(12) United States Patent
Duescher

(10) Patent No.: US 8,545,583 B2
(45) Date of Patent: Oct. 1, 2013

(54) METHOD OF FORMING A FLEXIBLE ABRASIVE SHEET ARTICLE

(76) Inventor: Wayne O. Duescher, Roseville, MN (US)

( * ) Notice: Subject to any disclaimer, the term of this patent is extended or adjusted under 35 U.S.C. 154(b) by 2447 days.

(21) Appl. No.: 11/029,761

(22) Filed: Jan. 5, 2005

(65) Prior Publication Data

US 2005/0118939 A1 Jun. 2, 2005

Related U.S. Application Data

(63) Continuation-in-part of application No. 10/816,275, filed on Aug. 16, 2004, now Pat. No. 7,520,800, which is a continuation-in-part of application No. 10/824,107, filed on Apr. 14, 2004, now Pat. No. 7,632,434, which is a continuation-in-part of application No. 10/418,257, filed on Apr. 16, 2003, now abandoned, which is a continuation-in-part of application No. 10/015,478, filed on Dec. 13, 2001, now Pat. No. 6,752,700, which is a continuation-in-part of application No. 09/715,448, filed on Nov. 17, 2000, now Pat. No. 6,769,969.

(51) Int. Cl.
C09K 3/14 (2006.01)
B24D 3/00 (2006.01)

(52) U.S. Cl.
USPC ............. 51/298; 51/309; 51/293; 451/527; 451/533; 451/539

(58) Field of Classification Search
USPC ............... 51/293, 295, 307, 308, 309, 298; 451/527, 528, 533, 539, 548, 550
See application file for complete search history.

(56) References Cited

U.S. PATENT DOCUMENTS 794,495 A 7/1905 Gorton et al. ............. 451/529
1,657,784 A 1/1928 Bergstrom ................. 51/295

(Continued)

FOREIGN PATENT DOCUMENTS
WO   WO 95/00295   1/1995

OTHER PUBLICATIONS

"Superabrasives and Microfinishing Systems" Product Guide. 3M, 1994, 60-4400-4692-2 (104.3) JR.
"Experimental Study and Neural Network Modeling of the Ligament Disintegration in Rotary Atomization" Atomization and Sprays, vol. 12, pp. 107-121, 2002, Stephan Stemowsky and Gunther Schulte, University of Bremen, Bremen, Germany and Roberto Guardani and Claudio A. O. Nascimento, Chemical Engineering Department (LSCP), University of Sao Paulo, Sao Paulo, Brazil.

Primary Examiner — Timothy V Eley
(74) Attorney, Agent, or Firm — Mark A. Litman & Associates, P.A.

(57) ABSTRACT

Flexible abrasive sheet articles having precision thickness flat-topped raised island structures that are coated with a monolayer of equal sized abrasive agglomerate are described. Methods of producing high quality equal-sized spherical shaped composite abrasive agglomerate beads containing small diamond abrasive particles are described. Beads are produced by level-filling fine mesh screens or perforated sheets with a water based metal oxide slurry containing abrasive particles and then using a fluid jet to eject the abrasive slurry lumps from the individual screen cells into a dehydrating environment. Surface tension forces form the ejected liquid lumps into spheres that are solidified and then heated in a furnace to form ceramic beads. These porous ceramic abrasive beads can be bonded directly onto the flat planar surface of a flexible backing material or they can be bonded onto raised island surfaces to form rectangular or disk abrasive sheet articles. Abrasive articles having equal sized abrasive beads are particularly suited for lapping and raised island articles are suited for high speed lapping. Non-abrasive equal-sized beads can also be formed using this simple bead manufacturing process, which requires only a very low capital investment.

26 Claims, 29 Drawing Sheets

(56) References Cited

U.S. PATENT DOCUMENTS

| | | | |
|---|---|---|---|
| 1,896,946 A | 2/1933 | Gauss | 451/527 |
| 1,924,597 A | 8/1933 | Drake | 451/550 |
| 1,941,962 A | 1/1934 | Tone | 5/295 |
| 2,001,911 A | 5/1935 | Wooddell et al. | 451/529 |
| 2,108,645 A | 2/1938 | Bryant | 427/204 |
| 2,115,897 A | 5/1938 | Wooddell et al. | 451/529 |
| 2,216,728 A | 10/1940 | Benner et al. | 51/298 |
| 2,242,877 A | 5/1941 | Albertson | 451/527 |
| 2,252,683 A | 8/1941 | Albertson | 51/298 |
| 2,292,261 A | 8/1942 | Albertson | 451/527 |
| 2,755,607 A | 7/1956 | Haywood | 451/527 |
| 2,820,746 A | 1/1958 | Keeleric | 205/114 |
| 2,838,890 A | 6/1958 | McIntyre | 451/527 |
| 2,907,146 A | 10/1959 | Dyar | 451/529 |
| 3,048,482 A | 8/1962 | Hurst | 51/298 |
| 3,121,298 A | 2/1964 | Mellon | 451/539 |
| 3,246,430 A | 4/1966 | Hurst | 451/534 |
| 3,423,489 A | 1/1969 | Arens et al. | 264/4 |
| 3,495,362 A | 2/1970 | Hillenbrand | 451/527 |
| 3,498,010 A | 3/1970 | Hagihara | 451/527 |
| 3,517,466 A | 6/1970 | Bouvier | 451/466 |
| 3,605,349 A | 9/1971 | Anthon | 451/534 |
| 3,702,043 A | 11/1972 | Welbourn et al. | 451/213 |
| 3,709,706 A | 1/1973 | Sowman | 501/103 |
| 3,711,025 A | 1/1973 | Miller | 239/222.11 |
| 3,859,407 A | 1/1975 | Blanding et al. | 241/3 |
| 3,916,584 A | 11/1975 | Howard et al. | 51/308 |
| 3,921,342 A | 11/1975 | Day | 451/550 |
| 3,933,679 A | 1/1976 | Weitzel et al. | 252/301.1 |
| 3,991,527 A | 11/1976 | Maran | 451/529 |
| 4,018,576 A | 4/1977 | Lowder et al. | 51/309 |
| 4,038,046 A | 7/1977 | Supkis | 51/295 |
| 4,111,666 A | 9/1978 | Kalbow | 51/295 |
| 4,112,631 A | 9/1978 | Howard et al. | 51/295 |
| 4,225,322 A | 9/1980 | Knemeyer | 51/295 |
| 4,251,408 A | 2/1981 | Hesse et al. | 524/541 |
| 4,256,467 A | 3/1981 | Gorsuch | 51/295 |
| 4,272,926 A | 6/1981 | Tamulevich | 51/216 |
| 4,311,489 A | 1/1982 | Kressner | 51/298 |
| 4,314,827 A | 2/1982 | Leitheiser et al. | 51/298 |
| 4,315,720 A | 2/1982 | Ueda et al. | 425/8 |
| 4,327,156 A | 4/1982 | Dillon et al. | 428/568 |
| 4,341,439 A | 7/1982 | Hodge | 350/96.22 |
| 4,364,746 A | 12/1982 | Bitzer et al. | 51/298 |
| 4,373,672 A | 2/1983 | Morishita et al. | 239/703 |
| 4,393,021 A | 7/1983 | Eisenberg et al. | 264/143 |
| 4,421,562 A | 12/1983 | Sands | 106/603 |
| 4,426,484 A | 1/1984 | Saeki et al. | 524/541 |
| 4,541,566 A | 9/1985 | Kijima et al. | 239/224 |
| 4,541,842 A | 9/1985 | Rostoker | 51/296 |
| 4,586,292 A | 5/1986 | Carroll et al. | 451/329 |
| 4,652,275 A | 3/1987 | Bloecher et al. | 51/298 |
| 4,710,406 A | 12/1987 | Fugier et al. | 427/389.8 |
| 4,773,599 A | 9/1988 | Lynch et al. | 241/69 |
| 4,773,920 A | 9/1988 | Chasman et al. | |
| 4,776,862 A | 10/1988 | Wiand | 51/293 |
| 4,799,939 A | 1/1989 | Bloecher | 51/298 |
| 4,863,573 A | 9/1989 | Moore et al. | 205/50 |
| 4,903,440 A | 2/1990 | Kirk et al. | 51/298 |
| 4,918,874 A | 4/1990 | Tiefenbach, Jr. | 51/293 |
| 4,930,266 A | 6/1990 | Calhoun et al. | 51/293 |
| 4,931,414 A | 6/1990 | Wood et al. | 501/103 |
| 4,974,373 A | 12/1990 | Kawashima et al. | 51/295 |
| 5,015,266 A | 5/1991 | Yamamoto | 51/293 |
| 5,020,283 A | 6/1991 | Tuttle | 451/550 |
| 5,090,968 A | 2/1992 | Pellow | 51/293 |
| 5,107,626 A | 4/1992 | Mucci | 451/28 |
| 5,108,463 A | 4/1992 | Buchanan | 51/295 |
| 5,110,659 A | 5/1992 | Yamakawa et al. | 428/141 |
| 5,127,197 A | 7/1992 | Brukvoort et al. | 51/204 |
| 5,137,542 A | 8/1992 | Buchanan et al. | 51/295 |
| 5,142,829 A | 9/1992 | Germain | 451/537 |
| 5,152,917 A | 10/1992 | Pieper et al. | 51/295 |
| 5,175,133 A | 12/1992 | Smith et al. | 501/127 |
| 5,190,568 A | 3/1993 | Tselesin | 51/293 |
| 5,199,227 A | 4/1993 | Ohishi | 451/527 |
| 5,201,916 A | 4/1993 | Berg et al. | 51/293 |
| 5,219,462 A | 6/1993 | Bruxvoort et al. | 51/293 |
| 5,221,291 A | 6/1993 | Imatani et al. | 51/293 |
| 5,232,470 A | 8/1993 | Wiand | 51/295 |
| 5,251,802 A | 10/1993 | Bruxvoort et al. | 228/121 |
| 5,273,805 A | 12/1993 | Calhoun et al. | 428/156 |
| 5,297,364 A | 3/1994 | Tuttle | 451/527 |
| 5,304,225 A | 4/1994 | Gardziella et al. | 51/298 |
| 5,318,604 A | 6/1994 | Gorsuch et al. | 51/293 |
| 5,343,656 A * | 9/1994 | Loos et al. | 451/540 |
| 5,368,618 A | 11/1994 | Masmar et al. | 51/295 |
| 5,380,390 A * | 1/1995 | Tselesin | 156/230 |
| 5,397,369 A | 3/1995 | Ohishi | 51/295 |
| 5,437,754 A | 8/1995 | Calhoun | 156/231 |
| 5,489,204 A | 2/1996 | Conwell et al. | 432/153 |
| 5,496,386 A * | 3/1996 | Broberg et al. | 51/295 |
| 5,549,961 A | 8/1996 | Haas et al. | 428/143 |
| 5,549,962 A | 8/1996 | Holmes et al. | 428/144 |
| 5,551,961 A | 9/1996 | Engen et al. | 51/298 |
| 5,611,825 A | 3/1997 | Engen et al. | 51/295 |
| 5,620,489 A * | 4/1997 | Tselesin | 51/293 |
| 5,674,122 A | 10/1997 | Krech | 451/536 |
| 5,733,175 A | 3/1998 | Leach | 451/41 |
| 5,820,450 A | 10/1998 | Calhoun | 451/530 |
| 5,888,121 A | 3/1999 | Kirchner et al. | 451/41 |
| 5,888,548 A | 3/1999 | Wongsuragrai et al. | 424/489 |
| 5,910,041 A | 6/1999 | Duescher | 451/28 |
| 5,910,471 A | 6/1999 | Christianson et al. | 51/295 |
| 5,924,917 A | 7/1999 | Benedict et al. | 451/526 |
| 5,967,882 A | 10/1999 | Duescher | 451/57 |
| 5,975,988 A | 11/1999 | Christianson | 451/28 |
| 5,984,988 A | 11/1999 | Berg et al. | 51/293 |
| 5,993,298 A | 11/1999 | Duescher | 451/56 |
| 6,017,265 A | 1/2000 | Cook et al. | 451/41 |
| 6,048,254 A | 4/2000 | Duescher | 451/28 |
| 6,080,215 A | 6/2000 | Stubbs et al. | 51/295 |
| 6,099,390 A | 8/2000 | Nishio et al. | 451/36 |
| 6,102,777 A | 8/2000 | Duescher et al. | 451/36 |
| 6,106,382 A * | 8/2000 | Sakaguchi | 451/443 |
| 6,120,352 A | 9/2000 | Duescher | 451/41 |
| 6,149,506 A | 11/2000 | Duescher | 451/59 |
| 6,159,087 A * | 12/2000 | Birang et al. | 451/526 |
| 6,159,286 A * | 12/2000 | Sung | 117/79 |
| 6,168,508 B1 | 1/2001 | Nagahara et al. | 451/527 |
| 6,186,866 B1 | 2/2001 | Gagliardi | 451/28 |
| 6,217,413 B1 | 4/2001 | Christianson | 451/28 |
| 6,228,133 B1 | 5/2001 | Thurber et al. | 51/295 |
| 6,231,629 B1 | 5/2001 | Christianson et al. | 51/295 |
| 6,277,160 B1 | 8/2001 | Stubbs et al. | 51/295 |
| 6,299,508 B1 | 10/2001 | Galiardi et al. | 451/28 |
| 6,319,108 B1 | 11/2001 | Adefris et al. | 451/533 |
| 6,368,198 B1 * | 4/2002 | Sung et al. | 451/443 |
| 6,371,842 B1 * | 4/2002 | Romero | 451/540 |
| 6,419,574 B1 * | 7/2002 | Takahashi et al. | 451/548 |
| 6,478,831 B2 * | 11/2002 | Tselesin | 51/293 |
| 6,521,004 B1 | 2/2003 | Culler et al. | 51/298 |
| 6,537,140 B1 | 3/2003 | Miller et al. | 451/259 |
| 6,540,597 B1 | 4/2003 | Ohmori | 451/443 |
| 6,551,366 B1 | 4/2003 | D'Souza et al. | 51/309 |
| 6,602,439 B1 | 8/2003 | Hampden-Smith et al. | 252/79.1 |
| 6,613,113 B2 | 9/2003 | Minick et al. | 51/298 |
| 6,620,214 B2 | 9/2003 | McArdle et al. | 51/298 |
| 6,645,624 B2 | 11/2003 | Adefris et al. | 428/402 |
| 6,752,700 B2 | 6/2004 | Duescher | 451/59 |
| 6,769,969 B1 | 8/2004 | Duescher | 451/59 |
| 6,884,155 B2 * | 4/2005 | Sung et al. | 451/443 |
| 7,258,708 B2 * | 8/2007 | Sung | 51/307 |
| 2002/0003225 A1 | 1/2002 | Hampden-Smith et al. | 252/79.1 |
| 2003/0143938 A1 | 7/2003 | Braunschweig et al. | 451/533 |
| 2003/0207659 A1 | 11/2003 | Annen et al. | 45/526 |

\* cited by examiner

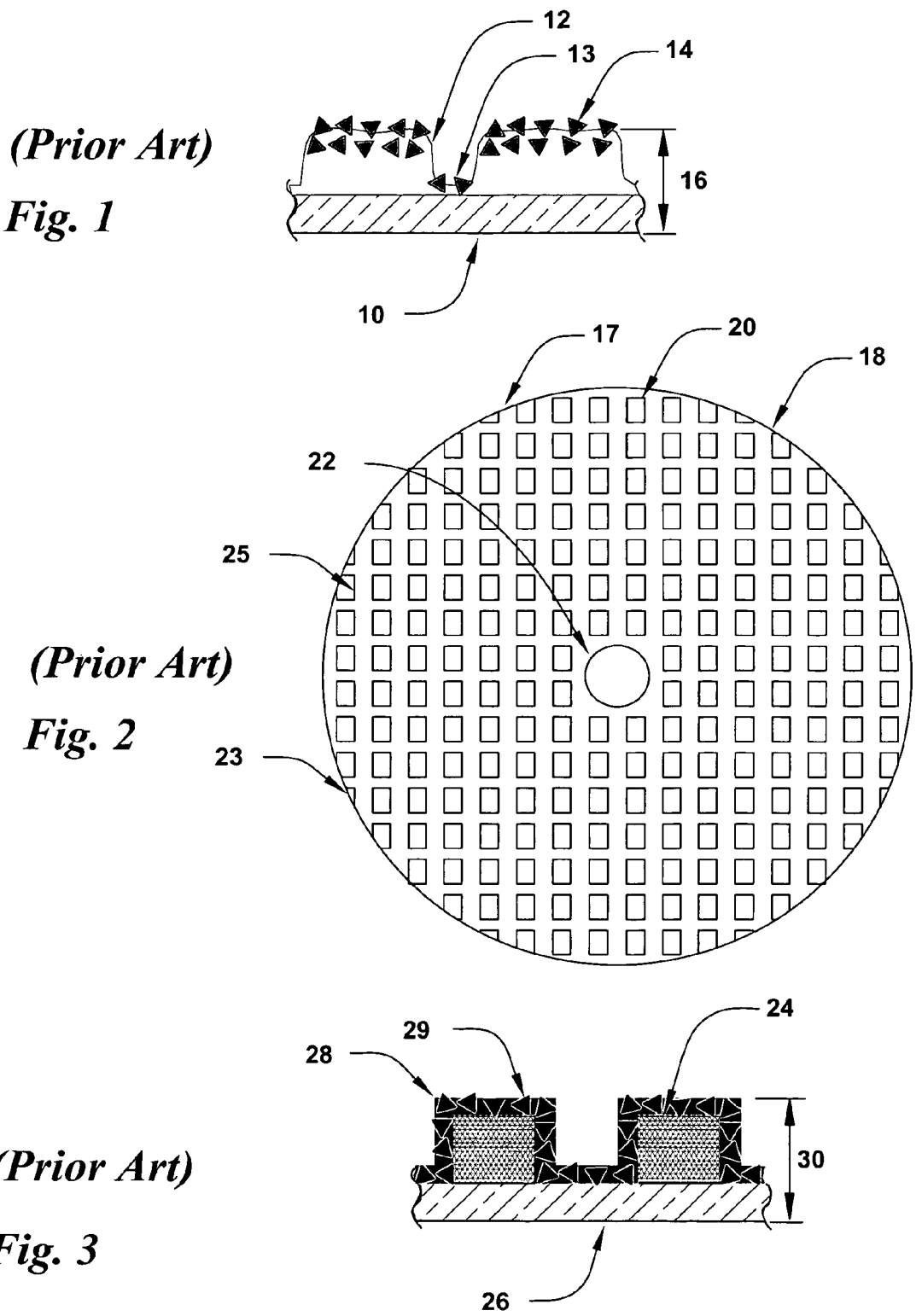

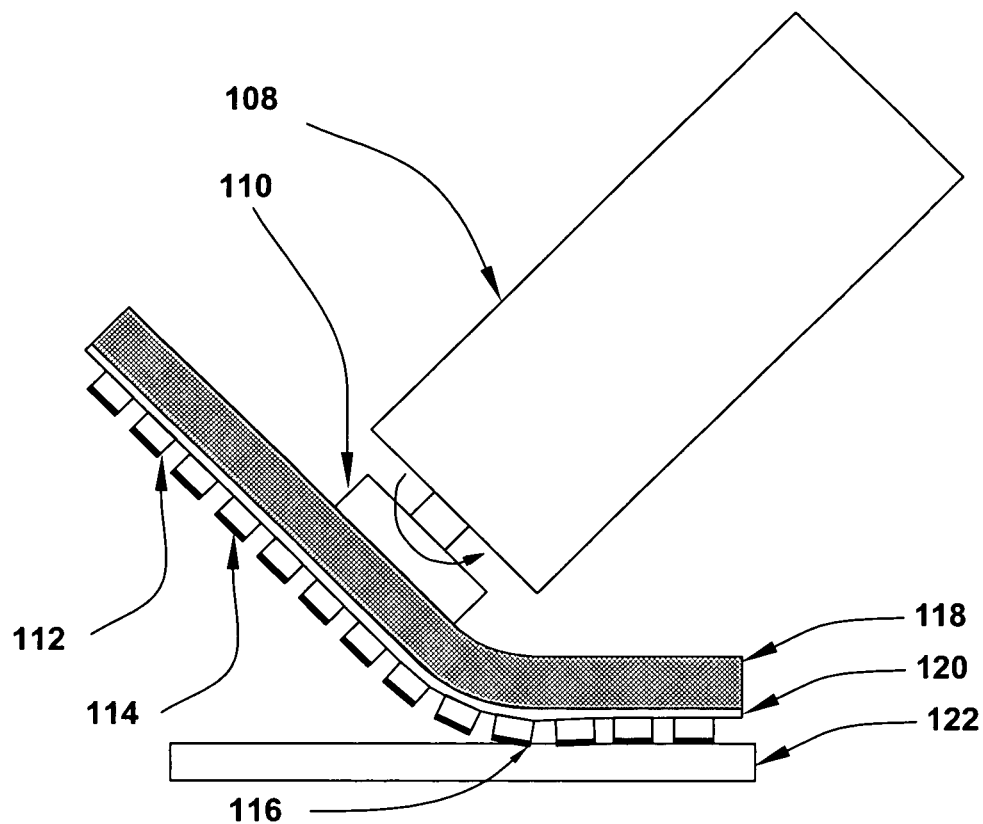
Fig. 10    (Prior Art)
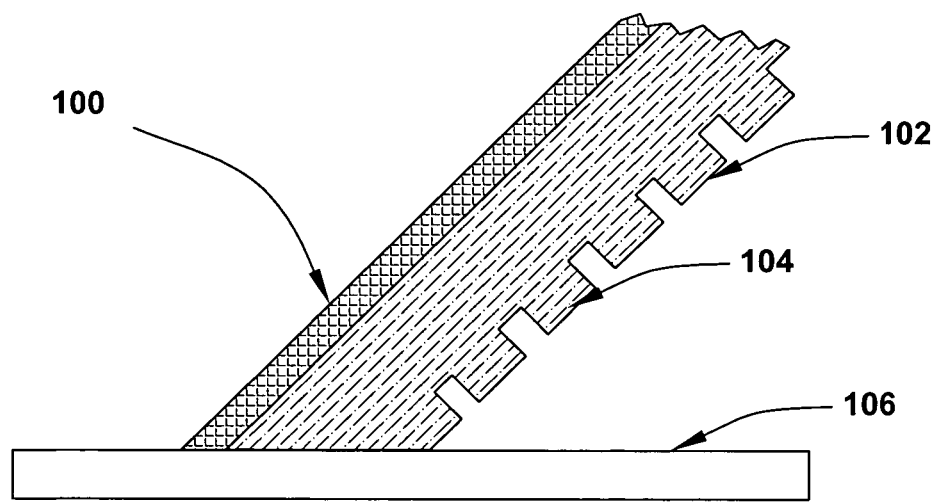
Fig. 11    (Prior Art)

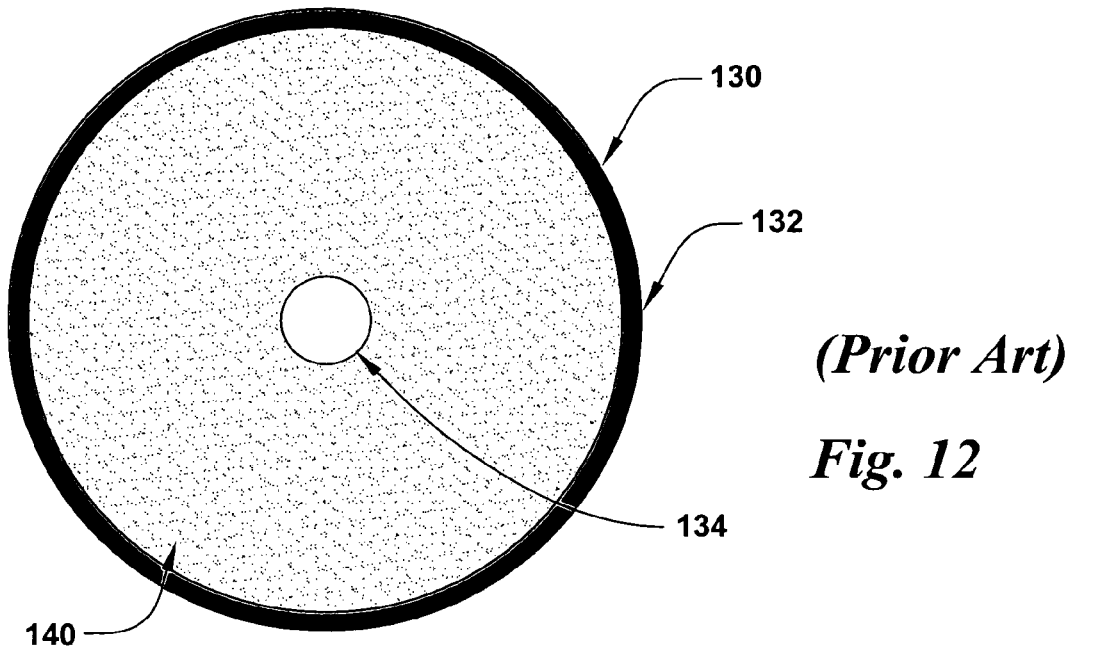
*(Prior Art)*
*Fig. 12*
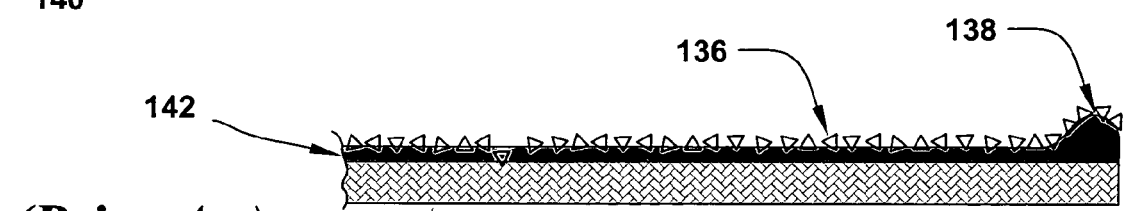
*(Prior Art)*
*Fig. 13*
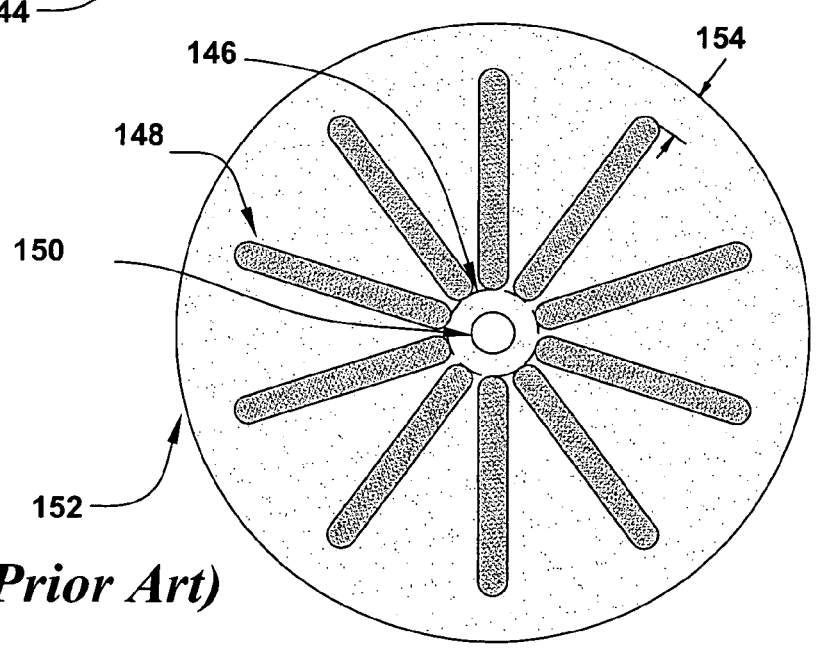
*Fig. 14* *(Prior Art)*

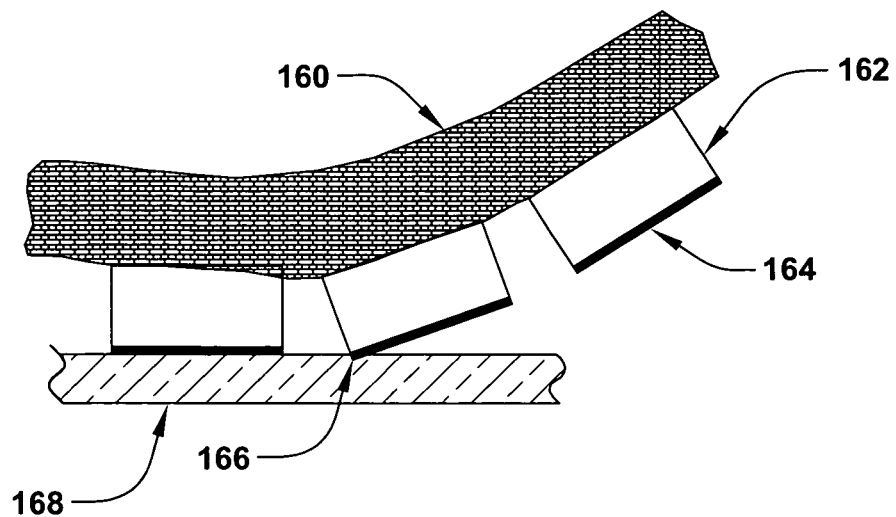
*Fig. 15* *(Prior Art)*
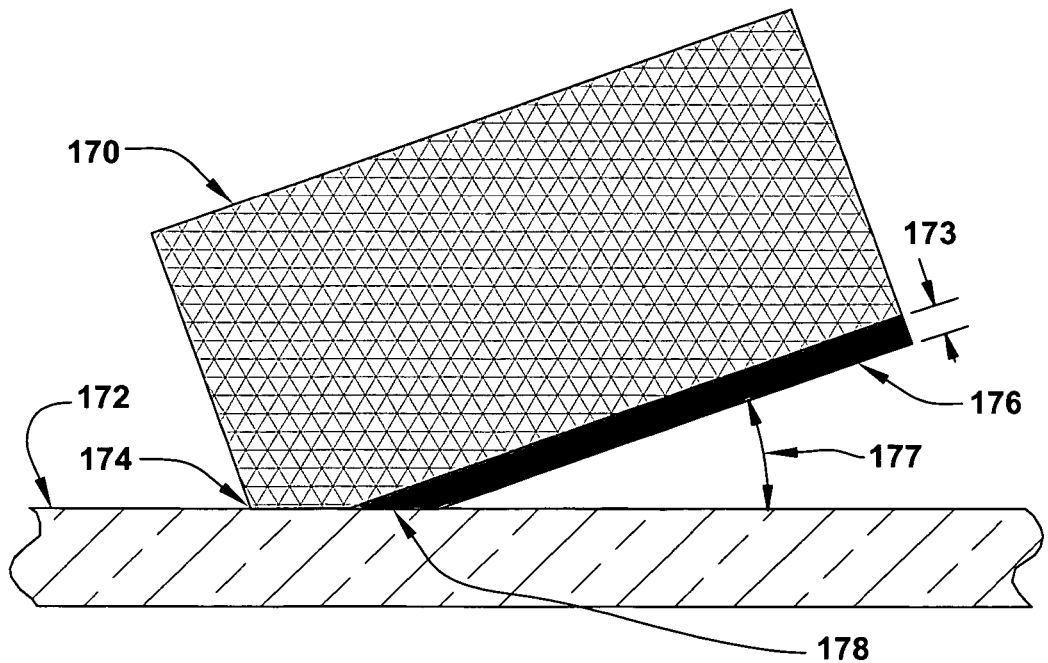
*Fig. 16* *(Prior Art)*

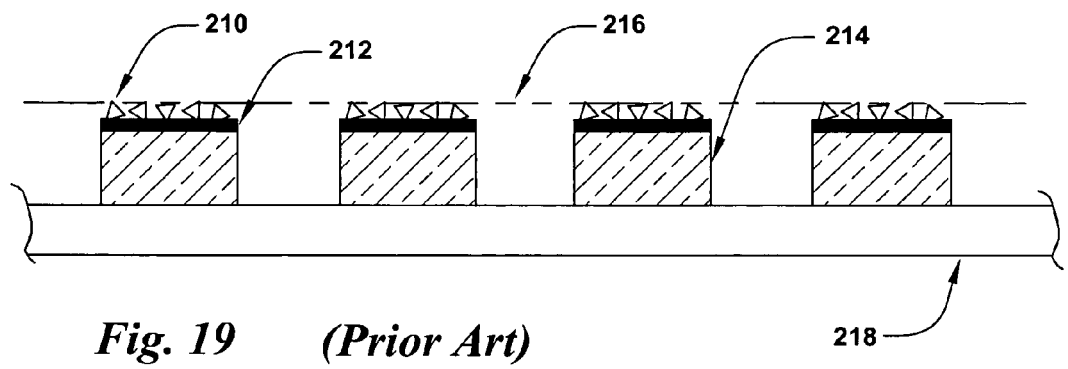
Fig. 19 *(Prior Art)*
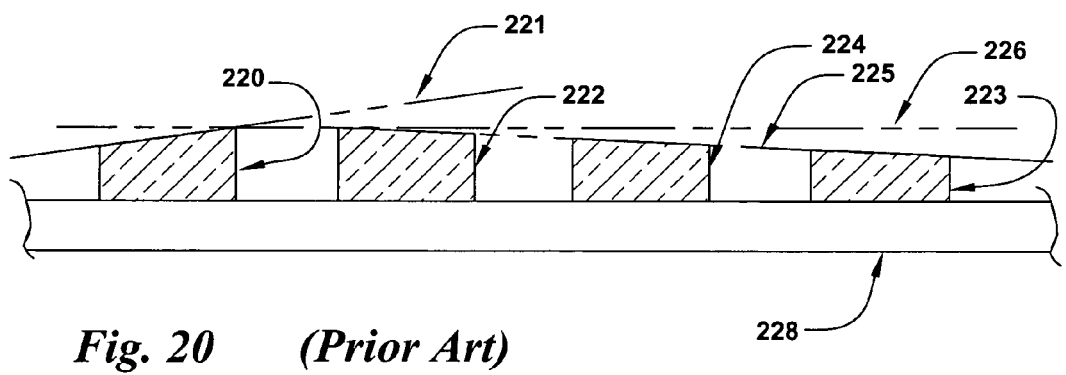
Fig. 20 *(Prior Art)*
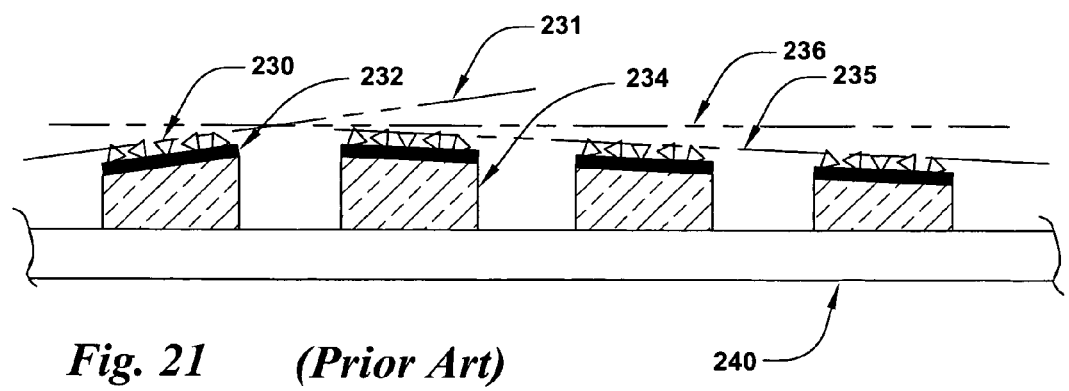
Fig. 21 *(Prior Art)*

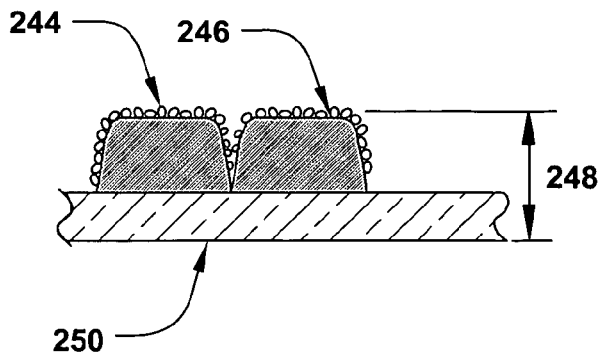
*(Prior Art)*
*Fig. 22*
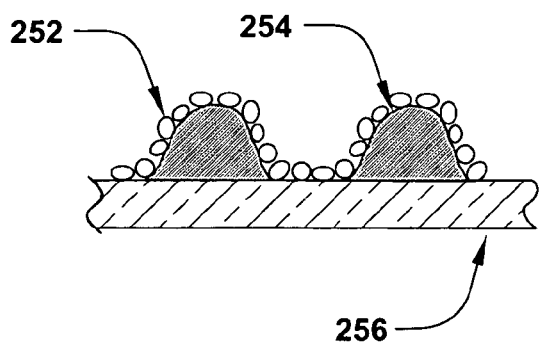
*Fig. 23* *(Prior Art)*
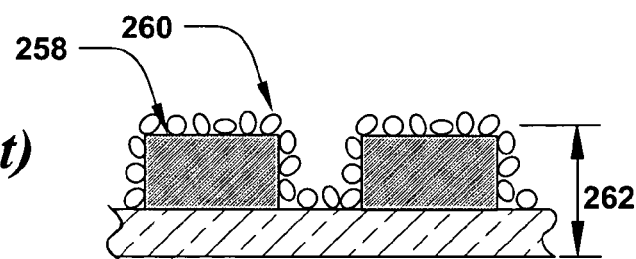
*(Prior Art)*
*Fig. 24*
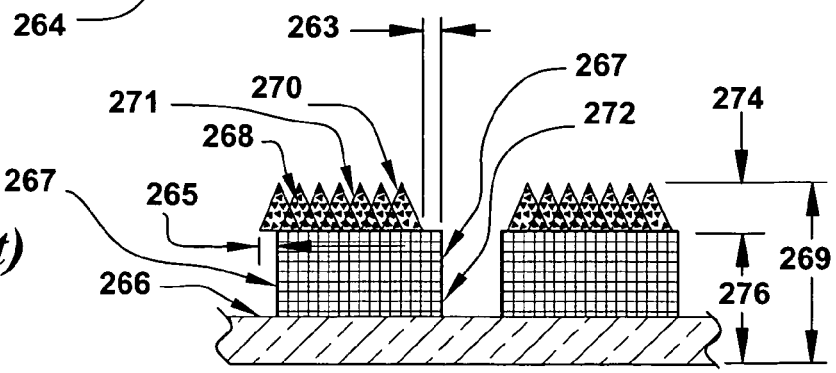
*(Prior Art)*
*Fig. 25*

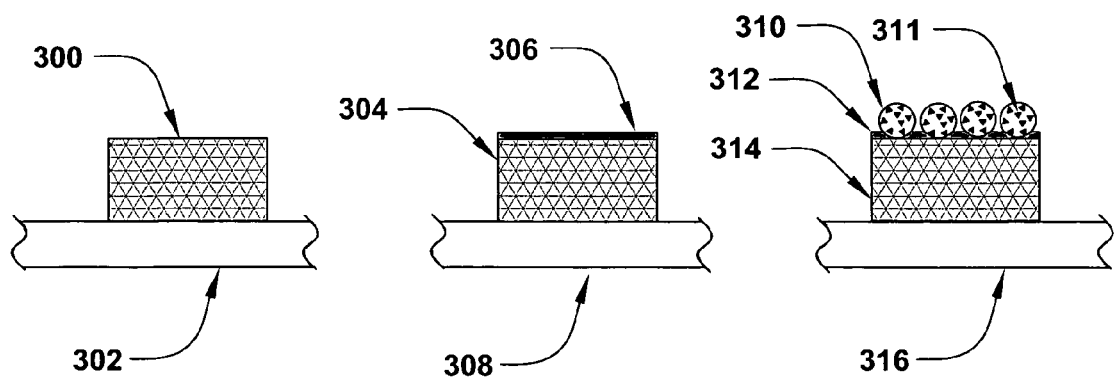
*Fig. 26*  *Fig. 27*  *Fig. 28*
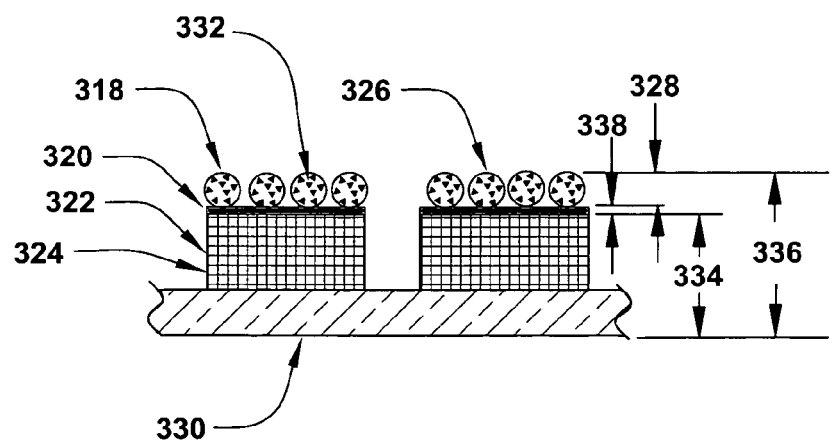
*Fig. 29*

METHOD OF FORMING A FLEXIBLE ABRASIVE SHEET ARTICLE

CROSS REFERENCE TO RELATED APPLICATION

This invention is a continuation-in-part of U.S. patent application Ser. No. 10/816,275, filed Aug. 16, 2004, now U.S. Pat. No. 7,520,800, which is a continuation-in-part of U.S. patent application Ser. No. 10/824,107, filed Apr. 14, 2004, now U.S. Pat. No. 7,632,434, which in turn is a continuation-in-part of U.S. patent application Ser. No. 10/418,257, filed Apr. 16, 2003, now Abandoned, which is a continuation-in-part of U.S. patent application Ser. No. 10/015,478, filed Dec. 13, 2001, now U.S. Pat. No. 6,752,700, which is a continuation-in-part of U.S. patent application Ser. No. 09/715,448, filed Nov. 17, 2000, now U.S. Pat. No. 6,769,969, and which applications are incorporated herein by reference.

BACKGROUND OF THE ART

1. Field of the Invention

The present invention relates to equal-sized abrasive agglomerate beads coated on both abrasive raised island and planar media, and also, to processes for manufacturing both the abrasive beads and raised island articles. The media are thin flexible abrasive sheeting used for grinding or lapping, workpiece surfaces. In particular, the present invention relates to media having the equal-sized abrasive beads or agglomerates bonded in monolayers to the flat surfaces of backing sheets. The sheets can also have raised island shapes that are repeated in patterned arrays where the top flat surfaces of the islands are coated with monolayers of the abrasive beads. The abrasive sheets and the raised island sheets can have a disk shape with an annular distribution of abrasive or the sheets can have rectangular shapes. The abrasive sheets can move against a stationary workpiece or the abrasive can be held stationary and a workpiece moved while in pressure contact with the sheets. Planar (non raised island) abrasive articles can be coated with the equal sized abrasive beads by many continuous web or sheet coating techniques that are in common use in the industry. The raised island abrasive articles can be manufactured with abrasive raised island surfaces, where the island surfaces are located in a common plane that is precisely parallel to the back mounting surface of the backing sheet. The individual island structures have thin top coatings of abrasive particles or abrasive agglomerate beads that are adhesively bonded to the top flat surfaces of the island structures, preferably in single or monolayers of particles or beads. The raised island abrasive articles can be used at high and slow abrading surface speeds where all or most of the abrasive particles are utilized in grinding or lapping flat workpiece surfaces. Small abrasive particles or abrasive bead agglomerates must be in direct contact with a workpiece to enable them to create material removal from the workpiece. Coolant water is typically used with abrasive grinding or lapping of workpieces, particularly for high speed abrading operations. The water cools workpiece surfaces and also cools the abrasive material where both are mutually heated by the friction heating of the abrasive moving in pressure contact with a workpiece. Overheating of abrasive particles can destroy the cutting capability of the abrasive. Coolant water can freely pass through the recessed flow channels formed as valley passageways between the raised islands to flush out grinding swarf and to exhaust excess water. This prevents swarf debris particles from scratching the surface of a workpiece when they can be lodged between the moving abrasive and the workpiece surface.

The formation of a boundary layer of coolant water on the surface of a workpiece or the hydroplaning of a workpiece on the surface of the abrasive can have a large effect on abrading the workpiece. If a portion of the workpiece is floated too far above the abrasive due to the separation caused by the thickness of the induced water boundary layer, no abrading contact is made with the workpiece in the area that has undersized beads or even full-sized beads in some cases. Because of this, it is desired to have equal-sized abrasive beads where all of the beads can be in contact with a workpiece. Hydroplaning of the workpiece when abrading at high surface speeds is minimized as a large proportion of the abrasive coolant water can pass between the raised island structures. Thick boundary layers of water that are usually formed between workpiece flat surfaces and flat-surfaced abrasive articles at high abrading speeds are diminished in thickness when an island-type abrasive is used. The water boundary layer thickness grows in magnitude as a function of the continuous water contact length between a workpiece and an abrasive surface. The water contact length is measured in the vector direction of the relative abrading speed between the workpiece and the abrasive. The reduced abrading-surface contact lengths of individual abrasive islands present shorter water contact lengths between a workpiece and an abrasive surface than occurs for a comparable continuous surface abrasive article. The short water-contact lengths of the island surfaces can produce substantially reduced water boundary layer thicknesses if the island surface length of the island is sufficiently short in the direction of relative motion between the abrading surfaces. Islands may have long lengths in a direction perpendicular to the direction of movement as the water boundary layer builds up in thickness from a leading edge of contact to the trailing edge of contact in the vector direction of the abrading relative surface velocity. Water boundary layer thickness is a function of a number of process variables including the abrading vector velocity, the viscosity of the water lubricant, the distance from the leading contact edge, the surface roughness and surface flatness of both the workpiece and the abrasive media and the contact pressure between workpiece and the abrasive article. However, in most abrading applications, the type of abrasive article, the abrasive particle or abrasive agglomerate size, the abrading surface speed, the contact pressure and the water lubricant are set or optimized for a given workpiece. The one important variable than can be changed is the use of an island type abrasive article in place of a continuous abrasive surface article to reduce the boundary layer thickness and to provide a free passage of grinding debris away from the workpiece abrading contact area. In the case of lapping, water traveling down the passageways that exist between island structures can flush abrasive media or workpiece debris particles out of the abrading contact areas and reduce the possibility of workpiece scratches. The same highly desired monolayers of abrasive bead agglomerates, each containing small sized abrasive particles, can be used on the island top surfaces as that which are presently used on abrasive articles having continuous flat abrasive surfaces. Island type abrasive is known to produce flatter workpiece surfaces than does continuous surfaced abrasive sheet article, particularly when used at high abrading surface speeds. Improved workpiece flatness when abraded with island abrasive is discussed in patent literature. High abrading speeds are desired for achieving high workpiece material removal rates by diamond and other abrasive materials. If the water boundary layer thickness varies over the surface of the portion of the workpiece being abraded, then the abrading contact between the workpiece and the abrasive media can vary and non-flat workpiece surfaces can be generated. It is desired to have uniform contact between the workpiece and the abrasive media over the whole abrasive contacting surface of the workpiece to generate flat surfaces. It is also preferred that the abrasive beads have a diameter size that is from 30 to 60 micrometers and that the standard deviation in size of the beads is less than 50% of the bead size to create an abrasive article that is precisely flat and that utilizes all of the abrasive particles that are contained in each abrasive agglomerate bead. The precision thickness control of the backing sheet abrasive articles assures that all of the abrasive material coated on an abrasive article contacts and abrades a flat workpiece. However, it is also necessary that the flat surface of the platen to which the abrasive sheet article is attached is also precisely flat so that the exposed abrasive surface is in flat contact with the workpiece surface. Lapping workpieces require both flat abrasive sheeting articles and flat abrasive article mounting surfaces even at low abrading surface speeds. At high abrading surface speeds, raised abrasive coated islands can prevent the formation of large boundary layers of coolant water between the workpiece and abrasive surfaces, which in turn, can prevent the creation of precisely flat workpiece surfaces.

2. Background of the Invention

Island type abrasive articles have been produced for many years, particularly for abrasive disks used on manually operated hand grinders. The islands have a variety of shapes including annular bands of discrete island shapes and generally had a repetitive geometric pattern. Many of the earliest abrasive islands were patterns of individual areas of abrasive that were flat coated on a backing sheet or backing disk with non-abrasive coated gap spaces located between the island shapes. Some early abrasive islands were raised island shapes that were produced by a variety of methods. In one of the earliest methods a very thick layer of make coat adhesive is applied to a backing disk, abrasive particles are then deposited on the surface of the thick adhesive and then embossing dies are used to push down portions of the abrasive coated adhesive which raised other adjacent portions to form abrasive coated raised island structures. This technique only was possible with thick coated sub layers of adhesive as it would not be possible to form the raised islands with a thin layer of adhesive with the embossing dies. In another of these same very early methods, individual raised island structures were independently formed in patterns on a backing sheet and these raised structures were then coated with a layer of abrasive particles that were adhesively bonded to the island structures. More recently, raised island structures are been formed on a backing sheet and the top surfaces (only) of the island structures are coated with abrasive particles or tooth-formed shapes of an abrasive layer. None of the referenced prior art abrasive coated raised island structure patents, other than Duescher in U.S. Pat. Nos. 6,752,700 and 6,769,969, address or teach the desirability of having layers of abrasive particles or abrasive agglomerates coated on precise height island structures to produce an abrasive article that has a final product precise thickness measured from the top surface of the abrasive media to the bottom surface of the backing sheet. Also, these other prior art patents do not teach of the desirability of using mono layers of abrasive particles or agglomerates on the top surface of the island structures.

An abrasive product from 3M Company is the pyramid shaped Trizact® abrasive, which helps with hydroplaning effects when used for high abrading speed processes. Coolant water flows between the tops of the pyramids when the abrasive article is only slightly worn and there are significant recessed water passageway channels between the pyramid tops. These recessed channels are substantially reduced as the Trizact® article becomes worn down and hydroplaning can become more significant. After the pyramid tips are worn down and the pyramid shape is reduced in height, the abrasive article tends to behave more like a more conventional abrasive article that has a continuous coating of abrasive as the coolant water passageways that lie between the tips are reduced in size. Also, it is only practical for this shaped pyramid product to be created with inexpensive abrasive media such as aluminum oxide as most of the volume of abrasive particles reside in the base of the pyramids and are only in abrading contact with a workpiece when the abrasive article is substantially worn down. Use of expensive diamond particles in these pyramid structures is not practical as much of the volume of the diamond particles that reside in a pyramid may not be utilized, particularly when the abrasive article is mounted on a platen, or other, mounting surface that is not precisely flat. Abrasive articles having patterns of shaped pyramid abrasive structures attached to a backing surface tend to wear fast and unevenly across its surface. These are a continuous web type of abrasive article products that typically do not have the precise article thickness control required for high speed precision flat lapping.

Coated abrasives typically have a plurality of abrasive particles or abrasive agglomerates bonded to a backing by means of one or more binders. Coated abrasives utilized in polishing processes are typically in the form of endless belts, tapes, or rolls that are provided in the form of a cassette. Examples of commercially available polishing products include "IMPERIAL" Microfinishing Film (hereinafter IMFF) and "IMPERIAL" Diamond Lapping Film (hereinafter IDLF), both of which are commercially available from Minnesota Mining and Manufacturing Company (3M Company), St. Paul, Minn.

High speed lapping can be accomplished with the use of thin flexible abrasive coated disks or sheets that are very precise in thickness and that are attached to a platen that is very flat and stable. When a platen having an attached abrasive disk rotates very fast, the high speed contact of the abrasive with the workpiece tends to "level" the abrasive surface as it is presented to the workpiece surface. As only the high spots of the abrasive contact the workpiece, the remainder of the disk abrasive is not used until the high spots wear down. Thus, it is necessary for the total lapping system equipment to be precisely aligned and constructed of precision components to provide precision abrading action, particularly at the start of the process when a new abrasive article sheet is first attached for use. Furthermore, the wear of the abrasive must proceed uniformly across both the surface of the planar abrasive sheet and across the surface of each island to maintain the required flatness of both the effective abrasive surface and correspondingly, the workpiece surface. Various configurations of high speed lapper machines along with different abrading process techniques employed in operating the machines have been defined. Lapping equipment and lapping process procedures that apply are taught by Duescher in U.S. Pat. Nos. 6,149,506, 6,120,352; 6,102,777; 6,048,254; 5,993,298; 5,967,882, 5,910,041, 6,752,700 and 6,769,969 which are incorporated herein by reference.

The manufacture of flat surfaced raised island abrasive articles that are to be used in lapping or flat-lapping is critical in that the finished article product should have abrasive particles that are all bonded to an abrasive disk article at the same elevation from the backside of the abrasive article. It is not critical to control the absolute height of abrasive flat islands as the depth of the water passage valleys located between the island structures can vary considerably and still perform the function of a simple water passageway. The total thickness of the monolayer abrasive coated abrasive article must be controlled to within a small fraction of the size of the abrasive particles or agglomerates coated on the island surfaces. This thickness control can be accomplished quite easily by using abrasive media production equipment that has approximately the same precision flatness and motion accuracy as the lapping machine equipment that is required to effectively use the abrasive article for precision-surface high speed lapping. Traditional methods of producing lapping disk articles is to abrasive coat a continuous web sheet and die-cut or punch out disks or sheets from the web sheet. Producing a precision flat workpiece surface when abrading with a non-flat abrasive disk article is difficult. Rectangular arrays of raised abrasive islands or flat surface abrasive coated backings can also be used for a variety of abrasive articles including: rectangular flexible flat abrasive article sheets where a workpiece can be moved relative to the abrasive sheet; continuous abrasive strips or abrading-tape articles; and also, endless abrasive belt articles. A slurry mixture of abrasive particles or composite abrasive agglomerate beads mixed with a solvent diluted resin can also be applied to bare or primer coated island tops or directly on the surface of backing material. Here, the top surface of individual abrasive beads are exposed from the surrounding surface of the abrasive bead supporting resin that is used to bond beads to the island structure top surfaces or backing sheet, after evaporation of the solvent. Batch manufacturing of small groups of individual annular band abrasive articles allows the utilization of quick response manufacturing techniques for specialty abrading applications. The batch process production rates can be increased substantially with a hybrid enhancement of producing resin transfer coating sheets that are used to transfer coat a abrasive resin slurry or a resin make coat to a backing sheet. A simple hand-spread notch-bar coater can be used to apply a resin make-coat or a abrasive slurry coating onto a continuous web backing material that is then cut or converted into transfer rectangular sheet or circular disk segments. Individual backing sheets having attached raised islands or non-island backing sheets can then be placed in flat contact with the resin or slurry coated transfer sheet web-sections that have been cut-out from the coated web. When the transfer sheet is separated from the backing, approximately 50% of the transfer sheet resin or slurry thickness is transferred to the surface of the target raised island or non-island backing sheet. In the case where a make coat of resin is applied to a backing material, abrasive beads are applied to the wet resin to form an abrasive coated backing.

Lapping and grinding can be performed on the surface of a workpiece part by placing the workpiece in moving contact with an abrasive sheet and controlling the contact force holding the workpiece against the abrasive. To create this abrading action either the workpiece can be moved along the surface of the abrasive or the abrasive can be moved along the surface of the workpiece. An increased contact force results in higher workpiece material removal rates and a more coarse or rough workpiece surface finish. A reduced force results in a smoother finish but lower material removal rates. Water, which is often used both as a coolant and also as an agent to flush grinding swarf from the contact area between the workpiece and the abrasive can cause hydroplaning of the workpiece when there is a high relative surface speed between the workpiece and the abrasive article surface. A continuous film of water present at the moving contact interface surface area between the workpiece and the abrasive surface tends to separate the workpiece surface from the abrasive surface. Hydroplaning of the workpiece occurring during the abrading action tends to develop cone or saddle shapes on the workpiece surface thereby preventing the formation of a precision flat workpiece surface. Use of raised abrasive top-coated flat surfaced islands attached to a backing sheet allows passage of water within the passageways formed by the valleys between islands while the abrasive is maintained in direct contact with a workpiece surface. Each abrading island contact raised land area is flat across its surface and can be used for flat lapping or flat grinding of workpiece articles.

In flat lapping or polishing where a flat workpiece surface is presented in surface contact with a flat abrasive article to produce cutting, grinding or polishing action where the contact surface pressure, in pounds per square inch or newtons per square cm, is uniform across a portion of, or the full surface of the workpiece. Contact pressures are typically controlled to be low at the onset of the polishing process, increased progressively and then decreased in the final phase of a lapping operation to obtain the most effective utilization of the abrasive media. A single or mono layer of abrasive particles or agglomerates is highly desired for flat lapping of workpieces including pump seals, bearing seals, optical components including but not limited to a lens, a fiber optic connector, optical crystals, and semiconductor substrates. Abrasion may take place where the workpiece is held stationary and the abrasive sheet article or lapping film is moved relative to the workpiece. Lapping film is a abrasive article having a thin, flexible polymer backing coated with abrasive particles or coated with spherical bead abrasive agglomerates. Also, abrasion may occur where the abrasive article or lapping film is held stationary and the workpiece is moved relative to the abrasive article. Relative surface speeds of the abrasive may be considerably less when moving the workpiece relative to the abrasive sheet than the abrasive speeds that are used in high speed lapping. In high speed lapping, the moving abrasive sheet typically has very high surface speeds to take advantage of the high cut rates that occur when using diamond abrasive at high surface speeds. Abrasive lapping sheets, commonly referred to as lapping films, typically have very precision thickness abrasive sheet article thicknesses and also have monolayer thickness abrasive particle coatings that are critical to produce the very precise flat surfaces and the very smooth polished surfaces required for optical workpieces and fiber optic devices.

Abrasive lapping of workpieces requires that fixed-abrasive sheet articles produce both a flat surface and a smooth surface. Polishing of a workpiece only requires a production of a smooth surface. Use of fixed-abrasive sheet articles has many advantages over the use of a liquid abrasive loose-particle slurry mixture. High speed lapping with a fixed-abrasive sheet takes advantage of the very high material removal rate of diamond abrasive that occurs when it moves at a high surface speed against the surface of a hard workpiece. Slurry lapping requires a slow abrading surface speed because of the limitations in shearing the liquid slurry mixture as a workpieces is held against a flat platen coated with the abrasive slurry. A preferred form of fixed-abrasive used for lapping is very small abrasive particles having sizes from 0.1 to 3.0 microns that are encapsulated into porous ceramic beads that have a modest sized diameter of 45 microns. These beads are bonded to the top surface of a thin backing sheet having a precise thickness to form a abrasive sheet article. The small abrasive particles provide a smooth workpiece finish and the larger beads provide sufficient abrasive material for a long life of the abrasive article. The 45 micron beads are not too large to create significant low-spot abrasive areas on the article during the abrasive wear down of the beads that occurs during abrading. These low-spots can result in non-flat workpiece surfaces. Almost all of the abrasive particle material contained within the individual spherical abrasive beads is contained at the center of the bead sphere which is located at 22.5 microns (one half the sphere diameter) up from the backing sheet top surface. Therefore, most of the workpiece material removal is provided by abrasive particles that are located at a narrow range of height variation from the top surface of the backing sheet which acts as a natural process mechanism to provide flat workpiece surfaces. When all of the beads are of an equal diameter size then all individual beads contribute equally to material removal. Beads can be coated directly on the flat surface of a backing sheet or the beads can be coated on the top flat surfaces of raised islands that are attached to backing sheets. Abrasive articles having a single or mono layer of individual abrasive particles or composite abrasive agglomerate beads coated on the flat surfaces of a flexible backing media provides the capability to grind and polish workpieces both flat and smooth during lapping and grinding operations. To have accurate and smooth high speed lapping it is critical that the abrasive be worn evenly across the abrasive article surface to maintain the presentation of a flat abrasive surface to workpiece surfaces throughout the working life of the abrasive article. It is also very important that all the abrasive attached to the surface of an abrasive article be positioned at the same elevation relative to the backside of the backing to allow contact of all of the individual particles. High abrading surface speeds are desired to effectively utilize the cutting action of diamond abrasive that can produce very high material removal rates on very hard substrate workpiece materials. However, diamond abrasive is also often used for low speed grinding or lapping, particularly when a workpiece is moved relative to a fixed position or slow moving abrasive sheet. Individual large abrasive particles can also be coated directly on the surface of a disk backing and used effectively for grinding. However, the small abrasive particles that are required to produce precisely smooth workpiece surfaces are too small to be directly coated on backings. Instead, small abrasive particles are joined together in agglomerates or beads having a larger size and these larger sized beads are coated with space gaps between individual beads on a backing sheet to form an abrasive article. A method is described for forming equal-sized composite spherical glass or ceramic beads with the use of a open mesh screen material. The beads can be solid or hollow. The beads may be comprised of a ceramic material or the beads may be comprised of a agglomerate mixture of different materials including ceramic materials and abrasive particles. Abrasive particles of different sizes may be incorporated into individual beads. Different types of abrasives including diamond, cubic boron nitride, aluminum oxide and other abrasive particles, and also non-abrasive materials including metals and lubricants or combinations thereof can be mixed together within the individual beads. Hollow abrasive beads may be formed where the ceramic and abrasive mixture forms the shell of a hollow abrasive bead. Preferably, the beads are abrasive agglomerates comprised of very small abrasive particles enclosed by an erodible ceramic matrix material.

Use of monolayers (single layers) of abrasive particles or abrasive composite agglomerates maximizes the use of individual abrasive particles and allows flat grinding of composite dissimilar workpiece materials including semiconductor devices having metal embedded within ceramic materials. Abrasive monolayers coated on backing sheets or coated on the top surfaces of raised island structures prevent the second-tier level of individual abrasive particles that are bonded at a raised elevation to particles bonded directly to a backing surface from digging out soft material workpiece features from hard workpiece substrate materials. Soft material "pick-out" can occur when the elevated non-monolayer abrasive particles are forced down into the workpiece embedded soft material by the abrading contact forces becoming concentrated upon the single raised particles as the abrasive moves relative to the workpiece surface.

When an abrasive article used for polishing that has a mono or single layer of abrasive particle or agglomerate or bead coated media, there will be less pick-out of softer materials, or discrete hard foreign nodules, located in pockets on the surface of hard workpiece articles than there will be when abrasive articles having stacked particles on the coated abrasive media. Workpieces having these characteristics that are susceptible to pick-out include semiconductor devices having soft metal conductor material imbedded in trenches in hard ceramics material and cast cylindrical automotive parts having carbon or other precipitated inclusions on the part surface.

Spherical bead composite agglomerate abrasive particle shapes are a preferred agglomerate shape for creating a single layer or monolayer of composite agglomerates on a backing sheet. The spherical shape provides more consistency in shape and consistency in slurry coating or abrasive particle drop coating than do acicular shaped or irregular shaped agglomerates formed by crushing a hardened abrasive composite material. The geometry difference between an agglomerate sphere shape and an agglomerate block shape has a pronounced effect on the utilization of individual abrasive particles coated on an abrasive article. The primary bulk of individual abrasive particles contained in a spherical erodible abrasive composite agglomerate are located at the sphere center of the spherical agglomerate which is positioned a sphere radius distance above the surface of a backing sheet. When the agglomerate abrasive spheres are raised to an elevated position above the backing surface, the elevated position of the bulk of the sphere-contained individual abrasive particles assures that most of the particles contained in a spherical agglomerate are effectively used in abrading action as the abrasive article becomes worn down. An abrasive article is usually abandoned prior to wearing all of the agglomerates completely down to the agglomerate base that is adhesively bonded to a backing surface that gives an abrasive particle utilization advantage to spherical agglomerates over block shape agglomerates. Few of the original total quantity of unused individual abrasive particles are contained in the remaining truncated hemisphere small-volume areas of spherical agglomerates that are left attached to a worn-down abrasive article backing-sheet. Comparatively, a larger portion of unused individual abrasive particles reside in the remaining truncated block-shape non-spherical agglomerates worn-down to the same height level above the backing surface as for the worn-down spherical agglomerates. The number of abrasive particles contained in the highly reduced volume in the inverted apex of a diminished truncated sphere are very small compared to the particles contained in the linearly reduced volume agglomerate block shape bonded flat to a backing sheet. Some coated abrasive particles including individual abrasive particles, abrasive agglomerates and spherical abrasive beads are often stacked at different levels where some of the particles are positioned 50% of their diameters above the height of like-sized particles which are located in direct contact with the surface of the backing sheet. Other particles are often stacked in layers that are positioned two or more particle diameters above the backing surface. These "high-positioned" particles are few in number compared to those positioned directly on the backing surface but these high-risers have an exaggerated effect on polishing a workpiece. Although not wanting to be bound by theory, it is believed that the high positioned particles will tend to reach down into the soft portions of a hard substrate surface and gouge out or selectively abrade away the softer material as the abrasive travels in abrading contact with the substrate surface. In the case of the force tensioned abrasive tape system, the abrading contact pressure that acts normal or perpendicular to the substrate or cylindrical journal surface is quite low compared to the normal surface contact pressure present in the nip-roll abrasive system. Less pick-out of soft materials will occur with the abrasive tensioned tape system than with the nipped roll abrasive belt system. The nipped belt having the relatively high contact pressures in the central land area will aggressively loosen and dispel the hard foreign surface particles or erode and gouge out soft material areas whenever a raised surface abrasive particle comes in contact with the foreign material nodule or the soft material. All of the localized high nip roll contact pressure tends to become focused on the high level abrasive particles which drives these individual high particles down into the soft material whereas the bulk of the same sized adjacent particles are self-bridged across the soft area and are principally in contact with the hard substrate parent material surface. These high particles or agglomerates also can tend to apply large impact forces to imbedded foreign surface particles when the abrasive is moving at high speeds in contact with the workpiece surface and dislodge the imbedded particle, leaving a crater in the surface of the substrate or cylindrical metal surface. Dislodging foreign particles can occur in the process of high speed lapping; where surface speeds of 10,000 surface feet per minute or more can be reached.

A wide range of diamond or other abrasive particles or abrasive agglomerates or spherical abrasive beads are commonly attached to the surface of abrasive articles. Some abrasive particles are faceted crystals having sharp edges on many sides. The sharp particle edges provide cutting surfaces that are brought in pressure contact with a workpiece to cut, grind or polish the workpiece surface. Ceramic bead composite agglomerates for a particular classification of diamond particles also tend to have different spherical diameters for a given particle size classification. For example, a 3-micron diamond particle classification abrasive article may be supplied coated with spherical beads having a range in size from 15 micron to 45-micron beads. Here, many 15 micron beads are often located adjacent to a few 45 micron beads in a typical coated abrasive article. The exact size range of the 3-micron classification abrasive diamond particle supplied within the composite agglomerate beads coated on a commercially available abrasive article is typically not listed in the product literature description. The "3 micron" classification diamond particles are actually a range of particle sizes, with a distribution where some of the individual diamonds either larger or smaller than the nominal or average 3-micron stated size.

Abrasive beads having sizes of 45 microns or larger can be coated in single or mono layers on an abrasive article backing and used for abrading or lapping. Typically, the individual particles are worn down from their apex-top until only a small portion of each particle remains at the end of the life of the abrasive article. Individual particle are attached to a backing sheet with enough room between particles that each individual particle is in a highly localized pressure contact with a workpiece surface during an abrading process. The localized pressure on the exposed tip of an individual diamond particle is so high and the frictional heating of the particle tip due to abrading action so severe, that carbides can be formed when the carbon in the diamond combines with the iron in a steel workpiece. Formation of the carbides result in dulled diamond particles. If the spacing between the abrasive beads is too small, the abrasive article surface can actually act as a bearing surface rather than an abrading surface with little resultant abrading action that removes workpiece surface material. When abrasive particles are used, the scratched depth or material removed as a layer from a workpiece substrate is thought to be roughly proportional to the diameter or size of the particle. Large diameter particles are used to aggressively remove large quantities of workpiece material but they leave large scratches on the surface of the workpiece that result in a coarse or rough surface finish. Progressively smaller sized abrasive particles are used to effect a smooth surface as the scratches produced are also progressively smaller and the top "surface damage" produced by the previous larger sized particle is removed by the subsequent small particles. When the size of the particles are less than 20 microns or 10 microns and particularly, when less than 1 micron, the small quantity of abrasive particles contained in a monolayer coated on a backing prevents extended use of the abrasive article. This thin layer of abrasive particles coated would be worn away and expelled from the article surface rendering the abrading performance of the article ineffective. It has been found by the abrasive industry that the small sized particles desired to produce a smooth workpiece surface finish can be joined together in composite agglomerates having an eroding matrix of supporting porous ceramic material provides long abrading life of the article and produces a smooth workpiece surface finish. The eroding mixture is controlled to erode away at a rate where the individual particles become loosened and are expelled from the agglomerate at the time that the particles become dull from abrading. A fresh new layer of sharp particles is then provided to be in contact with the workpiece surface. The eroding process continues progressively from the top of the agglomerate to the bottom of the agglomerate until all of the volume of the agglomerate is worn away and all of the individual abrasive particles are used. Composite agglomerates have a typical size of 45 microns or less for a mixture of 3 micron or less sized abrasive particles. The 45 micron agglomerates are often spherical shaped ceramic beads where the 45 micron size is not too large that enough wear occurs on one portion of the abrasive article that the flatness of the abrasive article is unacceptable due to the agglomerate abrasive height change that occurs when only some of the agglomerates are worn down and other agglomerates have little wear. Within a typical 3 micron categorized ceramic bead agglomerate, the abrasive particle component of the agglomerate bead is not restricted only to particles that are exactly 3 microns in size as it is not practical to procure a quantity of a single size particle only.

When small particles are mixed with large particles, the adjacent large and small particles contained in a individual agglomerate will tend to produce different polishing effects simultaneously on the workpiece. The size of the agglomerates used to encase a specific particle size depends on many variables including the techniques or processes used to manufacture the ceramic beads or other types of agglomerates. Typically, the agglomerates coated on an abrasive article rated as "3 micron particles" have a range in size from a desired 45 micron size down to a small 15 micron size. All of the beads, independent of bead size, tend to have the same spherical shape. When 15 micron diameter beads are coated adjacent to 45 micron beads, the 15 micron beads would have little, if any, abrasive utility as they would only come into contact with the workpiece surface after a full 30 micron wear-down had occurred in the larger 45 micron beads. Only after this 30 micron amount of wear-down occurred would the smaller 15 micron beads start their abrading action.

Two common types of abrasive articles that have been utilized in polishing operations include bonded abrasives and coated abrasives. Bonded abrasives are formed by bonding abrasive particles together, typically by a molding process, to form a rigid abrasive article. Coated abrasives have a plurality of abrasive particles bonded to a backing by means of one or more binders. Coated abrasives utilized in polishing processes are typically in the form of circular disks, endless belts, tapes, or rolls that are provided in the form of a cassette. Individual abrasive particles can be attached to a backing by plating or by resin coating. However, if a mono or single layer of very small 1-micron (0.000039 inch) particles is coated on a backing sheet these small particles would typically wear out very quickly during the workpiece lapping or grinding process and the abrasive sheet article would be rendered useless. Variations in the thickness of abrasive disk articles and variations in the flatness of rotating platens prevent the effective use of small particles coated directly onto backing sheets. Also it would be necessary to have a super precision flat platen when these small 1 micron (0.000039 inch) abrasive particles, would be coated as a monolayer on a 30.5 cm (12 inch) diameter abrasive sheet disk article and the abrasive disk rotated at 3,000 rpm. Here, the rotating platen that is typically used in high speed lapping would have to have a dynamic flatness of much less than 1 micron total flatness variation across the contacting abrasive surface across in order for all of the moving abrasive particles to contact the workpiece surface. It is not practical to provide this high level of dynamic platen flatness on a lapping machine without great expenditures on the machine platen rotational spindle. The alternate method to utilize the small 0.1 to 15 micron abrasive particles for an fixed-abrasive lapping or polishing process has been to form larger composite agglomerates having a sufficient number of these small abrasive particles mixed with an erodible material and to coat these agglomerate beads on a backing sheet. The agglomerates contain a sufficient number of abrasive particles to provide a long abrasive coated article grinding life. However, the agglomerates are typically limited in size to 45 microns. If the size of the agglomerates is excessive, then it is difficult to evenly wear down all of the abrasive across the width of the surface of a workpiece resulting in the loss of workpiece surface flatness during the abrading process. A balance is sought in selection of the size of the agglomerate bead, the size range of abrasive particles contained within the agglomerate, the dynamic flatness of the platen and the required flatness of the workpiece.

Abrasive agglomerates are preferred to be spherical in shape and to be of a uniform size for precision lapping of workpieces. These spherical abrasive agglomerates are referred to here as abrasive beads or beads. If undersized beads are mixed with full sized beads and coated on the surface of abrasive articles, the undersized beads are often not used in the abrading process as they are too small to come into contact with a workpiece surface. This means also, that the expensive materials commonly used in including diamond particles, are wasted as they are not used.

Presently there are a number of methods used to manufacture abrasive beads. These beads have been used for many years in fixed abrasive articles, particularly those abrasive sheets used for lapping. However, there is a undesirable large variation in size of the beads produced, and used in the abrasive articles, with all of the present manufacturing methods. Abrasive manufactures seem reluctant to discard undersized beads because of the economic loss associated with expensive abrasive materials such as diamond and cubic boron nitride (CBN). Also, there is a cosmetic factor in that an abrasive article appears to contain more abrasive if the small undersized beads are also coated onto the abrasive article even if they will never be used in the abrading process. Among the earliest processes of making beads is a process developed by Howard in U.S. Pat. No. 3,916,584 where he poured a slurry mixture (of abrasive particles mixed in a Ludox® solution of colloidal silica suspended in water) into a dehydrating liquid including various alcohols or alcohol mixtures or heated oils including peanut oil, mineral oil or silicone oil and stirred it. Abrasive slurry droplets were formed into spheres by slurry-drop surface tension forces prior to the spheres becoming solidified by the water depleting action of the dehydrating liquid on the individual spheres. Smaller sized spherical bead sizes are produced by faster stirring of the dehydrating fluid. Beads vary in size considerably, with a batch of beads produced typically having a ten to one range in size. For instance, one batch produced a size range from 10 to 100 microns and as Example 1 produced beads having a range of from 20 to 200 microns. The U.S. Pat. No. 3,916,584 beads are used to compare the performance of abrasive beads produced by other bead manufacturing process techniques. Adefris, et al., in U.S. Pat. No. 6,645,624 discloses the manufacturing of spherical abrasive agglomerates by use of a high-speed rotational spray dryer to dry a sol of abrasive particles, oxides and water. Bitzer, in U.S. Pat. No. 4,364,746 discloses the use of composite abrasive agglomerates grains which are produced by processes including a fluidized spray granulator or a spray dryer or by agglomeration of an aqueous suspension or dispersion. Hampden-Smith, in U.S. Patent Application No. 2002/0003225 A1 and U.S. Pat. No. 6,602,439 produces abrasive beads by introducing slurry liquid onto the surface of an ultrasonic head operating at 1.6 MHz (1.6 million cycles per second) to produce 2 micron or smaller droplets.

Another method is described here for the manufacture of equal sized abrasive beads that can be used for abrasive articles. Here, droplets of an abrasive slurry are formed from individual mesh screen cells that have cell volumes that are equal to the desired droplet volumetric size. Screens that are commonly used to size-sort 45 micron (or smaller) particles can be used to produce liquid slurry droplets that are individually equal-sized and that have an approximate 45 micron size. Larger mesh cell sized screens can be used to compensate for the heat treatment shrinkage of the beads as they are processed in ovens and furnaces. These uniform sized beads prevent the non-utilization and waste of undersized beads that are coated on an abrasive article. Further these equal sized beads have the potential to produce higher precision accuracy workpiece surfaces in flat lapping than can abrasive articles having surfaces coated with a mixture of different sized beads as the workpiece would always be in contact with the same sized beads, each having the same abrading characteristics. It is thought that small diameter beads will have different abrading characteristics, including rate of material removal, as compared to large sized beads, both at very low relative surface contact speeds of less than 1000 surface feet per minute when moving small workpieces, including fiber optic devices, relative to the abrasive article surface and also, at high flat lapping surface speeds of greater than 1000 surface feet per minute where typically, the workpiece is held in contact with a moving abrasive article. These equal sized abrasive beads can be used both for raised island abrasive articles and also, for coating the flat backing sheet surfaces of rectangular sheets of abrasive articles. Composite ceramic abrasive beads can be screened to a narrow size range before coating to effect abrading benefits including those described herein. Reducing the standard deviation in the size of abrasive beads is an important advancement in the production of abrasive articles. The variance in the size of beads can be further reduced by screen sifting processes. Smaller sized beads having small size variations can be effectively used in a variety of abrasive articles. A small change in the nominal bead size is not as important as having a uniform size to the beads that are bonded to an abrasive article.

There are a number of suppliers that sell different grades, types and sizes of diamond particles to abrasive article manufactures. Diamond particles are produced by various methods and these particles can be sorted into specific size ranges which may include particles that range for example from 30 to 10 microns, or from 15 to 2 microns, or simply 15 micron and smaller. When composite agglomerates of diamond particles are produced, the basic component of diamond particles will include a prescribed range of particle sizes, all of which particle sizes are mixed with an erodible material including ceramics and encapsulated within a typical composite agglomerate particle. It is necessary that the size of the agglomerate bead is larger than the largest diamond particles that are enclosed within the bead. It is desired that many individual abrasive particles are contained within a individual agglomerate bead to allow the erodible agglomerate surface to be eroded away by abrading contact with a workpiece to expose the sharp surface of one or more hard abrasive particles that removes material from the contact surface of the workpiece as the abrasive moves in contact with the workpiece. Further abrading action will dull the edges of the exposed individual abrasive particles contained within the structure of the bead and as the erodible agglomerate bead material erodes away, the dull abrasive particles are ejected from the agglomerate and new sharp abrasive particles are exposed to continue the abrading action that removes material from the workpiece. Large abrasive particles abrade away more workpiece material than small particles but the large particles produce a less-smooth workpiece surface than do small abrasive particles. Use of a wide range of different sized individual particles contained within an agglomerate composite structure is thought to produce a smoother workpiece surface finish than will be produced by use of a very narrow range of abrasive particle sizes. Examples of commercially available polishing products include "IMPERIAL" Microfinishing Film (hereinafter IMFF) and "IMPERIAL" Diamond Lapping Film (hereinafter IDLF), both of which are commercially available from Minnesota Mining and Manufacturing Company (hereinafter 3M), St. Paul, Minn. The IDLF product line of abrasive articles include abrasive articles having spherical bead composite agglomerates coated on the backing film sheet has been commercially available for a number of years.

Many different coating techniques can be used to resin coat a flexible backing sheet with abrasive beads. One technique includes a method to coat a slurry mixture of abrasive beads and a polymer resin on the surface of a backing with process procedures to create a mono or single layer of abrasive particles or agglomerates on the surface of a backing. Another technique includes a method where a thin coat of polymer resin is coated on a backing and abrasive beads are drop coated or propelled to the surface of the resin coating by electrostatic or other techniques. Other resin coatings may be applied to the attached particles including size coatings that strengthen the bond of the individual particles to the backing for increased resistance to the abrading forces that tend to dislodge the particles from the backing surface. When organic or polymer binders are used to bond abrasive particles to a backing sheet the particles are often mixed in a resin slurry that is commonly referred to as a binder precursor that is a binder that is in a liquid or flowable state. After the resin slurry, or resin, is coated on an abrasive article the resin is cured or polymerized to create a binder that is in a solid, non-flowable state thereby fixturing the abrasive particles to the backing sheet.

Abrasive media may require surface conditioning prior to use to remove "high-riser" abrasive beads. Also, when the spherical bead type enclosed body composite agglomerate is bonded to an abrasive article backing, it is necessary to first break the spherical exterior surface of the agglomerate to expose individual sharp edged abrasive particles for use in abrading the surface of a workpiece. The constituent volumetric percentage amount of diamond or other particles used in the agglomerate binder mixture affects the performance of the abrasive article. Composite abrasive agglomerate coated abrasive articles have been marketed for years including those using ceramic and metal oxide encased composite spherical beads that are offered with a variety of size classifications of diamond abrasive particle sizes.

U.S. Pat. No. 794,495 (Gorton) discloses dots of abrasive on round disks formed by depositing abrasive particles on adhesive binder wetted dot areas printed on the backing, primarily to aid the free passage of grinding debris away from the workpiece surface. These dot areas are not elevated as raised island shapes from the surface of the backing.

U.S. Pat. No. 1,657,784 (Bergstrom) describes flat surfaced island-type rectangular sheet abrasive articles having different geometric patterns of island shaped abrasive areas.

U.S. Pat. No. 1,896,946 (Gauss) describes raised island-type abrasive articles having a array of abrasive blocks attached to a thin flexible base that allows each island abrasive block to move independent of the other adjacent blocks.

U.S. Pat. No. 1,924,597 (Drake) describes flat surfaced island-type abrasive disk articles.

U.S. Pat. No. 1,941,962 (Tone) describes flat surfaced island-type abrasive rectangular articles having alternating bars of abrasive.

U.S. Pat. Nos. 2,001,911 and 2,115,897 (Wooddell, et. al) describes raised island-type abrasive disks and other articles.

U.S. Pat. No. 2,108,645 (Bryant) describes raised island-type rectangular abrasive articles.

U.S. Pat. No. 2,216,728 (Benner et al.) discloses a porous composite diamond particle agglomerate granule comprised of materials including ceramics and a borosilicate glass matrix that can be fired in an oxidizing atmosphere at 600 degrees C. and then fired at 900 degrees C. in a reducing atmosphere. Diamonds are subject to oxidization at temperatures above 700 degrees C. so a non-oxidizing atmosphere is used up to 1500 degrees C.

U.S. Pat. Nos. 2,242,877, 2,252,683 and 2,292,261 (Albertson) describes raised island-type abrasive disk articles. A thick coating of adhesive is applied to a disk backing and abrasive particles are deposited on the adhesive surface. Then an island cavity embossing tool is forced against the abrasive coated surface to create a pattern of raised islands. It is necessary to have a thick under-layer of adhesive so that the leading edge of the embossing tool can route some of the adhesive from the leading edges of the embossing tool upward into the raised-island pockets in the embossing tool. If a thin layer of adhesive is used, the embossing tool would simply "bottom-out" when the surface abrasive particles are pushed by the tool leading edges directly in contact with the backing surface with little or no lateral flow of adhesive from the leading edges of the embossing tool into the raised-island cavities of the tool. Generally, for the production of modern conventional abrasive media where an abrasive backing article having drop or electrostatic coated abrasive particles, the backing has an adhesive coating that is less thick than the diameters of the individual abrasive particles. This thin adhesive coating allows the particles to penetrate only one half of their diameter, or less, into the adhesive which results in exposure of about one half of the particle surface above the adhesive layer to provide effective abrasive grinding. Here, as disclosed in Albertson, the individual abrasive particles contained in the abrasive layer are driven down into the adhesive layer, at the leading edges of the embossing tool (which form the valleys between the raised island structures). If the adhesive layer is thin, the embossing tool leading edge will contact the top surface of the abrasive particles which would be driven into contact with the backing surface and no sideways motion would be imparted to the adhesive fluid which resides in the regions between the individual abrasive particles. The particles act as bridges for the contained adhesive fluid. With thin adhesive coatings, it is not possible to create a valley in the adhesive/abrasive mixture, and also, it would not be possible to create raised island structures from the mixture. The only way to create island structures from this type of coating is to have an adhesive layer that is considerably thicker than the diameter or height of the abrasive particles. The adhesive thickness must also be greater than the depth of the island-cavity pockets in the embossing tool or the island cavities of the tool will not be filled when the tool is pressed into the abrasive/adhesive mixture. When the embossing tool is pressed into the mixture the abrasive particles contained on the surface of the raised islands are also forced into the adhesive layer. Further, the abrasive particles located at that raised island top-surface location are also mixed with adhesive, internal to the island structure, due to the fluid flow shearing action of the adhesive/abrasive-particle mixture as the mixture is moved from the regions of the island valleys to the raised island top surfaces. Raised islands can be made quite high and the abrasive article coatings can be made to reside as a near-single layer on top of the island structures with the proper design of the embossing tool, the control of the adhesive viscosity and the thickness of the adhesive, the selection of the abrasive particle size and the design of the embossing technique. It would be difficult to get each island cavity completely filled with the polymer mixture as air would be trapped to form air voids at the top of each cavity as the embossing tool is advanced into the abrasive/adhesive mixture. Withdrawal of the embossing tool before solidification of the polymer adhesive would distort each island structure, as the adhesive would tend to adhere to the embossing cavity walls as the tool is moved away from the embossed islands. There is no teaching of the control of the height of each abrasive covered island relative to the backside of the disk backing. Condensation type phenolic thinned with solvents are used as a adhesive binder. FIGS. 1, 2 and 3 (Prior Art) show different views of the Albertson raised island shapes and raised island disks. FIG. 1 (Prior Art) is a cross section view of abrasive particle coated raised islands that are formed by pressing an embossing tool into a composite fluid of a thick under-layer of adhesive that was applied to a backing disk sheet where the adhesive is over-coated with abrasive particles. A disk backing 10 has raised island structures 12 and island recessed channels 13 that are coated with abrasive particles 14. The height of the islands 12 is measured from the backside of the backing 10 by the island height distance 16. FIG. 2 (Prior Art) is a top view of raised islands on an abrasive disk. The abrasive disk 18 has an aperture center hole 22 and abrasive coated raised island structures 20, 23 and 25. The disk 18 backing 17 has partial-sized island structures 23 and 25 that are located on the periphery of the disk 18. The reduced-sized islands 23, 25 can be structurally unstable during abrading usage, as the attachment base area of each of these small islands 23, 25 that are attached to the backing 17 can be small as compared to the base area of a full sized island 20. These islands 23, 25 that are located on the disk 18 periphery are particularly sensitive structurally when subjected to abrading leveraging forces for tall-height islands. Undersized islands, having small base areas that are located in a more interior portion of the disk 18 can also be structurally weak if the height of the small islands, measured from the top of the island to the top surface of the backing 17, is large relative to the base area or the base area dimensions. Albertson does not discuss the use of full sized islands 20 in all areas of the disk 18 including the peripheral edge area of the disk 18. FIG. 3 (Prior Art) is a cross section view of a pattern of rectangular shaped raised rib structures that are formed on a disk surface after which the raised rib structures are over-coated with an abrasive/adhesive mixture coating to provide a disk with a pattern of raised island ridges and adjacent grooves as shown in FIG. 23 of Albertson U.S. Pat. No. 2,242,877. A disk backing 26 has attached raised island structures 24 that are coated with an abrasive particle 29 and adhesive 28 mixture, where the height of the abrasive particle 29 and adhesive 28 mixture islands 24 is measured from the backside of the backing 26 to the top of the abrasive particles 29 by the distance 30. FIG. 10 (Prior Art) shows a side view of an abrasive grinding disk that is mounted on a mandrel tool that is used to grind a workpiece with the grinding abrasive disk distorted as it contacts a workpiece surface. This type of abrasive disk article is suitable for rough grinding but lapping can not be accomplished when using it as the raised islands on a angled disk that first come in contact with a flat workpiece tend to scratch the workpiece rather than polish it. This type of manual tool disk article is disclosed in U.S. Pat. Nos. 2,242,877, 2,252,683 and 2,292,261 by (Albertson), U.S. Pat. No. 3,498,010 (Hagihara), U.S. Pat. No. 3,991,527 (Maran) and U.S. Pat. No. 6,371,842 (Romero). A mandrel tool 108 has a disk aperture hole mounting hub 110 that attaches both the flexible tool pad 118 and the abrasive disk 120 to the tool 108. The disk 120 has attached raised islands 112 that are surface coated with an abrasive coating 114 where a leading-location island 112 abrasive coating 114 contacts a workpiece 122 at a abrasive contact point 116.

U.S. Pat. No. 2,755,607 (Haywood) describes abrasive coated articles having a pattern of raised adhesive shapes that are formed on a backing and the raised shapes are then coated with abrasive particles on a continuous web basis to form rectangular shaped abrasive articles.

U.S. Pat. No. 2,838,890 (McIntyre) describes abrasive coated articles having a pattern of backing sheet through holes for the abrasive debris to escape the abrading area.

U.S. Pat. No. 2,907,146 (Dynar) describes raised island-type abrasive disk articles.

U.S. Pat. No. 3,048,482 (Hurst) describes raised island-type abrasive disk articles.

U.S. Pat. No. 3,121,298 (Mellon) describes raised island-type abrasive disk articles. Recessed channels are provided on a backing sheet, the sheet is adhesive coated and abrasive particles are deposited on top of the adhesive to create a abrasive disk that has raised island structures top surface coated with abrasive particles.

U.S. Pat. No. 3,423,489 (Arens, et al.) discloses a number of methods including single, parallel and concentric nozzles to encapsulate water and aqueous based liquids, including a liquid fertilizer, in a wax shell by forcing a jet stream of fill-liquid fertilizer through a body of heated molten wax. The jet stream of fertilizer is ejected on a trajectory from the molten wax area at a significant velocity into still air. The fertilizer carries an envelope of wax and the composite stream of fertilizer and wax breaks up into a string of sequential composite beads of fertilizer surrounded by a concentric shell of wax. The wax hardens to a solidified state over a free trajectory path travel distance of about 8 feet in a cooling air environment thereby forming structural spherical shapes of wax encapsulated fertilizer capsules. Surface tension forces create the spherical capsule shapes of the composite liquid entities during the time of free flight prior to solidification of the wax. The string of composite capsule beads demonstrate the rheological flow disturbance characteristics of fluid being ejected as a stream from a flow tube resulting in a periodic formation of capsules at a formulation rate frequency measured as capsules per second. Capsules range in size from 10 to 4000 microns.

U.S. Pat. No. 3,495,362 (Hillenbrand) describes island-type abrasive disk articles having a thick backing, a disk-center aperture hole and raised abrasive plateaus.

U.S. Pat. No. 3,498,010 (Hagihara) describes island-type abrasive disk articles having a thick backing, a disk-center aperture hole and the backing having patterns of attached raised island structures formed on the backing surface. The islands are mold formed from a mixture of abrasive particles and a phenolic resin. The abrasive disks are used on manually operated portable grinding tools that are shown to distort the abrasive disk article out-of-plane when held with force against a workpiece surface. Comparative tests indicated that the disks had superior material removal rates and produced very smooth finishes as compared to tradition abrasive disks. The disks are very stiff after manufacture so they are subjected to a rotary device that cracks the disk in many places to provide flexibility of the thick disk. FIG. 11 (Prior Art) shows a cross section view of a disk that is in abrading contact with a workpiece. The abrasive disk 100 is shown by Hagihara to be in abrading contact with a workpiece 106 where the disk abrasive islands 102 and 104 contact the workpiece 106 on the island edges rather than the islands laying in flat contact with the workpiece 106.

U.S. Pat. No. 3,517,466 (Bouvier) describes raised abrasive cylinders mounted on a disk plate.

U.S. Pat. No. 3,605,349 (Anthon) describes raised abrasive islands on an abrasive backing article.

U.S. Pat. No. 3,702,043 (Welbourn et al.) describes a machine used for removing material from the internal surface of a workpiece and the use of a strain gage sensor device that indicates the cutting force exerted by the cutting tool upon the workpiece.

U.S. Pat. No. 3,709,706 (Sowman) discloses solid and hollow ceramic microspheres having various colors that are produced by mixing a aqueous colloidal metal oxide solution, that is concentrated by vacuum drying to increase the solution viscosity, and introducing the aqueous mixture into a vessel of stirred dehydrating liquid, including alcohols and oils, to form solidified green spheres that are fired at high temperatures. Spheres range from 1 to 100 microns but most are between 30 and 60 microns. Smaller sized spheres are produced with more vigorous dehydrating liquid agitation. Another sphere forming technique is to nozzle spray a dispersion of colloidal silica, including Ludox, into a countercurrent of dry room temperature or heated air to form solidified green spherical particles.

U.S. Pat. No. 3,711,025 (Miller) discloses a centrifugal rotating atomizer spray dryer having hardened pins used to atomize and dry slurries of pulverulent solids.

U.S. Pat. No. 3,859,407 (Blanding et al.) discloses a system of producing shaped abrasive particles by supplying a stream of a plastically formable abrasive mixture into a nipped set of rolls, where one or more of the rolls has a surface pattern of geometric shapes that the formable material is squeezed into as the rolls rotate. A continuous ribbon of the individual shaped abrasive particles that are joined together at the formed particle shape edges exits the rolls. The ribbon is flexed after the particles are solidified to separate the ribbon into individual particles.

U.S. Pat. No. 3,916,584 (Howard, et al.), herein incorporated by reference, discloses the encapsulation of 0.5 micron, or less, up to 25 micron diamond particle grains and other abrasive material particles in spherical erodible metal oxide composite agglomerates ranging in size from 5 to 200 microns and more. The large agglomerates do not become embedded in an abrasive article carrier backing film substrate surface as do small abrasive grain particles. In all cases, the composite bead is at least twice the size of the abrasive particles. Abrasive composite beads normally contain about 6 to 65% by volume of abrasive grains, and compositions having more than 65% abrasive particles are considered to generally have insufficient matrix material to form a strong acceptable abrasive composite granule. Abrasive composite granules containing less than 6% abrasive grains lack enough abrasive grain particles for good abrasiveness. Abrasive composite bead granules containing about 15 to 50% by volume of abrasive grain particles are preferred since they provide a good combination of abrading efficiency with reasonable cost. In the invention, hard abrasive particle grains are distributed uniformly throughout a matrix of softer microporous metal oxide (e.g., silica, alumina, titania, zirconia, zirconia-silica, magnesia, alumina-silica, alumina and boria, or boria) or mixtures thereof including alumina-boria-silica or others. Silica and boria are considered as metal oxides. The spherical composite abrasive beads are produced by mixing abrasive particles into an aqueous colloidal sol or solution of a metal oxide (or oxide precursor) and water and the resultant slurry is added to an agitated dehydrating liquid. Examples teach the use of a slurry mixture of abrasive particles mixed in a Ludox® solution of colloidal silica suspended in water. Dehydrating liquids include partially water-miscible alcohols or 2-ethyl-1-hexanol or other alcohols or mixtures thereof or heated mineral oil, heated silicone oil or heated peanut oil. The slurry forms beadlike masses in the agitated drying (dehydrating) liquid. Water is removed from the dispersed slurry and surface tension draws the slurry into spheroidal composites to form green composite abrasive granules. Other shapes than spheroidal such as ellipsoid or irregularly shaped rounded granules can be produced that also provide satisfactory abrasive granules. The green granules will vary in size; a faster stirring of the drying liquid giving smaller granules and vice versa. The resulting gelled green abrasive composite granule is in a "green" or unfired gel form. The dehydrated green composite generally comprises a metal oxide or metal oxide precursor, volatile solvent, e.g., water, alcohol, or other fugitives and about 40 to 80 weight percent equivalent solids, including both matrix and abrasive, and the solidified composites are dry in the sense that they do not stick to one another and will retain their shape. The green granules are thereafter filtered out, dried and fired at high temperatures. The firing temperatures are sufficiently high, at 600 degrees C. or less, to remove the balance of water, organic material or other fugitives from the green composites, and to calcine the composite agglomerates to form a strong, continuous, porous oxide matrix (that is, the matrix material is sintered). The resulting abrasive composite or granule has a essentially carbon-free continuous microporous matrix that partially surrounds, or otherwise retains or supports the abrasive grains. The firing temperatures are insufficiently high to cause vitrification or fusion. Vitrification of the composite agglomerate or granule is avoided as the external surface of the composite would change into a continuous glassy state, thereby preventing the composite from having a porous external surface. Some example abrasive agglomerates using Aluminum oxide abrasive particles were fired at 700 degrees C. which produced a smooth, shiny agglomerate surface finish. The green-state beads that are fired at up to 600 degrees C. typically shrink the green-state beads by from 10 to 20 percent. Having a porous surface on abrasive agglomerates allows liquid adhesive binders to penetrate the porous agglomerate surface somewhat or to better wet the agglomerate surface that tends to provide increased bonding strength when the agglomerate is attached to the surface of a backing sheet. The spherical composite matrix outer surface retains a degree of microporosity, as can be detected by the disappearance of the matrix when the spherical composite is filled with oil having the same refractive index as the matrix where the oil penetrates into the porous matrix. When the oil filled composite agglomerate is viewed with an optical microscope, only the diamond grains are visible and the dispersion of the diamond particles within the agglomerate can be seen. This oil-absorbing feature of the matrix spherical composite permits the incorporation of liquids including lubricants, liquid grinding aids, etc., to enhance performance of the composite in actual abrading operations. The sintering temperature of the whole spherical composite bead body is limited as certain abrasive granules including diamonds and cubic boron nitride are temperature unstable and their crystalline structure tends to convert to non-abrasive hexagonal form at temperature above 1200 degree C. to 1600 degrees C., destroying their utility. An air, oxygen or other oxidizing atmosphere may be used at temperatures up to 600 degrees C. but an inert gas atmosphere may be used for firing at temperatures higher than 600 degrees C. The Ludox® colloidal solution provides the metal oxide that forms a porous oxide structure that surrounds the individual abrasive particles within the abrasive agglomerate bead. These abrasive composite agglomerate beads incorporate abrasive particles 25 microns and less sized particles, as abrasive particle grains 25 microns and larger can be coated on abrasive articles to form useful materials. Example 1 described a mixture of 0.5 gram of 15-micron diamond powder, 3.3 grams of 30 percent colloidal silica dispersion in water (Ludox LS) and 3 grams of distilled water that was stirred and sonically agitated to maintain a suspension. The formed agglomerates were fired, a backing sheet was coated with a make coat of phenolic resin, and the abrasive spherical agglomerates were drop coated onto the wet resin and the excess of the spherical agglomerates were allowed to fall off. Applying the abrasive spheres to the abrasive backing sheet by this technique results in a abrasive article that has essentially a 100% coating of abrasive spheres with little or no space between individual adjacent abrasive spheres. After heating the abrasive coated backing sheet to precure the phenolic make coat, a size coat of the same resin was applied to the coated spherical agglomerates and the abrasive sheet article was further heated to fully cure the resin. Then this abrasive sheet article was formed into a disk and used to for forming and polishing workpieces with the result that this 100% abrasive spherical bead coated article showed a 30-40% higher rate of cut and provided a better surface finish than a conventional 15 micron (micrometer) diamond coated abrasive disk sheet article. It is significant that this comparative test shows that when small abrasive particles are formed into erodible ceramic agglomerate spheres that are coated on a backing sheet, it is not necessary to have a minimum separation between each of the adjacent abrasive spheres to obtain workpiece high cut rates and smooth surfaces. In other workpiece abrading applications where diamond abrasive particles are coated on a backing sheet with little or no space between adjacent individual abrasive particles, the cut rate can be reduced significantly compared to an abrasive article having gap spaces between adjacent abrasive particles. The uniform (non-gap-space) abrasive particle coating can act as a bearing surface for a workpiece rather than a cutting surface. Example 8 resulted in composite granules that ranged in diameter from 10 to 100 microns, with an average of about 50 microns and the diamond particle content was approximately 33% of the abrasive composite agglomerates. In example 6, a slurry of the average sized 50 micron abrasive agglomerates was mixed in a phenolic resin and was knife coated with a 3 mil (0.003 inch or 72 micron) knife gap setting which exceeded the size of the agglomerates. In Example 9, beads were screened to be less than 30 microns (0.0012 inches) in size before mixing them in a binder which was coated on a 0.003 inch (75 micron) thick polyester backing sheet using a coating knife opening of 0.002 inches (50 microns) which allowed the beads to pass through the knife opening gap. As the individual abrasive particles were smaller than the depth of the coated resin binder slurry (where the coating depth is approximately equal to the knife opening gap setting), there is indication that enough resin binder solvent was evaporated after coating to expose a substantial portion of the individual coated abrasive agglomerates when the abrasive product was dried. In Example 1, a backing sheet was coated with a wet make-coat binder and abrasive beads was dropped on the make coat and the excess of beads was allowed to fall off the backing. This type of abrasive coating will produce a uniform layer of abrasive beads across the full surface of the make-coat wetted surface of the backing with little or no spacing between adjacent individual abrasive agglomerate beads. Typically, a abrasive sheet article is not coated with a uniform continuous coating of individual abrasive non-agglomerate particles as the densely packed abrasive will not abrasively remove workpiece material in an aggressive fashion. Instead, the continuous abrasive particle covered surface can tend to act as a bearing surface that supports rather than abrades a workpiece. However, comparative tests of the densely-packed agglomerate bead covered surface showed a 30-40 percent higher rate of cut and provided a better surface finish than a comparative conventional abrasive article. When a composite bead granule was submerged in oil having a refractive index of about 1.5 under a microscope at 70-140× the oils penetration into the porous matrix was observed by visual disappearance of the silica matrix and only diamond particle grains throughout the composite bead granule were readily visible. The dispersion of the diamond particle grains throughout the bead granule was noted.

U.S. Pat. No. 3,921,342 (Day) discloses a lapping plate that has raised island sections where an abrasive liquid can flow in the recessed channel areas.

U.S. Pat. No. 3,933,679 (Weitzel et al.) discloses the formation of uniform sized ceramic microspheres having 1540 microns and smaller ideal droplet diameters. Mechanical vibrations are induced in an aqueous oxide sol-gel fluid stream to enhance fluid stream flow instabilities that occur in a coaxial capillary tube jet stream to form a stream of spherical droplets. Droplets are about twice the size of the capillary orifice tube diameter and the vibration wavelength is about three times the diameter of the tube. The spherical oxide droplets are solidified in a dehydrating gas or in a dehydrating liquid after which the solidified droplets are sintered. The spherical metal oxide particles have a very narrow-size distribution. Reference is made to alternative droplet generators such as spray nozzles, spinning discs and bowls that provide feed stock dispersion at high throughput capacity but these devices produce an undesirably wide droplet size distribution. Generally this vibration enhanced spherical droplet system is effective for making larger sized spheres with the use of capillary tubes having diameters of approximately 630 microns (0.024 inches). The production of 45-micron spheres would require a capillary tube diameter of only 23 microns (0.0009 inches) that is too small for practical use in the production of significant quantities of oxide spheres. Example 2 indicated extreme accuracy in control of the sphere sizes in that 99% of the large sized 599 micron (0.024 inch) microspheres produced had sphere diameters within the relatively narrow range of 0.43 microns (0.000017 inch).

U.S. Pat. No. 3,991,527 (Maran) describes abrasive disk articles having disk-center aperture holes that are used on manual mandrel abrading tools. Geometric patterns of island structures are formed on the surface of a disk backing sheet where the island structures have individual flat top surfaces and recessed valley areas around each raised island structure. The island surfaces are coated with a phenolic or other polymer resin but the recessed valley areas are left adhesive-free. Abrasive particles are then applied (only) to the resin adhesive coated island surfaces to form a abrasive disk that has the top flat surfaces of each individual island coated with abrasive particles while the recessed valley areas that exist between the raised island structures remains free of abrasive particles. Maran describes an electrostatic abrasive particle deposition apparatus. FIG. 4 (Prior Art) is a cross section view of the abrasive coated raised island structures. The abrasive disk 48 has raised island structures 44 that are coated with a layer of adhesive 42 that bonds abrasive particles 36 to the abrasive top-surface 38 of the raised island structures 44. Each of the raised island structures 44 have uncoated island recessed channel areas 40 that are located between the raised islands 44. There is no described control of the height 46 of the individual abrasive 36 coated islands 44 as measured from the island-top abrasive surfaces 38 to the backside of the disk 48 backing. FIG. 5 (Prior Art) is a top view of the Maran abrasive disks having geometric patterns of raised island structures. The disk 54 has raised islands 50, 53 and 58 and recessed channel areas 52 between the islands 50, 53 and 58. The island 50 is a full-sized island and the islands 53 and 58 are diminished-sized islands that are located on the periphery of the disk 54. Maran does not discuss the use of full sized islands 50 in all areas of the disk 54 including the peripheral edge area of the disk 54. The disk 54 has a disk-center aperture hole 56 that is used to mount the disk 54 to a manual tool mandrel, not shown. The recessed channel areas that exist between the islands are coplanar with the island top surfaces and are used to scavenging grinding debris from the abrading contact area with a workpiece as the debris is thrown out of the recessed channels at the periphery of the abrasive disk. No mention is made of the use of islands and recessed areas between the islands to break up the water coolant boundary layer that forms between a workpiece flat surface and a abrasive article abrasive surface during abrading.

U.S. Pat. No. 4,038,046 (Supkis) describes abrasive articles made with a blend of urea formaldehyde and alkaline catalyzed resole phenolic binder resins which are cured with the same curing time and temperatures as conventionally used for phenolic resins. Abrasive particles applied by gravity and also by electro-coating methods. A typical oven cure cycle of the web is 25 minutes at 125 degrees F., 25 minutes at 135 degrees F., 18 minutes at 180 degrees F., 25 minutes at 190 degrees F., 15 minutes at 225 degrees F. and 8 hours at 230 degrees F. Yellow and blue dyes are mixed in the binder system.

U.S. Pat. No. 4,111,666 (Kalbow) describes island-type abrasive articles having a foam backing that has island protuberances that are impregnated with polymer stiffening agent and the top island surfaces coated with a mixture of abrasive particles and a polymer adhesive.

U.S. Pat. No. 4,112,631 (Howard), herein incorporate by reference, discloses the encapsulation of 0.5 micron up to 25 micron diamond particle grains and other abrasive material particles in spherical composite agglomerates ranging in size from 10 to 200 microns. A liquid mixture of abrasive particles and a grinding aid is added into a stirred liquid mixture of a urea-formaldehyde which creates spheres of the abrasive-grinding aid which are encapsulated by a shell layer of the urea-formaldehyde material. The diameters of the spherical abrasive capsules ranged by a ratio of thirty to one as the individual abrasive agglomerate capsules ranged in size from 5 to 150 microns in Example 1. The polymer shells that surround the abrasive particles which are dispersed in the grinding aid material provide abrasive agglomerates that can be coated on an abrasive article. Encapsulated 75 micron composite spheres were knife-coated using a knife opening of 3 mils (76 micron) on a polyester film backing with a urethane phenoxy resin make coating that was thinned with methyl ethyl keytone.

U.S. Pat. No. 4,251,408 (Hesse) describes phenolic resins used in preparation of abrasives where rapid curing as a result of increasing the curing temperature tends to form blisters which impairs the adherence of the resin to the substrate backing. Special cure cycles are used which have low initial curing temperatures with regulated, progressively increasing temperature which prevent blister formation but the time required for cross-linking is thereby increased. Drying and curing of webs by use of loop dryers or festoon dryers are discussed which provide both the function of driving off the solvents from the binder and to cross-link cure the binder. The cure rate of a resin is defined by the B-time which is the time required to change from a liquid state to reach the rubbery elastomer state (B-state).

U.S. Pat. No. 4,256,467 (Gorsuch) describes an abrasive article with diamond particles plated onto an electrically insulated mesh cloth which can be cut into a "daisy wheel" for use in grinding curved, convex, or concave optical lenses. These articles are intended for rough grinding and not for lapping. An electrically conductive smooth metal cylindrical drum is coated with an insulating resist except in circular dot or spot areas where metal plating is desired. An electrically insulating woven cloth, typically made of common plastic fiber materials, is stretched over the whole drum surface including both the conductive spot areas and the resin insulated drum areas. The cloth covered drum is then placed in a plating tank and electroplating then starts where metal is plated through the cloth at the conductive spot areas. Buildup of plated metal occurs at the circular spots and electroplating continues until the desired plated metal thickness is reached to form raised islands that extend through the cloth thickness and above the curved cylindrical drum surface. Then small diamond particles are introduced into the electroplating bath liquid and plating continues, thereby trapping some of these diamond particles at the island top surface by metal electroplate bonding them to the exposed surface of the previously plated island areas. The plating action is stopped, the drum is removed from the bath and the cloth is separated from the drum surface to provide a cloth material having integral raised islands that have non-flat drum-cylinder shaped curved top surfaces that are covered with abrasive particles. The drum is described as being optionally rotated. After plating these diamond particles on the island top surfaces, the particles will all have different heights relative to the drum surface, and thus, relative to the bottom of the cloth due to a number of factors. It is well known that metal plating varies in thickness over different areas of a plated member simply due to variables inherent in an electro-plating process. Also, the woven cloth will have different thicknesses due to variations in the weaving machine performance. Also, there are variances in the thickness of individual woven cloth strands of the very fine denier fibers that are joined together to form a single strand. Further, the sleeve of material is stretched and pulled over the cylindrical drum, which can cause variations in the cloth thickness around the surface of the drum. All of these factors result in a flexible abrasive that can be cut into weak strips or legs that are fanned out from a common hub to form a daisy wheel article where the legs will conform to a curved lens when used at very low speeds. The individual stiff metal raised abrasive island structure surfaces of this daisy wheel will not locally conform, across the semi-rigid surface area of a typical metal plated flat abrasive island, to a curved lens surface. In fact, as the individual raised islands have the same curved surface shape as the drum surface, these island shapes will not lay in flat contact with a flat workpiece surface and also will not lay in conformance to a spherical lens curvature. Use of these stiff metal abrasive islands in abrading contact with the curved lens surface can result in abrading contact to be concentrated at a very small portion of a raised island structure. A plated metal portion of the island structure may contact the curved lens at a raised island location that does not contain abrasive particles, or it is possible that a single abrasive particle that is plated at the highest elevation of that portion of the raised island structure will alone contact the curved portion of the lens which will result in undesirable scratches of the lens surface by that single particle. This daisy wheel article is not useful for high speed lapping which requires extremely precise abrasive article thickness control. Again, in this patent, as was the case in his U.S. Pat. No. 5,318,604, he acknowledges and addresses the issue of obtaining an abrasive article that does, in fact, have all the abrasive particles in the same plane. This is done producing a cloth mesh island abrasive covered article with use of plastic cloth over a patterned drum. Here, he electroplates islands of metal over exposed areas and electroplates particles dropping out of the plating solution to these plated islands after which he continues to build up the metal plating thickness, add a cloth, continue plating, and then remove the cloth mesh from the drum. The islands are refereed to as having flat plane abrasive surfaces but island flat plane surface can not be produced from a cylindrical drum surface. The resultant article would seem to have little use as a abrasive article as the diamond particles are not exposed at the drum surface, but rather, are enclosed or buried within the plated metal layer by the progressively built-up plating metal. As they are not exposed from the plated metal surface, they cannot effect their abrasive cutting action. Also, the backside thickness of plated metal would vary in height due to variances in the deposition rate of material over each island site to variances in electrical conductivity of the unknown coating applied over each site which allows the plated metal to be peeled from the drum. When the cloth is turned over, and mounted to a backing, the variance in height of each island, as measured from the front surface of the diamonds to the cloth bonded surface of the backing, will be significant over the whole surface of the abrasive article. This abrasive article would have no use for high speed lapping where the high speed of a rotating platen establishes an abrasive sheet mounting flatness plane more precise as the platen rotation speed is increased. The requirements of high speed lapping far exceed the capability of this system of creating abrasive articles. In U.S. Pat. Nos. 4,256,467, 5,318,604, and 4,863,573 (Gorsuch and Moore) having metal island areas that are progressively built up by electroplating areas of cloth produce an aggressive grinding media that is not useful for precision polishing. The production process has many unique features that are reflected in the abrasive article finished product. Part of the process has cloth that is positioned in contact with an electrically insulated metal drum having arrays of exposed circular electrically conducting island-forming areas coated with wax. Abrasive particles contained in the electroplating liquid bath fall on the upper portion of the near-full-height plated metal islands during the process of depositing metal to create the islands. After the abrasive particles are metal bonded to the top surface of the islands that were formed by plating metal buildup, the island abrasive particle covered top surface curvature would tend to match the curvature of the circular drum. At completion of the plating process, the cloth encompassing the individual abrasive covered island structures is peeled from the drum surface and laid flat to be used, by further manufacturing steps, to create a variety of abrasive articles. However, the individual abrasive particles do not lie in a common flat plane. Instead, the particles are bonded on the curved surface of the raised islands, and also, are attached at many different random elevations within the upper portion of island structures. This particle out-of-flatness condition, where each particle is at a different elevation, occurs in part, because of uneven plated metal deposition rates that occur over the surface of the drum at all the different island locations during the process of building-up the height of each island. Also, a random uneven particle deposition occurs over time when particles come out of solution and are deposited in the final portion of the island build-up. Further, the plating process creates nominal island height differences that vary from island to island, in part, due to the different characteristics of the individual fibers of the mesh cloth. The height thickness of each island, as measured from the surface of the plated abrasive particles to the backside of the mesh cloth, or to the island bottom, is not precisely uniform. Another thickness tolerance disadvantage of this product occurs when the plated cloth material is stripped from the electrically conductive metal base and attached with adhesive to a backing substrate sheet to form a laminated abrasive article. This laminated abrasive article does not have precise overall thickness control due to thickness variations in the island plated cloth material, in the backing sheet, and in the laminating adhesive. The product can be used to create a flat workpiece surface by grinding action but is generally not effective for creating smooth surfaces, particularly in high speed lapping. The different height locations of the abrasive particles prevent the generation of precision workpiece smooth surfaces during abrading action. However, the plated abrasive island articles can be effective in producing flat (but not smooth) workpieces. Large abrasive particles, ranging from 100 to 300 microns, are preferred for plating. Segmented island areas consisting of abrasive particles dispersed in a resin binder that is directly molded on the surface of a backing, with grooves between the thick abrasive coated areas, is disclosed but these areas are not raised island areas. In another embodiment, a metal belt, used as a flat electrical conducting surface, is joined with a open mesh continuous web within an electroplating tank and abrasive covered raised islands are electroplate formed in patterns within the fiber mesh material that is separated from the belt and cut up or laminated into abrasive articles. Diamond particles can be surface coated with metals including copper, nickel, silver, cobalt and molybdenum and they can also coated with non-metals.

U.S. Pat. No. 5,318,604 (Gorsuch et al.) and U.S. Pat. No. 4,863,573 (Moore et al.) describes abrasive articles made by metal plating islands of which are top coated with diamond abrasives that have been plated onto the islands. The technique employed is to create an island by printing an insulation solder photo resist insulation pattern over an electrical conducting plate and overlaying this with a woven non-electrical conduction cloth mesh. When immersed in a plating bath, a metal plated island is formed integral with the cloth mesh over the electrically exposed island areas of the photo resist covered metal conducting plate. After a minimum height of metal plated island area is built up by metal progressively covering the island area of interlocking mesh fiber strands, diamond particles are suspended in the plating bath liquid and allowed to free fall by gravity onto the mesh. Those particles that fall into the small island areas, which are very irregular in shape due to the unevenness of the interlocking fibers, are progressively plated onto the existing metal plated surfaces. However, the individual plated abrasive particles do not lie in a common flat plane. Instead, the particles are electroplate bonded on the curved surface of the raised islands, and also, are attached at many different random elevations within the upper portion of island structures. This abrasive particle out-of-flatness condition, where each particle is at a different elevation, occurs in part, because of uneven metal deposition rates that occur over the surface of the drum at all the different island locations during the process of building-up the height of each island. Also, a random uneven particle deposition occurs over time when particles come out of solution and are deposited in the final portion of the island build-up. The presentation of the individual particles to the raised island area is completely random. Some particles will fall deep into the "log pile" mesh, and others will land on the top curved surface of an individual cylindrical mesh fiber. Some of the abrasive particles will come to rest on other particles that have already been plated onto the mesh, forming standing "rock towers" of particles. Further, the plating process creates nominal island height differences that vary from island to island, in part, due to the different characteristics of the individual fibers of the mesh cloth. The height thickness of each island, as measured from the surface of the plated abrasive particles to the backside of the mesh cloth, or to the island bottom, is not precisely uniform. Another thickness tolerance disadvantage of this product occurs when the plated cloth material is stripped from the electrically conductive metal base and attached with adhesive to a backing substrate sheet to form a laminated abrasive article. This laminated abrasive article does not have precise overall thickness control due to thickness variations in the island plated cloth material, in the backing sheet, and due to thickness variations in the laminating adhesive layer. There is no possible height control mechanism that can be employed to assure that there exists a uniform flat level surface of the individual diamond abrasive particles over the complete surface area of the abrasive article. Diamonds that are bonded at different elevations below the uppermost surface of the top surface of the fiber "logs" in the "log jam" that forms the foundation of the raised island structures are not used and are wasted. Further, there is no control over the thickness variation of the woven mesh material and no description of techniques to level-smooth it down to the surface of the photo resist covered electrical conducting plate used as a geometric reference base for the plating process. After sufficient plating has been achieved, the electrically insulated cloth, made of plastic fibers, is stripped away from the photoresist plate, which can be used again with another mesh cloth. The cloth can then be attached to a backing material or it can be dissolved away with strong chemicals or acids. Attaching the plated cloth with PSA (pressure sensitive adhesive) to a backing introduces new variance in the total thickness of the abrasive article. This process can be used to produce a rectangular sheet, but when a circular disk is punched out with the use of a punch-and-die set, the round surface of the die set will intersect with small portions of the typical round islands and either remove a sliver from some islands, or, leave just a sliver of a rather tall island weakly attached to the backing. In either case, the shearing action of a die punch will tend to jam the sliver portion of the island into the matching die set members. This jamming action will introduce unbalanced forces that will tend to push the island, or a crescent shaped sliver of an island sideways, which will weaken the islands structural attachment to the disk backing. Then the problem of "edge shelling" described earlier occurs and these raised island edge-slivers, or whole island structures, will tend to break loose during grinding and cause scratches that will occur on a lapped workpiece surface. Flex-Diamond® electroplated type of raised island diamond abrasive article sheets available from the 3M Company, St Paul, Minn. have been used to flat-grind workpiece surfaces at high rotational surface speeds using 12 inch (30.5 cm) diameter abrasive disks and these disks have successfully produced workpiece surfaces that had a very precise flatness. There was no indication of the occurrence of hydroplaning of the workpiece using the electroplated raised island product at rotational speed of up to 3,000 RPM. However, these precisely flat workpiece surfaces were simultaneously not polished smooth by the rotating disk abrading action, where the smoothness is relative to the micron size rating of the abrasive particle size of the abrasive article. After the workpiece surfaces were ground flat with the metal plated raised-island abrasive article the surface of the workpiece was so rough that it was not possible to establish the flatness of the ground surface by the use of an optical flat lens test system that allows the visual observation of fringe lightbands. Instead, many measurements (typically hundreds) were made on the workpiece surface by use of a coordinate measuring machine having a 0.0001 inch (2.54 micrometer) measurement readout capability and a theoretical plane of the ground surface was formed by regression analysis using the X, Y and Z coordinate measurements at the many test points of the workpiece surface. Then plots were made of the different areas of the error deviation of the localized non-flat areas of the workpiece surface area from the elevation of the theoretical calculated plane. These error plots gave an accurate description of the out-of-flat areas of the workpiece surface including both the magnitude of the errors and the location of the saddle, and other, shapes that were ground into the workpiece surface. Flat surfaced (non-island) abrasive disk articles of the same 12 inch (30.5 cm) diameter size having the same abrasive particle size rating tended to produce polished workpiece surface that were much smoother than was produced by the electroplated raised island articles under the same rotational speed conditions but these smooth surfaces were not precisely flat. This plated raised island product cannot be used to produce both a precisely smooth and flat workpiece surface, primarily because of the non-uniformity of the elevation of individual abrasive particles that are electroplate bonded to the irregular shaped raised island structures prevent the generation of a smooth surface. A woven mesh fiber cloth is used to produce the metal plated abrasive coated islands as this cloth can be easily stripped away from the island-patterned photo resist backing plate after the islands are formed on, and through the thickness, of the cloth during the island-forming electro plating process. Direct plating of abrasive particles to the top surface of island structures is described by Gorsuch but is not used as it is too difficult to separate the direct plated island from the electrically exposed areas of the photo resist plate. There is no discussion of the concerns of hydroplaning of the workpiece when used at the high speeds desired for abrading with diamond abrasive, which the height of the raised islands easily prevents. Instead, there is only discussion of a passageway for the water to travel outward to flush out the swarf generated as grinding particles are removed from the workpiece surface. Gorsuch makes an attempt to produce a flat level diamond abrasive surface, indicating he is aware of only the fundamental problem with this invention. He first plates a thin layer of metal in an array of islands "upside down" on a smooth cylinder. Then he plates on a layer of diamonds, which is followed by adding a cloth mesh and then adds a layer of metal plating on top of the diamonds which are now fully encapsulated into the thick layer of plated metal. The mesh is stripped off the drum to use the diamonds that originally lay on the flat surface of the drum. However, all the diamonds are completely buried in the plated metal and are useless for use as an abrasive article. Further, there was no description of uncurling a sheet of this material from the curvature of the drum and laying it flat for use as a disk without bending or distorting the abrasive metal plated sheet. The top surface of the raised island is formed in a non-flat cylindrical shape that matches the cylindrical curvature of the surface of the plating drum. Another part of the invention produces a disk with islands of abrasive. These are very thick disks that have a pattern of islands, which are raised 25 percent to 50 percent (of the overall thickness of the disk) above the disk base or backing. A thick layer of abrasive slurry of abrasive particles mixed in a resin is deposited on a backing and the thickness is controlled by the use of mold plates. No description is made of how critical it is to control the flatness of the upper surface of the molded layer of abrasive, or of how the abrasive surface is maintained flat during wear. Further, no description was made of any of the issues of hydroplaning at high speed with water lubricants which is a primary concern for use with high speed lapping. A description is given of the use of very large hemispherical elements of metal that have a diameter of 0.5 to 3 mm which has generally only five abrasive particles which have a very large average size of 250 micrometer diameter. These abrasive particles are located at the top and along the lower side-walls of each hemisphere and are metal plated to be embedded from 30 percent to 50 percent as an integral part of the metal hemisphere. These hemispheres are high enough to act as islands and the rounded tops would also aid in preventing hydroplaning at high speeds. However, this type of construction with very tall domes having only a single abrasive particle located on the very apex of the dome peak has little use for lapping. The single particle will be very aggressive in material removal but it will only produce distinct scratches as it removes a single track of material as it passes over a workpiece surface. This highest particle will have to become worn down along with some of the parent metal used for the dome construction before another particle will be active in partnership with the first. Having only five particles on a huge dome means most of the whole dome must effectively be worn down before the lower particles are engaged as grinding elements. The whole abrasive grinding load forces are so concentrated on single grains of abrasive that the grains tend to be knocked out of place, or "pulled" from the very strong plated metal binding. Use of expensive abrasive particles such as diamond seems totally out of place economically for this type of abrasive article construction. It has absolutely no value for lapping. None of the plating methods employed in this plating technique of forming abrasive articles has any capability of controlling the height of the particles relative to the backside of a backing, which is a critical factor for lapping at high surface speeds. FIG. 6 (Prior Art) is a cross section view of abrasive particle coated plated metal islands as described by Gorsuch. Island structures 68 are formed by metal plating geometric patterns on a cloth material 60 and abrasive particles 64 are fixtured to the surface of the metal islands 68 by a build-up of plated metal around each individual abrasive particle 64. Abrasive particles 62 also exist in the valleys or recessed areas between the island structures 68. There is no reference to controlling the variation in height 66 between islands or in controlling the height 70 of each individual islands as measured between the top surface of the islands 68 and the backside of the backing 60. In U.S. Pat. No. 5,318,604, Gorsuch forms plated abrasive particle covered elements where a metal element structure is first formed. This structure then has abrasive particles attached to the element top surface by further depositing plated metal on the element as abrasive particles are deposited on the metal structure. Many of these elements are formed through a cloth material, the cloth is removed from a plating tank grounding plate surface and the cloth is dissolved away to leave many of the individual small abrasive elements. The abrasive elements are then mixed with a polymer resin and the abrasive-resin mixture is then molded onto the surface of a disk backing sheet to form a geometric pattern of raised abrasive-polymer islands that are attached to the backing disk. FIG. 7 (Prior Art) is a cross section view of metal plated abrasive elements. An abrasive element 80 has a metal plated element structure 84 that has abrasive particles 82 metal bonded to the top surface of the structures 84. FIG. 8 (Prior Art) is a cross section view of raised island structures that are attached to a backing sheet. A backing sheet 90 has raised island structures 88 that are mold-formed from a mixture of a polymer 87 and abrasive coated plated metal structure elements 86 and there are with recessed valleys or channels 85 between the islands 88. FIG. 9 (Prior Art) is a top view of an abrasive disk article having molded abrasive raised islands. The abrasive disk 92 has a backing 93 that has attached abrasive mixture molded islands 96 that have recessed channel valley areas 95 that are located between the islands 96. There is a gap between the edges of all the islands 96 and the outer periphery of the disk 92 as shown by the recessed area gap width 94.

U.S. Pat. No. 4,315,720 (Ueda et al.) describes the use of a rotary wheel to produce spherical droplets of metal or slag where a melt material is feed into the wheel center and splits into small diameter linear streams. The spherical droplets that are formed from the streams become solidified and have a diameter larger than the stream diameter.

U.S. Pat. No. 4,272,926 (Tamulevich) describes the use of a abrasive coated sheet to polish the face end of a fiber optic connector where the fiber optic is positioned precisely perpendicular to the abrasive sheet mounted on a flat platen and the connector is moved relative to the sheet to produce a precisely flat and smooth facet. This same type of abrading process may be used to polish other components used with fiber optic systems.

U.S. Pat. No. 4,314,827 (Leitheiser, et al.) discloses processes and materials used to manufacture sintered aluminum oxide-based abrasive material having shapes including spherical shapes that are processed in an angled rotating kiln at temperatures up to 1350 degrees C. with a final high temperature zone residence time of about 1 minute.

U.S. Pat. No. 4,341,439 (Hodge) describes the use of abrasive to polish the face end of a fiber optic connector to produce a precisely flat and smooth face on the fibers.

U.S. Pat. No. 4,364,746 (Bitzer, et al.) discloses the use of composite abrasive agglomerates. Agglomerates include spherical abrasive elements. Composite agglomerates are formed by a variety of methods. Individual abrasive grains are coated with various materials including a silica ceramic that is applied by melting or sintering. Agglomerated abrasive grains are produced by processes including a fluidized spray granulator or a spray dryer or by agglomeration of an aqueous suspension or dispersion. Composite agglomerates contain between 10 and 1000 abrasive fine P 180 grade abrasive particles and agglomerates contain between 2 and 20 abrasive particles for P 36 grade abrasive.

U.S. Pat. No. 4,373,672 (Morishita, et al.) discloses a high speed air-bearing electrostatic automobile body sprayer article that produces 15 micron to 20 micron paint-drop particles by introducing a stream of a paint liquid into a segmented bore opening rotating head operating at 80,000 rpm. Comparatively, a slower like-sized ball-bearing sprayer head rotating at 20,000 rpm produces 55 micron to 65-micron diameter drops. A graph showing the relationship between the size of paint drop particles and the rotating speed of the spray head is presented. The 20 micron paint drops ejected from the sprayer head travel for some time over a distance before contacting an automotive body, during which time surface tension forces will act on the individual drops to form the drops into spherical shapes.

U.S. Pat. No. 4,421,562 (Sands) discloses microspheres formed by spraying an aqueous sodium silicate and polysalt solution with an atomizer wheel.

U.S. Pat. No. 4,426,484 (Saeki) describes phenolic resins which have the cure time accelerated by using special additives.

U.S. Pat. No. 4,541,566 (Kijima, et al.) discloses use of tapered wall pins in a centrifugal rotating head spray dryer that produces uniform 50 to 100 micron sized atomized particles using 1.0 to 4.0 specific gravity, 5 to 18,000 c.p. viscosity feed liquid when operating at 13 to 320 m/sec rotating head peripheral velocity.

U.S. Pat. No. 4,541,842 (Rostoker) discloses spherical agglomerates of encapsulated abrasive particles including 3 micron silicone carbide particles or cubic boron nitride (CBN) abrasive particles encapsulated in a porous ceramic foam bubble network having a thin-walled glass envelope. The composites are formed into spherical shapes by blending and mixing an aqueous mixture of ingredients including metal oxides, water, appropriate abrasive grits and conventional known compositions which produce spherical pellet shapes that are fired. Composite agglomerates of 250-micron size are dried and then fired at temperatures of up to 900 degrees C. or higher using a rotary kiln. Heating of the agglomerates to a temperature sufficiently high to form a glassy exterior shell surface on the agglomerates is done in a reducing atmosphere over a time period short enough to prevent thermal degradation of the abrasive particles contained within the spherical agglomerate. A vertical-shaft furnace is used to produce agglomerates as small as 20 microns.

U.S. Pat. No. 4,586,292 (Carroll et al.) describes an apparatus that provides a complex rotary motion used to lap polish the inside diameter of a spherical surface workpiece.

U.S. Pat. No. 4,652,275 (Bloecher) describes the use of erodible agglomerates of abrasive particles used for coated abrasive articles. The matrix material, joined together with the abrasive particles, erodes away during grinding which allows sloughing off of spent abrasive particles and the exposure of new abrasive grains. The matrix material is generally a wood product such as wood flour selected from pulp. A binder can include a variety of materials including phenolics. It is important that the binder not soften due to heat generated by grinding action. Instead, it should be brittle so as to breakaway. If too much binder is used, the agglomerate will not erode and if too little is used, the mixture of the matrix and the abrasive particles are hard to mix. The preferred agglomerate is made by coating a layer of the mixture, curing it, breaking it into pieces and separating the agglomerate particles by size for coating use. Agglomerates of a uniform size can be made in a pelletizer by spraying or dropping resin into a mill containing the abrasive mineral/matrix mixture. Agglomerates are typically irregular in shape, but they can be formed into spheres, spheroids, ellipsoids, pellets, rods and other conventional shapes. Other methods of making agglomerates include the creation of hollow shells of abrasive particles where the shell breaks down with grinding use to continually expose new abrasive particles. Other solid agglomerates of abrasive particles are mixed with an inorganic, brittle cryolite matrix. A description is made of conventional coated abrasives which typically consist of a single layer of abrasive grain adhered to a backing. It has been found that only up to 15 percent of the grains in the layer are actually utilized in removing any of the workpiece. It follows then that about 85 percent of the grains in the layer are wasted. The agglomerates described here preferably range from 150 micrometers to 3000 micrometers and have between 10 and 1000 individual abrasive grain particles for P180 grains and only 2 to 20 grains of larger P36 grains. These agglomerates far exceed the size required for high speed lapping. In fact, only single layers of diamond particles is required or typically used as a coating for most lapping abrasive articles, so these huge agglomerates have little or no use in lapping. Further, there would not be an effective method of maintaining a flat abrasive surface as the abrasive agglomerates are worn down by abrasive lapping or grinding action.

U.S. Pat. No. 4,710,406 (Fugier) describes a production method for the manufacture of a condensation reaction phenolic resin with different alkali catalysts and which can be diluted up to 1,000 percent.

U.S. Pat. No. 4,773,920 (Chasman et al.) herein incorporated by reference, describes an abrasive sheet article used for abrasive lapping where the backing sheet is less than 0.010 inches (254 micrometers) thick and is preferred to be 0.002 to 0.003 inches (51 to 76 micrometers) thick. Chemical treatments of the backing and mechanical roughing of the backing sheet is described that is used to promote the adhesion between the backing and the abrasive particle binder.

U.S. Pat. No. 4,776,862 (Wiand) discloses diamond and cubic boron nitride abrasive particle surface metallization with various metals and also the formation of carbides on the surface of diamond particles to enhance the bonding adhesion of the particles when they are brazed to the surface of a substrate.

U.S. Pat. No. 4,799,939 (Bloecher) describes use of 70 micrometer diameter hollow glass spheres which are mixed with abrasive particles and a binder to form erodible 150 to 3000 micrometer agglomerates which are used for coating in abrasive articles. The hollow glass spheres are strong enough for the mixing operation and for the process used to form the agglomerate particle. However, they are weak enough that they break when used in grinding. Again, as for U.S. Pat. No. 4,652,275, these agglomerates are much too large and inappropriate for use in high speed lapping.

U.S. Pat. No. 4,903,440 (Larson et al.), herein incorporated by reference, describes the use of different reduced-cost drum cured binder abrasive particle adhesives which allow elimination of the use of web festoon ovens which are used because of the long cure times required by conventional phenolic adhesives used for abrasive webs. Typically a pre-coat, a make coat, having loose abrasive particles imbedded into the make coat and then a size coat are applied to a continuous web backing. No reference is given to processing individual abrasive articles such as abrasive disks. Rather, a continuous backing web is coated with binders and abrasive particles, the binders are cured and then the web is converted into abrasive products such as disks or belts. Resole phenolic resins which are somewhat sensitive to water lubricants are catalyzed by alkaline catalysts and novolac phenolic resins having a source of formaldehyde to effect the cure are described. Viscosity of some binders are reduced by solvents. Fillers include calcium carbonate, calcium oxide, calcium metasilicate, aluminum sulfate, alumina trihydrate, cryolite, magnesia, kaolin, quartz and glass. Grinding aid fillers include cryolite, potassium fluroborate, feldspar and sulfur. Super size coats can use zinc stearate to prevent abrasive loading or grinding aids to enhance abrading. Coating techniques include two basic methods. The first is to provide a pre-size coat, a make coat, the initial anchoring of loose abrasive grain particles and a size coat for tenaciously holding abrasive grains to the backing. The second coating technique is to use a single-coat binder where a single-coat takes the place of the make coat/size coat combination. An ethyl cellosolve and water solvent is referenced for use with a resole phenolic resin.

U.S. Pat. No. 4,918,874 (Tiefenbach) discloses a slurry mixture including 8 micron and less diamond and other abrasive particles, silica particles, glass-formers, alumina, a flux and water, drying the mixture with a 400 degree C. spray dryer to form porous greenware spherical agglomerates that are sintered. Fluxes include an alkali metal oxide, such as potassium oxide or sodium oxide, but other metal oxides, such as, for example, magnesium oxide, calcium oxide, iron oxide, etc., can also be used.

U.S. Pat. No. 4,930,266 (Calhoun, et al.) discloses the application of spherical abrasive composite agglomerates made up of fine abrasive particles in a binder in controlled dot patterns where preferably one abrasive agglomerate is deposited per target dot by use of a commercially available printing plate. Small dots of silicone rubber are created by exposing light through a half-tone screen to a photosensitive silicone rubber material coated on an aluminum sheet and the unexposed rubber is brushed off leaving small islands of silicone rubber on the aluminum. The printing plate is moved through a mechanical vibrated fluidized bed of abrasive agglomerates that are attracted to and weakly bound to the silicone rubber islands only. The plate is brought into nip-roll pressure contact with a web backing which is uniformly coated by a binder resin which was softened into a tacky state by heat thereby transferring each abrasive agglomerate particle to the web backing. Additional heat is applied to melt the binder adhesive forming a meniscus around each particle, which increases the bond strength between the particle and the backing. The resulting abrasive article has gap-spaced dots of abrasive agglomerate particles on the backing but the agglomerates are attached directly to the backing surface and are not raised away from the backing surface. Each composite abrasive agglomerate bead is preferably a spherical composite of a large number of abrasive grains in a binder; the agglomerates typically range in size from 25 to 100 microns and contain 4-micron abrasive particles. It is indicated that the composite abrasive agglomerate granules should be of substantially equal size, i.e., the average dimension of 90% of the composite granules should differ by less than 2:1. Abrasive grains having an average dimension of about 4 microns can be bonded together to form composite sphere granules of virtually identical diameters, preferably within a range of 25 to 100 microns. Preferably, the abrasive composite granules have equal sized diameters where substantially every granule is within 10% of the arithmetic mean diameter so that the granules protrude from the surface of the binder layer to substantially the same extent and also so the granules can be force-loaded equally upon contacting a workpiece. Granules are spherical in shape or have a shape that has approximately that same thickness in every direction. By individually positioning the equal sized granules to be spaced equally from adjacent granules, the granules each bear the same load and hence wear at substantially identical rates and tend to be equally effective. Consequently, workpieces continue to be polished uniformly. One difficulty with this abrasive product, even with abrasive composites having uniform diameters where each composite granule can be positioned to protrude to the same extent from the binder layer, the variation in the thickness in the backing thickness is not considered. If there are significant variations in the backing thickness, even equal sized individual composite abrasive agglomerates coated on a abrasive article rotating at high lapping surface speeds of 8,000 surface feet per minute will not evenly contact a workpiece surface. Eventually, the highest positioned composite abrasives will wear down and adjacent composite agglomerates will be contacted by the workpiece surface. It is necessary to control the diameter of the composite agglomerates, the thickness variation of the binder and the variation of the coated surface height of the backing, relative to the back platen mounting side of the backing, to some fraction of the diameter of the average diameter of the abrasive composites to attain effective utilization of all or most of the abrasive composite agglomerates.

U.S. Pat. No. 4,931,414 (Wood, et al.) discloses the formation of microspheres by forming a sol-gel where a colloidal dispersion, sol, aquasol or hydrosol of a metal oxide (or precursor thereof) is converted to a gel and added to a peanut oil dehydrating liquid to form stable spheriods that are fired. A layer of metal (e.g. aluminum) can be vapor-deposited on the surface of the microspheres. Various microsphere-coloring agents were disclosed.

U.S. Pat. No. 4,974,373 (Kawashima, et al.) discloses a lapping abrasive tool having a adhesive bonded layer of abrasive particles where he describes the desirability of having a single layer of abrasive particles on the surface of the tool for lapping of workpieces. He discloses where multiple layers of abrasive particles in particle agglomerates can scratch the surface of a workpiece.

U.S. Pat. No. 5,015,266 (Yamamoto) describes surface-textured abrasive articles that have an abrasive coating applied to roll formed embossed backing sheets where the abrasive coating follows the contours of the embossed patterns.

U.S. Pat. No. 5,090,968 (Pellow) describes the formation of abrasive filaments by forcing a gelled hydrated mixture of a metal oxide into a moving porous belt to produce abrasive precursor filaments of substantially constant length. The filaments are treated to make them non-sticky as they are still attached to the belt after which they are removed from the belt and fired at a high temperature to convert them into filament abrasive particles. It is not possible to make spherical abrasive particles by this process.

U.S. Pat. No. 5,108,463 (Buchanan) describes carbon black aggregates incorporated into a super size coat which also included kaolin.

U.S. Pat. No. 5,110,659 (Yamakawa, et al.) discloses an abrasive lapping tape having very small abrasive particles where the tape has a defined smooth surface. He describes the undesirability of other abrasive particle coated lapping tapes that have agglomerations of fine abrasive particles that produce scratches in the surface of workpieces that include magnetic heads.

U.S. Pat. No. 5,137,542 (Buchanan) describes a coated abrasive article which has a coated layer of conductive ink applied to the surface of the article, either as a continuous film or the back side of the backing or as printed "island" patterns on the abrasive particle size of the article to prevent the buildup of static electricity during use. Static shock can cause operator injury or ignite wood dust particles. The islands coated on 3M Company Imperial® abrasive were typically quite large 1 inch (2.54 cm) diameter dots and cover only about 22 percent of the article surface. Further, they are very thin, about 4 to 10 micrometers. No reference is made to the affect of the raised islands on hydroplaning effects when used with a water lubricant and no reference is made to high speed lapping. Raised islands of this height would provide little, if any, benefit for hydroplaning. Further, islands of this large diameter would also develop a significant boundary layer across its surface length. Also, top coatings such as these electrically conductive particle filled materials would not allow the typically small mono layers of diamonds used in lapping films to abrasively contact the workpiece surface until the static coating was worn away, after which time it is no longer effective in static charge build-up prevention. Description is made of using polyester film as a backing material for lapping abrasive articles. Bond systems include phenolic resins and solvents include 2-butoxyethanol, toluene, isopropanol, or n-propyl acetate. Coating methods include letterpress printing, lithographic printing, gravure printing and screen printing. For gravure printing, a master tool or roll is engraved with minute wells which are filled with coatable electrically conductive ink with the excess coating fluid removed by a doctor blade. This coating fluid is then transferred to the abrasive article.

U.S. Pat. No. 5,175,133 (Smith, et al.) discloses bauxite (hydrous aluminum oxide) ceramic microspheres produced from a aqueous mixture with a spray dryer manufactured by the Niro company or by the Bowen-Stork company to produce polycrystalline bauxite microspheres. Gas suspension calciners featuring a residence time in the calcination zone estimated between one quarter to one half second where microspheres are transported by a moving stream of gas in a high volume continuous calcination process. Scanning electron microscope micrograph images of samples of the microspheres show sphericity for the full range of microspheres. The images also show a wide microsphere size range for each sample, where the largest spheres are approximately six times the size of the smallest spheres in a sample.

U.S. Pat. No. 5,190,568 (Tselesin) discloses a variety of sinusoidal and other shaped peak and valley shaped carriers that are surface coated with diamond particles to provide passageways for the removal of grinding debris. There are a number of problems inherent with this technique of forming undulating row shapes having wavelike curves that are surface coated with abrasive particles on the changing curvature of the rows. The row peaks appear to have a very substantial heights relative to the size of the particles which indicates that only a very small percentage of the particles are in simultaneous contact with a workpiece surface. One is the change in the localized grinding pressure imposed on individual particles, in newtons per square centimeter, during the abrading wear down of the rows. At first, the unit particle pressure is highest when a workpiece first contacts only the few abrasive particles located on the top narrow surface of the row peaks. There is a greatly reduced particle unit pressure when the row peaks are worn down and substantially more abrasive particles located on the more gently sloped side walls are in contact with the workpiece. The inherent bonding weakness of abrasive particles attached to the sloping sidewalls is disclosed as is the intention for some of the lower abrasive particles, located away from the peaks, being used to structurally support the naturally weakly bonded upper particles. The material used to form the peaks is weaker or more erodible than the abrasive particles, which allows the erodible peaks to wear down, expose, and bring the work piece into contact with new abrasive particles. Uneven wear-down of the abrasive article will reduce its capability to produce precise flat surfaces on the work piece. Abrasive articles with these patterns of shallow sinusoidal shaped rounded island-like foundation ridge shapes where the ridges are formed of filler materials, with abrasive particles coated conformably to both the ridge peaks and valleys alike is described. However, the shallow ridge valleys are not necessarily oriented to provide radial direction water conduits for flushing grinding debris away from the work piece surface on a circular disk article even prior to wear-down of the ridges. Also, a substantial portion of the abrasive particles residing on the ridge valley floors remain unused as it is not practical to wear away the full height of the rounded ridges to contact these lower elevation particles.

U.S. Pat. No. 5,199,227 (Ohishi) describes raised island structure protuberances that are coated with abrasive particles. FIG. 22 (Prior Art) is a cross section view of the Ohishi abrasive coated raised island structures. The protuberances 246 that are attached to a backing sheet 250 are coated with abrasive particles 244. There is no description of precisely controlling the height of the abrasive 244 from the backside of the backing 250 as indicated by the thickness or height dimension 248. The cavities that may be formed into the surface of the belt may be open cells that extend through the thickness of the flexible belt or cavity sheet.

U.S. Pat. No. 5,201,916 (Berg et al), herein incorporated by reference, describes abrasive particles that are formed with the use of a cavity cell belt or sheet that has a planar surface. A dispersion mixture of particles that can be converted into a metal oxide abrasive particle is formed as a liquid that is introduced into the belt cavity cells. The cells are filled with the liquid mixture dispersion flush with the flat top surface of the belt. The liquid can be gelled into a three dimensional network of solids dispersed in a liquid where the gel will not flow from an inverted test tube. The dispersion or mixture can be gelled before it is introduced into the belt cavities to fill them. Also, a peptizing agent may be added to the dispersion mixture to produce a more stable hydrosol or colloidal dispersion. Then a portion of the liquid in the dispersion mixture is removed while the mixture resides in the individual belt cavities whereby the precursor abrasive particles that are formed by the shape of each belt cavity shrinks in size while retaining the basic shape of the cavity. The preferred shape of a cavity is a flat-topped triangular shape so the formed abrasive particles in these cavities also have a flat-topped triangular shape. Each shrunken abrasive triangle abrasive precursor is reduced in size enough during the shrinkage that they then fall out of the cavities as solidified particles after shrinking due to gravity. The shrunken volume of the precursor of the abrasive particle can be 80% or less than the volume of the original liquid dispersion mixture that was initially deposited in the mold cavity. Care is exercised to not overheat the mixture during shrinkage to prevent cracks in the body of the solidified precursor particles. Typically 40% of the liquid is removed from the dispersion in the step in the process of forming the solidified abrasive particle precursor. The solidified particles are then collected to be subjected to heating to calcine the particles where all the volatile material is removed. Further heating then sinters or fires the calcined abrasive precursor particles into a hardened metal oxide ceramic abrasive particle. All of the finished abrasive particle shapes have flat and parallel front and back sides as they are formed by a speed controlled rubber squeegee to fully fill the flat planar cavity belt with the liquid mixture. The viscous liquid mixture contained in each individual cavity initially takes the geometric shape of the belt cavity shape to form the flat topped mixture geometric shapes. The cavity belt may be coated with a mold release agent prior to introduction of the dispersion into the cavity cells. As the cavity cell mixture particles are dried and shrunk into solid geometric forms prior to their being ejected by gravity from the belt it is not possible to produce a spherical abrasive particle shape by this process. Here, there is no provision made for surface tension forces to act on the individual abrasive particle lumps while the particle lump entities are in a fully free flowing liquid state and as the lump is in an unconstrained free state of suspension. There is no discussion by Berg of adding abrasive particles, including diamond particles, to the mixture prior to the mixture being introduced into the belt cavities. The high firing temperatures that are disclosed, which the metal oxide precursor particles are subjected to, would tend to destroy any diamond particles that were encapsulated in the form shaped abrasive particles. The metal oxide abrasive particles are then coated with a conventional resole phenolic resin on a backing sheet and cured in an oven to produce an abrasive article.

FIG. 29A (Prior Art) is a cross section view of the Berg triangular shaped abrasive particles and particle forming belt. The particle forming belt 335 has belt wall sections 331 that form cavity openings that are filled to the flat belt surfaces with a gelled mixture of suspended metal or other oxide particles in a water based solution to form a liquid flat sided triangular mixture lump 337 that shrinks to a smaller sized solidified flat sided triangular lump 333 which falls away from the belt 335. Two solidified falling abrasive flat sided triangular shaped lumps 339 are then collected and subjected to heating and firing to convert the abrasive lumps into hardened abrasive flat sided triangular shaped particles.

U.S. Pat. No. 5,221,291 (Imatani) describes the use of a polyimide resin for the combination use as an adhesive bonding agent for abrasive particles, and also, to form an abrasive sheet. Diamond particles were dispersed in solvent thinned polyimide resin and coated on a flat surface with 60 micrometer diamond particles to form an abrasive sheet where 20% of the sheet material is made up of abrasive particles. The sheet was tested at very low speeds of 60 rpm and did abrasively remove workpiece material, leaving a smooth workpiece surface. However, the abrasive particles are principally buried within the thickness of the resin mixture sheet as the abrasive and resin mixture forms the thin abrasive disk sheet article. Much of the expensive diamond particles are located at the bottom layer of the abrading sheet structure and so are not available for use as grinding agents but the polyimide successfully bonds the diamonds within the sheet.

U.S. Pat. No. 5,232,470 (Wiand) discloses raised molded protrusions of circular shapes composed of abrasive particles mixed in a thermoplastic binder attached to a circular sheet of backing.

U.S. Pat. No. 5,251,802 (Bruxvoort, et al.) discloses the use of solder or brazing alloys to bond diamond and other abrasive particles to a flexible metal or non-metal backing material.

U.S. Pat. No. 5,273,805 (Calhoun, et al.) discloses the use of a silicone material to transfer abrasive particles in patterns onto a tacky adhesive coated backing.

U.S. Pat. No. 5,304,225 (Gardziella) describes phenolic resins which typically have high viscosity which can be lowered by the addition of solvents or oils.

U.S. Pat. No. 5,368,618 (Masmar) describes preparing an abrasive article in which multiple layers of abrasive particles, or grains, are minimized. Some conventional articles have as many as seven layers of particles which is grossly excessive for lapping abrasive media. He describes "partially cured" resins in which the resin has begun to polymerize but which continues to be partially soluble in an appropriate solvent. Likewise, "fully cured" means the resin is polymerized in a solid state and is not soluble. If the viscosity of the make coat is too low, it wicks up by capillary action around and above the individual abrasive grains such that the grains are disposed below the surface of the make coat and no grains appear exposed. Phenolic resins are cured from 50 degrees to 150 degrees C. for 30 minutes to 12 hours. Fillers including cryolite, kaolin, quartz, and glass are used. Organic solvents are added to reduce viscosity. Typically 72 to 74 percent solids are used for resole phenolic resin binders. Special tests demonstrate that a partially cured resin is capable of attaching loose abrasive mineral grains which are drop coated onto test slides with the result that higher degree of cure results in lower mineral pickup and lower degree of cure results in less mineral pickup. Abrasive grains can be electrostatically projected into the make coat where the ends of each grain penetrates some distance into the depth of the make coat. No description was provided about the desirability, necessity, or ability of the grain application process having a flat uniform depth of the tops of each particle for high speed lapping.

U.S. Pat. No. 5,397,369 (Ohishi) describes phenolic resins used in abrasive production which have excessive viscosity where a large amount of solvent is required for dilution to adjust the viscosity within an appropriate range. Examples of organic solvents with high boiling points include cyclohexanone, and cyclohexanol. Solvents having an excessively high boiling point tend to remain in the adhesive binder and results in insufficient drying. When the boiling point of a solvent is too low, the solvent leaves the binder too fast and can result in defects in the abrasive coating, sometimes in the form of foamed areas. Additives such as calcium carbonate, silicone oxide, talc, etc. fillers, cryolite, potassium borofluoride, etc. grinding aids and pigment, dye, etc. colorants can be added to the second phenolic adhesive (size coat) used in the abrasive manufacture.

U.S. Pat. No. 5,489,204 (Conwell, et al.) discloses a non rotating kiln apparatus useful for sintering previously prepared unsintered sol gel derived abrasive grain precursor to provide sintered abrasive grain particles ranging in size from 10 to 40 microns. Dried material is first calcined where all of the mixture volatiles and organic additives are removed from the precursor. The stationary kiln system described sinters the particles without the problems common with a rotary kiln including loosing small abrasive particles in the kiln exhaust system and the deposition on, and ultimately bonding of abrasive particles to, the kiln walls. A pusher plate advances a level mound charge quanity of unsintered abrasive grains dropped within the heated body of a fixed position kiln having a flat floor to sinter dried or calcined abrasive grains. The depth of the level mound of unsintered particles is minimized to a shallow bed height to aid in providing consistent heat transfer to individual unsintered abrasive precursor grains, and in consistently providing uniformly sintered abrasive grains. The abrasive grain precursor remains in the sintering chamber for a sufficient time to fully sinter the complete body volume of each individual particle contained in the level mound bed. The surface of each unsintered particle is heated to the temperature of the sintering apparatus in less than a 1-second time period.

U.S. Pat. No. 5,496,386 (Broberg, et al.) discloses the application of a mixture of diluent particles and also shaped abrasive particles onto a make coat of resin where the function of the diluent particles is to provide structural support for the shaped abrasive particles.

U.S. Pat. No. 5,549,961 (Haas, et al.) discloses abrasive particle composite agglomerates in the shape of pyramids and truncated pyramids that are formed into various shapes and sintered at high temperature. Numerous references are made to the deployment of individual abrasive microfinishing beads on a backing but no reference is made concerning the production of these spherical beads by the technology disclosed in this patent. Rather, the creation of composite agglomerates is focused on the production of pyramid shaped agglomerates. The breakdown of abrasive composite agglomerates is characterized in the exposed surface regions of the abrasive composite where small chunks of abrasive particles and neighboring binder material are loosened and liberated from the working surfaces of the abrasive composite, and new or fresh abrasive particles are exposed. This breakdown process continues during polishing at the newly exposed regions of the abrasive composites. During use of the abrasive article of this invention, the abrasive composite erodes gradually where worn abrasive particles are expelled at a rate sufficient to expose new abrasive particles and prevent the loose abrasive particles from creating deep and wild scratches on or gouging a workpiece surface. The composite abrasive particles including diamond contained in the agglomerates range in size from 0.1 to 500 microns but preferably, the abrasive particles have a size from 0.1 to 5 microns.

U.S. Pat. No. 5,549,962 (Holms) describes the use of pyramid shaped abrasive particles by use of a production tool having three-dimensional pyramid shapes generated over its surface which are filled with abrasive particles mixed in a binder. This abrasive slurry is introduced into the pyramid cavity wells and partially cured within the cavity to sufficiently take on the shape of the cavity geometry. Then the pyramids are either removed from the rotating drum production tool for subsequent coating on a backing to produce abrasive articles, or, a web backing is brought into running contact with the drum to attach the pyramids directly to the backing to form an abrasive web article. If a web backing is used is contact with the drum, the apexes of the pyramids are directed away from the backing. If loose discrete pyramids are produced by the drum system, the pyramids can be oriented on a backing with the possibility of having the pyramid apex up, or down or sideways relative to the backing. The pyramid wells may be incorporated into a belt and also, these forms can extend through the thickness of the belt to aid in separating the abrasive pyramid particles from the belt.

Over time, many attempts have been made to distribute abrasive grits or particles on the backing in such a method that a higher percentage of the abrasive grits or particles can be used. Merely depositing a thick layer of abrasive grits or particles on the backing will not solve the problem, because grits or particles lying below the topmost grits or particles are not likely to be used. The use of agglomerates having random shapes where abrasive particles are bound together by means of a binder are difficult to predictably control the quantity of abrasive grits or particles that come into contact with the surface of a workpiece. For this reason, the precisely shaped (pyramid) abrasive agglomerates are prepared. Some pyramid-shaped particles are formed which do not contain any abrasive particles and these are used as dilutants to act as spacers between the pyramid abrasive agglomerates when coated by conventional means. Many different fillers and additives can be used including talc and montmorillonite clays. Care is exercised to provide sufficient curing of the agglomerate binders in the drum cavities so that the geometry of the cavity is replicated. Generally, this requires a fairly slow rotation of the production tooling cavity drum. No description is given to the accuracy of the height or thickness control of the resultant abrasive article which incorporates these very large agglomerate pyramids which typically are 530 micrometers high and have a 530 micrometer base length. Thickness variations of conventional lapping disk abrasive sheets generally are held within 3 micrometers in order for it to be used successfully. The system of using the large pyramids described here cannot produce an abrasive article of the precise thickness control required for high speed lapping for a number of fundamental reasons. Some of these reasons are listed here. First, creation of many precise sized pyramid cavities by use of a belt that is replicated into a plastic form to control the belt cost adds error due to the sequential steps taken in the replication process. Variations in binder cures from production run to run and also variations in binder cures across the surface of a drum belt result in pyramids that are distorted from the original drum wells. For backing belts to be integrally bonded to the pyramids during the formation of the pyramids, it is required that any adhesive binder used to join the agglomerate be precisely controlled in thickness. Thickness control is difficult to achieve with this type of production equipment as there are many thickness process variables that must be controlled that are in addition to those variables that are controlled to successfully create or form precise shaped pyramids. The backing material must be of a precise thickness. Random orientation of the large agglomerates will inherently produce different heights at the exposed tops of the agglomerates depending on whether an agglomerate has its apex up, it lays sideways, or has its sharp apex embedded in a make coat of binder. The use of pyramids where all the apexes are up and the bases are nested close together produces grinding effects that change drastically from the initial use where only the tips of the pyramids contact the workpiece, to a final situation where the broad bases contact the workpiece when most of the pyramid has worn away. There was no description of the inherent advantage of the use of upright pyramids for hydroplaning or swarf removal which is a natural affect of these relatively tall "mountain pyramids" and the "valleys" between them which can carry off the water quite well. There was no discussion of the use of this pyramid material for high speed lapping or grinding. The water lubricant effects on grinding would change significantly as the abrasive article wears down. There is a fundamental flaw in the design of the pyramid for upright use. Most of the abrasive material contained on the pyramid lies at the base which is worn out last during the phase of wear when the variations in thickness of the backing, and other thickness variation sources, prevent a good proportion of the bases from contacting a workpiece surface. When using these large-sized pyramid agglomerates, they are designed to progressively breakdown and expose new cutting edges as the old worn individual abrasive particles are expended as the support binder is worn down, exposing fresh new sharp abrasive particles. Most of the value of the expensive abrasive particles lies in the base, as most of the volume of a triangle is in the base. Here, most of the valuable abrasive particles at the base areas will never be used and are wasted. Further, as wear-down of the pyramids is prescribed by selection of the pyramid agglomerate binder, the level surface of the abrasive disk will vary from the inside radius to the outside radius as the contact surface speed with a workpiece will be different due to the radius affect of a rotating abrasive platen. The pyramids are grossly high compared to the size of abrasive particles or abrasive agglomerates and this height results in uneven wear across the surface of an abrasive article that often is far in excess of that allowable for high speed flat lapping. This uneven wear prevents the use of this type of article for high speed lapping. Inexpensive abrasive materials such as aluminum oxide can be used for the pyramid agglomerates but it is totally impractical to use the extra hard, but very expensive, diamond abrasives in these agglomerates. The flaws inherent in the use of conventional pyramid shaped type of agglomerates, due to the size variations in the agglomerates, would tend to prevent them from being used successfully for flat lapping. First, agglomerates can be made and then sorted by size prior to use as a coated abrasive. Also, the configuration of a generally round shaped conventional agglomerate would certainly wear more uniformly than wearing down a pyramid which has a very narrow spiked top and, after wear-down, a base which is probably ten times more large in cross-sectional surface area than the pyramid top. Random orientation of the pyramid shape does not help this geometric artifact. Another issue is the formulation of the binder and filling used in a conventional agglomerate. A wide range of friable materials such as wood products can be joined in a binder which can be selected to produce an agglomerate by many methods, including furnace baking, etc. The binder used in the production of the pyramids must be primarily selected for process compatibility with the fast cure replication of the drum wells and not for consideration of whether this binder will break down at the desired rate to expose new abrasives at the same rate the abrasive particles themselves are wearing down. It does not appear that this pyramid shaped agglomerate particle has much use for high speed lapping. Use of a polyethylene terephthalete polyester film with a acrylic acid prime coat is described.

U.S. Pat. No. 5,551,961 (Engen) describes abrasive articles made with a phenolic resin applied as a make coat used to secure abrasive particles to the backing by applying the particles while the make coat is in an uncured state, and then, the make coat is pre-cured. A size coat is added. Alternatively, a dispersion of abrasive particles in a binder is coated on the backing. The use of solvents is described to reduce the viscosity of the high viscous resins where high viscosity binders cause "flooding", i.e., excessive filling in between 30 to 50 micrometer abrasive grains. Also, non-homogenous binder resins result in visual defects and performance defects. Both flooding and non-homogenous problems can be reduced by the use of organic solvents which are minimized as much as possible. Resole phenolic resins experience condensation reactions where water is given off during cross linking when cured. These phenolics exhibit excellent toughness, dimensional stability, strength, hardness and heat resistance when cured. Fillers used include calcium sulfate, aluminum sulfate, aluminum trihydrate, cryolite, magnesium, kaolin, quartz and glass and grinding aid fillers include cryolite, potassium fluoroborate, feldspar and sulfur. Abrasive particles include fused alumina zirconia, diamond, silicone carbide, coated silicone carbide, alpha alumina-based ceramic and may be individual abrasive grains or agglomerates of individual abrasive grains. The abrasive grains may be orientated or can be applied to the backing without orientation. The preferred backing film for lapping coated abrasives is polymeric film such as polyester film and the film is primed with an ethylene acrylic acid copolymer to promote adhesion of the abrasive composite binder coating. Other backing materials include polyesters, polyolefins, polyamides, polyvinyl chloride, polyacrylates, polyacrylonitrile, polystyrene, polysulfones, polyimides, polycarbonates, cellulose acetates, polydimethyl siloxanes, polyfluocarbons, and blends of copolymers thereof, copolymers of ethylene and acrylic acid, copolymers of ethylene and vinyl acetate. Priming of the film includes surface alteration by a chemical primer, corona treatment, UV treatment, electron beam treatment, flame treatment and scuffing to increase the surface area. Solvents include those having a boiling point of 100 degrees C. or less such as acetone, methyl ethyl ketone, methyl t-butyl ether, ethyl acetate, acetonitrile, and one or more organic solvents having a boiling point of 125 degrees C. or less including methanol, ethanol, propanol, isopropanol, 2-ethoxyethanol and 2-propoxyethanol. Non-loading or load-resistant super size coatings can be used where "loading" is the term used in the abrasives industry to describe the filling of spaces between the abrasive particles with swarf (the material abraded from the workpiece) and the subsequent buildup of that material. Examples of load resistant materials include metal salts of fatty acids, urea-formaldehyde resins, waxes, mineral oils, cross linked siloxanes, cross linked silicones, fluorochemicals, and combinations thereof. Preferred load resistant super size coatings contain zinc stearate or calcium stearate in a cellulose binder. In one description, the make coat precursor can be partially cured before the abrasive grains are embedded into the make coat, after which a size coating precursor is applied. A friable fused aluminum oxide can be used as a filler.

U.S. Pat. No. 5,611,825 (Engen) describes resin adhesive binder systems which can be used for bonding abrasive particles to web backing material, particularly urea-aldehyde binders. There is no reference made to forming or abrasive coating abrasive islands. He describes the use of make, size and super size coatings, different backing materials, the use of methyl ethyl ketone and other solvents. Loose abrasive particles are either adhered to uncured make coat binders which have been coated on a backing or abrasive particles are dispersed in a 70 percent solids resin binder and this abrasive composite is bonded to the backing. Backing materials include very flat and smooth polyester film for common use in fine grade abrasives which allow all the particles to be in one plane. Primer coatings are used on the smooth backing films to increase adhesion of the make coating. Water solvents are desired but organic solvents are necessary for resins. Fillers include calcium metasilicate, aluminum sulfate, alumina trihydrate, cryolite, magnesia, kaolin, quartz, and glass. Grinding aid fillers include cryolite, potassium fluroborate, feldspar and sulfur. Backing films include polyesters, polyolefins, polyamides, polyvinyl chloride, polyacrylates, polyacrylonitrile, polystyrene, polysulfones, polyimides, polycarbonates, cellulose acetates, polydimethyl silotanes, polyfluorocarbons. Priming of the backing to improve make coating adhesion includes a chemical primer or surface alterations such a corona treatment, UV treatment, electron beam treatment, flame treatment and scuffing. Solvents include acetone, methyl ethyl ketone, methyl t-butyl ether, ethyl acetate, acetonitrile, tetrahydrofuran and others such as methanol, ethanol, propanol, isopropanol, 2-ethoxyethanol and 2-propoxyethanol. Abrasive filled slurry is coated by a variety of methods including knife coating, roll coating, spray coating, rotogravure coating, and like methods. Resins used include resole and novolac phenolic resins, aminoplast resins, melamine resins, epoxy resins, polyurethane resins, isocyanurate resins, urea-formaldehyde resins, isocyanurate resins and radiation-curable resins. Different examples of make, size and super-size coatings and their quantitative amounts of components were given.

U.S. Pat. No. 5,674,122 (Krech) described screen abrasive articles where the abrasive particles are applied to a make coat of phenolic resin by known techniques of drop coating or electrostatic coating. The make coating is then at least partially cured and a phenolic size coating is applied over the abrasive particles and both the make coat and size coat are fully cured. Make and size coats are applied by known techniques such as roll coating, spray coating, curtain coating and the like. Optionally, a super size coat can be applied over the size coat with anti-loading additive of a stearate such as zinc stearate in a concentration of about 25 percent by weight optionally along with other additives such as cryolite or other grinding aids. In addition, the abrasive coating can be applied as a slurry where the abrasive particles are dispersed in a resinous binder precursor which is applied to the backing by roll coating, spray coating, knife coating and the like. Various types of abrasive particles of aluminum oxide, ceramic aluminum oxide, heat-treated aluminum oxide, white-fused aluminum oxide, silicone carbide, alumina zirconia, diamond, ceria, cubic boron nitride, garnet and combinations of these in particle sizes ranging from 4 to 1300 micrometers can be used.

U.S. Pat. No. 5,733,175 (Leach) describes workpiece polishing machines with overlapping platens that provide uniform abrading velocities across the surface of the workpiece. Hydroplaning of workpieces during abrading action is discussed.

U.S. Pat. No. 5,888,548 (Wongsuragrai, et al.) discloses formation and drying of rice starches into 20 to 200 micron spherical agglomerates by mixing a slurry of rice flour with silicone dioxide and using a centrifugal spray head at elevated temperatures.

U.S. Pat. No. 5,910,471 (Christianson, et al.) discloses that the valleys between the raised adjacent abrasive composite truncated pyramids provide a means to allow fluid medium to flow freely between the abrasive composites which contributes to better cut rates and the increased flatness of the abraded workpiece surface.

U.S. Pat. No. 5,924,917 (Benedict) describes methods of making endless belts using an internal rotating driven system. He describes the problem of "edge shelling" which occurs on small width endless belts. This is the premature release of abrasive particles at the cut belt edge. He compensates for this by producing a belt edge that is very flexible and conformable. The analogy to this edge shelling occurs on circular abrasive disks also. To construct a belt, an abrasive web is first slit to the proper width by burst, or other, slitting techniques which tends to loosen the abrasive particles at the belt edge when the abrasive backing is separated at the appropriate width for a given belt. These edge particles may be weakly attached to the backing and they may also be changed in elevation so as to stick up higher than the remainder of the belt abrasive particles. Similarly, when a disk is punched out by die cutting techniques from a web section, the abrasive particles located on the outer peripheral cut edge are also weakened. This happens particularly for those discrete particles which were pushed laterally to the inside or outside of the die sizing hole by the matching die mandrel punch. Other types of cutting, slitting or punching abrasive articles from webs also create this shelling problem including water jet cutting, razor blade cutting, rotary knife slitting, and so on. Resole phenolic resins are alkaline catalyzed by catalysts such as sodium hydroxide, potassium hydroxide, organic amines or sodium carbonate and they are considered to be thermoset resins. Novolac phenolic resins are considered to be thermoplastic resins rather than thermoset resins which implies the novolac phenolics do not have the same high temperature service performance as the resole phenolics. Resole phenolic resins are the preferred resins because of their heat tolerance, relatively low moisture sensitivity, high hardness and low cost. During the coating process, make coat binder precursors are not solvent dried or polymerized cured to such a degree that it will not hold the abrasive particles. Generally, the make coat is not fully cured until the application of the size coat which saves a process step by fully curing both at the same time. Fillers include hollow or solid glass and phenolic spheroids and anti-static agents including graphite fibers, carbon black, metal oxides, such as vanadium oxide, conductive polymers, and humectants are used. Abrasive material encompasses abrasive particles, agglomerates and multi-grain abrasive granules. Belts are produced by this method using a batch process. The thermosetting binder resin dries, by the release of solvents, and in some instances, partially solidified or cured before the abrasive particles are applied. The resin viscosity may be adjusted by controlling the amount of solvent (the percent solids of the resin) and/or the chemistry of the starting resin. Heat may also be applied to lower the resin viscosity, and may additionally be applied during the processes to effect better wetting of the binder precursor. However, the amount of heat should be controlled such that there is not premature solidification of the binder precursor. There must be enough binder resin present to completely wet the surface of the particles to provide an anchoring mechanism for the abrasive particles. A film backing material used is PET, polyethylene terephthalate having a thickness of 0.005 inch (0.128 mm). Solvents used include trade designated aromatic 100 and Shell® CYCLO SO 53 solvent.

U.S. Pat. No. 6,017,265 (Cook, et al.) discloses abrasive slurry polishing pads that are used for polishing integrated circuits. He references polishing pads that are not highly flat and have variations in thickness where portions of the workpiece will not be in contact with the pad which gives rise to nonuniformities in the shape of the workpiece surface. A desirable thickness variation in these polishing pads is less the 0.001 inch (25 micrometers) in order to improve the uniformity of the polishing process.

U.S. Pat. No. 6,099,390 (Nishio, et al.) discloses abrasive slurry polishing pads having raised and recessed surfaces that are used for polishing semiconductor wafers. He references polishing pads that are used to polish semiconductors having level differences on the surface of the semiconductor wafer that are at most 1 to 2 micrometers.

U.S. Pat. No. 6,186,866 (Gagliardi) discloses the use of a abrasive article backing contoured by grinding-aid containing protrusions having a variety of peak-and-valley shapes. Abrasive particles are coated on both the contoured surfaces of the protrusions and also onto the valley areas that exist between the protrusion apexes. The protrusions present grinding aid to the working surface of the abrasive article throughout the normal useful life of the abrasive article. Useful life of an abrasive article begins after the abrasive particle coating that exists on the protrusion peaks is removed, which typically occurs within the first several seconds of use. Initial use, which occurs prior to the "useful life", is defined as the first 10% of the life of the abrasive article. Protrusions contain a grinding aid, with the protrusions preferably formed from grinding aid alone, or the protrusions are a combination of grinding aid and a binder. The protrusion shapes have an apex shape that is coated with an adhesive resin and abrasive particles. The particles are drop coated or electrostatically coated onto the resin and thereby form a layer of abrasive particles conformably coated over both the peaks and valleys of the protrusion shapes. The primary objective of the protrusion shapes is to continually supply a source of grinding aid to the abrading process. There are apparent disadvantages of this product. Only a very few abrasive particles reside on the upper-most portions of the protrusion peaks and it is only these highest-positioned particles that contact a workpiece surface. The small quantity of individual particles contacting a workpiece, which are only a fraction of the total number of particles coated on the surface of the abrasive article, will be quickly worn down or become dislodged from the protrusion peaks. Particles would tend to break off from the protrusion wall surfaces, when subjected to abrading contact forces, due to the inherently weak resin particle bond support at individual particle locations on the curved protrusion walls. Abrasive particles are very weakly attached to the sloping sidewalls of the protrusions due to simple geometric considerations that make them vulnerable to detachment. It is difficult to bond a separate abrasive particle to a wall-side with a resin adhesive binder that does not naturally flow by gravity and symmetrically surrounds the portion of the particle that contacts the wall surface. Abrasive particles attached to a traditional flat-surfaced abrasive backing sheet article tend to have a symmetrical meniscus of resin surrounding the base of each particle but this configuration of meniscus would not generally form around a particle attached to a near vertical protrusion side-wall. Also, the protrusion side-wall is inherently weak as the protrusion body is constructed of grinding aid material. Much of the valuable superabrasive particles located in the valley areas are not utilized with this technique of particle surface conformal coating of both protrusion peaks and valleys. As the abrading action continues, with the wearing down of the erodible protrusions, more abrasive particles are available for abrading contact with a workpiece article. However, the advantage of having protrusion valleys, that are used to channel coolant fluids and swarf, disappears as the valleys cease to exist. The procedure cited for testing the protrusion contoured abrasive article cited the use of a 7 inch (17.8 cm) diameter disk operated at approximately 5,500 rpm indicating an intended high surface speed abrading operation. FIG. 23 (Prior Art) is a cross section view of the Gagliardi abrasive coated raised island protrusion structures. The protrusions 254 that are attached to a backing sheet 256 are coated with abrasive particles 252. There is no description of precisely controlling the height of the abrasive or of the protrusions as measured from the backside of the backing 256. FIG. 24 (Prior Art) is a cross section view of rectangular-walled Gagliardi abrasive coated raised island protrusion structures. The protrusions 258 that are attached to a backing sheet 264 are coated with abrasive particles 260. There is no description of precisely controlling the height of the abrasive or of the protrusions as measured from the backside of the backing 256 as shown by the dimension 262.

U.S. Pat. No. 6,217,413 (Christianson) discloses the use of phenolic or other resins where abrasive agglomerates are drop coated preferably into a monolayer. Leveling and truing out the abrading surface is performed on the abrasive article which results in a tighter tolerance during abrading.

U.S. Pat. No. 6,231,629 (Christianson, et al.) discloses a slurry of abrasive particles mixed in a binder and applied to a backing sheet to form truncated pyramids and rounded dome shapes of the resin based abrasive particle mixture. Fluids including water, an organic lubricant, a detergent, a coolant or combinations thereof are used in abrading which results in a finer finish on glass. Fluid flow in valleys between the pyramid tops tends to produce a better cut rate, surface finish and increased flatness during glass polishing. Presumably, these performance advantages would last until the raised composite pyramids or domes are worn away. Abrasive diamond particles may either have a blocky shape or a needle like shape and may contain a surface coating of nickel, aluminum, copper, silica or an organic coating.

U.S. Pat. No. 6,299,508 (Gagliardi, et al.) discloses abrasive particle coated protrusions attached to a backing sheet where the protrusions have stem web or mushroom shapes with large aspect ratios of the mushroom shape stem top surface to the stem height. A large number of abrasive particles are attached to the vertical walls of the stems compared to the number of particles attached to the stem top surface. Abrasive discs using this technology range in diameter from 50 mm (1.97 inches) to 1,000 mm (39.73 inches) and operate up to 20,000 revolutions per minute. As in Gagliardi, U.S. Pat. No. 6,186,866, the abrasive article described here does not provide that the attachment positions of the individual abrasive particles are in a flat plane which is required to create an abrasive article that can be used effectively for high surface speed lapping.

U.S. Pat. No. 6,319,108 (Adefris, et al.), herein incorporated by reference, discloses the electroplating of composite porous ceramic abrasive composites on metal circular disks having localized island area patterns of abrasive composites that are directly attached to the flat surface of the disk. Glass-ceramic composites are the result of controlled heat-treatment. The pores in the porous ceramic matrix may be open to the external surface of the composite agglomerate or sealed. Pores in the ceramic mix are believed to aid in the controlled breakdown of the ceramic abrasive composites leading to a release of used (i.e., dull) abrasive particles from the composites. A porous ceramic matrix may be formed by techniques well known in the art, for example, by controlled firing of a ceramic matrix precursor or by the inclusion of pore forming agents, for example, glass bubbles, in the ceramic matrix precursor. Preferred ceramic matrixes comprise glasses comprising metal oxides, for example, aluminum oxide, boron oxide, silicone oxide, magnesium oxide, manganese oxide, zinc oxide, and mixtures thereof. A preferred ceramic matrix is alumina-borosilicate glass. The ceramic matrix precursor abrasive composite agglomerates are fired by heating the composites to a temperature ranging from about 600 to 950 degrees C. At lower firing temperatures (e.g., less than about 750 degree C.) an oxidizing atmosphere may be preferred. At higher firing temperature (e.g., greater than about 750 degree C.) an inert atmosphere (e.g., nitrogen) may be preferred. Firing converts the ceramic matrix precursor into a porous ceramic matrix. An organic size coat comprising resole phenolic resin (the resole phenolic was 78% solids in water and contained 0.75-1.8% free formaldehyde and 6-8% free phenol), tap water, silane coupling agent and a wetting agent may be coated over the ceramic abrasive composites and the metal coatings on an abrasive article. Individual diamond particles contained in the composites have metal surface coatings including nickel, aluminum, copper, inorganic coatings including silica or organic coatings. Composite abrasive agglomerates sink through an electroplating solution and land on a conductive backing where they are surrounded by plated metal that bonds the agglomerates to the backing surface. A polymer size coat can be applied over the agglomerates to strengthen the bond attachment of the agglomerates to the backing. Composites may have a mixture of different sizes and shapes but there is a stated preference that the abrasive composites have the same shape and size for a given abrasive article. Diamond particles were mixed with metal oxides to form an aqueous slurry solution that was coated into cavities, solidified, removed from the cavities and at 720 degrees C.

U.S. Pat. No. 6,371,842 (Romero) describes island-type abrasive grinding disk articles that have an article center aperture hole and circular bands of raised islands having flat top surfaces that are adhesive coated and abrasive particles which are deposited onto the adhesive. The raised island abrasive hand tool disks disclosed by Romero are intended to correct a specific problem that occurs in typical non-island disk manufacturing where thick preformed disks are coated with an adhesive binder that has a tendency to form a high lip of binder coating on the disk backing outer peripheral edge, after which, abrasive particles are deposited on the binder raised peripheral lip. This raised elevation outer diameter raised lip that is coated with abrasive particles causes undesirable workpiece surface scratches during abrading use. The use of abrasive coated raised island structures that are attached to a backing sheet reduces the formation of the raised abrasive peripheral edge lips on manual tool grinding disk articles. FIG. 12 (Prior Art) is a top view of a Romero described abrasive disk that has an outer periphery polymer adhesive make-coat raised band. The disk 130 has a disk-center aperture hole 134 and a raised polymer peripheral band 132 where both the flat surface of the disk 130 and the outer band 132 are surface coated with abrasive particles 140. FIG. 13 (Prior Art) is a cross section view of a Romero described abrasive disk having a raised polymer band on the outer periphery of the disk. The disk backing 144 has a coating of polymer adhesive 142 that is generally flat across the inner surface of the disk but the polymer adhesive 142 has a outer periphery raised-bead edge 138 where all the adhesive 142 in both the disk 144 flat inner area surface and the top surface of the bead edge 138 has a coating of abrasive particles 136. FIG. 14 (Prior Art) is a top view of a Romero described disk having abrasive coated raised islands. The disk 152 has a center aperture hole 150 and a number of abrasive particle coated raised island structures 148 that are positioned radially on the disk 152 where the inner radius position of all the raised islands 148 have a common island 148 end-position inner radial location diameter 146. The radial islands 148 each have a radial length that is somewhat less than the radius of the disk 152. No teaching is included of the advantage of having the radial islands 148 having a minimum position diameter 146 to reduce the large change of surface cutting speeds of the radial disk from the inner radius portions of the radial islands 148 to the outer radius portions of the radial islands 148. Romero focuses on an abrasive article that has raised islands where there are gap spaces between the islands and the outer periphery of the backing sheet. His use of abrasive coated raised islands that are positioned a gap-distance away from the peripheral edge of the backing sheet is a solution to the addressed problem of the raised peripheral edge bead of abrasive particle coated resin. He does not disclose abrasive articles where the raised islands are positioned directly at the outer periphery of the abrasive article backing sheet without a gap between the raised islands and the backing sheet. His abrasive islands also are adhesive coated on the top island surface only and abrasive particles are drop coated on the island adhesive coated surfaces to form abrasive particle coated islands, and where the recessed valley areas between the raised islands do not have abrasive particles. No other raised island abrasive particle coating techniques, such as applying an abrasive resin slurry directly onto the island top surfaces, are described.

The Romero abrasive disk articles described are not suggested for nor is awareness indicated for their use in flat lapping or in flat grinding where the disks would be mounted on a flat surfaced rotary platen. Instead the articles are taught to be mounted on hand tool mandrels by the use of mechanical fasteners that penetrate an aperture hole located at the center of the circular disk. No mention or teachings are made of the art of precision flat grinding, or lapping, of flat workpiece surfaces or of using these island disks in that abrasive application area. Also, there is no mention of the precision control of the variation in the thickness of the abrasive disk articles or the use of the precision flatness grinding or lapping machines that are required to produce precise flat workpiece surfaces. There is no mention of the desirability of the existence of a mono (single) layer of coated abrasive particles; or of controlling the variation of the thickness of the abrasive article to a proportion of the diameter of the coated abrasive particles. Further, no mention is made of the problems of hydroplaning of disks or workpieces.

Romero does not teach the advantages or requirements of having the features of uniform flat surfaces or even "substantially planar surfaces" for: the recessed valley areas located between the islands; the top surfaces of the islands; or the back side surface of the backing in the non-claims portion of the patent specification. There is no reference given for the use of the island type abrasive articles to be used for creating precision flat workpiece surfaces or precise smooth workpiece surfaces as in a flat-lapping operation. Flat lapping requires extremely flat abrasive disk machine tool platens and the abrasive disk article also must be precisely flat and of uniform thickness to enable all of the coated abrasive particles to be utilized. Further, there is no mention of the advantages of arranging the raised islands in an annular array having a narrow outer radius annular band width of abrasive to avoid having the slow moving abrasive surfaces that are located at the inner diameter area of a disk, to be in contact with a workpiece surface. Uneven wear occurs across the surface of a workpiece when the workpiece is in contact with an abrasive article abrading surface that has both fast and slow surface speeds. Reduced workpiece material removal occurs at the inner diameter area of an abrasive disk, which is slow moving, while the majority of the material removal occurs at the outer diameter area of the disk, which has the highest surface speed area.

Romero's abrasive disks have significant amounts of fibers and other fillers imbedded in the disk backing which tends to produce a disk of limited thickness uniformity. The preferred embodiment of Romeo is a thick fiber filled disk backing. These thick and very stiff abrasive disks generally require "flexing" after manufacturing where portions, or all of, the disk is bent through a out-of-plane angle sufficient that the thick disk is fractured, resulting in many small cracks through the disk thickness. The crack-fractured disk is weaker structurally than a non-cracked disk and has less disk article stiffness, thereby providing a more flexible disk that can more readily conform to a workpiece surface. The backings used for the Romero disks are not as thick as the traditional disk backings and he states that it is not necessary to do the Flex-bending" of his raised island disks to provide a disk having sufficient flexibility. He states that thin backings having a backing thickness of from 100 micrometers (0.004 inches) to 2500 micrometers (0.100 inches) are too thin and will easily rip and tear when used in his abrading application. The Romero disks are intended for use with manual grinding tools where the amount of workpiece material removal is of primary concern, rather than controlling the flatness of the workpiece. This type of grinding disk generally would have large sized abrasive particles that are not suitable for polishing or lapping operations. The described abrasive disk is frictionally mounted to a flexible backup pad that is attached to a mandrel with a disk-center-screw-cap that penetrates the disk-center aperture hole and squeezes the disk against the flexible and conformable metal or polymer backup pad. The screw-cap mounting forces result in significant and uneven distortions of both the abrasive disk sheet and the backup pad prior to the moving abrasive contacting a workpiece. Mounting a thin and fragile 0.004 inch (100 micrometer), or less, thick polymer abrasive island backing sheet to a manual abrading tool with a disk-center screw flange to a flexible padded mandrel can easily crease or tear the thin polymer backing in the area of the flange screw where large localized distortions of the backing can take place. Tearing of these thin disk sheets can occur at the outer radius location on a abrasive disk article particularly as the outer radial portions of the thin backing sheet are not attached to the stronger flexible abrasive tool disk pad that is used as a back-up support for the compressive forces (only) that are applied to the abrasive disk article. Abrasive disks used on these types of manual or machine abrasive tools encounter large tangential forces when contacting a workpiece during abrasion action and there is little strength in the independent loose fitting thin disk backings to resist these tangential forces. Grinding disks having thick fiber-reinforced backing sheets can easily resist these large tangential abrading contact forces as these thick disks are very strong in a tangential direction. Also, tearing of thin backing sheet disks would tend to occur at the disk center. Here, the thin disk is attached at the disk center aperture hole area only where a flat surfaced internally threaded attachment nut, or threaded attachment cap, holds the disk in pressure contact with the abrasive tool flexible back-up pad. Frictional contact between the disk sheet and the attachment nut occurs at only the small outer radial surface area of the diameter of the nut. The outside-flat surfaced nut is tightened by manually rotating the abrasive disk, and the nut, against the manual tool hold-down screw post, which is temporarily held stationary during this disk mounting procedure. Only a very narrow annular band of the flexible and fragile thin abrasive disk at the disk center is in contact with the nut inside annular surface, which, in itself, is not necessarily flat. When the abrasive disk attachment nut inside annular surface is not flat, or the abrasive disk nut-contact annular surface is pressured into a location not parallel with the plane of the abrasive tool flexible mounting pad, the flexible abrasive disk is distorted into a out-of-plane configuration, particularly at the location of the disk center. Out-of-plane distortions that are localized can create stress-risers within the thickness of the disk sheet. These stress risers can multiply any backing material stresses due to abrading forces that are transmitted to this critical center area of the disk, where the disk is attached to the abrasive tool. The narrow annular band of the abrasive disk that is in contact with nut is then subjected to a significant portion of the mounting nut tightening torque force when the disk is attached to the tool, depending how the tightening force is applied to the abrasive disk. Tightening of the nut progresses until the resulting mounting nut disk center compressive force is significantly high to compress and distort the abrasive tool thick flexible backing pad sufficiently to provide a secure attachment of the disk and pad to the manual abrading tool. A thin abrasive disk article can be easily torn at the abrasive disk center just by this disk attachment mounting procedure. Also, a significant portion of the torque dynamic impact forces that act in a tangential location at the outer periphery of the disk, as a result of the disk contacting a workpiece at the disk periphery during disk abrading procedures, can be transmitted to the disk center where the disk is attached to the small center attachment nut. A disk center mounted thin flexible polymer disk backing has little strength at its center to resist these outer radius tangential forces and will tend to tear at the disk center mounting location as a result of these forces. There is little additional strength that is provided to the thin abrasive disk article backing sheet by the polymer binder that is used to bind the abrasive particles to the backing as this binder layer also is so thin. As a reference, the backing thicknesses typically used for abrasive lapping articles are from 50 to 100 micrometers (0.002 to 0.004 inches) thick and by comparison to grinding disks, these lapping sheet articles are very delicate and fragile. The lapping sheet abrasive articles typically use thin backings sheets that are coated with single-layer abrasive binder coatings to attach 0.002 inch (51 micrometer) diameter abrasive agglomerate beads to the backings. Lapping sheet abrasive articles that use these thin polymer backings and thin abrasive binder coatings of abrasive materials are used successively for abrasive flat lapping procedures without tearing problems. These lapping sheet abrasive articles are mounted differently to a lapping machine head than are abrasive disks mounted to a manual abrasive tool. First the abrasive disk is not attached to a platen only with a disk-center torque tightened threaded device. Instead the flexible abrasive disk sheet is attached to a flat platen with the use of vacuum which applies a hold-down force pressure of nearly one atmosphere (14.7 lbs/sq. inch) to all of the flat surface of the abrasive article. A typical abrasive disk has a large surface area which results in a very large total disk hold down attachment force. There is no distortion of the abrasive disk out-of-plane from the original-condition disk surface as the platen is flat and the flexible abrasive disk easily conforms to the flat platen with no localized stress-risers in the disk backing material. Forces that are applied at the abrasive disk outer periphery tend to remain in the outer disk areas where they are applied as they are not transferred to the central area of the disk. These disk outer periphery forces are also not multiplied as they are transmitted to the inner radius of the disk due to the geometry factor where a force applied at the large radius at the periphery increases as a function of being transferred to, and concentrated at, a disk center small radius. Further, there is no multiplication of the disk backing abrading force stresses due to the disk sheet buckling that can occur when a disk sheet experiences a localized out-of-plane distortion. An abrasive disk that is held to the surface of a platen has a significant coefficient of friction between the disk surface and the platen surface and the disk mounting surface friction resists movement of the abrasive disk sheet relative to the platen surface. The coefficient of friction between the abrasive disk and the platen can be enhanced by surface coatings, etching or otherwise surface conditioning of either the surfaces of the abrasive disk backing or of the platen surface, or both. The Romero backing sheet has integral raised islands that is constructed by a variety of techniques including: 1.) molding a flat disk with integral raised islands; or 2.) adhesively bonding island shapes cut out from sheet material to a backing disk; or 3.) embossing island shapes into the surface of a flat backing disk sheet. None of these three raised island disk manufacturing techniques would be expected to produce islands having precisely flat surfaces where the island height variations, as measured from the backside of the backing, is within the 0.0001 to 0.0003 inch (0.003 to 0.008 mm) tolerance that is typically required for 8,000 or more surface feet per minute SFPM high speed platen flat lapping. Romero does not teach the use of a circular disk backing that does not have a center hole aperture in the non-claims portion of the patent specification. He describes raised island abrasive substrate sheets or strips having rectangle, square, hexagon, octagon and oval shapes. However, these non-circular strip shapes, which are presumed to be used with sheet-center aperture holes (the same as for aperture-hole circular disks) allow multiple layers of these non-circular abrasive strip sheets to be mounted on a mandrel. Here, the cut-out abrasive strips are positioned with incremental rotational angles about the aperture hole position relative to each other in a manner that all the stacked strips mutually form a circular disk shaped abrasive article when they are mutually attached to a mandrel with an aperture screw-cap. However, each of the composite abrasive strips lays at a different elevation relative to each other due to the stacking of individual strips, which means that a continuous abrasive surface can not be presented to a workpiece surface. Instead the abrading action takes place primarily at the trailing edge of the single outermost strip that is in contact with a workpiece. This type of abrasive article typically can have large sized abrasive particles relative to the thickness of the backing sheets, even though the backing sheets are very thick. This type of abrasive article is only suited for rough grinding, not for flat lapping. Romero incorporates by reference U.S. Pat. No. 5,142,829 (Germain) which describes a variety of these same types of non-circular abrasive sheet shapes, all having center aperture holes, where the holes allow them to be progressively stacked on a mandrel for use as a flapper abrasive portable manual tool. Romero does not disclose flat sheets, long strips or belts of abrasive coated raised island articles that do not have a disk-center aperture hole or disclose where these disks would be used for non-manual tool abrading purposes. Disk articles that have disk-center aperture holes are used principally on portable tool mandrels. The method described by Romero for coating the abrasive disk with abrasive particles is to first coat the island top surfaces with a make coat of binder, deposit loose abrasive particles on the make coat and then add a size coat of binder after which the binders are cured. Coating the island top surfaces with an abrasive slurry is not taught. It is important that raised island structures do not exist in the center area of the abrasive disk as the screw flange nut, or threaded nut, would contact parts of the raised island structures, thereby making it difficult to attach an abrasive disk to a grinder tool head under this condition. Romero does specify a disk center area that is free of the raised island structures.

Romero does not teach the hydroplaning of workpieces surfaces when lapping at very high surface speeds. Hydroplaning would not be an issue when using a abrasive disk on a mandrel tool device as the abrasive article would have a line-shaped area of contact with a workpiece surface due to the abrasive article out-of-plane distortion by the tool operator. A water boundary layer does not build up in thickness and create hydroplaning for line-contact abrading surfaces because there is not enough distance for the water film to increase in thickness across the short distance of the line width. Also, there is a very highly localized area of contact pressure at the abrading contact line area due to the large applied pressure that is distributed over a very small area. Most of the manual force applied by a mandrel to an abrasive disk is concentrated at the small line-area where the abrasive disk is distorted most where it contacts a workpiece surface. This high contact line-area pressure tends to prevent the boundary layer thickness buildup of coolant water. In the instance of flat lapping, the abrasive contacts the workpiece with a very low contact force across a full surface area that is typically as wide as the width of the workpiece. Due to the low contact force and large contact area, the water boundary layer can build up in substantial thickness across the relatively long distance that extends across the full length of the mutual abrading contact area. In this way, hydroplaning, where a portion of the workpiece is lifted from the abrasive surface by the depth or thickness of the water boundary layer, does not tend to occur for mandrel-and-flexible-pad type of manual tool abrading. Hydroplaning is difficult to avoid for machine tool flat lapping at high surface speeds.

Island types of abrasive articles used for precision flat grinding or lapping are primarily suited for use with rotating flat platen surfaces. The localized individual island sites are structurally stiff due to their increased thickness as compared to the thickness of the adjacent thin backing sheet. The flexural stiffness of the island areas is a function of the total island material thickness cubed, which means a relatively small change in the backing sheet material thickness at the location of a raised elevation island can change the localized stiffness of the island area by a very large amount. These abrasive coated stiff islands will not easily conform to a curved surface. Stiff raised large diameter islands that have a thin flat top surface coating of abrasive material will only be contacted by a workpiece at the central portion of the island abrasive or in a line extending across the surface of an island when contacting a convex workpiece. Only the abrasive outer island peripheral edges of a stiff island would be contacted when abrading a concave workpiece. In either case, abrading action results in uneven wear of both the island coated abrasive and of the workpiece surface. In a like manner, raised island abrasive disk articles having stiff islands that have their flat disk-plane surface distorted by manual pressure when contacting a flat workpiece will only be effective in uniform material removal if the island dimensions are very small, in particularly the tangential direction. Here, small islands can lay flat to a workpiece but only if the adjacent disk backing material that is located next to the islands is flexible enough to allow the island to bend enough to compensate for the disk out-of-plane distortion created by the abrasive tool operator. Even if the backing is flexible, the backing pad would tend to prevent this conforming action. Stiff and thick backings are generally used with manual abrasive disk articles as thin backings are too fragile for this type of abrading usage. Manual pressure will distort the disk plane in both a radial and tangential direction. This abrasive sheet distortion would prevent the production of a precision flat workpiece surface with this manual apparatus and abrasive article. Flexible sheets of a non-island uniform coated abrasive article having a thin backing will conform to a flat rigid platen which provides a natural flat abrading surface for the whole surface of the abrasive sheet. The thin and flexible and structurally weak lapping sheets assume the flat surface of the platen even if the lapping sheet is not perfectly flat prior to contact with the platen. Vacuum is typically employed to bring the thin lapping sheet into intimate contact with the platen and to hold the abrasive lapping sheet in flat contact with the platen even when the lapping sheet is subjected to significant contact pressures and forces during the abrading action. Likewise, a thin backing sheet or disk having integral raised islands will likewise conform to the flat platen surface where each of the individual islands will be presented with a flat island top surface that is mutually flat to the workpiece surface. Flexible abrasive sheets or disks having raised islands mounted on flat platens can be used effectively for the flat grinding and smooth lapping of a flat workpiece surfaces. The Romero described abrasive disks as used with conformable screw-cap mandrel pads are not practical for use for precision flat grinding. Conformable pad mandrels are generally used on portable grinding tools that are held with large (6 kilogram or 13 lbs) manual contact forces against a workpiece. This large force typically deforms a portion of the flexible abrasive disk supporting pad to allow an controlled area of the thick and stiff abrasive disk to be in flat contact with a workpiece surface. The whole large contact force tends to be concentrated at the typical small line-type contact area that exists between the abrasive and the workpiece surfaces. The manual abrasive grinding operator typically moves the disk with a random oscillation-type orientation motion relative to the surface of the workpiece. In the comparative case of a flat lapping machine, a low contact force of 1 to 2 lbs (0.5 to 1 kg) is spread evenly over large surface areas of a workpiece having a 3 inch (76 mm) diameter that is supported by a workpiece holder spindle. The workpiece spindle of a flat lapping machine is typically orientated perpendicular to the surface of an abrasive disk that is flat mounted to a rigid platen. A manual abrasive disk tool is typically oriented at a significant angle to the workpiece surface. Very low stresses are induced within the thin and weak abrasive backing sheet used in flat lapping because the relatively large mutual flat workpiece and abrasive contact surface areas do not create localized areas of abrading contact forces. Thin backings as used with the manual tool grinding pad disks is stated by Romero to be a problem as this fragile type of disk easily rips and tears and can crease and pucker the disk article.

FIG. 15 (Prior Art) shows an expanded side view of the FIG. 10 (Romero, and others) abrasive disk that is mounted on a mandrel tool used to grind a workpiece with the disk distorted. The abrasive disk 160 that has attached islands 162, which have a coating of abrasive 164. The abrasive 164 that is located at the edge of the island 162 contacts the workpiece 168 at a contact point 166. When the abrasive 164 contacts the workpiece 168 at a single point 166 during abrading action, the workpiece can be scratched at this single point-contact, rather than the workpiece 168 being polished at this location by the abrasive 164. This scratching occurs because the abrasive disk 160 having abrasive 164 coated islands 162 is typically presented at an angle to the workpiece rather than the abrasive 164 on all the islands 162 being presented in flat contact with the workpiece 168 surface. Mounting of a disk 160 by use of a disk-center threaded screw device with a flexible pad to a hand-tool mandrel tends to prevent all of the flat contact surfaces of the abrasive 164 coated raised islands 162 from lying in a flat plane relative to the workpiece 168 flat plane surface due to distortion of the disk 160 by the threaded screw device, not shown. Any out-of-plane contact of the abrasive 164 with the workpiece 168 will tend to create workpiece 168 scratches. This makes it impractical to use these abrasive disks on manual tool disk mandrel systems to provide flat lapping of workpieces. However, these abrasive disks and mandrels are suitable for rough grinding of a workpiece. FIG. 16 (Prior Art) shows an expanded side view of a (Romero, and others, as shown in FIG. 15 single abrasive coated island in angled contact with a flat workpiece. The island 170 having an abrasive coating 176 is positioned at an angle 177 with a workpiece 172 where the leading-edge contact portion of the island 170 and the abrasive 176 both independently contact the workpiece 172. The island structural material contacts the workpiece at the contact point 174. It is typically not desirable for the island non-abrasive structural material to contact a workpiece surface during abrading, especially for precision flat lapping, as the abrading characteristics, or workpiece contamination action, of this island 170 structural material may be unknown. The leading edge of the abrasive 176 also makes a sharp-edge contact area 178 with the workpiece 172. The expanded view of this figure shows a significant sized abrasive 176 contact area 178 even though the area 178 is actually quite small, as the island surface abrasive 176 coating thickness 173 is typically less than 0.002 inches (50 micrometers) for an abrasive lapping article. FIG. 17 (Prior Art) is a cross section view of Romero abrasive coated islands attached to a backing sheet. Raised island structures 186 are coated with a layer of adhesive 184 with abrasive particles 180 and 182 that are deposited onto, or applied to, the adhesive 184 coating. The islands 186 are attached to a backing sheet 187 and a gap 192 exists between the outer edge of the island 186 and the outer periphery 193 of the backing 187. There is no disclosure of control of the relative height (or island height variations) of the island structures 186 as shown by the height variation dimension 188. There is also no control of the thickness or size 190 of the abrasive particles 182 or control of the height of the island structure 186 height 194 as measured from the top of the adhesive 184 coated island 186 and the backside of the backing sheet 187. Also, there is no control of the height of the abrasive particle 182 coated island 186 island structure thickness 195 as measured between the top of the abrasive particles 182 and the backside of the backing sheet 187. FIG. 18 (Prior Art) is a top view of Romero abrasive island disk having an aperture hole and an island gap at the disk periphery. The disk 200 has a disk-center aperture hole 198 that allows the disk 200 to be screw fastener mounted to a manual abrasive grinder tool, not shown. The abrasive coated raised islands 202 have a recessed area gap having a gap-width dimension 204 where this recessed gap extends around the outer periphery of the disk 200 between the edges of the islands 202 and the disk 200 edge. Romero also describes the abrasive particle re-coating of his worn-out abrasive raised island disks. Island structures that are worn down in abrading use are re-coated with an adhesive layer on top of the worn island structures and abrasive particles are deposited on the raised island adhesive layers. After sufficient adhesive is applied to structurally support the individual abrasive particles on the island tops, the adhesive is fully cured to develop the adhesive bond strength. The disk is then appraised by Romero to be suitable for his intended abrading use. It is obvious that this abrading use is not precision grinding or precision flat lapping. All of the mutual-plane flatness, if it originally existed, of the individual abrasive coated islands would have been lost in the first abrading usage of the disk and this lack of flatness would have been retained in the re-coating procedure. It is very difficult to obtain an even or flat in-plane wear of a circular abrasive disk due to the fact that the outer radius of the disk has a higher rate of surface speed than the inner radius of the disk and the disk abrasive will wear down at a faster rate at high surface speeds than at low surface speeds. Other localized areas of the original disk will wear down at faster rates due to causes including, but not limited to, the disk-surface variations in the contact force that is applied between the abrasive disk and the workpiece surface. Abrasive wear rates increase for higher contact forces. (Prior Art) is a cross section view of a precisely flat original-condition Romero abrasive island FIG. 19 article. Raised island structures 214 are attached to a disk backing sheet 218 where the islands 214 have a top layer coats of adhesive 212 which binds abrasive particles 210 to the islands 214. All of the abrasive particles 210 that are positioned at the top of each of the islands 214 are shown to lie in a mutual flat plane 216 that is parallel to the backside of the backing 218. FIG. 20 (Prior Art) is a cross section view of the precisely flat original-condition Romero abrasive island article shown in FIG. 19 that has been subjected to abrading wear where all of the adhesive and abrasive particles that were originally attached to the island top surfaces are worn down. The worn-down island structures 220, 222, 223, and 224 originally had a mutual-plane 226 height location that was parallel to the backside of the backing sheet 228. After partial wear-down of the island structures, the islands 222, 223 and 224 all have top surfaces that lie in a mutual angled plane 225 that is not parallel to the backside of the backing sheet 228. Likewise the top surface of the island 220 is ground to a shape that lies in a different plane 221 and that plane 221 is neither parallel to the backside of the backing 228 or parallel to the plane 225. FIG. 21 (Prior Art) is a cross section view of the worn-down islands on the backing shown in FIG. 20 that have been recoated with adhesive and abrasive particles. The islands 234 are coated with an adhesive 232 that bonds abrasive particles 230 to the top surfaces of the worn-down islands 234. The abrasive 230 coated island 234 surfaces lie in two different planes 231 and 235 where plane 235 is not parallel to either the original island top surface flatness plane 236 or the island 234 plane 231. In addition, all of the islands 234 have different top surface height locations where the island heights are measured from the backside of the backing sheet 240. In order for the abrasive article to be useful for precision flat grinding or flat lapping, each abrasive coated island on a backing sheet must have the same height elevation relative to the backside if the backings, and also, the top surface of each island must also be flat in a island-mutual plane that is parallel to the backside of the backing 240.

U.S. Pat. No. 6,521,004 (Culler, et al.) and U.S. Pat. No. 6,620,214 (McArdle, et al.) disclose the manufacturing of abrasive agglomerates by use of a method to force a mixture of abrasive particle through a conical perforated screen to form filaments which fall by gravity into an energy zone for curing. U.S. Pat. No. 4,773,599 (Lynch, et al.) discloses an apparatus for extruding material through a conical perforated screen. U.S. Pat. No. 4,393,021 (Eisenberg, et al.) discloses an apparatus for extruding a mix of grit materials with rollers through a sieve web to form extruded worm-like agglomerate lengths that are heated to harden them.

U.S. Pat. No. 6,540,597 (Ohmori) describes a raised island polishing pad conditioner that reconditions pads that are used to polish silicone wafers. The raised island structures are coated with abrasive particles.

U.S. Pat. No. 6,551,366 (D'Souza et al.) describes the manufacture of spherical abrasive agglomerate beads by spray drying an abrasive particle, a binder and water mixture in a rotary spray dryer.

U.S. Pat. No. 6,602,439 (Hampden-Smith et al.) and U.S. patent application No. 2002/0003225 (Hampden-Smith et al.) describes the manufacture and use of composite abrasive beads made from slurries of abrasive particles and water soluble salts and other metal oxide water based materials. He introduces the abrasive slurry liquid onto the surface of an ultrasonic head aerosol generator operating at 1.6 MHz (1.6 million cycles per second) to produce 0.1 to 2 micron nominal sized droplets. Also, the ultrasonic heads simultaneously produce a range of other droplets having sizes of mostly less than 5 microns. Here, the abrasive slurry liquid covering the ultrasonic head forms standing slurry waves where the tips of the liquid waves shed droplets that are introduced into a hot air environment where they are solidified. These droplets form abrasive spheres, but again, the spheres have a large variation in size. Droplets are classified or separated by size when they are still in a liquid state by introducing them, after ultrasonic generation, into a moving air stream that is routed at sharp angles between barrier plates. The oversized droplets can't follow the sharp air-turns and impact a barrier wall. The wall impacted droplets change into a liquid that runs down the wall and is collected in a drainpipe. Those spherical slurry droplets that have the desired size are then subjected to heating to first solidify them. Then individual beads are heat treated in a furnace into a single crystal or into a number of crystals or into a amorphous bead. The small 2 micron abrasive spheres produced are used in chemical mechanical planarization (CMP) polishing of workpieces. He can incorporate the chemically active compound ceria into the beads. Ceria is commonly used for polishing technical glasses as it can accelerate the removal of silica by chemically reacting and bonding with the silica surface. The abrasive beads can individually include both $CeO_2$ and $SiO_2$. No mention is made of using lower ultrasonic frequencies in the range of 20,000 Hz that would typically produce droplets of the much larger 45 micron size which is the abrasive bead size that is desired for resin-bond coating onto backing sheets to form fixed-abrasive sheet or disk articles. Droplets produced by ultrasonic heads vary in size, in part, as a function of the oscillation frequency of the ultrasonic head where higher frequencies produce smaller droplets. However, an ultrasonic atomization head always simultaneously produces a wide range of droplet sizes.

U.S. Pat. No. 6,613,113 (Minick et al.) describes island-type flexible abrasive bodies covered with abrasive particles that are attached to a flexible backing sheet.

U.S. Pat. No. 6,645,624 (Adefris, et al.), herein incorporated by reference, discloses the manufacturing of spherical abrasive agglomerates by use of a high-speed rotational spray dryer to dry a sol of abrasive particles, oxides and water. An abrasive slurry of abrasive particles mixed in a Ludox® colloidal silica water solution is introduced into the center of a rotating wheel operating at 37,500 revolutions per minute (RPM) where centrifugal action drives the slurry to the outside diameter of the wheel where it exits the wheel into a dehydrating environment of hot air. Typically, when using rotary atomizers, individual slurry streams exit spaced ports located at the wheel periphery and form into thin curved string-like or ligament streams of fluid at each port where the streams have both a large tangential and radial fluid velocity. These individual curved slurry streams are separated into a stream pattern of adjacent individual droplets as the high speed stream moves through the stationary air. The droplets are then drawn into spheres by surface tension forces acting on the free-falling drops. Sphere sizes of the drops are controlled, in part, by adjusting the wheel rotation RPM. The slurry drops are formed into solidified abrasive beads by the dehydrating action of the hot air. Again, there is a wide distribution of abrasive sphere sizes produced by this method. Abrasive beads can also be formed by simply spraying a slurry mixture, from a paint sprayer type of spray device or other pressurized nozzles, into a dehydrating fluid (either hot air or a liquid bath) but the range of droplets sizes produced by these devices would vary considerably.

U.S. Pat. No. 6,752,700 (Duescher) and U.S. Pat. No. 6,769,969 (Duescher) describe island-type abrasive lapping or grinding flexible abrasive articles that have an precision height raised island structure that is coated with abrasive particles or abrasive agglomerate beads. The height of both the island structure and the top surface of the abrasive beads as measured to the backside of the backing sheet are controlled with a height variation of less than a percentage of the diameter size of the abrasive beads. The precision control of the height or elevation of the abrasive beads allows these abrasive articles to be used to abrade workpiece surfaces where all of the abrasive material coated on the islands is utilized when the abrasive article is mounted on a precision flat platen or other type mounting surface. The raised island structures allow excessive coolant water to flow in the recessed channels that exist between the raised islands, which minimizes the occurrence of hydroplaning of the workpiece during a high surface speed lapping operation. Reduction of hydroplaning effects improves producing a precisely flat workpiece surface. The recessed channels that exist between the island structures also allow grinding debris to be washed out from the workpiece abrading contact area by coolant water, which prevents workpiece surface scratching that can occur when this loose debris becomes lodged between the workpiece and the abrasive article surface. FIG. 26 is a cross section view of a non-abrasive coated raised island structure 300 that is attached to a flexible backing sheet 302. FIG. 27 is a cross section view of an adhesive 306 coated raised island structure 304 that is attached to a flexible backing sheet 308. FIG. 28 is a cross section view of an adhesive 312 coated raised island structure 314 that is attached to a flexible backing sheet 316 where abrasive agglomerate beads 310 containing abrasive particles 311 are supported by the adhesive 312. FIG. 29 is a cross section view of an abrasive article 324 having adhesive 320 coated raised island structures 322 that are attached to a flexible backing sheet 330 where abrasive agglomerate beads 318, 326 containing abrasive particles 332 are supported by the adhesive 320. The adhesive layer 320 has an adhesive thickness 338. The diameter (or size) of the abrasive beads 328 is used as a reference for establishing the control, or allowable variation, of the height 334 of the island structure 322 as measured from the top of the non-adhesive coated island structure 322 to the backside of the abrasive article backing sheet 330. The diameter (or size) 328 of the abrasive beads 318, 326 is also used as a reference for establishing the control, or allowable variation, of the height (or thickness) 336 of the raised island abrasive article 324 as measured from the top of the island beads 326 to the backside of the abrasive article backing sheet 330. The heights (or thicknesses) 336, 334 are controlled to have a standard deviation, or size variation, that is only a percentage of the size 328 of the abrasive beads 318, 326 where the standard deviation is typically less than 50% of the size 328 of the abrasive beads 318, 326. Having island structures 322 that have a precision heights 334 aids in the manufacturing of abrasive articles 324 that have precision thicknesses 336. However, it is the precise height 336 or thickness 336 of the abrasive article 324 that provides the desired performance of the precision flatness abrasive article 324. It is desired that the abrasive beads 318, 326 have a small diameter of a preferred size of 45 micrometers (0.002 inches) for abrasive lapping articles 324 as a bead size 318 that is smaller than this does not provide enough abrasive for a significant abrading life of an abrasive article and beads 318, 326 that are much larger than this provide too much variation in the thickness of the article 324 bead 318, 326 abrasive layer which results in uneven or non-flat article 324 abrading surfaces after some abrading usage of the article 324. Therefore, it is critical that the abrasive article 324 thickness 336 have a standard deviation of less than 50% of the desired 45 micrometers (0.002 inches) bead size 328 or a deviation of less than 23 micrometers (0.001 inches) and it is more preferred that the deviation be less than 10 micrometers (0.0004 inches) and even more preferred that the deviation be less than 5 micrometers (0.0002 inches). None of the disclosures in the referenced prior art patents address this issue of the control of the standard deviation of the overall thickness 336 of the abrasive article 324.

U.S. patent application No. 2003/0143938 (Braunschweig et al.) describes island-type abrasive articles having backings that have raised island structures that are top coated with shaped-abrasive coatings while the article backside has a mechanical engagement system.

U.S. patent application No. 2003/0207659 (Annen et al.) describes island-type abrasive articles having backings that have raised island structures that are top coated with shaped-abrasive coatings. The backings include polymer foam backings. Raised island structures are attached on backing sheets by a variety of methods including the use of belts and rolls having island shaped cavities that are filled with a polymer or foam structure material that is deposited onto and attached to the backing sheet. A mixture of abrasive particles and polymer resins are then formed into geometric shapes, preferably pyramid shapes, onto the raised island top surfaces. The pyramids are formed by coating the abrasive slurry on a shape-patterned tooling belt or a shape-patterned rotogravure roll and bringing a backing into contact with the roll or belt to transfer the shaped-abrasive coating onto the raised island surfaces. It is desirable that the tooling belt be made of a polymer material, using a master belt to produce the polymer tooling belts. These abrasive pyramids are similar to the shaped abrasive pyramids sold by 3m Company under the trade designation "TRIZACT™ as abrasive sheet lapping articles. There is no teaching of the importance of controlling the height of the raised island structures or of controlling the exact thickness of the shaped abrasive island coatings that would allow this product to be used effectively in high speed or precision flat lapping. In fact, reference is made specifically that island structures may have varying heights. One intended use of this abrasive-island product is to reduce "stiction", a form of friction, between the abrasive article and the workpiece. Stiction is defined by Annen as the condition whereby the combination of a coolant fluid and a smooth abrasive coating creates a condition whereby the fluid acts as a adhesive between the abrasive coating and the workpiece surface which causes these surfaces to stick together with unwanted results. Stiction tends to occur frequently with lapping type abrasive articles where the abrasive particles are imbedded in a binder which provides a smooth surface to these abrasive sheet articles. The shaped abrasive coatings are a mixture of abrasive particles mixed with a polymer binder that is applied to the flat top surfaces of the raised island structures in a pattern of shaped abrasive bodies. Each shaped body is formed into a geometric shape, including pyramid shapes, where each formed shaped body has a individual height and a volume and body base area and where each shape body has raised and recessed portions. The presence of the recessed valley areas between the raised island structures allows fluid flow at the working face of the abrasive article without undesirable stiction taking place. It is suitable for casual polishing rather than for controlling both the flatness and smoothness of the surface rather than precision flat lapping of workpieces. Triangular shaped abrasive coatings in general do not provide the even wear across the surface of a workpiece that is required for flat lapping due to the geometric shape of abrasive island coating. The tips of the abrasive triangles volumetrically contain very little abrasive material and are very fragile while the triangle base areas contain the bulk of the abrasive material. During abrading action, the tips wear down very rapidly which changes the overall flatness of the abrasive article dramatically in those surface areas where a workpiece first contacts the abrasive article. When a new workpiece is then positioned at an article surface area that has sub-section areas of worn-down-tips and adjacent un-worn shaped abrasive tips, the workpiece surface is abraded unevenly by both the tip-worn and tip-non-worn shaped abrasive areas. The preferred construction materials, including non-precision foam backings and foam island structures, and sequential manufacturing techniques, including the use of master belts to produce replicated polymer belts that are used to form shaped abrasive coatings, and the use of thick and fragile shaped abrasive coatings that are not thickness-controlled as described here by Annen, taken together, prevent the production of precision height or overall-thickness controlled abrasive articles. In comparison, precision abrasive articles that can successfully produce both flat and smooth workpiece surfaces require durable and equal-sized abrasive beads or coatings that are bonded onto stable and strong island structures that are precision height controlled relative to the backside of the abrasive article backing sheet. None of these critical abrasive article design feature issues are addressed by Annen.

FIG. 25 (Prior Art) is a cross section view of the Annen raised islands attached to a backing sheet where the islands have pyramid shaped abrasive coatings. The island structures 272 are attached to a backing sheet 266 and the flat top surfaces of the island structures 272 are covered with pyramid shaped bodies 270 that contain abrasive particles 268 which are mixed in a polymer binder 271. The shaped pyramid bodies 270 have a height 274 as measured from the top flat surface of the island structures 272 to the apex of the pyramid body 270. The raised island structures 272 have a height 276 measured from the top of the island structure 272 to the backside of the backing 266. The overall thickness 269 of the abrasive article 267 is measured from the top of the abrasive shaped pyramids 270 to the backside of the backing 266. Control of the variance of the height 274 of the pyramids 270 or variance in the overall abrasive article 267 thickness 269 is not discussed by Annen, which indicates a lack of awareness of the article size control features that are required for an abrasive article such as this to be successfully used for precision flatness high speed lapping. When the abrasive pyramids that are attached to the island surfaces of an abrasive article that has raised island structures, or the pyramids are attached to the flat surface of an abrasive article that does not have raised island structures, there tends to be large dimensional wear-down changes in the thickness of the abrasive article even though little of the volume of the abrasive material is worn away. FIG. 25A, FIG. 25B, FIG. 25C and FIG. 25D (all Prior Art) are cross section views of the Annen pyramid shaped abrasive bodies that are shown in FIG. 25 as the abrasive pyramids are bonded to the top surfaces of raised island structures which are attached to a backing sheet. The abrasive pyramids are shown in the original as-formed, full-height pyramids and then in progressive stages of wear-down, which has a large effect on the height of the pyramids even though little of the volume of abrasive material has been expended in the abrading wear process. FIG. 25A (Prior Art) is a cross section view of an Annen original as-formed pyramid shaped abrasive body where the abrasive pyramid body 280 is attached to a backing sheet 282 and the pyramid 280 has a full height 281 that is measured from the apex of the pyramid 280 to the base of the pyramid 280. FIG. 25B (Prior Art) is a cross section view of an Annen abrasive pyramid shaped abrasive body where the abrasive pyramid body 284 has 25% of the original pyramid 280 height, as shown in FIG. 25A, worn away. The pyramid 284 is attached to a backing sheet 282 and the pyramid 284 has a new height 285 that is measured from the worn upper flat surface of the pyramid 284 to the base of the pyramid 284. The abrasive pyramid has been reduced in height by 25% but the volumetric loss of abrasive material from the original square pyramid volume is only 1.5% of the original volume. FIG. 25C (Prior Art) is a cross section view of an Annen abrasive pyramid shaped abrasive body where the abrasive pyramid body 286 has 50% of the original pyramid 280 height, as shown in FIG. 25A, worn away. The pyramid 286 is attached to a backing sheet 282 and the pyramid 286 has a new height 288 that is measured from the worn upper flat surface of the pyramid 286 to the base of the pyramid 286. The abrasive pyramid has been reduced in height by 50% but the volumetric loss of abrasive material from the original pyramid volume is still only 12.5% of the original volume. FIG. 25D (Prior Art) is a cross section view of an Annen abrasive pyramid shaped abrasive body where the abrasive pyramid body 290 has 75% of the original pyramid 280, as shown in FIG. 25A, worn away. The pyramid 290 is attached to a backing sheet 282 and the pyramid 290 has a new height 292 that is measured from the worn upper flat surface of the pyramid 290 to the base of the pyramid 290. The abrasive pyramid has been reduced in height by 75% but the volumetric loss of abrasive material from the original pyramid volume is still only 42% of the original volume which means that 58% of the abrasive material contained in the original pyramid still remains in the worn-down pyramid body. When the abrasive article is worn down this much, it is typical that some areas of the abrasive article will wear down much more rapidly than other areas due in part to the location of the workpiece on a specific area of a abrasive article. Also, high spots that initially existed on a workpiece surface will wear down localized portions of the abrasive article surface more than other portions. These worn-down abrasive areas then will not effectively contact a flat workpiece surface during subsequent abrading action. This is a significant reason to limit the initial thickness of an abrasive layer coated on an abrasive article specifically to limit the out-of-plane wear down of a portions of the abrasive article during repetitive abrading use. When an abrasive article is worn into a non-flat condition, it now becomes difficult to generate a flat abrasive surface on a workpiece in precision flat lapping. Non-flat abrasive article areas can produce non-flat workpiece surface areas, which is objectionable. Use of arrays of pyramid shapes of an abrasive particle binder mixture that is coated on the top flat surfaces of raised island structures increases the non-flat wear-down of abrasive articles because so little abrasive material exists at the apex areas of the individual pyramids which results in fast wear-down of the pyramid apex or tip areas. Annen states the desirability of the abrasive article providing a constant abrasive cut rate but this constant cut rate is very difficult to provide with the pyramid shaped abrasive shaped forms. The cut rate, or material removal rate, of an abrasive is related to the contact pressure (force per unit area) that is applied to the abrasive material that is in contact with a workpiece surface. When a pyramid shaped abrasive structure is worn down, the abrading contact area of the pyramid changes rapidly from a very small area to a very large area. In their original full-sized shape, the pyramid top surfaces have very little area in contact with a workpiece as the applied abrading contact force is concentrated into the small contact areas at the apex of the individual pyramids. As the abrading pressure is equal to the abrading force divided by the abrading area, a very large pressure and very large material removal rate is present when a pyramid shaped abrasive is first used. The sharp apex contact areas of a new pyramid abrasive article even has the capability of scratching a workpiece rather than polishing it due to these concentrated abrasive contact areas. As the pyramids are worn down, a process that occurs rapidly during the first stages of abrading use, the contact area of the individual pyramids also collectively increases very rapidly. Adjusting the abrading contact force to accurately compensate for the change of abrasive contact area to achieve the same or a constant cut rate is difficult to accomplish. As an example, the top surface area of a triangular shaped pyramid has an extremely small surface area so the contact pressure, consisting of the applied contact force divided by the contact area, is very high. This pressure results in high and localized workpiece cut rates that exists only at the location of the pyramid tips. Workpiece surface areas that are located adjacent to the pyramid tips get no abrading action at all as these adjacent areas are not in contact with the workpiece surface. The change of the pyramid top surface contact areas of worn-down pyramids is very large. A sharp-topped pyramid initially has an infinitesimally small contact area, depending on how sharp the apex of the pyramid is before wear occurs. When 25% of the original pyramid is worn down the pyramid has a flat top and has a truncated pyramid shape that has a small but significant top area that is considered here, for comparison, to have a unity (1.0) sized area. When 50% of the original pyramid is worn away, the pyramid top surface area is now 4.0 times greater than the unity 1.0 area of the 25% worn pyramid. When 75% of the original pyramid is worn away, the pyramid top surface area is now 9.0 times greater than the unity 1.0 area of the 25% worn pyramid. There is still 58% of the original abrasive left in the pyramid at this stage of wear. The pyramid will continue to wear down, the abrading contact surface area will continue its large non-proportional increase and the abrading contact pressure will continue the rapid change reduction. This huge abrading contact area change will produce non-constant wear over the abrading life of the abrasive article having the pyramid shaped abrasive structures coated on the top surfaces of the raised islands. However, this well-worn abrasive article can still provide smooth polishing of a workpiece surface even though the workpiece material removal rate may not be accurately controlled. Also, the large dimensional change in the thickness of portions of an abrasive article having pyramid abrasive shapes on its surface can tend to prevent the workpiece surface being abraded into a precisely flat surface. This series of pyramid wear-down FIGS. 25A-25D also demonstrate why it is impractical to use expensive diamond particle abrasives in the pyramid formed bodies as so much of the abrasive resides in the lower elevations of each pyramid where they will not be used effectively in precision flat lapping in either low speed or high speed operations.

In general, the features described by Annen are of non-precision height or thickness controlled abrasive articles that are produced by mass production continuous web processes that each add an element of size, thickness or other dimensional location variability to the finished article. The location of the individual formed polymer resin pyramid, and other, shapes on the top surfaces of the individual raised island structures is not discussed. Many of the web or sheet or belt or roll shape forming techniques he uses will tend to position some of the individual shaped abrasive shapes on, or over, the edges of the top surfaces of the island structures which will leave them in a precarious structural location. Each of these individual abrasive shapes needs to be firmly anchored to the structure top surface to provide sufficient structural strength to resist the very high local abrading forces that are applied to these individual shapes as they are providing abrading action to the workpiece surface. These localized abrading forces can become significantly high when an individual formed abrasive shape contacts a physical deformity or material inclusion that exists at or on the surface of a workpiece. If the individual abrasive shape is not sufficiently anchored to the raised island structure, either part of or the whole abrasive formed shape can be knocked off the abrasive article and cause a scratch to occur on the workpiece surface during this event. This is very undesirable for workpiece lapping. Because of this shape bond strength vulnerability, the formed abrasive shapes should not overhang the edges of the raised island structures. Also, the surfaces of each raised island should in general be flat, and in particular, the edge areas of the island structures in the areas that support each individual abrasive shape should be flat to provide a structural support to the abrasive shapes. The manufacturing techniques described to form the abrasive shapes generally provide an array of like-sized abrasive shapes that lie in a plane and there is no capability to position an individual abrasive shape on a non-flat island structure. This same problem can occur on the non-flat inner area portion of raised islands rather than just the non-flat island edge portions. An individual abrasive pyramid shape will not be properly attached to a non-flat island surface. FIG. 25 (Prior Art) shows abrasive pyramid bodies 270 that are intentionally shown overhung a distance 265 from the raised island structure 272. Also shown is a border gap that has a gap distance 263 that is a measure of the distance that the abrasive pyramid body 272 could be positioned from the edge of the raised island structure 272 to assure structural attachment stability of the abrasive body 272 as it is attached to the island structure 272. The pyramid body overhang distance 265 and gap 263 as shown here, are not disclosed by Annen.

SUMMARY OF THE INVENTION

Abrasive Bead Manufacturing Process and Apparatus

A method of manufacturing abrasive beads that produces beads with a very narrow range of bead sizes compared to other bead manufacturing process is described here. The process requires a very low capital investment by using inexpensive screen material that is widely available for the measurement and screening of beads and particles. The beads can be produced with very simple process techniques. Those skilled in the art of abrasive manufacturing can easily employ the new and simple abrasive bead manufacturing techniques described here with the composition materials and processes already highly developed and well known in the industry to produce premium quality abrasive articles.

The new equal-sized beads can be bonded to abrasive articles using coating techniques already well known. The coated layer of abrasive beads is controlled to minimize the occurrence of more than a single (mono) layer of beads on an island surface. The resultant sheet or disk form of abrasive article has a single layer of abrasive particles bonded to island surfaces where the variation of height, measured from the backside of the abrasive particle backing, of adjacent particles on islands is preferred to be less than one half the average diameter of the particle. One objective in the use of a single layer of abrasive particles is to utilize a high fraction of the expensive particles, particularly for the two super abrasives, diamond and cubic boron nitride (CBN). Another objective is to minimize the dimensional change in the flatness of the abrasive article due to wear-down. A preferred abrasive particle size for lapping sheet articles is from 30 to 45 microns. When the abrasive particles are fully worn away, the abrasive surface of the islands has therefore only changed by approximately 0.001 inch (25.4 microns). A number of the commercial abrasive articles presently available are coated with erodible composite agglomerate shapes including beads or spheres, pyramids, truncated pyramids, broken particle and other agglomerate shapes which have nominal effective diameters of two to ten times, or more, of the individual abrasive particles contained in the agglomerate body shapes. Large agglomerates can wear unevenly across the abrasive article surface due to abrading contact with workpiece articles due to a number of factors. If the abrading contact size of the workpiece is smaller than an abrasive disk article surface and is held stationary, a wear track will occur where the workpiece contacts the abrasive. Also, there often is an increased abrasive wear-down at the outer diameter of an abrasive disk article, having high surface speeds, and decreased wear-down at the inside diameter having slower surface speeds. When the agglomerate wears down unevenly on a portion of its surface and this uneven abrasive surface is presented to a new workpiece article, the new workpiece tends to wear unevenly. Uneven wear of a workpiece article reduces the capability of a lapping process to quickly and economically create flat surfaces on a sequence of workpieces. However, the workpieces may be smoothly polished due to the characteristics of the fine abrasive particles embedded in the erodible agglomerates even though the workpieces are not flat.

A wide range of abrasive particles can be used to coat abrasive articles and to be encapsulated within the spherical composite abrasive beads disclosed here. These abrasives include diamond, cubic boron nitride, fused aluminum oxide, ceramic aluminum oxide, heated treated oxide, silicone carbide, boron carbide, alumina zirconia, iron oxide, ceria, garnet, and mixtures thereof. These abrasive materials are widely used in the abrasive industry.

A method to produce equal sized spherical agglomerates from ceramic materials is described. These spheres can contain abrasive particles that can be coated on the surface of a backing to produce an abrasive article. The spheres can contain other particles or simply consist of ceramic or other materials. After solidifying the spherical agglomerates in heated air or a dehydrating liquid by techniques well know in the art, the spherical particles are fired at high temperatures to create spherical beads having abrasive particles distributed in a erodible porous ceramic material, again by well known techniques. Equal sized abrasive beads have many abrading advantages over the beads presently used in abrading articles. A primary advantage is that all of the expensive diamond or other abrasive material is fully utilized with equal sized beads coated on an article in the abrading process compared to present articles where a large percentage of the undersized beads do not contact a workpiece.

Lapping Process and Raised Islands

Lapping or grinding with abrasives fixed to the flat surfaces of raised island structures attached to a flexible sheet is performed at high surface speeds of at least 5,000, at least 7,500 and preferably about or at least 10,000 or more surface feet per minute (1,517; 2,228; and 3,048 meters per minute, respectively), desirably with the use of water-like lubricants to cool the workpiece and to carry away grinding swarf. A workpiece can be held rigidly or flexibly by many different types of supports, including, by way of non-limiting examples, a rotating spindle platen to effect grinding or lapping contact with a rotating abrasive platen. Lapping on a rotating platen can produce a workpiece surface flat within about 2 lightbands (22.3 microinches or 0.6 micrometers). The aggressive cutting action of plated diamond island style flexible sheets requires a very low grinding contact perpendicular force at the start and at the end of the grinding procedure. A typical force of 2.0 lbs. (0.908 kg) can be used for an annular ring shaped workpiece having approximately 3.0 square inches (19.4 square cm) of surface area. Hydroplaning of the workpiece on water lubricated abrasive is minimized when using abrasive covered flat surfaced raised island sheets. Hydroplaning tends to be severe for uniformly coated abrasive non-raised island disks that have historically been used for smooth polishing or lapping operations. Cone shaped workpiece surfaces can be caused by hydroplaning effects, even when planar flat-coated, non-raised-island, abrasive sheet articles are mounted on rotary platens having raised annular bands. Here the platen raised annular bands concentrate all of the abrading action of the planar abrasive article within the platen body narrow radial width raised annular band. Rotating the workpiece holder in the same clockwise or counter clockwise direction as the rotating abrasive disk when using large diameter disks with narrow annular bands of thin coated raised abrasive islands is an effective method to better flat-grind or lap-polish workpieces having large diameters. The abrasive platen must be ground very flat and the abrasive disk sheet must be precise in thickness to be used effectively at high speeds. The raised-island abrasive sheet articles must have a very uniform thickness to utilize all of the abrasive particles coated on the article for precision flat lapping. To obtain smooth workpiece surfaces very small abrasive particles are joined together in spherical porous ceramic beads. These abrasive beads are coated on an abrasive article that contacts a workpiece surface at high, or low, surface speeds. The beads hold individual abrasive particles in place within the bead until the particles become worn or dulled, after which time the ceramic erodes away to expose new sharp particles. The beads have optimized small diameters, which then require very precise construction of the abrasive article, very precise lapping machine equipment and also special lapping process procedures. These abrasive articles, lapping equipment and process procedures accuracies are directly related to the abrasive bead nominal sizes that are used to coat the article. Raised island abrasive lapping sheets also have the possibility to reduce the stiction bonding of a workpiece to a abrasive sheet when a water film is present between the sheet and the workpiece, particularly at the completion of a lapping process where the workpiece is very flat and in very close contact with the abrasive sheet. The abrasive platen must be ground very flat and the abrasive disk sheet must be precise in thickness to be used effectively at high speeds.

Abrasive disks of large 18 inch (0.457 m), 24 inch (0.609 m), 36 inch (0.914), 48 inch (1.22 m), 60 inch (1.5 m) or even 72 inch (1.8 m) diameters, having an outer annular band of raised islands which have a thin precise coating of diamond particles, can be produced inexpensively with very precise thickness control. Abrasive particle materials that have a Mohs hardness of 7 or greater are preferred. These abrasive particles can also be individually coated with various organic and non-organic coatings well known in the industry to enhance the adhesion of the particles to a polymer binder or to the porous ceramic when the particles are encapsulated in a spherical agglomerate. Raised islands can be deposited by a variety of means on a variety of commonly available thin flexible plastic or metal backing materials. Loose diamonds can be metal plated or plastic binder coated as a single mono layer on top of these islands which have been height controlled to produce a precisely controlled thickness relative to the bottom surface of the disk backing material. Diamond particles can be coated with the use of binders such as phenolics that have been used traditionally in the abrasive industry for many years. A make binder coating can be applied to a backing material, abrasive particle powder applied, a partial or full cure effected and a filled size coat applied and then the full substrate disk cure effected. The make or size or other coatings of polymer binders used to produce the abrasive coated raised island abrasive articles can utilize most if not all of the polymer binders that are well known and in common use in the abrasive industry, which are used to adhesively attach abrasive particles to the surface of abrasive articles. The binders include solvent based binders, water based binders, radiation cured binders, electron beam cured binders, heat cured binders and combinations thereof. The precision thickness raised island abrasive disks and abrasive rectangular sheets described here would typically be produced by a batch manufacturing process. However, these abrasive articles and the basic manufacturing processes used to produce them can also be applied to continuous web manufacturing processes. Abrasive particle disk sheets, rectangular shaped abrasive articles, or abrasive belts having small or fine abrasive particles can be used for lapping, and these types of articles having large or coarse abrasive particles can be used for grinding. Also, abrasive disks having small diameters of less than 0.75 inches (19.1 mm) may also have an outer band of raised islands. Very large disks can be used at slower rotational speeds and very small disks are operated at high speeds to generate the same linear speed where grinding is desired to be performed, and in both cases, a relatively high surface speed is reached. It is preferred that the inner radius of the raised annular band is greater than 20% and more preferred that the inner radius is greater than 30% of the outer annular band radius. Island shapes are preferred that have top surface area lengths measured in a tangential direction of from 0.010 to 0.375 inches (0.25 to 9.5 mm). Raised island foundation bases can be deposited on a backing by a variety of means on a variety of commonly available thin flexible plastic, polymer or metal backing materials. These island foundation base plateau surfaces are preferred to be machined or ground after attachment to the backing to establish a precisely controlled thickness relative to the bottom surface of the disk backing material. It is not critical that the absolute sheet thickness, relative to the bottom surface of the disk backing, is precisely controlled. Rather, it is only important that the heights of the top surfaces of all the islands have the same elevation after they are deposited on the backing. Individual diamonds or other abrasive particles, including composite structured agglomerates, can be metal plated or organic resin binder coated as a single mono layer on the top surface of the islands. Abrasive particles can be slurry resin coated; or drop coated (e.g., similar to shaking salt from a salt shaker), gravure coated, spray coated, or electrostatically deposited onto a wet organic resin island surface coating. Resin coatings are based on a variety of organic resins including phenolics and epoxies that have been used traditionally in the abrasive industry for many years. A make-binder resin coating can be applied to an island foundation top surface, abrasive particle powder applied, a partial or full resin cure effected, a resin size coat applied and then a full resin cure effected by heat or other energy sources. These abrasive disks typically would be produced by a batch process, but a more traditional continuous web process can also be used. The web process technology can be used to create abrasive particle coated raised islands in rectangular or annular band array patterns by a number of different techniques. Raised islands can be cast on the surface of a flexible web, islands can be machined or etched into the web surface, or islands can be formed with the use of spherical beads where the height of the island is equal to the diameter of the beads. Abrasive particles can then be resin coated, electroplate-bonded or braze-bonded to the island surfaces and reinforcing size coats of resin can be applied to structurally reinforce the bond of the individual abrasive particles to the backing. The abrasive web material can be converted to form annular disks or rectangular sheets or continuous belts or other abrasive articles such as daisy wheels. A wide range of abrasive articles produced with small sized abrasive particles that are formed into disk sheets or belts can be used for lapping. Articles with large sized or coarse particles can be used for grinding. All the abrasive articles can be used at high surface speeds, which fully utilize the increased abrading material removal rates which occur at high speeds, particularly with diamond particles.

A number of techniques can be used to establish a uniform thickness of a make-coat composition of binder to the top surface of island foundations which have been previously ground to a very precise height as measured from the bottom side of a backing material. One method to produce this make-coat is to first spin coat a layer of binder resin onto a flexible sheet of backing and then to press this layer of binder wetted coating onto the top surface of an annular array of raised islands attached to a round backing. Approximately one half of the spin-coated binder is transfer coated to the island top surfaces when the spin-coated transfer sheet is separated from the island sheet. Many other coating devices including hand spread notch bar coaters, knurl roll coaters, roll coaters, extruders, curtain coaters, gravure coaters, and reverse-roll coaters can be used to apply resin to continuous web sheet material that can be used to transfer-coat a layer of resin onto the top surface of raised island structures. Abrasive particles can be applied to the coated surface by any convenient process including by way of non-limiting examples drop coated or electrostatic coated onto the binder-wetted surface of the islands and then the binder can be partially or fully cured. Make coats of resin may be wet through the full thickness of the resin coat or only the top surface of a solidified partially cured resin coat may be changed to a wet surface condition by the application of heat or by other means prior to the application of abrasive particles. Subsequently, other size coats of resin binders can be applied to the island sheet, optionally coating either the island tops only, or covering both the island tops and the island valleys. Other coatings can be applied optionally by various printing techniques directly on the surface of the islands, for the make coat, for the size coat and for other coatings. Printing apparatus devices include: metal printing plates, print transfer blankets, rubber or polymer flexographic plates and print screen masks. A variety of techniques are described which control the application of the abrasive particles to achieve a uniform density of particles on the surface of the islands where there is no more than 65% of a given island flat area that is covered by abrasive particles, with the surface viewed from a vertical perspective and areas of the surface that are not visibly blocked by particles are uncovered areas (e.g., at least 35% of the vertically viewed area is uncovered). Furthermore, the resultant layer of particles is controlled to minimize the occurrence of more than a single (mono) layer of particles on an island surface. The resultant sheet or disk form of abrasive article has a single layer of abrasive particles bonded to island surfaces where the variation of height, measured from the backside of the abrasive particle backing, of adjacent particles on islands is preferred to be less than one half the average diameter of the particle. One objective in the use of a single layer of abrasive particles is to utilize a high fraction of the expensive particles, particularly for the two super abrasives, diamond and cubic boron nitride (CBN). Another objective is to minimize the dimensional change in the flatness of the abrasive article due to wear-down. A preferred abrasive particle size is from 30 to 45 microns that is from 0.0012 to 0.0018 inches. When the abrasive particles are fully worn away, the abrasive surface of the islands has therefore only changed by approximately 0.001 inch (25.4 microns). A number of the commercial abrasive articles presently available are coated with erodible composite agglomerate shapes including beads or spheres, pyramids, truncated pyramids, broken particle and other agglomerate shapes which have nominal effective diameters of two to ten times, or more, of the individual abrasive particles contained in the agglomerate body shapes. Large agglomerates can wear unevenly across the abrasive article surface due to abrading contact with workpiece articles due to a number of factors. If the abrading contact size of the workpiece is smaller than an abrasive disk article surface and is held stationary, a wear track will occur where the workpiece contacts the abrasive. Also, there often is an increased abrasive wear-down at the outer diameter of an abrasive disk article, having high surface speeds, and decreased wear-down at the inside diameter having slower surface speeds. When the agglomerate wears down unevenly on a portion of its surface and this uneven abrasive surface is presented to a new workpiece article, the new workpiece tends to wear unevenly.

Uneven wear of a workpiece article reduces the capability of a lapping process to quickly and economically create flat surfaces on a sequence of workpieces. However, the workpieces may be smoothly polished due to the characteristics of the fine abrasive particles embedded in the erodible agglomerates even though the workpieces are not flat.

It is preferred that a single or monolayer of individual abrasive particles, such as natural or man-made diamond particles or composite particles, be coated on abrasive island tops. However, a single or mono layer of erodible agglomerates made up of smaller abrasive particles can also be used on top of the abrasive islands. It is preferred that each of the island foundations are high enough from the surface of the abrasive article backing that cooling water and generated grinding swarf can freely travel down the valleys between the island tops. A radial orientation of the long dimension of non circular raised islands allows the best water flow for an abrasive disk article. The radial flow of water and debris swarf is created by the centrifugal forces generated by rotation of the abrasive sheet. The spent coolant water exits the active grinding surface area of the disk while fresh clean water is supplied continuously over the whole time of the grinding event. A wide range of abrasive particles can be used to coat raised islands and to be encapsulated within the spherical composite abrasive beads disclosed here. These abrasives include diamond, cubic boron nitride, fused aluminum oxide, ceramic aluminum oxide, heated treated oxide, silicone carbide, boron carbide, alumina zirconia, iron oxide, ceria, garnet, and mixtures thereof.

A method to produce equal sized spherical agglomerates from ceramic materials is described. These spheres can contain abrasive particles that can be coated on the surface of a backing to produce an abrasive article. The spheres can contain other particles or simply consist of ceramic or other materials. After solidifying the spherical agglomerates in heated air or a dehydrating liquid by techniques well know in the art, the spherical particles are fired at high temperatures to create spherical beads having abrasive particles distributed in a erodible porous ceramic material, again by well known techniques. Equal sized abrasive beads have many abrading advantages over the beads presently used in abrading articles. A primary advantage is that all of the expensive diamond or other abrasive material is fully utilized with equal sized beads coated on an article in the abrading process compared to present articles where a large percentage of the undersized beads do not contact a workpiece.

BRIEF DESCRIPTION OF THE DRAWINGS

FIG. 1 Prior Art, is a cross sectional view of abrasive coated raised islands on a backing sheet.

FIG. 2 Prior Art, is a top view of abrasive coated raised islands on a disk backing sheet.

FIG. 3 Prior Art, is a cross sectional view of abrasive coated raised structure islands on a backing sheet.

FIG. 10 Prior Art, is a cross-sectional view of a flexible abrasive disk and manual abrading tool.

FIG. 11 Prior Art, is a cross-sectional view of a grinding disk in angled contact with a workpiece.

FIG. 12 Prior Art, is a top view of an abrasive disk with a raised resin peripheral bead edge.

FIG. 13 Prior Art, is a cross sectional view of an abrasive disk with a raised resin peripheral edge.

FIG. 14 Prior Art, is a top view of a radial pattern of abrasive coated raised islands on a backing sheet having a disk aperture hole.

FIG. 15 Prior Art, is a cross-sectional view of a raised island grinding disk in angled contact with a workpiece.

FIG. 16 Prior Art, is a cross-sectional view of a grinding disk raised island in angled contact with a workpiece.

FIG. 19 Prior Art, is a cross sectional view of abrasive coated raised islands on a backing sheet.

FIG. 20 Prior Art, is a cross sectional view of worn raised island structures on a backing sheet.

FIG. 21 Prior Art, is a cross sectional view of abrasive coated worn raised island structures on a backing sheet.

FIG. 22 Prior Art, is a cross sectional view of abrasive coated raised islands on a backing sheet.

FIG. 23 Prior Art, is a cross sectional view of abrasive coated raised islands on a backing sheet.

FIG. 24 Prior Art, is a cross sectional view of abrasive coated raised islands on a backing sheet.

FIG. 25 Prior Art, is a cross sectional view of raised islands coated with pyramid shaped abrasive structures on a backing sheet.

FIG. 26 is a cross sectional view of a raised island structure on a backing sheet.

FIG. 27 is a cross sectional view of an adhesive coated raised island structure on a backing sheet.

FIG. 28 is a cross sectional view of an adhesive and abrasive bead coated raised island structure on a backing sheet.

FIG. 29 is a cross sectional view of adhesive and abrasive bead coated raised island structures on a backing sheet.

DETAILED DESCRIPTION OF THE INVENTION

Figure 4:
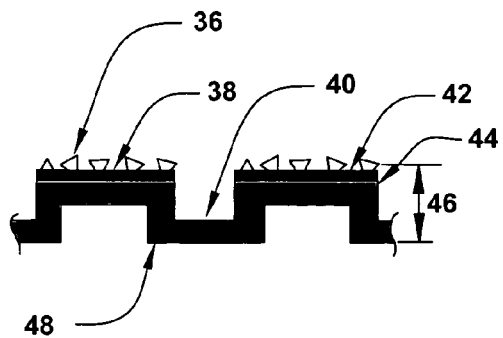
FIG. 4 Prior Art, is a cross sectional view of abrasive coated raised structure islands on a backing sheet.
Figure 5:
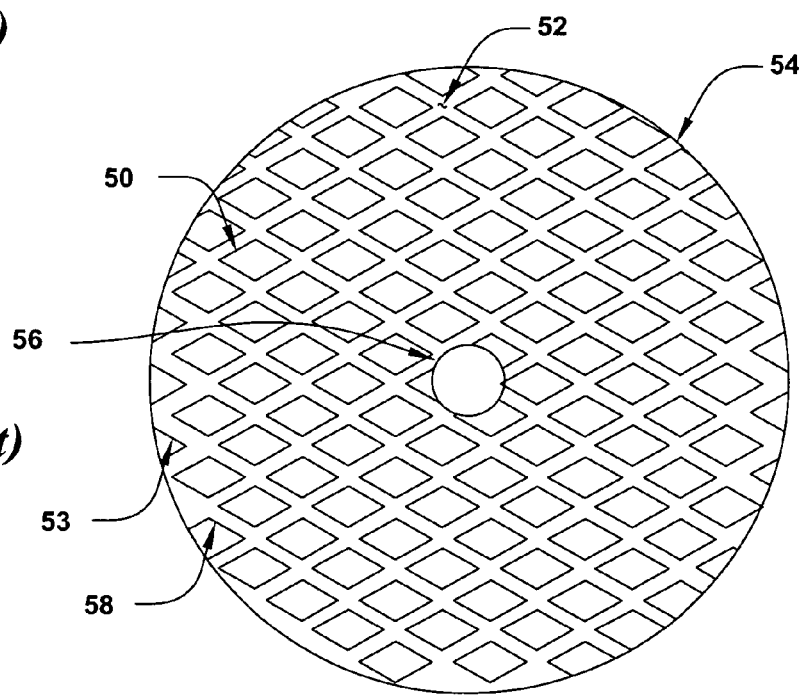
FIG. 5 Prior Art, is a top view of abrasive coated raised islands on a disk backing sheet.
Figure 6:
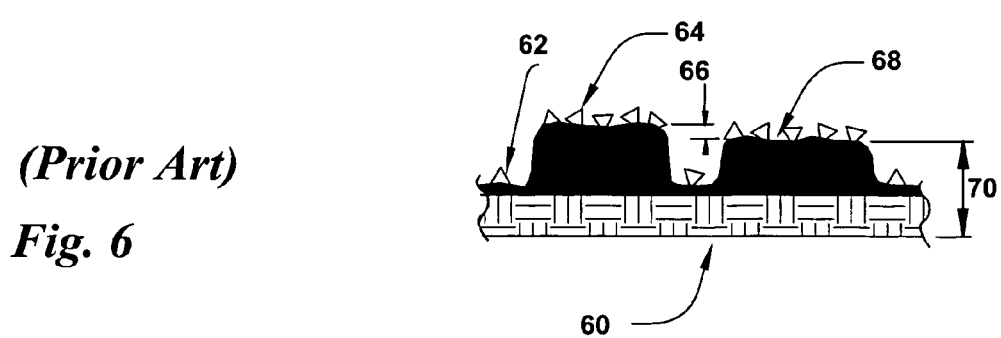
FIG. 6 Prior Art, is a cross sectional view of abrasive coated raised metal plated islands on a backing sheet.
Figure 7:
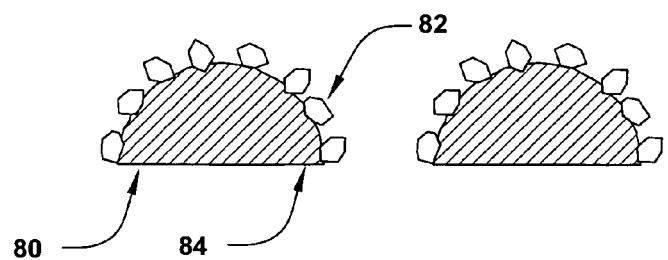
FIG. 7 Prior Art, is a cross sectional view of abrasive coated metal plated structures.
Figure 8:
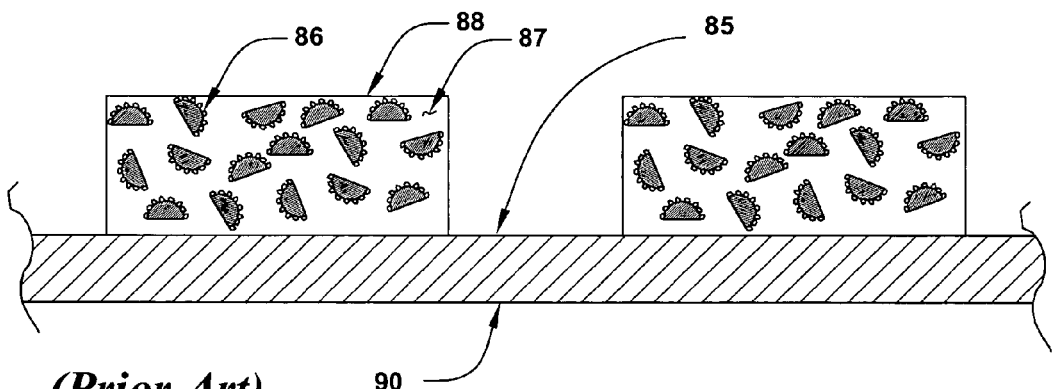
FIG. 8 Prior Art, is a cross sectional view of a mixture of abrasive metal structures and polymer binder formed raised island structures on a backing sheet.
Figure 9:
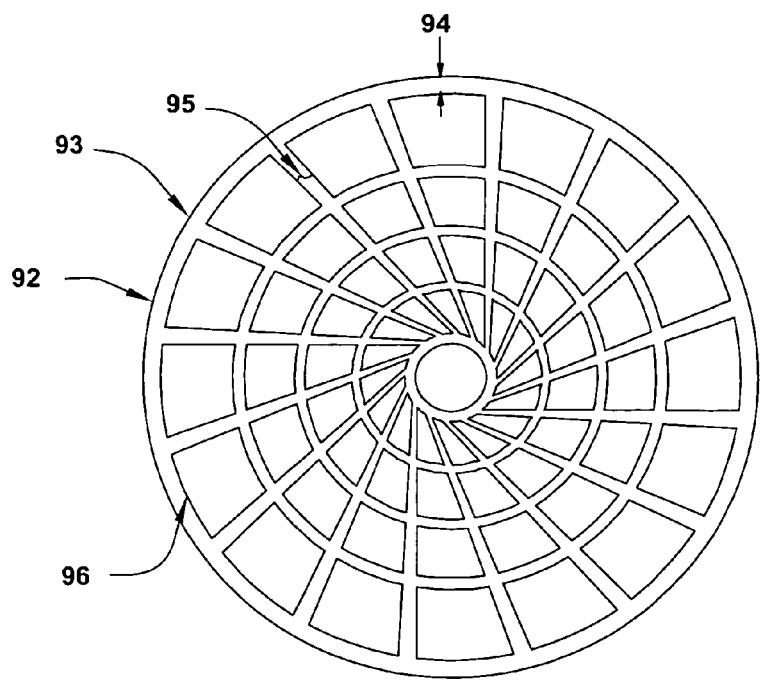
FIG. 9 Prior Art, is a top view of a mixture of abrasive metal structures and a polymer binder formed raised islands on a backing sheet.
Figure 17:
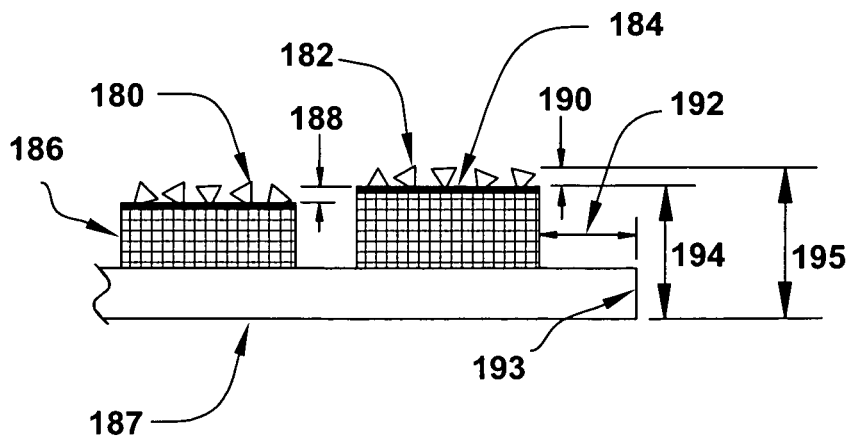
FIG. 17 Prior Art, is a cross sectional view of abrasive coated raised islands on a backing sheet.
Figure 18:
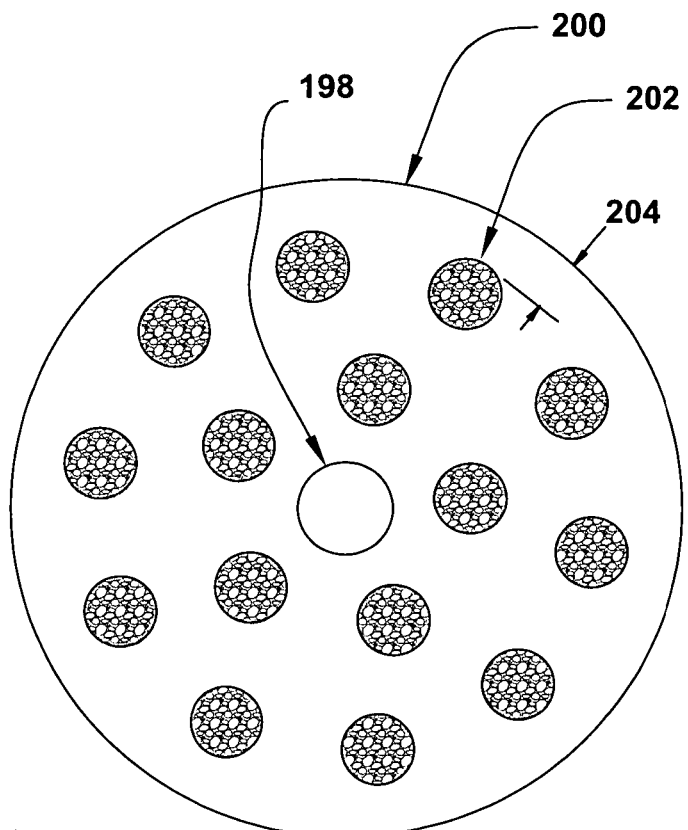
FIG. 18 Prior Art, is a top view of abrasive coated raised islands on a disk backing sheet.
Figure 25A:
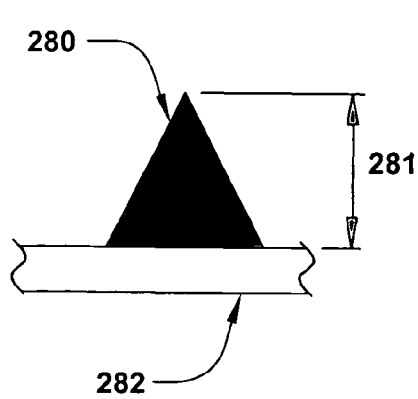
FIG. 25A Prior Art, is a cross sectional view of a full sized pyramid shaped abrasive structure on a backing sheet.
Figure 25B:
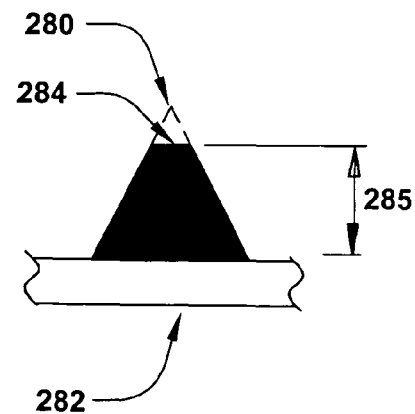
FIG. 25B Prior Art, is a cross sectional view of a 25% worn down pyramid shaped abrasive structure on a backing sheet.
Figure 25C:
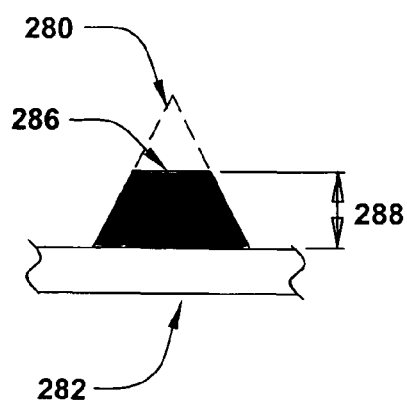
FIG. 25C Prior Art, is a cross sectional view of a 50% down pyramid shaped abrasive structure on a backing sheet.
Figure 25D:
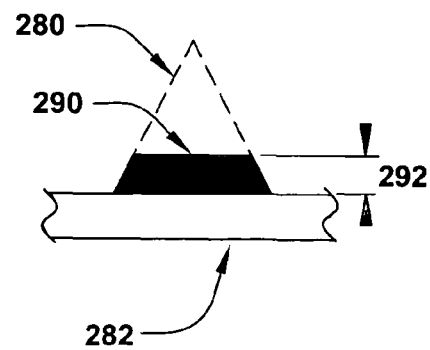
FIG. 25D Prior Art, is a cross sectional view of a 75% down pyramid shaped abrasive structure on a backing sheet.

The present invention may be further understood by consideration of the figures and the following description thereof.

In this application:

"abrasive particle" means, without limitation, an individual particle of abrasive material, the abrasive material including diamond, cubic boron nitride (CBN), aluminum oxide and other abrasives.

"abrasive agglomerate" means, without limitation, abrasive agglomerates comprised of abrasive particles in a matrix of supporting material where the agglomerate can have shapes that include spherical, near-spherical, irregular shaped lumps and other shapes.

"abrasive bead" means, without limitation, spherical abrasive agglomerates comprised of abrasive particles in a matrix of supporting material where the supporting material includes porous metal oxides or polymeric resins.

"bead" means, without limitation, a material or a number of different materials that are formed into a spherical shape where the bead is solid, porous or hollow.

"particle" means, without limitation, a material or a number of different materials that have or are formed into a shape, where the shape includes, without imitation, spheres, beads, rounded, irregular, cylindrical, triangular, pyramid and truncated pyramid shapes.

"stiction" means, without limitation, the condition when a drag force is exerted between a smooth workpiece and smooth abrasive article surface when there is a presence of coolant fluid between the mutual flat surfaces of the workpiece and the abrasive and there is a relative motion between both surfaces whereby the fluid acts as an adhesive between the abrasive coating and the workpiece surface which causes them to stick together.

"boundary layer" means, without limitation, the condition when there is a presence of coolant fluid in the gap between a smooth workpiece and a smooth abrasive article surfaces and there is a relative motion between both surfaces whereby the thin layer of fluid in the gap is sheared by the relative motion.

"hydroplane" means, without limitation, the condition when there is a presence of coolant fluid in the gap between a smooth workpiece and a smooth abrasive article surfaces and there is a relative motion between both surfaces whereby the thin layer of fluid in the gap has a variable thickness and the fluid layer thickness is sufficient to prevent contact of some abrasive particles with a portion of the workpiece surface.

Precision Flat Abrasive Platen

Variations in the precision of the abrasive platen spindle prevent the sheets of abrasive acting as a flat surface to the workpiece. Flexible abrasive disk sheets used for lapping typically are constructed with 0.004 inch (102 micrometer) thick backing sheets and have an abrasive coating of a single (mono) layer of abrasive agglomerate beads that have a nominal diameter size of 50 micrometers (0.002 inches) or less. These lapping sheet or lapping film disks are mounted on platens that can rotate at surface speeds of 10,000 surface feet (3,048 meters) per minute, more or less, to utilize the high speed cutting capability of diamond abrasive particles. A commercial spindle platen typically can provide a flat surface area for mounting a lapping sheet that is flat within 0.0001 inch (0.00254 mm) around the full circumference of the platen. However, this 0.0001 inch (0.00254 mm) platen circumferential variation means that a perfectly flat abrasive disk sheet would have to wear down 0.0001 inches (2.54 micrometers)) in some areas on this platen for all of the abrasive beads on the disk to be in contact with the substrate when the platen is rotated to present the abrasive in contact with a flat workpiece. This localized wear-down of 0.0001 inches (2.54 micrometers) required to achieve uniform flatness of the lapping disk sheet represents 5% of the total 50 micrometer (0.002 inches) thickness of the original monolayer thickness of the abrasive layer before all of the abrasive coated on a lapping sheet comes in contact with the surface of a workpiece when the disk is rotated at high rotational speeds. Likewise a 0.0002 inch (5.1 micrometers) variation in the circumferential surface flatness of a platen would require 20% of the abrasive thickness to be worn away in areas to achieve total flat contact between a flat workpiece and a abrasive sheet. At low speeds, the workpiece can travel up and down with the abrasive "hills and valleys" to utilize all of the abrasive. However, when the non-precise platen surface rises and falls as it passes a workpiece, this induces a vertical vibration input into the bottom of the workpiece that can disturb both flat grinding and polishing. The faster an abrasive platen rotates, the "flatter" the abrasive surface "appears" to the workpiece. Here, the faster the rotational speed, the less the surface area of a typical abrasive sheet actually contacts the workpiece as only the high plateau areas touch the workpiece. Abrasive sheets having abrasive beads that have bead diameters much larger than a size of 50 micrometers (0.002 inches) are practical to produce and surface-coat on a backing sheet. These larger beads would compensate for larger variations in platen surface accuracy. However, as the beads size becomes too large, the abrasive lapping sheet does not retain its inherent surface flatness as the abrasive is worn down more in some areas than others during use. When abrasive beads are much smaller than a size of 50 micrometers (0.002 inches), they require very precise and expensive platens. Platens having the large roller bearings that are required to support large diameter abrasive sheet articles are difficult to operate at high rotational speeds to provide the desired high abrading surface contact speeds. The nominal size of 50 micrometers (0.002 inches) abrasive beads that are coated in a single layer on a precision thickness backing sheet then set the requirements for all of the equipment that is used in flat lapping with sheets of these lapping film abrasive sheets. Likewise, the desired sizes of abrasive beads that are coated on the top surfaces of raised islands are the same as used in flat abrasive article sheets. These nominal sized 50 micrometers (0.002 inches) abrasive beads also set the requirements for the accuracy of the precise height of the island structures, and further, for the precision height location of the individual beads that are coated in a polymer binder layer on top of the islands. The critical variation in the surface location of the abrasive beads on the islands is always as measured to the backside of the backing sheet as this is the sheet surface that contacts that flat platen surface. The absolute thickness of the abrasive bead abrasive sheet article is not nearly as important as the variation in the total thickness of the sheet article for lapping. This is true for both low speed lapping and high speed lapping.

Thickness Variation of Abrasive Disks

Sheets of abrasive articles used for lapping typically are about 0.0005 inch (0.0127 mm) thick with 0.003 inches (0.076 mm) thick plastic backing and 0.002 inches (0.051 mm) thickness of abrasive. Thus the abrasive can wear down 0.0001 inches (0.00254 mm) or 0.0002 inches (0.00508 mm) without destroying the abrasive layer.

Rotation Speed of Workpiece

It is desirable to rotate a workpiece as fast as possible when contacting an annular band of abrasive. If the abrasive annular band is less wide than the workpiece, a groove having the width of the annular band is cut into the workpiece surface as the portion of the workpiece that overhangs the narrow abrasive annular band is not abraded away. Also this groove depth is tapered with faster cutting action at the outer radial periphery of the annular band as the abrasive is traveling faster which results in a higher cutting rate than the slower moving inside radial positions. If the workpiece is held stationary, there will be a single track ground into the surface of the workpiece. If the workpiece is rotated very slowly, the track will progress circumferentially around the workpiece. If the workpiece is rotated rapidly, the track will become more shallow and the workpiece surface will tend to be ground more uniform and flat across the whole surface. The faster that the platen is rotated, the higher the grinding rate of material removal and the more pronounced the track affect on the surface. Here, the fast material removal of the high surface speed of the abrasive works against producing a flat workpiece surface. Conversely, if the workpiece is less wide than the annular band, the workpiece will tend to wear a groove into the abrasive surface where the groove width is equal to the width of the workpiece. If another workpiece contacts the abrasive surface at both the "low" groove abrasive area and also at the non-groove abrasive area, a non-flat pattern will be ground into the workpiece surface because of the discontinuity of the abrasive surface. Also, the depth-tapered nature of the abrasive located within the groove annular area would exist as the outer radius of the abrasive band would cut faster than the inboard radius. To compensate for this narrow workpiece being used on a wide abrasive annular band, the workpiece holder can be translated radially to oscillate back and forth across the edges of the abrasive annular band to wear the annular band evenly across its surface. Sharp edges on the abrasive annular band can cause sharp lines to be ground into the workpiece surface so it is desirable to provide a tapered edge to the abrasive.

To help adjust for the difference in the surface speed abrasive wear rate and material removal at the outer and inner radii of the annular band, the workpiece can be rotated in the same clockwise or counterclockwise direction as the platen. Here, the workpiece would typically be rotated at the same RPM as the abrasive platen to obtain a similar relative abrasive cutting surface speed, SFPM, at both the inner and outer annular radius. The result of these two elements rotating in the same direction provides a subtraction of the workpiece surface speed from the platen speed at the outer radius and an addition of the two at the inner diameter as measured in the tangential direction of the abrasive platen. Because the abrasive platen has a very high rotational RPM velocity to obtain a high surface speed, of surface feet per minute, it is necessary to have a very high rotational speed of the workpiece holder also. The workpiece holder then has to be balanced quite well even with the casual loading of unfinished workpiece parts to prevent centrifugal out of balance forces from tipping the workpiece relative to the abrasive surface and causing non-flat patterns to be ground into the workpiece. This is particularly of concern when using a low friction spherical movement workholder for polishing.

Flat Abrasive Island Disks

Problem: When using abrasive coated disks at high abrading surface speeds of approximately 8,000 to 10,000 SFPM (surface feet per minute) it is necessary that all of the individual particles of abrasive be of the same exact height measured from the bottom side of the disk that mounts onto a rotating platen. Having all of the abrasive at same elevation assures even wear across the whole surface of the removable abrasive sheet and also assures that maximum grinding material removal from the workpiece is attained. Having uneven levels of abrasive across the abrasive disk surface creates a particular problem when a workpiece is first brought in contact with the moving abrasive. The workpiece part having a horizontal flat surface contacting a horizontal abrasive surface is unable to be moved quickly enough in an up-and-down vertical direction to follow the dynamic change of elevation caused by a non-flat disk surface excursion. Due to the mass inertia of the workpiece holder mechanism and due to the mass inertia of the workpiece part, the workholder cannot follow this vertical change of abrasive elevation which occurs 50 times per second for a 3,000 RPM platen speed. The most desirable form of abrasive is for the abrasive to be only located on the top surfaces of discrete raised-elevation islands to allow the cooling or lubricating water to flow freely around the side of the island structures. Abrasive particles that are deposited in the valleys between the raised islands can impede the flow of the coolant water in the passageway valleys. Grinding debris or grinding swarf can not travel away from the abrasive contact area with the abrasive as easily if the water flow is partially blocked by the stationary deposited abrasive particles. The raised island structures allow the coolant water that is applied to the interface between the abrasive surfaces and the workpiece surface to flow away from the workpiece into the island passageways where the water travels to, and past, the outer portion of the abrasive article. Hydroplaning of the workpiece is reduced by the existence of the abrasive island structures. Conversely, a continuous water film can exist on the surface of a non-island abrasive disk article having a continuous flat abrasive surface, which can cause significant hydroplaning of the workpiece.

Solution: Abrasive top coated islands that are placed in closely spaced array patterns on an annular ring portion of a plastic or metal disk backing, where the islands are attached to the backing, can be constructed in manufacturing steps to obtain true precision flatness of each island. The resulting disk article has an annular pattern of raised abrasive particle coated islands, all of which are exactly the same height from the back side surface of the abrasive disk backing. Each island also has the same thickness as measured from the top exposed surface of the abrasive to the flat back surface of the backing sheet. During flat abrading use each island that is integrally bonded to the backing sheet will have uniform wear across the island surface. An abrasive disk can be fabricated where the total thickness of the disk as measured from the backing to the top of the abrasive islands is within 0.0001 inch (0.0025 mm) over the whole area of the annular band of abrasive Precision Flatness Abrasive Disks When diamond or Cubic Boron Nitride (CBN) coated abrasive disks are produced they tend to have abrasive coatings that are very thin. Generally only one layer of abrasive is coated and the particles typically have a diameter of 3 to 80 micrometers or about 0.1 mil to 0.003 inches (0.0025 to 0.076 mm). These thin abrasives are coated or plated on thin plastic sheets perhaps 0.003 inch (0.076 mm) thick or thicker metal disks. The thickness tolerance range for these backings may vary from 0.0001 inch to 0.001 inch (0.0025 to 0.025 mm) that produces an abrasive disk which has a net thickness change greater than the thickness of the abrasive coating thickness. When used at slower RPM speeds of 500 RPM a workpiece part can be held against the abrasive surface which changes elevation due to these thickness variations. However, when the rotary abrasive platen is operated at 3,000 or 5,000 RPM, it is difficult to hold the workpiece part against the surface. Because low contact forces of only 0.2 lb/square inch are typically used for high speed lapping at 8,000 or more surface feet per minute, SFPM, there is not enough force to maintain the heavy inertia workholder against the abrasive, which moves up and down as the platen rotates. It is desirable to have the total thickness variation of a 12 inch (30.5 cm) diameter disk to be less than 0.1 mil (0.0001 inch, 0.0025 mm) so that when it is installed on a perfectly flat platen, only a small portion of the abrasive high areas are removed during grinding. This brings more of the total disk abrasive in contact with the workpiece part. A very small amount of high spot abrasive areas can be removed by normal grinding action, which can effectively flatten a disk if the high spots are modest in height relative to the abrasive thickness. Also, it is desirable that the abrasive be in the form of islands on the surface of the abrasive disk to allow water flow between the islands and prevent hydroplaning of the workpiece.

It is difficult to construct a flexible sheet of abrasive disks with raised islands of abrasive material that have the abrasive particles, such as 3 to 80 micrometers diameter diamond, to be located exactly the same distance above the base of the disks backing. If this exact distance is not maintained, not all of the abrasive particles will contact a workpiece surface when used in high speed lapping at 3,000 or more RPM with a 12 inch diameter disk even with use of a perfectly flat platen. Only the highest particles will contact the workpiece surface. Individual island patterns forming an annular ring on a common disk sheet is most desirable because of the reduction in hydroplaning effects.

Precision Thickness Abrasive Disks

If thin flexible abrasive coated sheet disks of abrasive do not have a very precise thickness controlled to 0.0005 inches (0.013 mm) or less, there is a significant problem with their use with very high speed rotating platens operated at 3,000 or more RPM as only the few very highest areas of abrasive will contact the surface of a workpiece held against its surface. Wherever the local thickness of the abrasive sheet is less than the disk total area average thickness, this "low" area will not be utilized for grinding as the workpiece does not have sufficient time to be lowered into contact with the abrasive located in this low valley area due to the high rotational speed of 3,000 RPM or 50 revolutions per second. To maintain contact with all portions of the hills and valleys would require the workpiece to travel from high abrasive points to low abrasive points at a rate of 50 times per second. This is not practical due to the mass weight of the workpiece part and the mass of the associated workpiece part holder assembly. To minimize the workpiece vertical travel at high platen RPM and to utilize the whole area of coated or plated abrasive it is desirable that the total thickness variation of the abrasive disk be within 0.0001 inch (0.0025 mm) or less.

Abrasive Disk Island Patterns

Problem: When using thin diamond coated lapping disks such as 3M Company brand 12 inch (30.5 cm) diameter disks on a lapper platen rotating at 3000 RPM with water as a lubricant, the water film tends to form a boundary layer between the workpiece surface and the abrasive which tends to tip the part and prevents a flat grind of the workpiece within 1 to 2 Helium light bands (11.6 to 23.2 microinch or 0.25 to 0.51 micrometers). This tipping action occurs particularly with low friction spherical wobble head workpiece holders because a continuous film of water which exists between the workpiece and the continuous smooth abrasive surface. The water film is sheared across its thickness by the relative stationary velocity where it contacts the workpiece surface and the very high speed where it contacts the abrasive surface. The shear force imparted by the moving abrasive across the water film thickness to the workpiece surface tends to tip the workpiece part held by the spherical action workholder. The boundary layer tends to build in thickness along the continuous length of uninterrupted water film that exists between the moving abrasive and the surface of the workpiece.

Solution: Breaking up the continuous smooth surface of the abrasive into discrete patterns so that gaps exist between the independent islands of abrasive will also break up the continuous film of water in the developed boundary layer between the workpiece and the abrasive. Whenever the water is moved across a gap, as the abrasive island moves with the abrasive sheet, the continuous boundary layer is broken and not allowed to build further in height or thickness. Whenever the boundary layer path is shortened, its thickness is reduced and the workpiece is not lifted as high from the abrasive surface which minimizes the tipping angle between the workpiece part surface and the abrasive. Whenever the boundary layer thickness shear force is reduced, less tipping of the workpiece occurs and less of a cone shape is produced on the workpiece surface. Many different shapes can be produced to make these islands of abrasive with the recessed water channels between them which can aid in breaking up the boundary layers forming in a tangential direction along the abrasive disk surface on the moving platen.

Abrasive Agglomerate Beads

Problem: It is desired to provide effective and consistent abrading characteristics in an abrasive article with the use of equal sized abrasive agglomerate beads and to apply these beads to the surfaces of raised island structures with gap spaces between adjacent beads and gap spaces between beads and island edges.

Solution: The most desirable raised island abrasive disk or rectangular shaped articles have a flat surfaced raised structures that are attached to a flexible backing sheet where the island structures are coated with equal sized abrasive agglomerate spherical beads that contain small abrasive particles which are supported in a erodible ceramic matrix. A critical feature of the abrasive article is the uniformity of the thickness of the article, which is measured from the top of the abrasive to the support side of the backing sheet for use in high speed lapping operations. It is preferred that the non-abrasive coated island structures also have a precision uniformity of thickness, which is measured from the top of the structure to the support side of the backing sheet, as a precision flat structure surface allows a wide range of abrasive coating techniques to be used that result in a abrasive article having a precise overall thickness. The location of the individual abrasive beads on the top flat surface of the raised island structures is important to control the workpiece material removal rates and to provide smooth workpiece surfaces during the abrading process. Abrasive agglomerate spherical beads are the preferred form of abrasive particles for abrasive lapping operations. The metal oxide porous ceramic matrix material within the bead body structure provides a strong structural support for individual abrasive particles but yet the porous ceramic erodes away during the abrading process whereby old and dull abrasive particles are ejected from the bead body and new sharp particles are presented from within to the workpiece surface. Abrasive beads can be formed from a variety of polymer resin materials to support enclosed small abrasive particles in place of a metal oxide supporting bead body material. However, the use of a porous metal oxide ceramic is preferred for supporting diamond abrasive particles in a bead body, especially for the very small 0.1 micrometer to 10 micrometer particles that are selected for lapping hard workpiece materials. The abrasive beads can have random space gaps between the adjacent beads that are adhesively bonded with a resin to the top flat surface of raised island structures that are attached to a backing sheet. The gaps between adjacent abrasive beads may also be controlled by the use of mesh screens or perforated metal sheets that provide specific distances between the adjacent beads. When abrasive agglomerate porous ceramic beads are used on an abrasive article, the beads may be positioned with little or no gap between the adjacent beads and the article can still be effectively used for abrading workpiece surfaces. Also, the location of the abrasive beads at the periphery of a raised island edge is important. If a bead is too close to the edge of a raised island there may not be sufficient adhesive resin surrounding a individual bead to structurally bond the bead to the raised island structure to resist the abrading contact forces that occur when a workpiece contacts a abrasive article abrasive surface. If a weakly supported bead is broken away from the island edge there is a possibility that this bead can become lodged between a workpiece surface and the abrasive surface and cause undesirable scratching of the workpiece surface. Techniques can be used in the abrasive article manufacturing processes to place abrasive beads either at the edge of the island or the beads can be placed a controlled distance away from the edge of the raised islands to assure that sufficient resin surrounds individual beads to provide a strong structural bonding of the beads to the raised island structures.

Thin metal font sheets can be fabricated to provide a precise thickness electrodeposited sheet that has very precise sized through holes that are positioned on the sheet with precision locations. These electrodeposited sheets area similar to perforated metal sheets have a variety of uses in the manufacture of equal sized abrasive spherical shaped agglomerates. Also, these sheets can be designed to position individual abrasive beads in controlled placement patterns with on the top surfaces of raised island structures during the manufacturing of an abrasive sheet article. Here, the individual beads can have specific controlled distances between adjacent beads on the island tops and the beads can also be placed a specified distance away from the edge of an island. The electrodeposited sheets that can be used in these applications can be obtained from the Thin Metal Parts Company, located at Colorado Springs, Colo. Stainless metal can be electrodeposited with a 0.002 inch (51 micrometer) thickness to form 0.0025 inch (64 micrometer) diameter holes with a 0.002 inch (51 micrometer) space between holes in any array pattern with 0.0001 inch (2.5 micrometer) accuracy. The formed sheet holes can be positioned in array groups that correspond to the location of raised islands that are attached to a backing sheet and the individual holes can correspond to the position of the desired location of abrasive beads to control both the gap spacing between adjacent beads and the gap distance between individual beads and the edge on a raised island. Here, a release coated electrodeposited font sheet is aligned with and placed in contact with a backing sheet having attached resin coated raised islands and a excess of abrasive beads are applied to the top surface of the electrodeposited font sheet. The spherical abrasive beads flow easily into the electrodeposited holes where they contact the wet resin and become attached to the resin after which the font sheet is separated from the islands, thereby leaving the abrasive beads attached in the desired locations on the island top surfaces. Beads do not enter the areas between the raised islands as there are no electrodeposited holes in the font sheet in these areas. A font sheet can be formed with 64 micrometer diameter holes to be used with equal-sized 45 micrometer beads which individually enter the font sheet holes with enough clearance between the bead and the hole that the bead is not removed from the resin when the font sheet is separated. Only one bead will enter a font hole. All excess beads are removed from the surface of the font sheet prior to separation of the font sheet from the islands by simply tipping the font sheet upward at a angle and letting the excess of spherical beads run of the sheet surface. Excess beads can also be blown off the sheet surface with a jet of air and the beads collected for reuse. The resin can be partially cured, if desired, prior to separation of the font sheet from the islands. Only a monolayer of abrasive gap spaced beads are deposited on the resin coated surface and there can be a gap between beads and the outer top surface perimeter of the raised island structures. This use of an open cell font sheet to position beads with controlled gap spaces between the individual beads can also be used to abrasive bead coat an abrasive non-island article having a planar surface. The abrasive articles can have a circular disk shape or the can have a rectangular or parallelogram shape. A different form of the bead placement electrodeposited sheets can be formed into a less fragile and more robust structural sheet form by laminating a thin metallic font sheet onto a thicker and stronger metal or polymer sheet to form a font sheet having shallow cavity pocket receptor holes for individual abrasive beads. Here, the receptor hole cavities are filled with individual beads and then a resin coated backing sheet having, or not having, raised island structures, is pressed into wet resin contact with the beads and then the hole font sheet is separated from the backing sheet whereby the beads are attached to the backing sheet. If desired, the backing sheet and font sheet assembly can joined together and then turned over to allow undersized breads to drop unto the wet resin before the sheets are separated. Spherical beads, non-spherical agglomerates or individual particles of abrasive or non-abrasive materials can be deposited onto a resin coated sheet article by this technique. This technique of spaced abrasive bead coating an abrasive article can be applied to either raised island articles or planar surfaced articles. Use of the method of laminating a thin electrodeposited hole font sheet to a thicker backing sheet can allow the fabrication of strong and durable continuous belts of the cavity font sheets.

Different patterns of these electrodeposited sheets can be fabricated as a electrodeposited hole sheet for use as a cavity array font sheet to form precision equal sized abrasive beads from a solution mixture of abrasive particles and a metal oxide sol, the sol including a metal oxide type material. Ludox® which is a colloidal silica sol, where sol is a suspension of an oxide in water, a product of W.R. Grace & Co., Columbia, Md. is one sol that can be used with 1 micrometer, or other sized, diamond particles to form a mixture solution. After the electrodeposited font sheet precision hole cavities are level-filled with the abrasive particle sol mixture, the contents of each cavity is ejected with fluid pressure and the ejected cavity lumps are formed into spheres by surface tension forces acting on the liquid lumps as they are free falling in a dehydrating atmosphere. The abrasive spheres become solidified in this free-fall state and are collected for further heating to remove bound water and to fuse the oxide material that surrounds the abrasive particles into a porous ceramic to form the equal sized abrasive beads. As each of the independent hole cavities in the array of cavities in the electrodeposited metal sheets are consistently of circular form, are very precise in diameter size and the sheet has a precise thickness so the volume of the abrasive sol mixture that is contained in each cavity, when the cavities are level filled with the mixture to the top and bottom flat surfaces of the font sheet, is consistently equal from cavity to cavity. These equal sized volumes can then be ejected from the cavity font sheet and formed into spheres and then solidified and fired to produce equal sized abrasive agglomerate particles (abrasive agglomerate beads), which are spherical in shape. These beads are easy to handle in bulk form as they pour easily. Individual beads are easy to separate and do not tend to join-up with each other to form large sized agglomerates. The spherical round bead surfaces of the beads allow them to be positioned independently in circular receptor holes in a bead. The metal oxide based abrasive mixtures shrink when water is removed in the dehydration process of solidifying the beads so the volumes of the cavities is oversized to compensate for this shrinkage. Larger sized cavities produce larger sized beads, which allows a wide range of beads to be produced by this technique.

The description here of this bead producing technique is based on the formation of abrasive particle filled metal oxide materials. However, this same bead forming technique can be used to produce equal sized beads of many different material compositions. Either solid, porous or hollow ceramic beads can be made simply by selecting the component material that are mixed into a solution and introduced into the font sheet cavities and then ejected, where these same component materials are well known for use with other bead forming techniques including the use of pressurized nozzle spray dryers and rotary wheel spray dryers that atomize the material into beads. The font sheets can be also used to form equal sized beads of materials the are heated into a liquid form and the liquid introduced into cold, warm or heated cavity font sheets after which the liquid material is ejected from the cavities into an atmosphere that cools off the surface tension formed spherical particles into partial or wholly solidified beads. These melt-formed beads can also be solid, porous or hollow, again depending on the bead material selection. Furthermore, bead materials can be selected that allow a liquid material to be introduced into the font sheet cavities and after ejection of the liquid material lumps from the cavities the lumps can be formed into spheres by surface tension forces and then the formed bead sphere material can be partially or wholly solidified by either a chemical reaction of the base materials or by subjecting the beads to energy sources including convective or radiant heat, ultraviolet or electron beam energy or combinations thereof. The beads formed here can be porous, solid or hollow, depending on the selection of the bead materials. Beads my contain a variety of materials where some of the bead materials are used to form the beads structure while other of the bead materials are present to perform another function or combination of functions. Porous beads may be used as a carrier device for other materials where an open porous lattice structure of the porous carrier material can allow fluids, including gases and liquids, to penetrate or diffuse into the porous bead structure and contact the other materials that are distributed throughout the bead structure. Examples of the use of porous beads containing other materials include, but are not limited to, the use of catalysts, medicines or pharmacology agents.

Woven wire mesh screens can also be used to gap position abrasive beads on the flat surface of a planar backing sheet or on the top surfaces of raised island structures that are attached to a flexible backing sheet. Individual abrasive beads can be placed in the open cells of a wire mesh screen where the woven wires that form the mesh hole openings act as barriers that separate adjacent beads. Here, a wire mesh is placed in flat contact with a wet resin coated backing sheet, an excess of beads is spread over the surface of the wire mesh and all the beads other than those positioned in the mesh opens are removed. The beads will contact and become fixture to the resin after which, the mesh screen is separated from the backing sheet to leave a monolayer of abrasive beads attached to the backing with a precisely controlled gap between each individual bead. The gap spaces between the beads would be typically greater than the diameter of the bead when a screen mesh has openings that are slightly greater than the diameter of the beads. Mesh screens suitable for use with 45 micrometer beads can be obtained from TWP, Inc in Berkley, Calif. where the screens are constructed from stainless or bronze woven wire. If desired, the screen material can be flattened by a hammering process where the thickness of the screen is reduced by 30 to 40% while the rectangular screen cell openings retain their original shape. The open cells are reduced in cross sectional size and the thickness of the woven wires increase laterally along the screen surface, which has the desirable effects of providing more gap space between individual beads. Also, the walls that form each rectangular cell opening become more solid with less space between the individual wires that are woven together to form the open cells. The mesh screen can be coated with release agents that are well known to prevent the adhesion of resin or other materials to the screen body. A filler material may be applied to certain areas of the screen to block some of the open screen cells but yet leave patterns of open cells in the screen sheet. Here, island areas of a screen may be left open but all the screen areas that surround the island areas may be filled level with the screen surfaces with materials that include but are not limited to epoxy or other polymers. This screen can then be aligned and placed in contact with a sheet having attached wet resin coated island structures and abrasive beads introduced into the open screen cell openings where they contact and are bonded to the resin. When the screen is separated from the islands, the islands have a monolayer of abrasive beads that have gap spaces between each individual bead and there can be a gap between beads and the outer top surface perimeter of the raised island structures.

In addition, woven wire mesh screens can also be used to manufacture equal sized spherical abrasive beads from an abrasive water based solution of suspended metal or silicone oxides mixed with abrasive particles using the same techniques described for the electrodeposited electrodeposited metal hole font sheets. Hammering the mesh screens to a reduced thickness provides screen cell walls that have more flat-surfaced cell defining walls than does a non-flattened screen. Screen open cells that have equal cell opening contained volumes are helpful in forming equal sized volumes of liquid abrasive mixtures that are ejected from the screen cells and then converted into spherical ceramic abrasive beads. Hammered screens can produce improved definition of the cell wall structures.

Figure 29A:
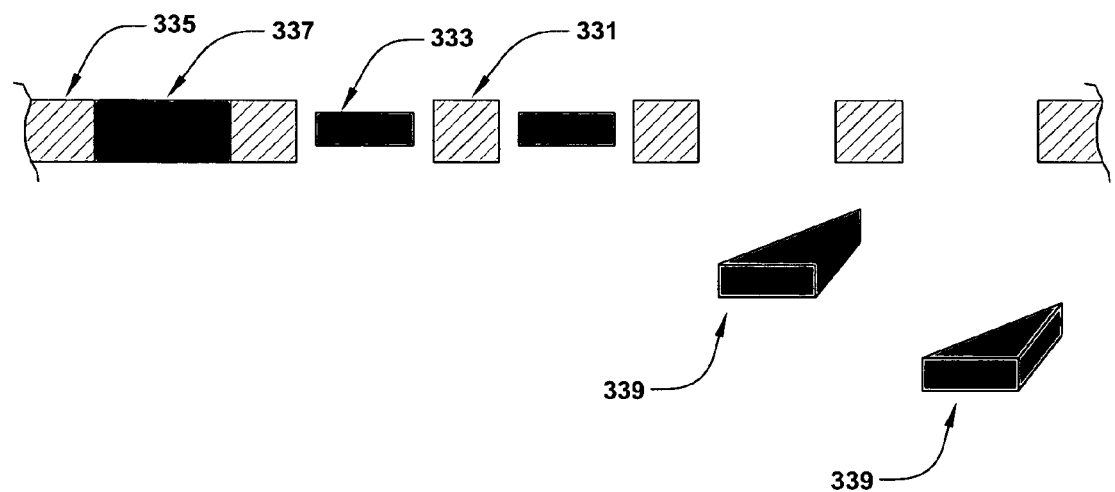
FIG. 29A Prior Art, is a cross sectional view of flat sided triangular shaped abrasive particles.
Figure 30:
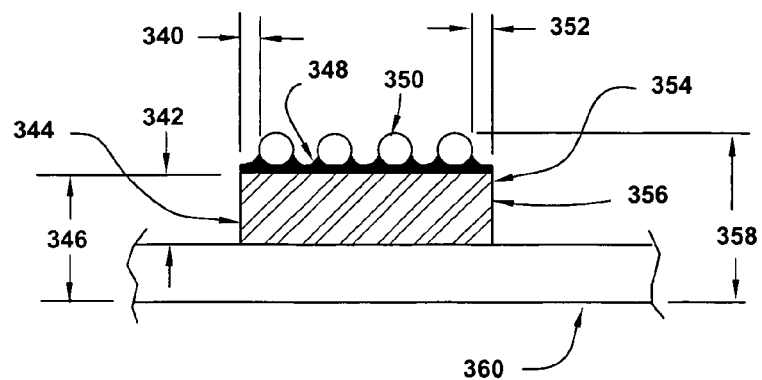
FIG. 30 is a cross sectional view of an abrasive coated raised island attached to a backing sheet.
Figure 31:
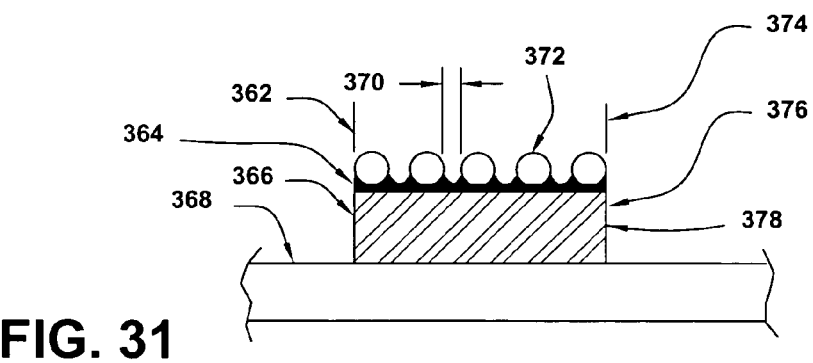
FIG. 31 is a cross sectional view of an abrasive coated raised island attached to a backing sheet.
Figure 32:
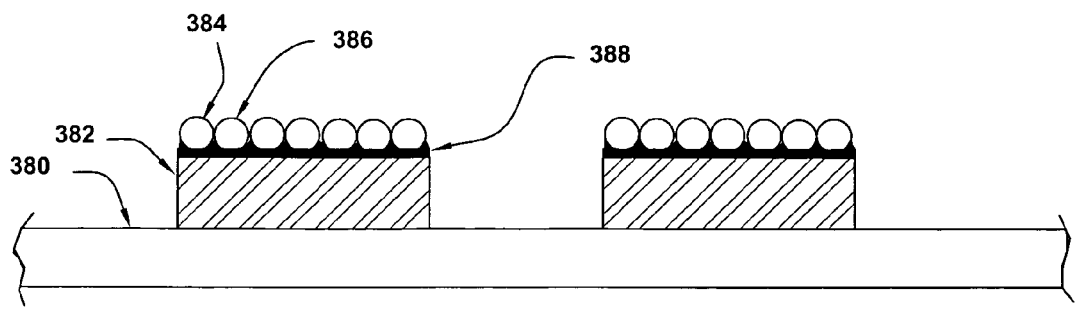
FIG. 32 is a cross sectional view of an abrasive coated raised islands attached to a backing sheet.
Figure 33:
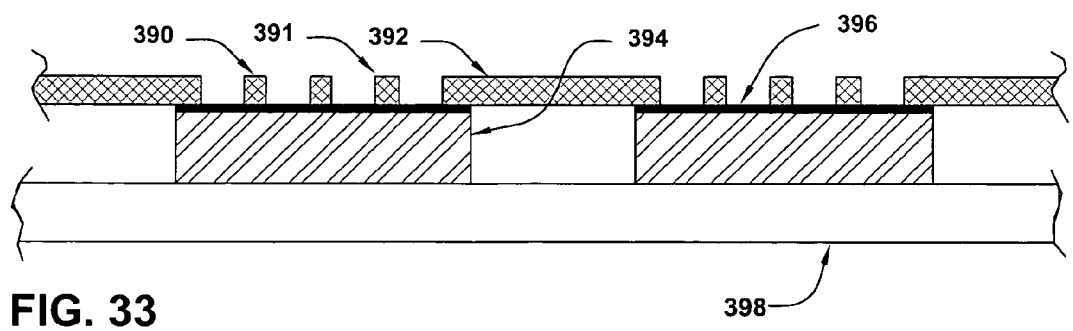
FIG. 33 is a cross sectional view of an abrasive island abrasive beads spacing font sheet.
Figure 34:
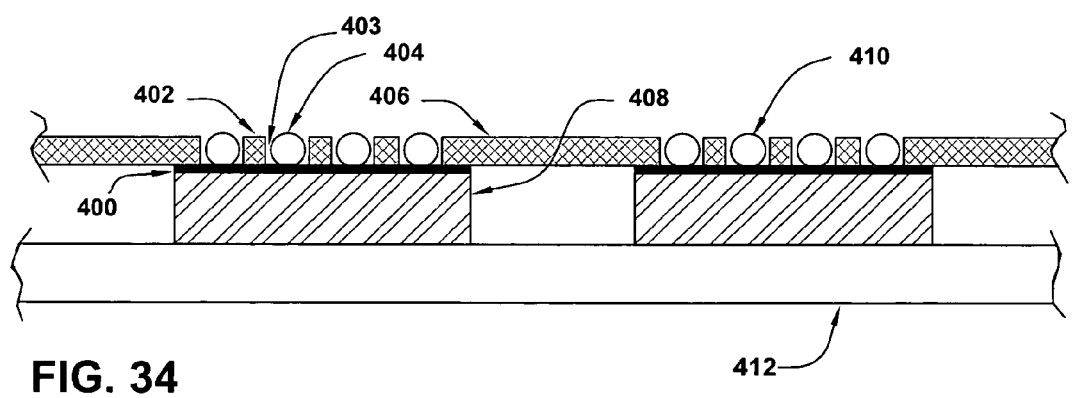
FIG. 34 is a cross sectional view of an abrasive island abrasive beads spacing font sheet with beads.
Figure 35:
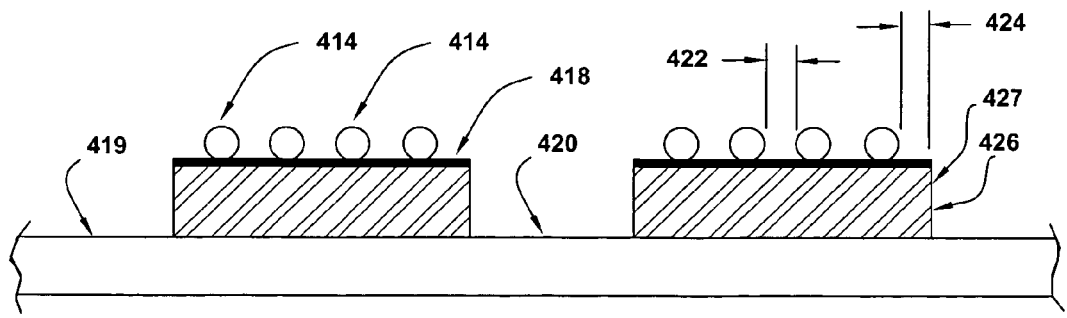
FIG. 35 is a cross sectional view of spaced abrasive island abrasive beads.

FIG. 26 is a cross section view of a flat surfaced raised island structure that is attached to a backing sheet. The raised island structure 300 is attached to a backing sheet 302. FIG. 27 is a cross section view of an adhesive resin coated raised island structure that is attached to a backing sheet. The flat surfaced raised island structure 304 having an adhesive resin coating 306 is attached to a backing sheet 308. FIG. 28 is a cross section view of an abrasive agglomerate bead coated raised island structure that is attached to a backing sheet. The flat surfaced raised island structure 314 having an adhesive resin 312 coating is attached to a backing sheet 316 where abrasive beads 310 containing abrasive particles 311 are resin 312 bonded to the island structure 314. FIG. 29 is a cross section view of abrasive agglomerate bead coated raised island structures that are attached to a backing sheet. The abrasive article 322 has flat surfaced raised island structures 324 attached to a backing sheet 330. The structures 324 have an adhesive resin 320 coating that supports abrasive beads 318, 326 which contain abrasive particles 332. The non-abrasive coated island structures 324 have a precision uniformity of thickness 334, which is measured from the top of the structure 324 to the support side of the backing sheet 330. The adhesive resin 320 has a precision resin thickness 338 and the abrasive beads have a precision diameter 328. The abrasive article 322 has uniform and precise thickness 336, which is measured from the top of the abrasive beads 326 to the support side of the backing sheet 330. FIG. 30 is a cross section view of an abrasive agglomerate bead coated raised island structure that is attached to a backing sheet. The abrasive article 344 has a flat surfaced raised island structure 356 attached to a backing sheet 360. The structure 356 has a wall 354 and a resin 348 coating that supports abrasive agglomerate beads 350 which are positioned gap distances 340 or 352 away from the structure wall 354 to assure sufficient resin 348 surrounds the beads 350 in the gap distance 340,350 areas to provide structural support of the edge-positioned beads 350. The raised island structure 356 has a precision uniformity of thickness 346, which is measured from the top of the structure 356 to the support side of the backing sheet 360. The abrasive article 344 has a uniform and precise thickness 358, which is measured from the top of the abrasive beads 350 to the support side of the backing sheet 360. FIG. 31 is a cross section view of an abrasive agglomerate bead coated raised island structure that is attached to a backing sheet. The abrasive article 366 has a flat surfaced raised island structure 378 attached to a backing sheet 368. The structure 378 has a wall 376 and a resin 364 coating that supports abrasive agglomerate beads 372 which are positioned with gap distances 370 between adjacent beads 372. The beads 372 are also positioned with the side of the bead 372 in a flush position with the wall 376 as shown by the flush wall line 374. FIG. 32 is a cross section view of abrasive agglomerate bead coated raised island structures that are attached to a backing sheet. The abrasive article has flat surfaced raised island structures 382 attached to a backing sheet 380. The structures 382 have a resin 388 coating that supports abrasive agglomerate beads 386 which are positioned with no gap distances between adjacent beads 386. FIG. 33 is a cross section view of resin coated raised island structures having a electrodeposited metal abrasive bead placement font sheet. Flat surfaced raised island structures 394 are attached to a backing sheet 398. The structures 394 have a resin 396 coating that is applied to the top flat surface of the island structures 394. An abrasive bead placement font sheet 392 having sheet walls 390 and sheet openings 391 is placed in flat contact with the resin 396. FIG. 34 is a cross section view of resin coated raised island structures having a electrodeposited metal abrasive bead placement font sheet with abrasive beads in contact with the resin. Flat surfaced raised island structures 408 are attached to a backing sheet 412. The structures 408 have a resin 400 coating that is applied to the top flat surface of the island structures 408. An abrasive bead placement font sheet 406 having sheet walls 402 and sheet openings 403 is placed in flat contact with the resin 400 and abrasive beads 404,410 are positioned in the font sheet 406 openings 403 in direct contact with the resin 400. FIG. 35 is a cross section view of abrasive agglomerate bead coated raised island structures that are attached to a backing sheet. The abrasive article 419 has a flat surfaced raised island structure 426 attached to a backing sheet 420. The structure 426 has a wall 427 and a resin 418 coating that supports abrasive agglomerate beads 414 which are positioned gap distances 424 away from the structure wall 427. The beads 414 are positioned with gap distances 422 between adjacent beads.

Figure 36:
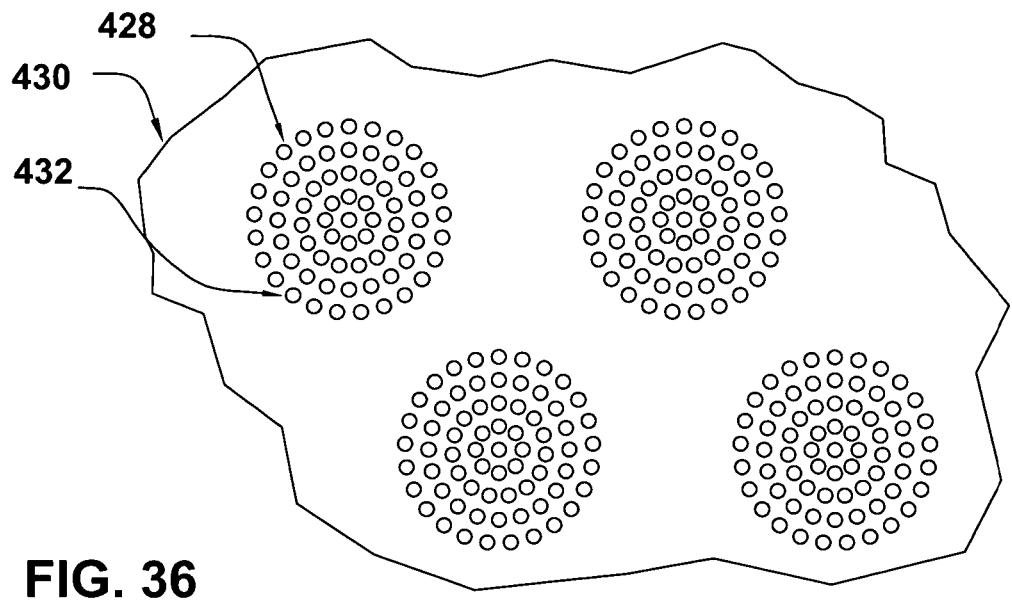
FIG. 36 is a top view of an electrodeposited metal abrasive island bead spacing font sheet.

FIG. 36 is a top view of an electroplated abrasive bead font sheet that can be used to position individual beads on the top surface of resin coated raised island structures. The font sheet article 430 has circular pattern arrays 432 of individual through holes 428. The sheet article 430 can be aligned with and placed on the top surface of wet resin coated raised islands (not shown) that have the same size and relative location as the pattern arrays 432 and individual abrasive beads (not shown) can be inserted into the font sheet article 430 through holes 428 whereby the beads will contact only the wet resin and become attached to the top surface of the islands. Beads that contact the font article 430 at positions other than the through holes 428 will not be deposited on the raised island article at those position locations as the non-hole portions of the font sheet article act as a barrier to those beads.

Figure 37:
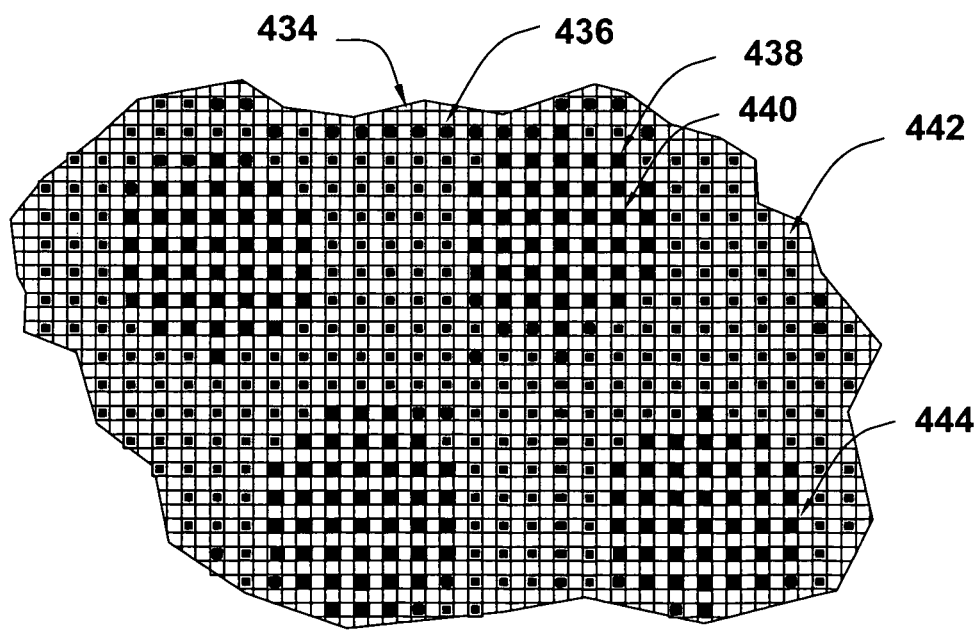
FIG. 37 is a top view of an wire mesh abrasive island bead spacing font sheet.

FIG. 37 is a top view of a mesh screen bead font sheet that can be used to position individual beads on the top surface of resin coated raised island structures. The font sheet article 434 has circular pattern arrays 438 of individual open-cell through holes 440, 444. Areas of the screen article 434 that surround the circular pattern arrays 438 have filled screen cells 436, 442 that block the introduction of the beads (not shown) into a screen mesh cell. The sheet article 434 can be aligned with and placed on the top surface of wet resin coated raised islands (not shown) that have the same size and relative location as the pattern arrays 438 and individual abrasive beads can be inserted into the font sheet article 434 through holes 440, 444 whereby the beads will contact only the wet resin and become attached to the top surface of the islands. Beads that contact the font article 434 at positions other than the through holes 440, 444 will not be deposited on the raised island article at those position locations as the non-open-hole portions of the font sheet article act as a barrier to those beads.

Figure 38:
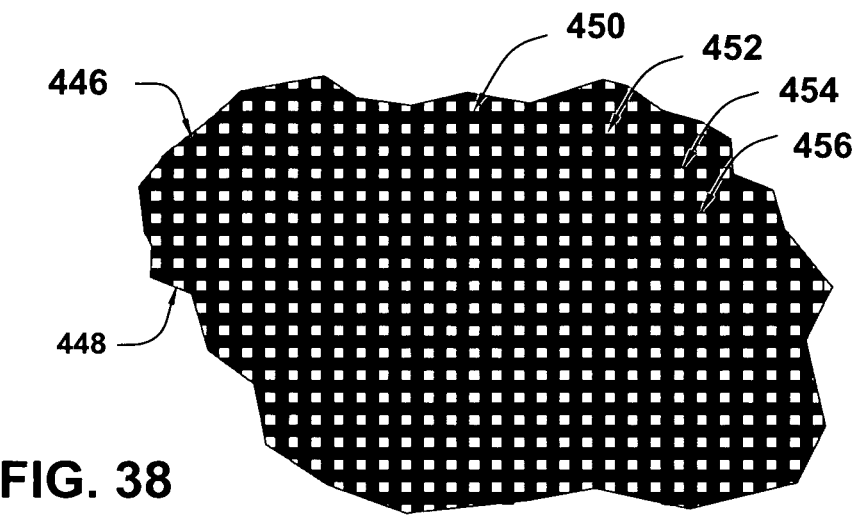
FIG. 38 is a top view of an wire mesh abrasive bead manufacturing font sheet.
Figure 39:
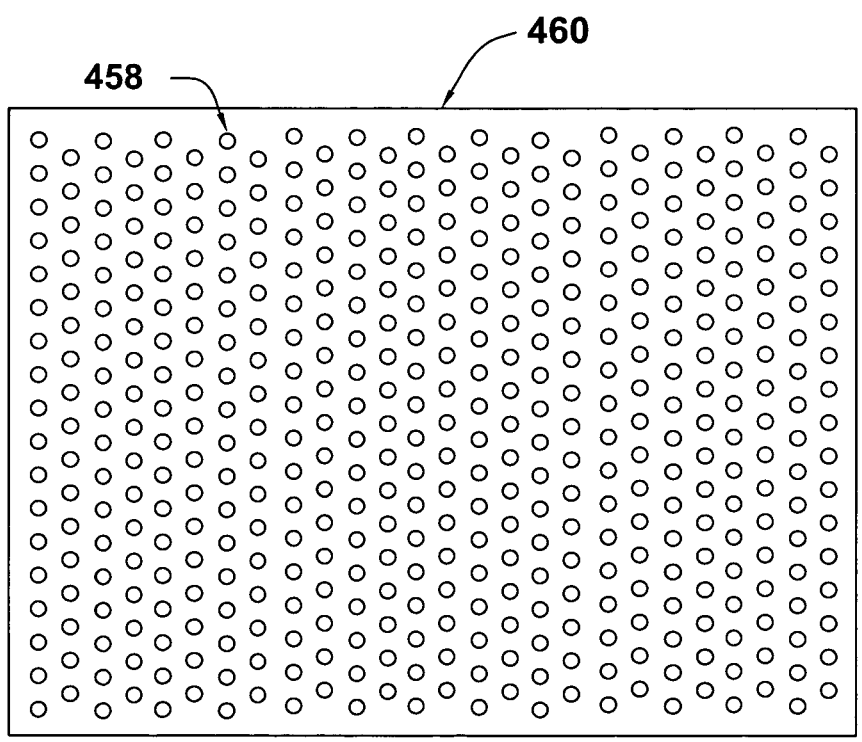
FIG. 39 is a top view of an electrodeposited abrasive bead manufacturing font sheet.

FIG. 38 is a top view of a mesh screen bead font sheet that can be used to manufacture spherical abrasive beads. The font sheet article 448 is constructed of wires 446, 450 that are woven together to create individual open-cell through holes 452, 454, 456. This type of mesh screen article can be used to mass produce equal sized abrasive spherical beads. FIG. 39 is a top view of an electrodeposited perforated hole font sheet that can be used to manufacture spherical abrasive beads. The font sheet article 460 is constructed of metal that is electrodeposited in patterns to create individual open-cell through holes 458 in the sheet article 460.

Figure 40:
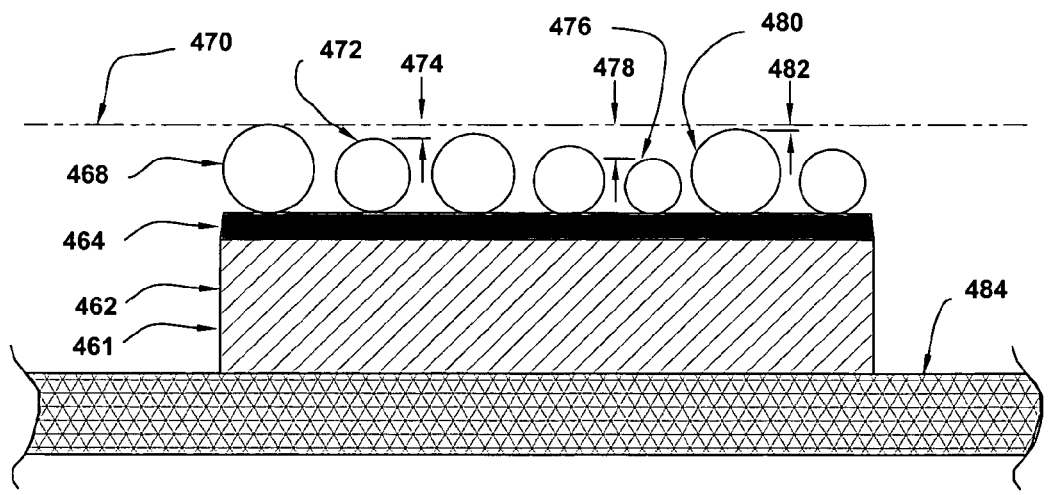
FIG. 40 is a cross sectional view of an abrasive coated raised island with various sized beads.
Figure 41:
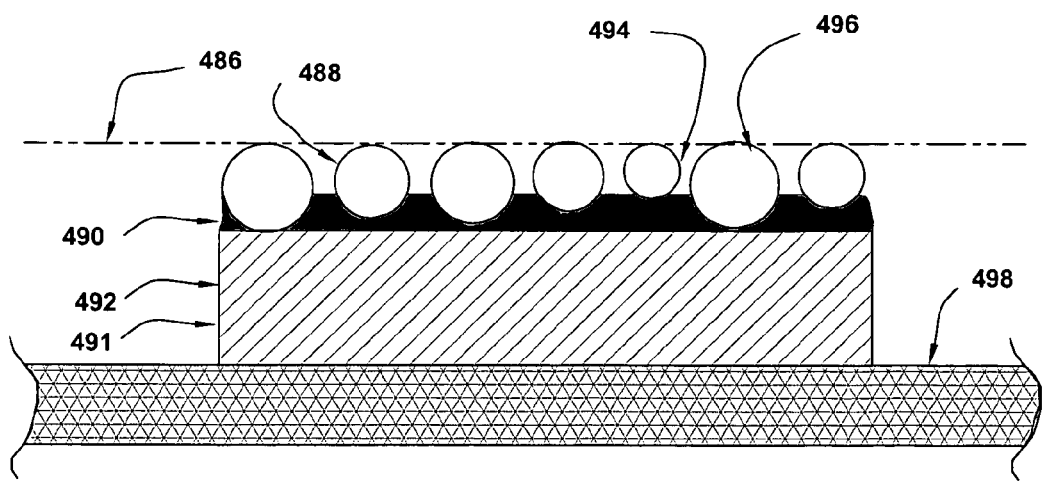
FIG. 41 is a cross sectional view of an abrasive coated raised island with various sized beads that are leveled.

When different sized abrasive beads are coated on a precisely flat raised island structure having a precise thickness resin coating only some of the largest sized abrasive beads will contact a flat workpiece surface. FIG. 40 is a cross section view of an abrasive agglomerate bead coated raised island structure that is attached to a backing sheet. The abrasive article 461 has a flat surfaced raised island structure 462 attached to a backing sheet 484. The structure 462 has a resin 464 coating that supports different sized abrasive agglomerate beads 468, 472, 476, 480. A flat plane 470 that is parallel to the back mounting side of the backing sheet 484 is shown in flat contact with the top surface of the largest beads 468,480 and there is a gap distance 474 between the plane 470 and the top surface of the medium sized bead 472. There is a gap distance 478 between the plane 470 and the top surface of the small sized bead 476. When an abrasive article 461 is used to abrade a flat surfaced workpiece (not shown) only the large abrasive beads 468, 480 will contact the workpiece surface and the smaller sized abrasive beads 472, 476 will not be in contact with the workpiece until the large sized beads 468, 480 wear down. A method to provide a continuous flat top surface of a abrasive coated raised island structure having different sized abrasive beads is to coat the island structure with a thick coating of resin and then depositing the different sized abrasive beads onto the liquid state resin. Then a flat plate can be applied to the surfaces of all the abrasive beads to push them individually down into the resin layer. The flat plat abrasive bead contacting surface would be maintained in a position that is parallel to the back side of the backing which is the mounting side of the abrasive article backing sheet as the flat plate is advanced toward the raised island structure. The largest beads would be pushed the deepest into the resin layer and the smallest beads would penetrate least into the resin layer. The plate is advanced until all of the beads have their top surfaces in a common plane that is parallel to the backside of the backing sheet. Then, or after partial solidification of the resin, the plate is separated from the abrasive beads thereby leaving all the bead surfaces in a flat common plane. If desired a precision thickness release liner sheet can be applied to the abrasive bead top surfaces prior to contact with the beads with the flat plate which will prevent contamination of the plate by the resin which can be squeezed up from between the beads as the beads are pressed down into the resin. After the plate is separated from the beads, the release liner sheet can also be removed from the bead surfaces. Precision thickness release liner sheets can be made by applying a release coating material including but not limited to wax, petroleum jelly, silicone oil or polytetrafluoroethylene (PTFE) to a sheet of polyester or polyethylene terephthalate (PET) backing material. Also, skived PTFE sheet supplied by ENFLO Corporation, Bristol, Conn. can be used as a release liner sheet. FIG. 41 is a cross section view of an abrasive agglomerate bead coated raised island structure having surface leveled beads. The abrasive article 491 has a flat surfaced raised island structure 492 attached to a backing sheet 498. The structure 492 has a thick resin 490 coating that supports different sized abrasive agglomerate beads 488, 494, 496. A flat plate (not shown) having a contact surface in a plane 486 that is parallel to the back mounting side of the backing sheet 498 was used to position the top surfaces of all of the beads 488, 494 and 496 in the common plane 486. Only one raised island structure is shown but the technique of using the flattening plate is applied to all the islands that are attached to a typical abrasive article. The same type of abrasive bead leveling as described here can be done on an abrasive article by passing the abrasive article through a set of precision gap spacer rollers. Gap spaced rolls can also be used to position abrasive beads on raised islands that are attached to a continuous web by passing the continuous web through a set of the precision gapped rolls. The same technique of using a flat plate to level the surfaces of different sized abrasive beads on a backing sheet can also be used to level abrasive beads on raised islands that are not flat or are not precisely located in a common plane that is parallel to the backside of the backing sheet.

Raised Island Locations on Backing Sheets

Problem: It is desired to provide abrasive island articles that have full-sized islands which are located at the immediate edge of the periphery of an abrasive backing sheet. Reducing the size of island structures by trimming the structure sides at the periphery edge of the article weakens the structural bond between the raised island structures and the backing sheet. Full-sized island structures can be dislodged from the backing sheet when tall and narrow islands having small attachment areas are contacted by a workpiece where the abrading forces are concentrated at the top surfaces of the diminished island structures and the forces are directed on the island in a direction that is perpendicular to the island narrow portion of the island. Also, where an abrasive article is cut out from a raised island continuous web material by mechanical or other cutting devices, the cutting action can weaken the structural bond between the cut raised island structures and the backing sheet. A broken island structure can become lodged between the workpiece surface and the abrasive article surface and create significant scratches to the workpiece during abrading action. Further, this island structure cutting action also can disturb the abrasive particles or beads that are located at the top cut edge of the raised island. These disturbed abrasive beads or abrasive particles tend to break off the island surface prematurely during an abrading operation and the broken pieces can cause scratch damage to a workpiece surface.

Figure 42:
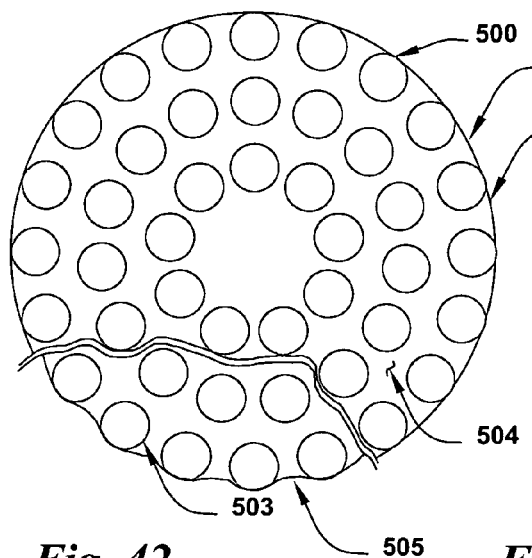
FIG. 42 is a top view of an abrasive island disk with edge positioned islands.
Figure 43:
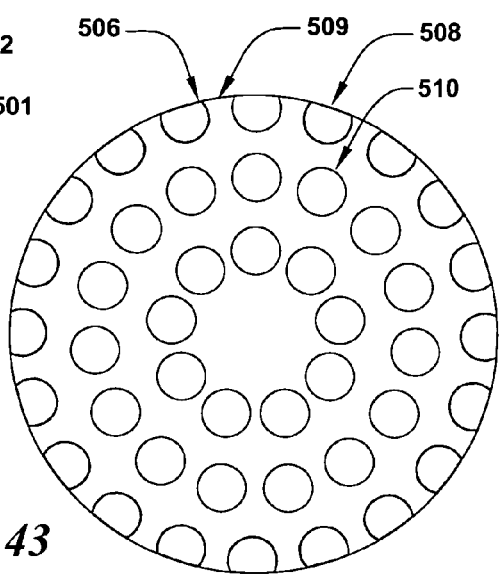
FIG. 43 is a top view of an abrasive island disk with edge positioned partial sized islands.
Figure 44:
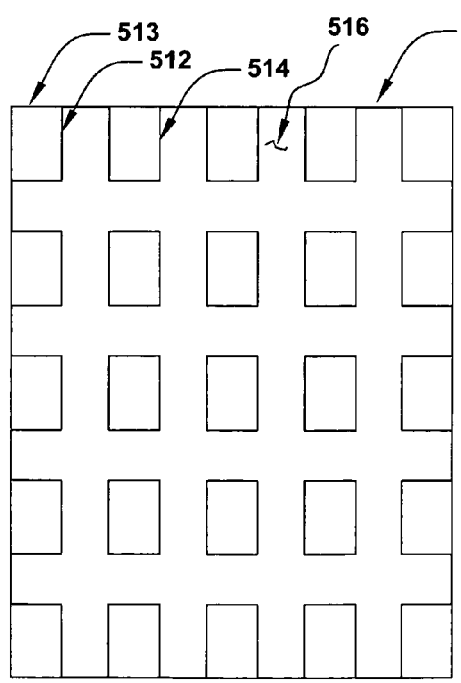
FIG. 44 is a top view of an abrasive island rectangular sheet with edge positioned islands.
Figure 45:
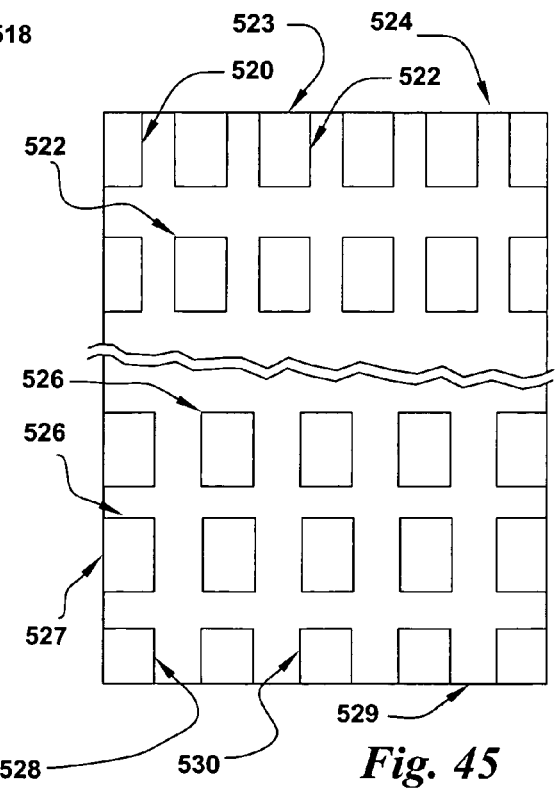
FIG. 45 is a top view of an abrasive island rectangular sheet with edge positioned partial sized islands.

Solution: Equal sized raised islands can be attached to the surface of a backing sheet over the whole surface area of the backing sheet. Full sized islands tend to have the best bonding strength for the attachment of the island structure to a backing sheet. However, some island shapes can be trimmed in cross section size and still main sufficient bonding strength to adequately support the islands against abrading forces to prevent the island structures becoming dislodged from the backing sheet. It is preferred that the attachment base area of individual island structures that are located on the periphery of the abrasive article backing sheet have island base attachment areas which are at least 80% of the average of the island base attachment areas of all of the island structures that are attached to the abrasive sheet article. It is more preferred that the attachment base area of individual island structures that are located on the periphery of the abrasive article backing sheet have island base attachment areas which are at least 90% of the average of the island base attachment areas of all of the island structures that are attached to the abrasive sheet article. The most critical reduction in size of raised island structures for a abrasive disk article is where the tangential width of an island is reduced as this reduction in width can significantly reduce the structural stability of the island structure when the island top is subjected to tangential abrading forces. Rectangular raised island abrasive articles are be subjected to abrading forces that can be random in direction so the island areas have width to length ratios that are closer to unity than in the case of the abrasive disks. These island structures can all be positioned at the immediate edge of the backing sheet and still have sufficient bond strength between the structure and the backing sheet particularity where the abrasive article is used for lapping a workpiece surface. Contact forces during a lapping operation generally are quite low compared to abrasive grinding of a workpiece. Also, the forces generally act in a tangential direction for a abrasive disk article which utilizes the bond strength of a full sized island structure where the island is attached to the backing sheet. In lapping operations the abrasive article can be attached to a flat platen plate with the use of vacuum which results in a bonding force being applied to the full surface of the abrasive article backing sheet, including the extreme outer peripheral edges of the abrasive article. The vacuum thereby provides good attachment strength to the portion of the backing that is located immediately in the areas under the outer periphery raised islands. Also, it is not necessary to provide an abrasive article, which has periphery edges that have primal cut-line shapes, including straight or circular edge lines that cut through full sized island structures. Instead a cut line can be established around the circumference of a abrasive article peripheral edge that conforms to the edges of the full-sized raised island structures where the edge cut line generally follows a primal straight or curved line even with the localized deviations in the ct lines in the areas of those islands that are positioned at the periphery of the article. The cut line may have many shapes including, but not limited to, scalloped lines that are positioned at the immediate edge of the island structures where the island structures are positioned with one structure wall in vertical alignment with the vertical edge of a backing sheet when the backing sheet surface is mounted in a horizontal plane. It is not necessary to have a space gap between the raised island structures and the outer periphery edge of the abrasive article. FIG. 42 is a top view of a abrasive disk having full sized raised islands that are positioned with the side of the circular islands positioned directly at the peripheral edge of the backing sheet. One portion of the abrasive disk article shows a peripheral backing sheet abrasive article edge cut line that is scalloped to conform to the sides of individual raised islands. An abrasive article 502 has raised abrasive islands 500 and 503 that are positioned with one side of the islands 500 and 503 at the article 502 edge cut line 501. In another drawing break-out area of the article 502 the article 502 edge cut line 505 has a scalloped shape but the raised islands 503 are still located at the edge of the cut line 505. FIG. 43 is a top view of a abrasive disk having partial sized raised islands that are positioned directly at the peripheral edge of the backing sheet and full sized islands located at the interior surface of the disk. An abrasive article 506 has raised abrasive islands 508 and 510. The partial sized islands 508 are positioned with one side of the islands 508 at the article 506 edge cut line 509 and the full sized islands 510 are positioned at the disk article 506 interior area. FIG. 44 is a top view of an abrasive rectangular shaped article having full sized rectangular shaped raised islands that are positioned with the sides of the islands positioned directly at the peripheral edge of the backing sheet. An abrasive article 518 has raised abrasive islands 512 and 514 that are positioned with one side of the islands 512 and 514 at the article 518 edge cut line 513. There are open recessed areas 516 between the islands 512, 514. FIG. 45 is a top view of a abrasive disk having partial sized and full sized raised islands that are positioned directly at the peripheral edge of the backing sheet and full sized islands located at the interior surface of the disk. An abrasive sheet article 524 has partial sized raised abrasive islands 520, 528, 530 and full sized raised islands 522,526. In the upper portion of the drawing in the figure show both partial sized islands 520 and full sized islands 522 are positioned with one side of the islands 520, 522 at the article 524 peripheral edge cut line 523. Other full sized islands 522 are positioned at the rectangular article 524 interior area. The lower portion of the drawing in the figure again shows both partial sized islands 528 and 530 and full sized islands 526 positioned at the article 524 peripheral edge cut lines 527, 529 with full sized islands 526 located at the interior area.

Workpiece and Platen RPM Speed Control

Problem: When a workpiece is ground, it is difficult to get a totally flat ground surface of 1 to 2 Helium light bands (11.6 to 23.2 microinches or 0.25 to 0.51 micrometers) flatness on the workpiece surface when using an annular band of abrasive that is less wide than the contacting width of the workpiece part. It is necessary to overhang the part on the annular band ring to obtain even wear across the ring but this tends to produce a wide undercut on the workpiece center with more undercut material removed in rough proportion to the linear surface velocity of the abrasive relative to the workpiece. Also it is typically necessary to use a spherical motion workpiece holder to assure the workpiece lays flat to the platen abrasive when the last stage of lapping is carried out to achieve a workpiece surface flatness of 1 to 2 Helium light bands (11.6 to 23.2 microinches or 0.25 to 0.51 micrometers). Because of the free spherical motion of the workholder it is necessary to keep the workpiece in flat contact with the platen abrasive from the very start of the lapping process when both the platen and workpiece are not rotating. This flat contact needs to continue through all grinding events. Then all rotation of both the workpiece and the platen should be stopped before removal of the workpiece from the platen abrasive to prevent scratches in the surface of the workpiece from the edge of the annular abrasive as the workpiece is tipped by spherical action when the workpiece is raised up from the abrasive surface. Rotating the workpiece in the same direction as the platen evens the abrasive contact speed at the workpiece surface to obtain uniform wear.

Solution: A process technique can be incorporated into the grinding or lapping procedure to accomplish the desired stable and flat contact of the workpiece surface with the abrasive. This technique is particularly necessary with the extra low friction designs of the workholder spherical joints employed in lapping and grinding with abrasive annular rings.

First, the non-rotating workpiece is brought into a light pressure contact with the stationary platen. Then, slowly over a defined period of time, the workpiece is brought up to full RPM speed with the same rotation direction as the platen is run. Also, the platen is brought up to the desired speed over a controlled period of time with a defined acceleration time profile. The faster the abrasive contact surface speed, the faster the removal of material rate from the workpiece. Because of this, it is desired that the workpiece makes many full rotations relative to the rate of material removal so that abrasive wear is spread out evenly over the workpiece surface to achieve extreme flatness. For instance, 0.001 inch (0.025 mm) total of workpiece surface material may be removed, but the workpiece may only have rotated a total of 100 revolutions over this period of time which means the surface height variation per revolution would only be 0.001 divided by 100 or 0.00001 inch (0.00025 mm) which typically would be sufficient for the desired flatness on a 3 inch (7.7 cm) diameter workpiece. If a workpiece is a common ring-shaped part with an opening at the center radius, then the ground material removal rate at the center is not important. However for a solid workpiece disk it may be an advantage to first bring both up to RPM speed and either reduce the platen speed to a very low RPM while the workpiece is rotated at full RPM. Many relative speed patterns may be developed for different types of parts and different abrasives and these patterns could be repeated in processing a workpiece part.

Radial Tracks in Abrasive Disk Sheets

When an annular ring uniform abrasive coated disk sheet is operated at very high 9,420 surface feet per minute, SFPM, speeds such as with a 12 inch (30.5 cm) diameter platen operated at 3,000 RPM, with coolant water applied to the grinding surface, a boundary layer of water builds up between the abrasive surface and the workpiece. When an abrasive disk is used, which has the abrasive formed on small islands of approximately 0.125 inch (3.175 mm) diameter, then the workpiece can easily be ground flat within 0.0002 inches (0.0051 mm) over 4 inches (10.2 cm) diameter. However, when an abrasive disk is used at these speeds which has a continuous flat coating of abrasive over its full surface, the workpiece is typically not ground flat to this same accuracy. The boundary layer tends to build in thickness with a longer length of tangential contact with a workpiece. Also, vibrations caused by the hydrodynamic interface forces where the workpiece contacts the wetted abrasive affect the grinding action. Vibrations and changes in the grinding action due to shedding of the water eddies and other phenomenon which occur at the contact of the workpiece with the water film covered abrasive tend to be periodic in nature and can reactively build up a dynamic oscillation of the workpiece.

Print Coating of Abrasive Island Disks

Problem: It is desirable to create islands of abrasive particles or abrasive agglomerates in an annular ring band of a flexible circular disk with a precision overall thickness for the whole circumferential length of the annular ring. The thickness is measured from the exposed top of the abrasive islands to the bottom of the abrasive disk backing. It is also important to utilize all of the typically expensive abrasive particles or abrasive agglomerates, such as diamond, as the abrasive wears down on a disk. It is also desirable to create large diameter disks of 12 inches (30.5 cm), 18 inches (45.7 cm) and up to 24 inches (61 cm), 36 inches (91.4 cm) or 48 inches (122 cm) or more diameters so that the difference in surface speed is small at the inner and outer radii of the annular abrasive band.

Solution: An island type annular band of precision thickness can be fabricated by printing discrete islands of a polymer adhesive on the flat surface of a flexible backing sheet to form island structures that are attached to the backing sheet. Each island structure is then top-leveled into a mutual plane that is parallel to the backside of the backing sheet by any convenient process to a precise height or thickness. The islands can be formed into a mutual flat and parallel plane by an island molding process before the polymer island structures become solidified. Alternatively, the free-formed island structures can be solidified and the island tops can be machined or ground into a mutual flat and parallel plane. Then, a coating fluid mixture, made from abrasive particles or abrasive agglomerates mixed in a suitable polymer binder solution can be coated onto the top surfaces of the island structures. Or, alternatively, an adhesive coating can be applied to the island top surfaces and then abrasive particles or abrasive beads can be deposited onto the adhesive layer to form abrasive particle coated islands that are attached to a flexible backing sheet. A desirable pattern of separate island structures can be deposited on a polymer or metal backing disk by use of a single-head or multiple-head fluid injector that can deposit controlled polymer drop sizes to form island structure polymer lumps when the polymer injector head, or heads, are activated electrically or by other means. A large diameter circular disk backing can be laid on a flat mount surface and the backing can be driven by an X-Y positioning table, or a rotary table, in a series of incremental positioning steps under a single, or multiple, head stationary deposition injector(s) which is injection-activated at each desired island position. After the fluid polymer island structure lump deposits are made, the island tops are mutually flattened either before or after the island structure polymer has been solidified. As an alternative, instead of forming solidified island structures and then coating these with an abrasive layer, abrasive coated islands can be formed before the island structures have become solidified. Here, a pattern of primary island bases can be constructed at each independent island site on a backing sheet by a island structure injector. Then another coating injector station would deposit an abrasive and adhesive mixture on top of the individual fluid-state polymer island structures to form non-solidified abrasive mixture coated islands. Then, both the island structure and the abrasive coating would become solidified. The top surfaces of the abrasive coated islands can be flattened into a mutual flat plane that is parallel to the backside of the backing sheet prior to partial or full solidification of the abrasive mixture or prior to partial or full solidification of the island structure polymer. A variety of filled or non-filled polymer materials can be injected at the island sites to act as an island base or foundation by an injector station. This island base deposition would be completed prior to deposition of the abrasive particle fluid drop. This double injection at each island site creates an abrasive top to each island, where the lowest abrasive particle in the island is raised off the backing disk floor surface, and all of the abrasive particles in an island are available for grinding or polishing action when the upper abrasive portions are worn away. Also, following the drop deposition of either or both the base material and the abrasive material, the height of each island can be adjusted, or leveled, by a precision gap roller. Abrasive island articles can be produced by this double-injection method on a continuous web basis or individual abrasive disks or rectangular sheets or abrasive strips can be produced by this method. For individual abrasive disks the abrasive island surface roller would have a cone-shape having different diameter at each end. It can be rolled along the tangential path of the annular drop-island pattern so that each island top is contacted by the lowered portion of the roller, and thus the island is reduced in height by the roller. The outboard roller flange edges, where the inside portion that contacts the top of each island, would have a smaller diameter than the outside flange diameter. This would allow direct contact of the flange edge with the rotating disk backing. The roller would travel on the outboard and inboard portions of the backing disk that have not been island drop coated. The backing would be mounted on a stationary or rotating platen that is precisely flat in the radial direction. With a single or multiple pass of the roller height-leveling roller at different stages of curing or drying of the island components, the height of each island can be controlled to be precisely uniform to within 0.001 inches (0.025 mm) or less but preferably within 0.0001 inch (0.0025 mm) or less. Other substances, such as coatings, binders, surfactants, etc. can be added later to the disk.

An apparatus can be used for injection drop coating of abrasive loaded binder onto an annular band of island shapes and a roller device can be used to level the partially cured abrasive slurry binder coated islands to a uniform height. The absolute height of each island, past a minimum value to prevent hydroplaning of a workpiece, is not critically important to abrasive grinding but the relative height variation is important to utilize all of the expensive abrasive particles or abrasive agglomerates in the grinding or polishing events. Abrasive islands that are too high will have their tops broken off and islands that are too low will not abrasively contact a workpiece surface. The island height gauging roller can be constructed of a variety of metal or plastic or composite materials to achieve the precise accuracy and also to promote the release characteristics that prevent a buildup on it surface by the pickup of wetted abrasive binder. Special coatings can be applied to the surface of the roller including integral platings or coatings such as fused carbon, fused Teflon® coatings, and so on. Also liquid, or dry powders, or chemicals can be used with the roller as a coating applied to the roller or a coating applied to the surface of the wet abrasive islands to prevent sticking to the roller surface. Special binder systems can be used which allow the top surface of the abrasive island to become partially cured adequately well that the height adjusting roller can move the island bulk abrasive laterally without pickup of abrasive binder on its surface. These binders could be solvent based for drying and curing, could be thermally cured, catalyst cured (e.g., room temperature cured), radiation cured, ultraviolet cured and chemical reaction cured.

Diamond Particle Coating of Abrasive Islands

Problem: When constructing an abrasive disk with a band of annular islands which have a liquid abrasive-free adhesive binder deposited at individual island sites it is difficult to top-coat, with loose abrasive particles or abrasive agglomerates, only the top of wetted binder spots to form abrasive coated islands. It is desired that only a single layer of abrasive particles or abrasive agglomerates be wetted and bonded to the binder-wetted island without an excess of binder liquid from the islands to contaminate the loose abrasive particles or abrasive agglomerates.

First Solution: Liquid drops of adhesive binder can be deposited at island sites on a thin plastic or metal disk backing to form an annular band of island sites. When the binder adhesive is still wet at the top of each island, abrasive particles can be applied to the surface of the disk backing. The particles can be poured, or dropped, on the top surface of the disk that has been mounted flat with the wet binder islands upward so the whole disk surface is coated with abrasive particles. Those particles which contact the wet island tops will be bound to the top surface of the island and any excess will not be attached. The excess abrasive can then be collected by a variety of methods such as shaking it off, vacuuming it off and recycled for use on the next abrasive disk. By using this technique, the use of very expensive abrasive particles, such as diamond, can be used with a maximum of abrasive grinding utility on the top surface of the islands. Very little loss of this expensive abrasive media would occur in the manufacturing of the abrasive disks. Many forms, shapes, sizes and types of abrasive can be used which includes aluminum oxide, diamond, cubic boron nitride, CBN, and others.

Island Height Grinding System

Problem: It is important to precisely control the heights of abrasive coated annular rings of abrasive disks to be uniform in height relative to each other. Variations in the thickness of the abrasive backing material can result in some abrasive islands having a taller height relative to contact with a workpiece ground surface. Even if an abrasive disk supporting platen is perfectly flat, the areas of higher islands will contact the workpiece at high rotational speeds of the platen while the lower islands will not contact the workpiece at all. A precise thin coat of abrasive is applied to the island tops.

Solution: A disk sheet of thick plastic or metal backing having an annular band of abrasive island foundations can be print-coated, with a periodic or random pattern of the island base foundations. The island coated backing sheet can be mounted on a precisely flat platen having a significantly larger diameter than the disk backing. Air bearing pads would be mounted on both ends of a support mechanism structure frame which spans across the center of the abrasive disk and which can be fixtured to the platen by vacuum. The two air bearing support pads would contact the outboard edge of the platen that is not covered by the disk sheet. An island-top grinding head would be mounted on the mechanism support frame positioned directly above and centered on the annular band of disk islands. The grinder head would nominally be positioned on a centerline between the two air bearing pads. Rotation of the platen will cause the annular band of islands to progressively travel under the grinding head that is held in a stationary position relative to the rotating platen. Using a precision ground hard steel or carbide grinding head, which has a width greater than the radial width of the annular island band, assures that each island tip is ground off to the same height both along a circumferential path and also in a radial direction. This grinding mechanism creates an island height uniformity as measured from the top of the island to the bottom of the backing which reduces variations caused by changes in the thickness of the backing. All grinding thickness control of the islands is accomplished locally at any tangential position on the disk as the grinding contact line of the grinding wheel with the island tops is referenced to the corresponding tangential outboard flat surface of the platen. The air pad nearest to the grinder travels up and down with the platen surface and also raises or lowers the grinder head as the outer platen surface raises and lowers. The effect of variations of the slow, or fast, rotating platen surface variations on the opposite end of the support frame are diminished by the long length of the remote air bearing pad location. An alternative technique of grinding with a grinding head wider than the annular island band would be to move a narrow grind head radially as the platen is rotated.

Extended Coating of Abrasive Particle Disk Islands

Problem: Abrasive coated annular disks need to have islands of abrasives to minimize hydroplaning at high operation speeds due to use of water cooling during the grinding or lapping process. Also, the preferred form of coated diamond abrasive is to have a single or mono layer of abrasive particles or abrasive agglomerates on the surface of the disk so that each individual particle can be brought in contact with a flat workpiece surface. Use of a mono layer of abrasive particles or abrasive agglomerates prevents the top particles of a stacked layer of particles from shielding workpiece contact with adjacent or lower-level particles which lay deeper within the abrasive particle coating layer. Also, when the particles are stacked in layers, and the top layer becomes worn down partially, the worn top surface of the diamonds acts as a smooth bearing surface which prevents cutting or grinding action on the workpiece. The top-most sharp edges of all of the particles must lie precisely flat in a plane parallel to the bottom surface of the disk backing so that all of the typically small, 25 micrometer (or about 0.001 inch) diameter particles successfully contact the workpiece at 8,000 SFPM (surface feet per minute) speeds when using a precision flat surface platen system. It is desired to have a mono layer of diamonds when using either an adhesive binder coating or a metal plated system where the abrasive particles are attached to a disk backing by entrapment with deposited metal.

Electroplated diamond particles sometimes lay on top of each other, to form an equivalent intermittent stacked particle layer, which prevents formation of the desired single or mono layer of abrasive particles. Premixing a slurry of abrasive particles or abrasive agglomerates with a binder adhesive prior to applying an abrasive particle coating to a backing disk tends to result in multiple stacked layers of abrasive particles or abrasive agglomerates particularly with very small particles of 6 micrometer or less diameters. Also, when a stacked layer of particles is worn away, the wear tends to create an uneven top surface of the abrasive unless special methods are employed in controlling how the workpiece is presented to contact the abrasive. If the workpiece overhangs the width of the abrasive coating, and if the workpiece is rotated in the same direction as the abrasive platen, or if the workpiece is oscillated across the abrasive surface, it is possible to create precisely uniform wear across the full top surface of the abrasive. These conditions of having non-uniform wear of thick coats of abrasive slurries having stacked layers of individual abrasive particles or abrasive agglomerates results in the non-flat uneven wear of workpiece surfaces. The uneven workpiece wear occurs for both abrasive sheet articles having the thick abrasive slurry coated directly on the flat surface of a backing sheet or for articles where the thick abrasive slurry is coated on the top surface of raised island structures. As the diamond abrasive particles or abrasive agglomerates are typically 0.001 inch in diameter (for a 25 micrometer particle) the removal of some discrete areas of abrasive particles or abrasive agglomerates can lower the abrasive in that region by a factor of ten times the desired 0.0001 inch (0.0025 mm) flatness of the abrasive surface. Variations in the abrasive surface due to uneven wear can translate into significant uneven wear of the workpiece surface. Applying a wet coating of liquid adhesive binder, followed by a dusting or sprinkling of a top coating of loose abrasive particles or abrasive agglomerates, with an option of another top sizing coat of liquid adhesive, does not necessarily produce an abrasive disk with a precisely flat top surface. This problem of non-flat or uneven abrasive coating can occur as the typical coater head device may not have a total thickness measurement reference to allow the height of the abrasive to be accurately controlled. Uneven surface coating can occur especially when solvent-based coatings are used as these coatings shrink in size when they are dried or cured. Most of these coater processes are used to coat continuous webs and do not address discrete coating of the top surfaces of abrasive islands. A further source of height, thickness, or flatness error occurs because abrasive particles or abrasive agglomerates vary in shape and size, even when screened, so they are difficult to level. Wetting of diamond particles by an adhesive binder for good bonding can be a problem because of the smoothness of the surface of individual particles and the surface energy characteristics of the diamond material. A liquid slurry mixture of abrasive particles or abrasive agglomerates mixed with a polymer resin can be applied to a flexible transfer sheet and this sheet can be pressed against the surface of a array of raised islands that are attached to a backing sheet, where the liquid slurry is in pressure contact with the surfaces of uncoated raised island structures, to wet-coat each island surface with the transfer sheet abrasive slurry. Then the transfer sheet can be separated from the raised islands with the result that at least 5% or up to 50% or more of the thickness of the slurry originally coated on the transfer sheet is transferred to the island structure surfaces. New abrasive slurry can be spread as a even coating on the original transfer sheet and this transfer sheet then used again to coat another array pattern of raised island structures with abrasive slurry. Different coating process variables including, but not limited to, the viscosity of the slurry, the thickness of the slurry and the speed at which the transfer sheet is separated from the raised islands can be optimized to provide a consistent abrasive particle slurry thickness being coated on the top surface of the island structures. Adhesive binders must be cured within a time period suitable for the abrasive disk manufacturing process. The binder must be sufficiently strong to resist all the different types of forces or stresses present in the grinding action, and also, must remain dimensionally stable at the localized high temperatures created by grinding friction.

Solution: An annular pattern of raised island foundations can be formed on a backing sheet. This annular group of islands can be ground precisely flat on the tops with all islands having the same precise height from the bottom surface of the backing. These islands can be formed with straight walls or they can also be formed with tapered walls having a wide base and a more narrow top to provide better structural support to the islands and improved water lubricant flow around the island top. A number of methods can be used to transfer a liquid adhesive coating to the top surface of the independent islands. Various coating techniques include transfer of coating liquid from a transfer sheet that has been coated as an intermediary step for transfer of a portion of the coating liquid to the top surfaces of the islands. Also, a rotogravure roll can be used to top coat the islands. For transfer sheet coating, a relatively thick coating of up to 100 percent solids adhesive can be applied to the whole top surface of a web coating transfer sheet of web material, which is larger in surface size dimensions than the outer diameter of the annular ring of raised abrasive islands formed on the circular disk backing. This adhesive coated transfer sheet can be brought in contact with the annular ring of island tops so as to transfer about 50 percent of the wet adhesive binder uniquely to the tops of the islands but not to the island valleys. Abrasive particles or abrasive agglomerates can be separately prepared for transfer to the adhesive coated islands. Here, a thin layer of diamond or other abrasive particles or abrasive agglomerates are uniformly distributed within a shallow grooved annular shape cut out of a container plate with the use of a scrapper blade, and if necessary, a spreader blade. The top adhesive wetted surface of the annular patterned islands backing disk sheet is then brought into contact with the loose abrasive particles or abrasive agglomerates laying flat in the shallow annular grooved container plate. Then the adhesive binder surface of the island tops is lightly pressed into the loose abrasive particles or abrasive agglomerates to transfer a single layer of abrasive particles or abrasive agglomerates to the adhesive binder wetted island tops. Then after the diamonds or other abrasive particles are coated on the island tops, the disk is processed by use of a vibrating bar to precisely height-level the exposed tops of each particle. The abrasive particles can be driven sufficiently deep into the adhesive binder by vibration to level the exposed particle tops to the same uniform height from the bottom of the backing sheet. It is desired that the particles are not driven deep enough into the binder adhesive to contact the backing surface which results in a uniform thickness of the abrasive particle top surfaces. A low shrink or zero shrink abrasive particle adhesive binder is one of many binder adhesives which can be used. The binders can be cured or solidified by a variety of methods including a two-part chemical polymerization reaction, UV cure, heat cure, E-beam (electron beam) or a laser cure to fixture each particle at its precise height. Other particles or powders can be added to the diamonds or other abrasive particles in the trench to act as spacers between the diamond particles when they are brought in contact with the wet island adhesive binder.

Use of a vibrating bar to level the tops of the abrasive particles can have a wide range of frequencies and motion excursion amplitudes. Low frequencies of 20, 60 and 120 cycles per second (Hertz) can be used with excursions of 0.0001 to 0.005 inches (0.0025 0.127 mm), as long as the bar always has a constant lower position, to drive each particle level with the other adjacent particles. Frequencies can be much higher, up to 20,000 Hertz, where the corresponding amplitudes can be only 0.0001 inch (0.0025 mm) or less. Use of a hardened steel bar with precisely ground diameters can be used as a vibration leveling bar where the rounded leading edge of the round bar can aid in leveling extra high abrasive particles. Even though the total excursion of the vibrating bar is less than the variation in excess height of the individual particles, which are being leveled, the rounded bar would aid in bringing all particles to a nominal equal height. Wear on the bar due to moving contact with the abrasive particles can be easily compensated for by occasionally rotating the round bar a small angular increment so that a new unused surface of the bar is in contact position with the abrasive particles.

Special techniques can be employed to promote adhesion of the binder to the diamond particles and also to improve adhesion to the island top surface areas. The surface energy of the particles can be increased and the adhesion characteristics of the particles and the adhesion characteristics of the island top surfaces can be enhanced by methods or processes including: sand blasting; coating the individual abrasive particles; applying sputtered metal coatings to the abrasive particles; using flame treatments, corona treatments and surfactant coatings, and so on. The backing surface may be conditioned by various techniques to promote adhesion of the raised island foundation material to the backing surface.

A number of different binder adhesives can be used including ultraviolet (UV) or light-cure acrylics, polyimides, light-cure cyanoacrylates, acrylics, cyanoacrylates, polyurethanes, one part or two part epoxies, different types of phenolics and two part acrylics. A preferred binder is methyl ethyl keytone (MEK) solvent diluted phenolics. The abrasive particles would be fixtured stable to the backing adhesive binder in their precise height position soon after the leveling action of the vibrating bar by partially solidifying or curing the binder before the particles can move relative to their precision height controlled position. Subsequently, the binder can be fully cured or solidified for full strength over a longer period of time and the binder cure can be enhanced with the use of light sources, lasers, heat, electron beam energy and moisture reactions.

Creating island type abrasive media by this technique of forming island base foundations, making the island tops flat, applying an adhesive binder, attaching loose abrasive particles, precisely height leveling the particles and effecting a strong stable cure of the binder with perhaps the addition of top sizing coats of materials results in the production of very precise grinding media. These thin, flexible abrasive sheets, disks and belts would have superior grinding and polishing capability compared to existing abrasive products and they would be less expensive than existing commercial products. These disk articles can have large fixed abrasive disk nominal diameter sizes, have annular ring abrasive shapes and these products can also be formed as continuous web abrasive material which can later be fabricated into continuous belts.

The coatings and the type of abrasive particles as described here, of which many have been traditionally used in the abrasive industry to surface-coat flat web materials or to manufactures abrasive articles, can also be applied in a sequence of process steps to form raised island structures that are attached to flexible backing sheets or to coat the top flat surfaces of raised island structures with abrasive particles or abrasive agglomerates. The particles are attached to the island flat top surfaces. The island flat surface coating process steps or procedures may be similar to old traditional procedures or the procedures described may be new and unique or they may be a combination of old and new procedures. Various binder systems and coating techniques that are commonly used in the abrasives industry for surface coating non-raised island flexible web backing material are described in some detail to provide information that can readily be utilized to provide similar abrasive particle coatings on the surfaces of raised islands that are attached to flexible backing materials. The backing materials, the resin binders and the backing surface preparations or the backing surface conditioning that are commonly used for the manufacture of abrasive articles can also be used for backings, to prepare backing sheets for the attachment of island foundation materials and to form the flat topped raised island foundation structures that are attached to the backings.

All polymers, including epoxy and phenolics, that are used as abrasive particle or island structure binders area are cured with a time-and-temperature relationship. With phenolics, if they are cured at a low temperature, they will stay soft for a period of time ranging from minutes to hours or even to days.

Generally, a thin 10 micrometer binder coating is applied to a web backing and the abrasive particle powder, which is larger than 10 micrometers in diameter, is applied or "powdered" onto the wet binder surface. These abrasive particles are too large to sink into the coating binder and become fully covered. Generally, the particles are only adhesively wetted on their bottom surface, especially for particles which are 30 micrometers or larger in diameter. It is possible to apply a very thick binder coating and then partially cure it to form a thin skin on the top surface which is sufficiently strong to support abrasive mineral particles so they do not sink into the depth of the binder and the particles become completely enveloped in the binder coating. In order to achieve the full highest temperature glass transition temperature of a binder, the binder must be cured at a high enough temperature that exceeds the maximum rated binder material glass transition temperature. When a binder coating has been heated to a low, or modest, temperature sufficient to have developed enough strength to support the abrasive particles, then, when the temperature is raised somewhat higher, the coating will tend to become liquid or wet and it will adhesively bond the abrasive particles to the backing surface. After this, the particle coated backing can be given additional curing to further strengthen the bond between the particles and the backing. At this "B stage" of intermediate cure, a size coat can be applied to the article and it will tend to create a superior strength, more integral bond with the make coat as compared to applying a size coat to a fully cured make coated abrasive sheet. The size coat will also tend to bridge across from particle to particle and thus provide the primary structural support of a particle to withstand forces generated by grinding action.

The make coat polymer resin adhesive applied to an raised island top surface would typically be about 10 micrometers thick. The abrasive particles would typically be from 0.1 to 150 micrometers in diameter. The diamond, cubic boron nitride, silicone carbide or aluminum oxide abrasive particle coatings would be either coated as a particle powder onto a wet make-coat binder resin or the abrasive particles or abrasive agglomerates would be coated as a abrasive and resin slurry mixture coating. The abrasive coatings can be applied directly onto a flat web backing (for the production of traditional abrasive articles) or the abrasive coatings can be applied onto the top flat surfaces of raised islands that are attached to a flexible backing material. Various other powdered materials can be used as a filler material along with the abrasive particles in the slurry mixture to assure a minimum gap exists between individual abrasive particles after the slurry has been coated. The slurry coating of abrasive particles or abrasive agglomerates can be applied as a single binder coat as a make coat, or alternatively, a size coat of binder resin can be subsequently applied over the make coat to structurally reinforce the bond of the individual abrasive particles or abrasive agglomerates to the backing or to the island top surfaces. The polymer size coat applied over the abrasive particles may contain particles of clay or feldspar additives that have traditionally been used as grinding or lapping action aids. Another candidate mineral additive, that can be used in place of feldspar, is minsper. A super size coating can also be applied over the size coating to prevent the buildup of grinding swarf, to improve lubrication qualities of the abrasive surface, and perform other functions. These lubricants can include fluorine based additives or silicone based additives. The web backing may include polyester, PET (polyethylene teraphalate). If desired, a Kapton based material may be used to provide a backing with a high glass transition temperature which can be used for processing an abrasive disk or belt article for high temperature, above 150 up to 200 degrees C., cures without experiencing shrinkage or backing sheet relaxation shrinkage which would unevenly change the backing and abrasive disk thickness.

A number of different types of binders may be used with or in place of solvent based phenolics which is preferred as binder to provide good abrasive particle bonding strength for attaching particles to backings or island top surfaces. Water based phenolics can be used, but more care must be exercised in the binder formulation process and the binder cure process to achieve the same particle bond strength and bond durability characteristics that is achieved when using solvent based phenolics. Often an effective binder solvent such as MEK (methyl ethyl ketone) is used. Other non-phenolic polymers may be used as abrasive binders. For example, a polyimide binder system can be used as an abrasive particle binder system. Many of the different solvent based polyimide adhesive binders were developed for application in adhesively bonding metal or composite articles strongly together for use in high speed aircraft which experience high temperature operational environments. Some solvents which can be used for polyimide binders include DMAE or dimethylacetamide, NMP, N-methylpkrrolidone, which is a preferred solvent, and DMSO, Dimethylsulfoxide. Many different types of binders can be used to either attach abrasive particles or abrasive agglomerates to the top surface of the raised islands or they can be used to form the foundations of the raised islands. Primer coatings can be applied to the smooth surface of backing films or to island top surfaces to increase adhesion of the make coat or other coatings to the backing. Also other chemicals, or dry mechanical or solvent wetted mechanical abrasion treatments or corona treatment, UV treatment, electron beam treatment, or flame treatment, may be applied to a smooth backing to enhance the adhesion of raised island foundation materials. Different dye coloring agents can be added to either the pre-size, make or size coat binders to allow an easy method of classifying or sorting the different raised island abrasive articles. Each color could represent a specific nominal size of abrasive particle or type of abrasive particle. For instance, a light pink coloring agent could be used for a 30 micrometer diameter diamond abrasive and a light brown color could be used for a 50 micrometer diamond disk. Slurry coats of mixtures of abrasive particles or abrasive agglomerates and binders may include a combination of all the above binders and fillers. These abrasive slurry coats can also be applied to the surfaces of the raised islands attached to the backing sheets.

Abrasive Slurry Coated Backing Islands

Problem: Abrasive particles or abrasive agglomerates coated on the top of islands attached to abrasive backing sheet material must be initially flat relative to the backside of the backing, must wear down uniformly, must be strongly bonded to the backing, must be uniformly separated from each other, and must be bonded with an adhesive which will not break down in the presence of water, chemical lubricants, intense heat generated by grinding friction, and which will not sustain burning or release toxic fumes when burned. Typical coating thicknesses of 0.5 to 2 thousandths of an inch (0.0005 to 0.002 inch or 0.013 to 0.051 mm) are far in excess of the diameter of 2.5 micrometer (0.0001 inch) particles which means small fine abrasive particles must be stacked in layers.

Solution: Use of diamonds that are metal plated to metal flex bond abrasive disks or to the flat surface of a wheel or to the peripheral round surface of a grinding wheel are known to be tough, have high material removal rates but are not capable of polishing smooth surfaces. Coated fine diamond particles from 0.1 to 80 micrometers provide good polishing media. Two methods may be used to apply an organic binder abrasive coating. The first method is to apply a binder adhesive coating first to a backing and then dust on diamond particles. The second is to premix diamond particles and other fillers in a slurry and coat this mixture on a backing. The backing may have a precoat and a size coat also. The preferred binder system would be one of a variety of the commonly used phenolics for abrasive articles. Here a phenolic resin with about 70 percent solids would be diluted with MEK or other solvents to about 50 percent solids. Then, mono crystal diamond particles would be mixed in the resin along with clays and other powdered materials and this mixed slurry coating would be applied to the island top surfaces. The slurry would be spread flat and polymerized to a solidified state with the use of an oven which has low velocity air currents and progressively increased temperature heating. Heat would first drive off the solvents that reside deep within the interior portions of the coated slurry resin layer by diffusion flow of the solvent to the resin surface without disrupting the slurry resin surface. A final slurry resin cure temperature of approximately 250 degrees F. may be used for the final cure. Large sized friable hollow glass bubbles can be used in the mix which would act as surface rollers to establish the thickness of the coating with a doctor blade. Some limited shrinkage of the resin binder, due to the volume loss that occurs with the evaporation of the contained solvent, reduces the volume of the residual resin which tends to expose the top surfaces of the individual diamond particles. Clay particles and other glass microspheres or other materials can be used as a filler which would control the wear rate of the diamond particles and also structurally support the diamonds. New sharp edges of new exposed diamond particles would be continuously presented as the clay and other fillers that surround the particles are eroded away during lapping. The slurry coating can be applied to island foundations which have the upper island plateau edges eroded by sandblast or other means to eliminate the abruptly sharp edges of the abrasive particles located at the raised peripheral edges of each island surface. The sandblasting would also provide a better structural anchor by improving the adhesive bonding of the abrasive coating to the island surface. The rounded edges provided by the sandblasting would allow the slurry coating to hang down over the rounded edges which would increase the strength of the bond of the abrasive coating to the island top surface in resisting abrading forces as the rounded edge of the coating would tend to mechanically lock the abrasive coating island cap to the island top. A trailing coating edge caused by a doctor blade can provide more overhang and the disk could preferentially be operated or rotated in a direction opposite the overhang.

Island Height Gauge Matching Plates

Problem: Island height molding plates used to produce a precisely even thickness of abrasive coatings on the top surfaces of an annular pattern of islands attached to a thin flexible disk backing sheet must be wear resistant and have a precise gap distance between the plate matching surfaces. Machining or flat lapping large plate annular surfaces is expensive when producing plates flat enough they can be rotated and used in any circumferential position to form an island height molding gap which is flat within 0.0001 inch (0.0025 mm).

Solution: The abrasive island media disk backing is thin and flexible so the overall sheet thickness only has to be height controlled locally at any given sector of the disk. The precise thickness flexible abrasive disk is used on a grinding or lapping machine by conforming to a flat rotary grinder platen. Because of how the thin flexible abrasive disk is mounted to a flat grinder platen, the disk can be manufactured by height gage mold plates that may not be perfectly flat. Instead, it is only necessary that a precise gap distance be maintained along the annular ring contact surface of two matching mold plates. Plates that are machined to inexpensive commercial tolerances can be used as the base parts to produce a mold plate assembly having a precision annular height gap with the use of inexpensive thickness sheet stock material. Both shim stock metal, and also plastic web backing material, are inexpensive to purchase and which can have a thickness uniformity well within the desired 0.0001 inch (0.0025 mm) tolerance. A piece of this hardened stainless steel shim stock material can be used as a wear surface for oscillation contact of the upper mold plate with the abrasive island slurry by adhesively bonding shim stock to the raised annular ring of one mounting gage plate. Then another piece of precise web precision thickness polyester web material, or shim stock, can be used to conformingly replicate and match the surface of the shim stock covered mold plate directly to the surface of the matching second mold plate. This conformal duplication of the upper mold plate surface to the lower mold plate is accomplished by laying the gap spacer web piece across the surface of the steel covered plate, applying a coating of adhesive to the raised annular ring portion of the matching mold plate and lowering it in alignment with the first mold plate. A small force is applied to clamp the two plates together, which then forms a matching surface replica of the steel covered plate on the matching mold plate after the adhesive solidifies. The thickness gage sheet (or spacer web piece) is removed, and discarded, leaving an adhesive plastic coated mold plate that precisely conforms to the steel covered mold plate at the original registration or orientation of the two plates. When abrasive island height gauging is accomplished by use of the mold plate assembly, the plate with the plastic adhesive surface is used to contact the backside of the abrasive disk backing and the hardened steel covered plate is used in contact with the abrasive slurry. Both plates would be appositionally registered to each other in the position they were originally replicated together.

Screen Formation of Spherical Ceramic Abrasive Agglomerates

Problem: It is desired to form spherical ceramic abrasive particle composite agglomerates or beads that are made of abrasive powder particles mixed with metal or non-metal oxides or other materials where each of the agglomerates have the same nominal size. Production of equal-sized beads increases the bead product utilization as expensive composite beads that are not of the desired size at times do not have to be discarded. Also, the use of undersized beads that do not contact a workpiece surface is avoided. Spherical composite abrasive agglomerate beads produced by the present methods of manufacturing tend to result in the simultaneous production of agglomerate beads having a wide range of sizes during the process of encapsulating a single abrasive particle size. When this wide range of different sized agglomerate beads are coated together on an abrasive article, the capability of the article to produce a smooth finish is primarily related to the size of the individual abrasive particles that are encapsulated within a bead body, rather than being related to the diameter of the bead body. Also, when abrasive beads are coated in a monolayer on the surface of an abrasive article, it is desired that each of the individual beads have approximately the same diameter to effectively utilize all of the abrasive particles contained within each bead. If small beads that are mixed with large beads are coated together on an abrasive article, contact of the small beads with a workpiece surface is prevented because the adjacent large diameter beads contact the surface first. Typically the number of particles contained within a small bead is insufficient to provide a reasonable grinding or lapping abrading life to the abrasive article before all of the particles are worn away. The number of individual particles encapsulated within the body volume of a spherical agglomerate bead is proportional to the cube of the diameter of the bead sphere but the average height of the bulk of the particles, located close to the sphere center, is directly proportional to the sphere diameter. A small increase in a bead diameter results in a modest change of the bulk agglomerate center height above the surface of a backing sheet, but the same diameter change results in a substantial increase in the number of individual abrasive particles that are contained within the bead body. Most of the volume of abrasive particles are positioned at a elevation raised somewhat off the surface of the backing sheet, or the surface of a raised island, that results in good utilization of nearly all the encapsulated abrasive particles during the abrading process before the agglomerate is completely worn down. Even though the spherical bead shape is consumed progressively during the abrading process, the body of the remaining semi-spherical agglomerate bead structure has sufficient strength and rigidity to provide support and containment of the remaining abrasive particles as they are contacted by a moving workpiece surface. It is necessary to provide gap spacing between adjacent agglomerate beads to achieve effective abrading. The presence of coated undersized non-contacted agglomerate beads results in the water and swarf passageways existing between the large diameter agglomerates being blocked by the small agglomerates. The nominal size of the abrasive bead diameters is also selected to have sufficient sphere-center heights to compensate for both the thickness variations in the abrasive sheet article and also the out-of-flatness variations of the abrasive sheet platen or platen spindle. Overly small beads located in low-spot areas on a non-flat platen rotating at very high rotational speeds are not utilized in the abrading process as only the largest sized beads, or the small beads located at the high-spot areas of a rotating abrasive disk article, contact the surface of a workpiece. When a non-flat abrasive surface rotates at high speeds, a workpiece is typically driven upward and away from low-spot areas due to the dynamic impact effects of abrasive article high-spots periodically hitting the workpiece surface during the high speed rotation of a workpiece contacting abrasive platen. Workpieces subjected to these once-around impacts are prevented from traveling up and down in contact with the uneven abrasive surface due to the inertia of the workpiece or the inertia of the workpiece holder. Most of an abrasive article beads can be utilized if the abrasive platen is operated at sufficiently low rotational speeds where a small or low inertia workpiece can dynamically follow the periodically changing contour of a non-flat moving abrading surface. However, the abrasion material removal rate is substantially reduced at these low surface speeds as the material removal rate is thought to be proportional to the abrading surface speed. Use of very large diameter agglomerate spheres or beads addresses the problem of abrasive article thickness variations or platen surface flatness variations. Very large beads introduce the disadvantage of tending to create a non-level abrading surface during abrading operations as the coated abrasive is too thick to retain its original-reference precision flatness over extended abrading use. A non-level abrasive surface typically can not generate a flat surface on a workpiece. There is a trade-off in the selection of the abrasive coating thickness or selection of the size of abrasive beads coated on an abrasive article. If the abrasive coating is too thick or the beads too large, the original flat planer surface of the abrasive article ceases to exist as abrading wear proceeds. If the abrasive coating is too thin, or the beads are too small, the abrasive article will wear out too fast. High surface speed operation with super hard abrasive particles, including diamond and cubic boron nitride, is very desirable for abrading manufacturing processes because of the very high material removal rates experienced with these abrasives when used in a high surface speed abrading operation. It is not a simple process to separated the undesirable under-sized beads from larger sized beads and crush them to recover the expensive abrasive particle material for re-processing to form new correct-sized beads. In many instances, the too-small beads are simply coated with the correct-sized spherical agglomerate beads even though the small beads exist only as a cosmetic component of the abrasive coated article. It is preferred that equal-sized bead agglomerates have a nominal size of less than 45 microns when enclosing 10 micron, or smaller, abrasive particles that are distributed in a porous ceramic erodible matrix. Another use for equal-sized non-abrasive spherical beads is for creating raised islands on a backing sheet by resin coating island areas and coating the wet resin areas with these beads to form equal height island structures that can be resin coated to form island top flat surfaces. Equal sized beads can also be used in many commercial, agricultural and medical applications.

Solution: A microporous screen endless belt or microporous screen sheet having woven wire rectangular openings can be used to form individual equal-sized volumes of an aqueous based ceramic slurry containing abrasive particles. The screen cell volumes of a fine 325 rating mesh screen are approximately equal to the volume of the desired size spherical agglomerates or beads. Cell volumes are approximately equal to the thickness of a screen multiplied by the open cell cross sectional area. The screen cells are filled with a slurry mixture and an impinging fluid is used to expel the cell slurry volumes into a gas or liquid environment. Surface tension forces acting on the suspended or free-traveling slurry lumps forms the liquid slurry volumes into individual spherical bead shapes that are solidified. Beads can then be collected, dried and fired to produce abrasive composite beads that are used to coat flexible sheet backing material. Box-like cell volumes that are formed by screen mesh openings have individual cell volumes equal to the average thickness of the woven wire screen times the cross-sectional area of the rectangular screen openings. Individual rectangular cell openings formed by the screen interwoven strands of wire have irregular side walls and bottom and top surfaces due to the changing curved paths of the woven screen-wire strands that are routed over and under perpendicular wires to form the screen mesh. These irregular rectangular cell openings can be made more continuous and smooth by immersing the screen in a epoxy, or other polymer material, to fully wet the screen body with the polymer, after which, the excess liquid polymer is blown off at each cell by a air nozzle directed at a angle to the screen surface. The polymer remaining at the woven wire defined rectangular mesh edges of each cell will tend to form a more continuous smooth surface shape to each cell due to surface tension forces acting on the polymer, prior to polymer solidification. Screens can also be coated with a molten metal that has excess metal residing within the rectangular cell shape interior that is partially removed by mechanical shock impact, or vibration, or air jet to make the cell wall openings more continuous and smooth. Also, screens can be coated with release agents including wax, mold release agents, silicone oils and a dispersion of petroleum jelly dissolved in a solvent, including acetone or Methyl ethyl keytone (MEK). Screen materials having precision small sized openings are those woven wire screens commonly used to sieve size-grade particles that are less than 0.002 inches (51 micrometers) in diameter. These screens can be used to form small sized abrasive agglomerates. Another open cell sheet material having better defined cell walls than a mesh screen is a uniform thickness metal sheet that has an array pattern of circular, or other shaped, perforation holes created through the sheet thickness by chemical etching, laser machining, electrical discharge machining (EDM), drilling or other means. Also, perforated metal sheets can be fabricated by the electro deposition of metal. The smooth surface of both sides of the electrodeposited metal sheet cell-hole material allows improved hole slurry filling, slurry expelling and slurry clean-up characteristics as compared to a mesh screen cell-hole material. A endless screen or perforated belt can be made by joining two opposing ends of a very thin mesh screen, or of a perforated sheet, or an electrodeposited sheet, together to form an joint that is welded or adhesively bonded. Butt joint, angled butt joint, or lap joint belts can be constructed of the cell-hole perforated sheet material or sheet screen material. A belt butt joint that has inter-positioned serrated joint edges that are bonded together with an adhesive, solder, brazing material or welding material allows a strong and flat belt joint to be made. Butt joint bonding materials that level-fill up belt material cell holes may extend beyond the immediate borders of the two joined belt ends to strengthen the belt joint as these filled cell holes are not significant in number count compared to the remainder of open cell holes contained in the belt. The belt lap joint is practical as a 25 micron (0.001 inch) thick cell sheet material would only have a overlap joint thickness of approximately 50 microns (0.002 inches) and preferably would have a 0.5 to 1.5 inch (12.7 to 38 mm) long overlap section. This overlap section area can easily pass through a doctor blade or nip roll cell filling apparatus. Cell openings that reside at the starting and trailing edges of the joint may be smaller than the average cells but these undersized cells would be few in number compared to the large number of cells contained in the main body of the belt. Cell openings within the belt joint overlap area would typically be filled with adhesive. Extra small agglomerates produced by the few extra small cells located at the leading and trailing belt joint edges can simply be discarded with little economic impact. The endless belt can have a nominal width of from 0.25 to 40 inches (0.64 to 101.6 cm) and a belt length of from 2.5 to 250 inches (6.4 to 640 cm) or more. The belt can be mounted on two rollers and all or a portion of the rectangular or round cell openings in the belt can be filled with abrasive slurry. Belt cell holes would be filled level to the top and bottom surfaces of the belt by use of a nipped coating roll, or one or more doctor blades, or by other filling means. Two flexible angled doctor blades can be positioned directly above and below each other on both sides of the moving belt to mutually force the slurry material into the cell holes to provide cells that are slurry filled level with both surfaces of the belt. Another form of open cell hole sheet or screen that can be used to form spherical beads is a screen disk that has an annular band of open cell holes where the cell holes can be continuously level filled in the screen cell sheet with a oxide mixture solution, or other fluid mixture material, on a continuous basis by use of doctor blades mutually positioned and aligned on both the upper and lower surfaces of the rotating screen disk. The solution filled cell volumes can then be continuously ejected from the screen cells by an impinging fluid jet, after which, the cell holes are continuously refilled and emptied as the screen disk rotates. Inexpensive screen material may be thickness and mesh opening size selected to produce the desired ejected mixture solution sphere size. The screen disk can be clamped on the inner diameter and the inner diameter driven by a spindle. The screen disk may also be clamped on the outer diameter by a clamp ring that is supported in a large diameter bearing and the outer support ring rotationally driven by a motor which is also belt coupled to the inner diameter support clamp ring spindle shaft. A stationary mixture solution dual doctor blade device would level fill the screen cell openings with the mixture solution and a stationary blow-out head located at another disk tangential position would eject the mixture solution cell volume lumps from the disk screen by impinging a fluid jet on the screen. Multiple pairs of solution filler and ejector heads can be mounted on the disk screen apparatus to created the ejected solution lumps at different tangential locations on the disk screen. A disk screen apparatus can be constructed with many different design configurations including those that use hollow spindle shafts and support arms that clamp the outer screen diameter. Also, the screen cell holes located in the area of the support arms may be permanently filled to prevent filling of the cell holes with a liquid mixture solution in those areas to prevent ejected solution lumps from impacting the support arms. A cone shaped screen can also be constructed using similar techniques as those used for construction of the disk screens.

An abrasive particle fluid slurry can be made of a water or other solvent based mixture of abrasive particles and erodible filler materials including metal or non-metal oxides and other materials, or mixtures thereof. Equal sized spherical shaped abrasive or non-abrasive hollow or solid or porous beads can be made in open-cell sheets, disks with an annular band of open cell holes or open cell belts from a variety of materials including ceramics, organic materials, polymers, pharmaceutical agents, living life-forms, inorganic materials or mixtures thereof. Hollow abrasive beads would have a outer spherical shell comprised of a agglomerate mixture of abrasive particles, a gas inducing material and a metal oxide material. These beads would be created after forming the agglomerate mixture lumps in the open cells of the screen and ejecting these lumps from the screen body by the same type of techniques that are commonly used to form hollow ceramic spheres from lumps of a water mixture of ceramic materials. Here, the mixture of water, gas inducing material, metal oxide and abrasive particles would be substituted for the water mixture of metal oxides and other gas inducing materials used to make glass spheres. A metal oxide material used to make beads is Ludox® a colloidal silica sol, where sol is a suspension of an oxide in water, a product of W.R. Grace & Co., Columbia, Md. These beads can be used in many commercial applications including use as plastic fillers, paint additives, abrasion resistant and corrosion resistant surface coatings, gloss reduction surface coatings, organic and inorganic capsules, and for a variety of agricultural, pharmaceutical and medical capsule applications. Porous cell-sheet spheres can be saturated with specialty liquids or medications and the spheres can be surface coated with a variety of organic, inorganic or metal substances. A large variety of materials can be capsulized in equal sized spheres for a variety of product process advantages including improving the material transport characteristics of the encapsulated material or to change the apparent viscosity or rheology of the materials that are mixed with the capsule spheres.

It is preferred that the individual abrasive or other material particles have a maximum size of 65% of the smallest cross-section area dimension of a cavity cell that is formed by the rectangular opening in the wire mesh screen, or perforated belt circular holes, to prevent individual particles from lodging in a belt cell opening. A fluid jet stream, including air or other gas or water or solvent or other liquids, or sprays consisting of liquids carried in a air or gas can be directed to impinge fluid on each slurry filled cell to expel the volume of slurry mixture from each individual cell into an environment of air, heated air or heated gas or into a dehydrating liquid. A liquid or air jet having pulsating or interrupted flows can also be used to dislodge and expel the volume of slurry contained in each belt cell hole from the belt. It is desired to expel the full volume of slurry contained in a cell opening out of the cell as a single volumetric slurry entity rather than as a number of individual slurry volumes consisting of a single large volume plus one or more smaller satellite slurry volumes. Creation of single expelled slurry lumps is more assured when each slurry lump residing in a cell sheet is subjected to the same dynamic fluid pressure slurry expelling force across the full cross-sectional area of each cell slurry surface. The fluid jet nozzles can have the form of a continuous fluid slit opening in a linear fluid die header or the linear fluid jet nozzle can be constructed from a single or multiple line of hypodermic needles joined at one open end in a fluid header. The linear nozzle would typically extend across the full width of the cell sheet or belt. A fluid nozzle can also have a single circular or non-circular jet hole and can be traversed across the full width of the cell sheet or cell belt. Slurry volumes would be expelled from the multiple cell openings that are exposed to a fluid jet line where the cell sheet or cell belt is either continuously advanced under the fluid jet or moved incrementally. A fluid jet head can also move in straight-line or in geometric patterns in downstream or cross-direction motions relative to a stationary or moving cell sheet or cell belt. Further, a linear-width jet stream can be directed into the gap formed between two closely spaced guard walls having exit edges positioned near the cell sheet surface. The guard walls focus the fluid stream into a very narrow gap opening where the fluid impinges only those cells exposed within the open exit slit area. Another technique is to use a single guard wall that concentrates and directs a high energy flux of fluid toward slurry filled cell holes as they arrive under the wall edge from an upstream belt location of a moving cell belt. Other mechanical devices can be used that expose a fixed bandwidth of slurry filled cells to the impinging fluid on a periodic basis where sections of a cell belt or screen are advanced incrementally after each bandwidth of slurry lumps are fluid expelled from the cell sheet during the previous fluid expelling event. Slurry lumps can also be expelled from cells holes by mechanical means instead of impinging fluids by techniques including the use of vibration or impact shock inputs to a filled cell sheet. Pressurized air can be applied to the top surface or vacuum can be applied to the bottom surface of sections of slurry filled cell sheets or belts to expel or aid in expelling the slurry lumps from the cell openings.

A cell belt may be immersed in a container filled with dehydrating liquid and the slurry cell volumes expelled directly into the liquid. Providing a dry porous belt that does not directly contact a dehydrating liquid reduces the possibility of build-up of dehydrated liquid solidified agglomerate slurry material on the belt surface as a submerged belt travels in the dehydrating liquid. The expelled free-falling lump agglomerates can individually travel some distance through air or other gas onto the open surface of a dehydrating liquid where they would become mixed with the liquid that is still or agitated. The agitated dehydrating liquid can be stirred with a mixing blade to assure that the slurry agglomerates remain separated and remain in suspension during solidification of the beads. The use of dehydrating liquids is well known and includes partially water-miscible alcohols or 2-ethyl-1-hexanol or other alcohols or mixtures thereof or heated mineral oil, heated silicone oil or heated peanut oil. In the embodiment where one end of the open-cell belt is submerged in a container of dehydrating liquid provides that the slurry lumps are expelled directly into the liquid without first contacting air after being expelled from the belt. The expelled free-falling agglomerates can also be directed to enter a heated air, or other gas, oven environment. A row of jets can be used across the width of a porous belt to assure that all of the slurry filled belt cell openings are emptied as the belt is driven past the fluid jet bar. The moving belt would typically travel past a stationary fluid jet to continuously expel slurry from the porous belt cell openings. Also, the belt would be continuously refilled with slurry as the belt travels past a nip-roll or doctor blade slurry filling station. Use of a moving belt where cells are continuously filled with slurry that is continuously expelled provides a process where production of spherical beads can be a continuous process. Surface tension forces, or other forces, acting on the individual ejected free-travelling or suspended slurry lumps causes them to form spherical agglomerate beads. In aqueous ceramic slurry mixtures, water is removed first from the exterior surface of the beads that causes the beads to become solidified sufficiently that they do not adhere to each other when collected for further processing. Agglomerate beads are solidified into green state spherical shapes when the water component of the water-based slurry agglomerate is drawn out at the agglomerate surface by the dehydrating liquid or by the heated air. Instead of using a slurry mixture in the open cell sheets, molten thermoplastic-type or other molten cell filling materials may be maintained in a liquid form within the sheet or belt cell openings with a high temperature environment until they are fluid spray jet ejected into a cooling fluid median to form sphere shaped beads. A flat planar section of open-cell mesh screen material or of perforated-hole sheet material can also be used in place of an open cell sheet belt to form slurry or other material beads.

Dehydrated green composite agglomerate abrasive beads generally comprises a metal oxide or metal oxide precursor, volatile solvent, e.g., water, alcohol, or other fugitives and about 40 to 80 weight percent equivalent solids, including both matrix and abrasive, and the composites are dry in the sense that they do not stick to one another and will retain their shape. The green granules are filtered out, dried and fired at high temperatures to remove the balance of water, organic material or other fugitives. The temperatures are sufficiently high to calcine the agglomerate body matrix material to a firm, continuous, microporous state (the matrix material is sintered), but insufficiently high to cause vitrification or fusion of the agglomerate interior into a continuous glassy state. Glassy exterior shells can also be produced by a vitrification process on oxide agglomerates, including abrasive agglomerates, where the hard glassy shell is very thin relative to the diameter of the agglomerate by controlling the ambient temperature, the dwell time the agglomerate is exposed to the high temperature and also by controlling the speed that the agglomerate moves in the high temperature environment. Using similar techniques glassy shells can be produced by the oxide vitrification process to produce glassy shells on hollow agglomerates. The sintering temperature of the whole spherical composite bead body is limited as certain abrasive granules including diamonds and cubic boron nitride are temperature unstable at high temperatures. Solidified green-state composite agglomerate beads can be fired at high temperatures over long periods of time with slowly rising temperature to heat the full interior of an agglomerate at a sufficiently high temperature to calcine the whole agglomerate body. Solidified agglomerates that are produced in a heated air or gas environment, without the use of a dehydrating liquid, can also be collected and fired. A retort furnace can be used to provide a controlled gas environment and a controlled temperature profile during the agglomerate bead heating process. An air, oxygen or other oxidizing atmosphere may be used at temperatures up to 600 degrees C. but an inert gas atmosphere may be preferred for firing at temperatures higher than 600 degrees C. Dry and solidified agglomerates having free and bound water driven off by oven heating can also be further heated very rapidly by propelling them through an agglomerate non-contacting heating oven or kiln. The fast response high temperature agglomerate bead surface heating can produce a hard shell envelope on the agglomerate surface upon cooling. The thin-walled hardened agglomerate envelope shell can provide additional structural support to the soft microporous ceramic matrix that surrounds and supports the individual hard abrasive particles that are contained within the spherical agglomerate shape. The spherical agglomerate heating can be accomplished with sufficient process speed that the interior bulk of the agglomerate remains at a temperature low enough that over-heating and structurally degrading enclosed thermally sensitive abrasive particles including diamond particles is greatly diminished. Thermal damage to temperature sensitive abrasive particles located internally within the spherical agglomerates during the high temperature process is minimized by a artifact of the high temperature convective heat transfer process wherein very small spherical beads have very high heat transfer convection coefficients resulting in the fast heating of the agglomerate surface. Agglomerates can be introduced into a heated ambient gas environment for a short period of time to convectively raise the temperature of the exterior surface layer while there is not sufficient time for significant amounts of heat to be thermally conducted deep into the spherical agglomerate interior bulk volume where most of the diamond abrasive particles are located. The diamond particles encapsulated in the interior of the agglomerate are protected from thermal damage by the heat insulating quality of the agglomerate porous ceramic matrix surrounding the abrasive particles. Special ceramics or other materials may be added to the bead slurry mixture to promote relatively low temperature formation of fused glass-like agglomerate bead shell surfaces.

Equal sized abrasive beads formed by open cell sheet material can be attached to flat surfaced or raised island metal sheets by electroplating or brazing them directly to the flat sheet surface or to the surfaces of the raised islands. Brazing alloys include zinc-aluminum alloys having liquidus temperatures ranging from 373 to 478 degrees C. Corrosion preventing polymer coatings or electroplated metals or vapor deposition metals or other materials may be applied to the abrasive articles after the beads are brazed to the article surface. These beads can be individually surface coated with organic, inorganic and metal materials and mixtures thereof prior to the electroplating or brazing operation to promote enhanced bonding of the beads to the electroplating metal or the brazing alloy metal. Bead surface deposition metals can be applied to beads by various techniques including vapor deposition. Metal backing sheet annular band abrasive articles having resin coated, electroplated or brazed abrasive particles or abrasive agglomerates bonded to raised flat-surfaced islands are preferred to have metal backing sheets that are greater than 0.001 inch (25.4 microns) and more preferred to be greater than 0.003 inches (76.2 microns) thickness in the backing sheet areas located in the valleys positioned between the adjacent raised islands.

It is desired to use a color code to identify the nominal size of the abrasive particles encapsulated in the abrasive equal sized beads that are coated on an abrasive sheet article. This can be accomplished by adding a coloring agent to the water based ceramic slurry mixture prior to forming the composite agglomerate bead. Coloring agents can also be added to non-abrasive component slurry mixtures that are used to form the many different types of spherical beads that are created by mesh screen or perforated hole sheet slurry cells to develop characteristic identifying colors for the resultant beads. Coloring agents used in slurry mixtures to produce agglomerate sphere identifying colors are well known in the industry. These colored beads may be abrasive beads or non-abrasive beads. The formed spherical composite beads can then have a specific color that is related to the specific encapsulated particle size where the size can be readily identified after the coated abrasive article is manufactured. The stiff and strong spherical form of an agglomerate bead provides a geometric shape that can be resin wetted over a significant lower portion of the bead body when bonding the bead to a backing surface. The wet resin forms a meniscus shape around the lower bead body that allows good structural support of the agglomerate bead body. Resin surrounding the bottom portion of a bead reinforces the bead body in a way that prevents total bead body fracture when a bead is subjected to impact forces on the upper elevation region of the bead. This resin also provides a strong bonding attachment of the agglomerate bead to a backing sheet or to an island top surface after the resin solidifies. It is desired that very little, if any, of the resin extend upward beyond the bottom one third or bottom half of the bead. A strong resin bond allows the top portion of the bead to be impacted during abrading action without breaking the whole bead loose from the backing or the island surfaces.

Composite ceramic agglomerate abrasive beads may have a nominal size of 45 or less microns enclosing from less than 0.1 micron to 10 micron or somewhat larger abrasive particles that are distributed in a porous ceramic erodible matrix. Composite beads that encapsulate 0.5 micron up to 25 micron diamond particle grains and other abrasive material particles in a spherical shaped erodible metal oxide bead can range in size of from 10 to 300 microns and more. Composite spherical beads are at least twice the size of the encapsulated abrasive particles. A 45-micron or less sized bead is the most preferred size for an abrasive article used for lapping. Abrasive composite beads contain individual abrasive particles that range from 6 to 65% by volume. Bead compositions having more than 65% abrasive particles generally are considered to have insufficient matrix material to form strong acceptable abrasive composite beads. Abrasive composite agglomerate beads containing less than 6% abrasive particles are considered to have insufficient abrasive particles for good abrading performance. Abrasive composite beads containing from 15 to 50% by volume of abrasive particles are preferred. Hard abrasive particles including diamond, cubic boron nitride and others are distributed uniformly throughout a matrix of softer microporous metal or non-metal oxides (e.g., silica, alumina, titania, zirconia, zirconia-silica, magnesia, alumina-silica, alumina and boria, or boria) or mixtures thereof including alumina-boria-silica or others.

Spherical agglomerate beads produced by use of screens or perforated sheets can be bonded to the surface of a variety of abrasive articles by attaching the beads by resin binders to backing materials, and by attaching the beads by electroplating or brazing them to the surface of a metal backing material. Individual abrasive article disks and rectangular sheets can have open cell beads attached to their backing surfaces on a batch manufacturing basis. Screen or perforated sheet beads can also be directly coated onto the flat surface of a continuous web backing material that can be converted to different abrasive article shapes including disks or rectangular shapes. These beads can be bonded directly on the surface of backing material or the agglomerates can be bonded to the surfaces of raised island structures attached to a backing sheet, or the agglomerates can be bonded to both the raised island surfaces and also to the valley surfaces that exist between the raised islands. Disks may be coated continuously across their full surface with cell sheet beads or the disks may have an annular band of abrasive beads or the disks can have an annular band of beads with an outer annular band free of abrasive. The cell sheet beads may be mixed in a resin slurry and applied to flat or raised island backing sheets or the backing sheets can be coated with a resin and the beads applied to the wet resin surface by various techniques including particle drop-coating or electrostatic particle coating techniques. Agglomerate beads may range in size from 10 microns to 200 microns but the most preferred size would range from 20 to 60 microns. Abrasive particles contained within the agglomerate beads include any of the abrasive materials in use in the abrasive industry including diamond, cubic boron nitride, aluminum oxide and others. Abrasive particles encapsulated in cell sheet beads can range in size from less than 0.1 micron to 100 microns. A preferred size of the near equal sized abrasive agglomerates for purposes of lapping is 45 micrometers but this size can range from 15 to 100 micrometers or more. The preferred standard deviation in the range of sizes of the agglomerates coated on an abrasive article is preferred to be less than 100% of the average size of the agglomerate, or abrasive bead, and is more preferred to be less than 50% and even more preferred to be less than 20% of the average size. Abrasive articles using screen abrasive agglomerate beads include flexible backing articles used for grinding and also for lapping. These cell sheet beads can also be bonded onto hubs to form cylindrical grinding wheels or annular flat surfaced cup-style grinding wheels. Mold release agents can be applied periodically to mesh screen, or perforated metal, sheet or belt materials to aid in expelling slurry agglomerates and to aid in clean up of the sheets or belts. Mesh screens and cell hole perforated sheets can be made of metal or polymer sheet materials. The mesh screens or metal perforated sheets can also be used to form abrasive agglomerates from materials other than those consisting of a aqueous ceramic slurry. These materials include abrasive particles mixed in water or solvent based polymer resins, thermoset and thermoplastic resins, soft metal materials, and other organic or inorganic materials, or combinations thereof. Abrasive slurry agglomerates can be deposited in a dehydrating liquid bath that has a continuous liquid stream flow where solidified agglomerates are separated from the liquid by centrifugal means, or filters, or other means and the cleaned dehydrated liquid can be returned upstream to process newly introduced non-solidified abrasive slurry agglomerates. Dehydrating liquid can also be used as a jet fluid to impinge on slurry filled cell holes to expel slurry volume lumps from the cell holes.

Near-equal sized spherical agglomerate beads produced by expelling a aqueous or solvent based slurry material from cell hole openings in a sheet or belt can be solid or porous or hollow and can be formed from many materials including ceramics. Hollow beads would be formulated with ceramic and other materials well known in the industry to form slurries that are used to fill mesh screen or perforated hole sheets from where the slurry volumes are ejected by a impinging fluid jet. These spherical beads formed in a heated gas environment or a dehydrating liquid would be collected and processed at high temperatures to form the hollow bead structures. The slurry mixture comprised of organic materials or inorganic materials or ceramic materials or metal oxides or non-metal oxides and a solvent including water or solvent or mixtures thereof is forced into the open cells of the sheet thereby filling each cell opening with slurry material level with both sides of the sheet surface. These beads can be formed into single-material or formed into multiple-material layer beads that can be coated with active or inactive organic materials. Cell sheet spherical beads can be coated with metals including catalytic coatings of platinum or other materials or the beads can be porous or the beads can enclose or absorb other liquid materials. Sheet open-cell formed beads can have a variety of the commercial uses including the medical, industrial and domestic applications that existing-technology spherical beads are presently used for. Commercially available spherical ceramic beads can be produced by a number of methods including immersing a ceramic mixture in a stirred dehydrating liquid or by pressure nozzle injecting a ceramic mixture into a spray dryer. The dehydrating liquid system and the spray dryer systems have the disadvantage of simultaneously producing beads of many different sizes during the bead manufacturing process. The technology of drying or solidifying agglomerates into solid spherical bead shapes in heated air is well established for beads that are produced by spray dryers. The technology of solidifying agglomerate beads in a dehydrating liquid is also well established. There are many uses for equal-sized spherical beads that can, in general, be substituted for variable-sized beads in most or all of the applications that variable-sized beads are presently used for. They can be used as filler in paints, plastics, polymers or other organic or inorganic materials. These beads would provide an improved uniformity of physical handling characteristics, including free-pouring and uniform mixing, of the beads themselves compared to a mixture of beads of various sizes. These equal sized beads can also improve the physical handling characteristics of the materials they are added to as a filler material. Porous versions of these beads can be used as a carrier for a variety of liquid materials including pharmaceutical or medical materials that can be dispensed over a controlled period of time as the carried material contained within the porous bead diffuses from the bead interior to the bead surface. Equal-sized beads can be coated with metals or inorganic compounds to provide special effects including acting as a catalyst or as a metal-bonding attachment agent. Hollow or solid equal-sized spherical beads can be used as light reflective beads that can be coated on the flat surface of a reflective sign article.

Figure 46:
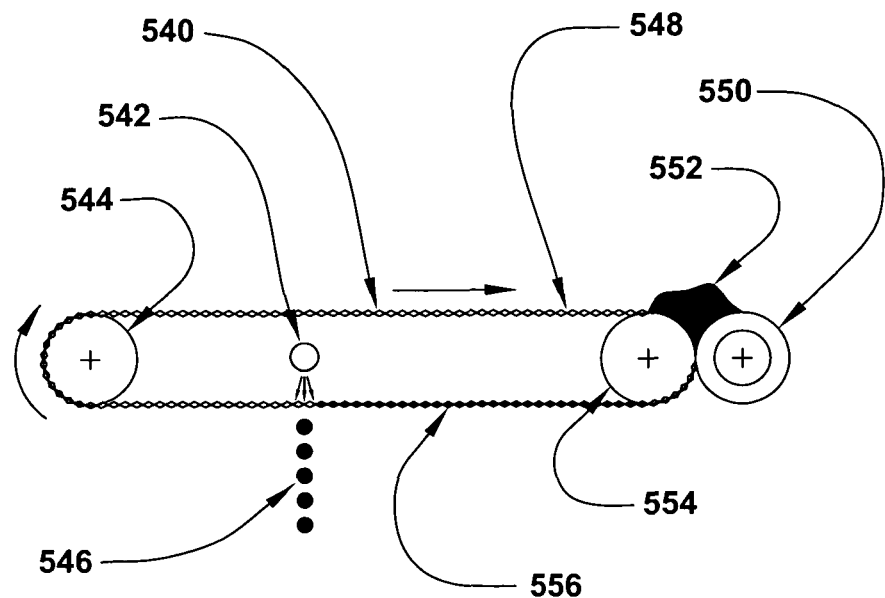
FIG. 46 is a cross-section view of a screen belt abrasive agglomerate forming system.
Figure 47:
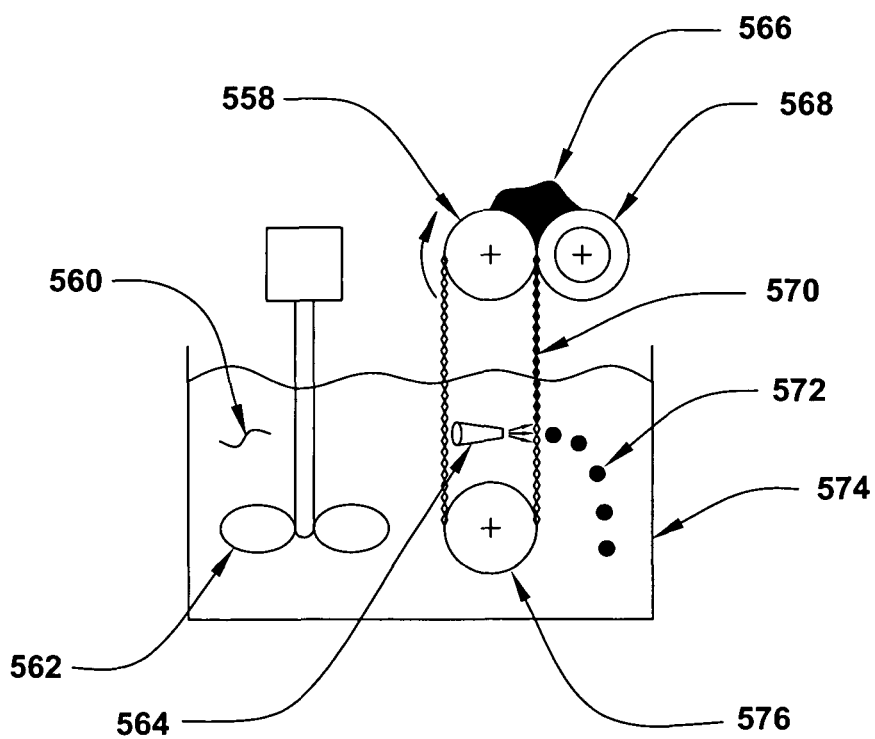
FIG. 47 is a cross-section view of an abrasive agglomerate screen belt in a dehydrating container.
Figure 48:
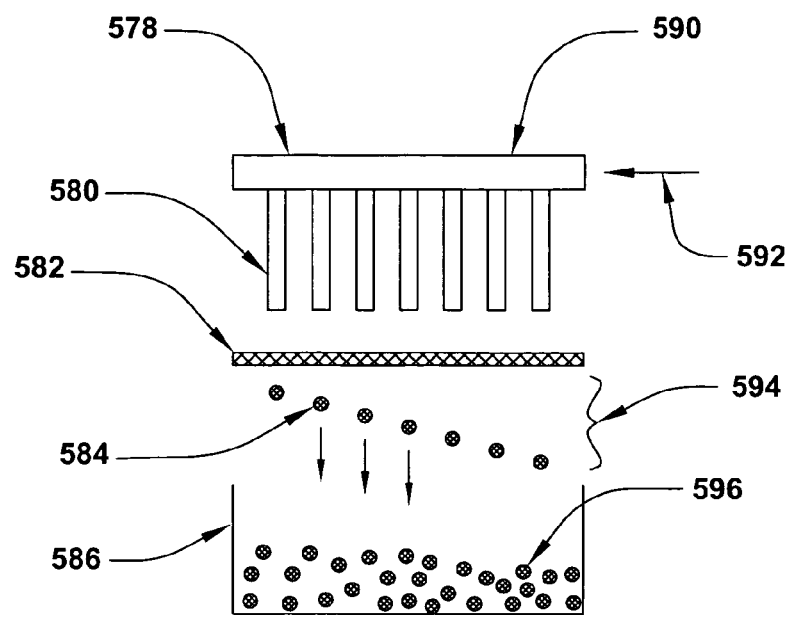
FIG. 48 is a cross-section view of screen belt agglomerates ejected into an dehydrater device.
Figure 49:
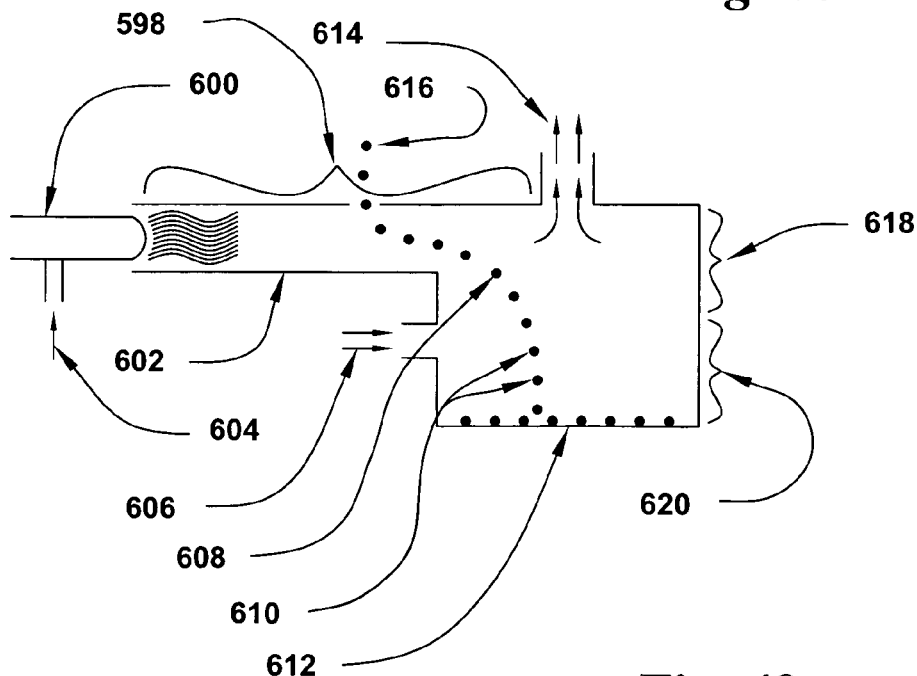
FIG. 49 is a cross-section view of a duct heater system that heats solidified agglomerates.
Figure 50:
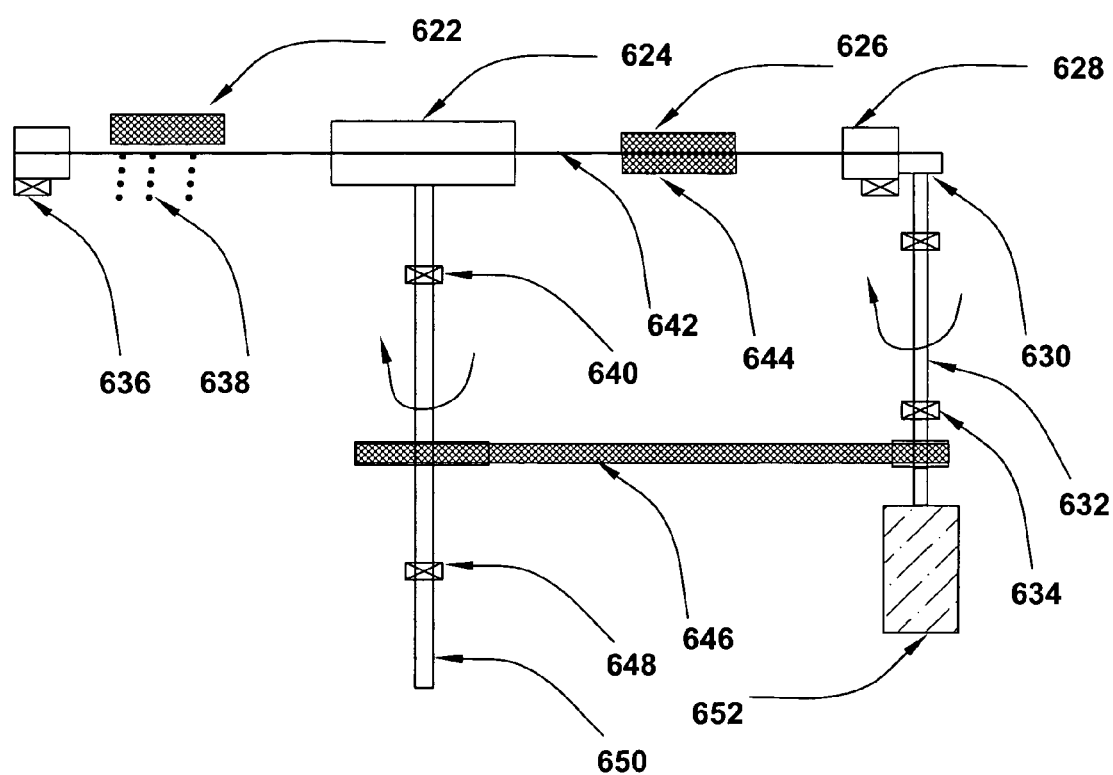
FIG. 50 is a cross-section view of a disk screen abrasive bead former.
Figure 51:
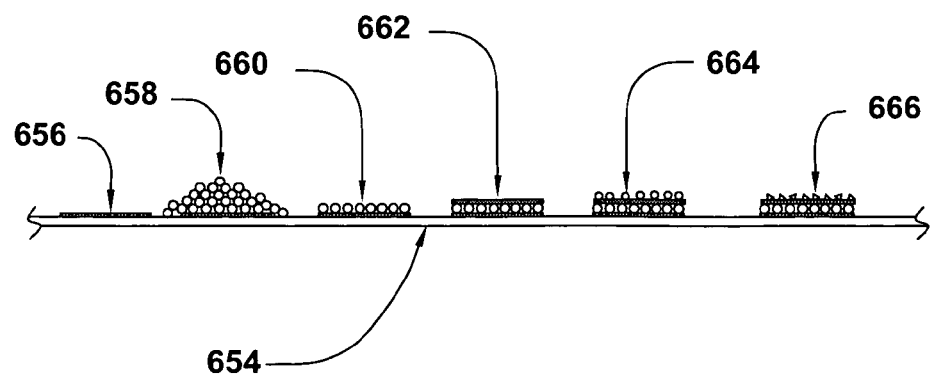
FIG. 51 is a cross-section view of abrasive coated raised islands formed with structural beads.
Figure 52:
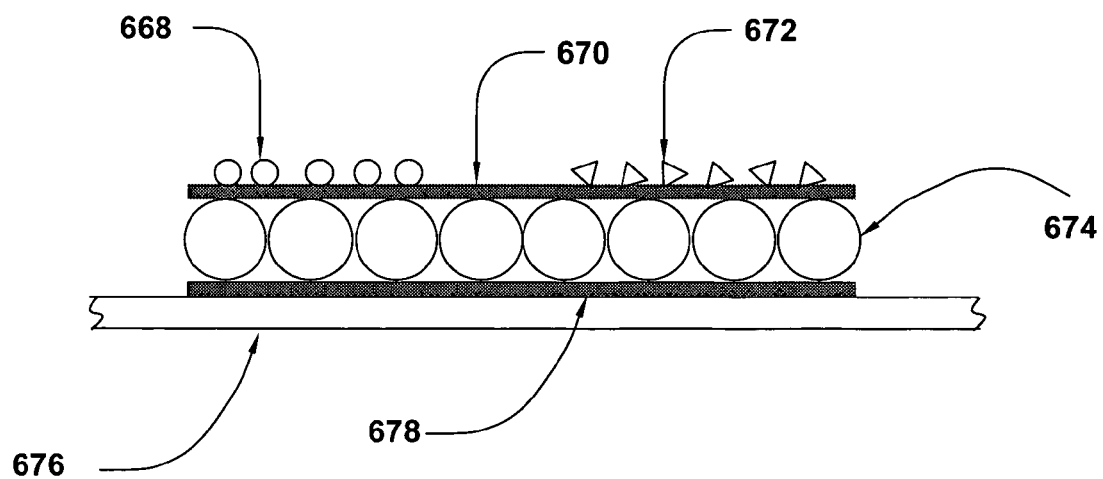
FIG. 52 is a cross-section view of a abrasive coated raised island formed with structural beads.

FIG. 46 is a cross-section view of a screen belt used to form spherical agglomerates of an abrasive particle filled ceramic slurry. A screen belt 540 having a multitude of microporous through-holes is mounted on and driven by a drive roll 554 and is also mounted on an idler roll 544. Abrasive slurry 552 is introduced into the unfilled portion 548 of the screen belt 540 mesh opening holes by use of a stiff or compliant rubber covered nip roll 550 supplied with bulk abrasive slurry 552 to produce a section of slurry filled screen belt 556 that is transferred by the belt motion to a fluid-jet blow-out bar 542. High speed air exiting from the jet bar 542 ejects the abrasive slurry contained in each belt 540 mesh opening to create ejected agglomerates 546 that assume a spherical shape due to surface tension forces acting within the ejected agglomerates 546 as they travel in free space independently from each other in an oven or furnace heated air or gas environment (not shown) or dehydrating liquid that is adjacent to the belt. The spherical agglomerates 546 will each tend to have a similar volumetric size as the volume of each of the screen mesh openings are equal in size. FIG. 47 is a cross-section view of a solvent tank having an immersed abrasive slurry filled screen belt and fluid blowout jet bar. Abrasive slurry is provided as a slurry bank 566 contained in the top area common to a rubber covered driven nip roll 568 and a screen belt idler roll 558 mounted above a liquid container 574 where the slurry is forced into the screen belt pore holes by the slurry pressure action of the nipped roll 568. The screen belt 570 mounted on the idler roll 558 transfers the slurry filled pores downward into a liquid solvent 560 filled container 574 past a fluid jet 564 that blow-ejects individual agglomerates in a trajectory away from the screen belt into the volume of solvent 560. The agglomerates 572 form into spherical shapes due to surface tension forces while in a free state in the solvent 560 fluid that has been selected to dry the spherical agglomerates 572 by drawing water from the agglomerates 572 as they are in suspension in the solvent 560. The spherical agglomerates 572 will each tend to have a similar size, as each of the screen openings is equal in size. A solvent stirrer 562 can be used to aid in suspension of the agglomerates 572 in the solvent 560. FIG. 48 is a cross-section view of an air-bar blow-jet system that ejects ceramic abrasive agglomerates from a screen into a heated atmosphere of air or different gasses. The cell screen belt 582 or cell screen segment 582 can be filled with a slurry mixture comprised of water based abrasive particles and ceramic material and individual wet agglomerates 584 can be blow-ejected by an air-bar 590 into a heated gas atmosphere 594 that will dry the agglomerates 584 that are collected as dry agglomerates 596 in a container 586. The free traveling individual agglomerates 584 form spherical shapes due to surface tension forces as they travel from the cell screen belt 582 or cell screen segment 582 to the bottom of the container 586. The air bar 590 can be constructed of a line of parallel hypodermic tubes 580 joined together at one end at an air manifold 578 that feeds high pressure air or other gas 592 into the entry end of each tube 580. FIG. 50 is a cross-sectional view of a screen disk agglomerate manufacturing system. A screen disk 642 is clamped with a inner diameter clamp 624 that is mounted on a spindle shaft 650 that is supported by shaft bearings 640 and 648. The disk 642 is also supported by an outside-diameter ring clamp 628 that is supported by a ring bearing 636 and the clamp 628 is also rotated by a gear 630 that is mounted on a shaft 632 that is supported by shaft bearings 634. The shaft 632 is driven by a drive motor 652 and the shaft 632 is drive belt 646 coupled with belt pulleys to the disk spindle shaft 650 to allow the screen disk 642 to be rotated mutually by the drive motor 652 at both the inner and outer disk 642 diameters to overcome friction applied to the screen surface by the mixture solution application devices 626 and 644. The stationary upper mixture solution application device 626 introduces the solution mixture into the rotating screen disk screen cells and a doctor blade portion of the application device 626 levels the solution contained in the screen cells to be even with the top surface of the screen 642. The stationary lower doctor blade device 644 is aligned axially with the upper doctor blade device 626 to allow the lower device 644 to level the solution mixture contained within the moving cells to be even with the lower surface of the screen resulting in screen cells that are completely filled with a mixture solution level with both the upper and lower surfaces of the screen disk. The filled cells rotationally advance to a blow-out or ejector head 622 where the mixture solution fluid is ejected from the screen cells by a jet of fluid from the ejector head 622 to form lumps 638 of mixture solution material where each lump has a volume approximately equal to the volume of the individual screen cells. FIG. 49 is a cross-section view of a duct heater system that heats green state solidified ceramic abrasive agglomerates introduced into the duct hot gas stream. A hydrocarbon combustible gas 604 is burned in a gas burner device 600 to produce a flow of temperature controlled gaseous combustion products inside a heat duct 602 that exit the container 612 as exhaust stream 614. The heater zone 618 has a mixture of hot and cold air and therefore has a moderate zone temperature. Green-state solidified agglomerates 616 are introduced into the duct 602 wherein the agglomerates are heated by the hot gaseous products as the agglomerates 616 are carried along the length of the duct high temperature zone 598 before falling into a low temperature zone 620. Cooling air introduced at the air inlet duct 606 into the agglomerate bead container 612 chills the surface of the hot agglomerates 608 that are collected as chilled agglomerate beads 610. FIG. 51 is a cross-section view of a backing sheet having raised islands constructed of spherical beads. A backing sheet 654 is coated with island shaped deposits of resin 656 that are covered with an excess of equal-sized spherical beads 658 to form a bead monolayer 660 where the beads 658 are attached to the wet resin 656. Another layer of wet resin 662 is deposited on the top surface of the beads 660 after which, a sparse monolayer coating of spherical abrasive agglomerates 664 or a monolayer of individual abrasive particles 666 are deposited into the wet resin 662. FIG. 52 is a cross-section view of an abrasive coated raised island structure constructed of equal sized large diameter spherical beads that are resin bonded to a backing sheet. Both spherical shaped composite abrasive beads 668 and individual abrasive particles 672 are shown bonded with a top layer of resin 670 to the top surface of large diameter hollow or solid or porous structural beads 674 that are bonded in an island shape with a layer of resin 678 to a backing sheet 676. The structural beads 674 are preferred to have a diameter of at least 0.005 inches (127 microns) while the composite abrasive beads 668 have a size of approximately 0.0015 inches (38 microns). It is preferred that only abrasive particles or equal-sized composite spherical agglomerates are bonded to the top surface of a raised island but a mixture of individual abrasive particles and composite abrasive beads can be coated together on the island top surfaces. Beads having different sized abrasive particles enclosed together in the individual composite bead bodies can be coated on the raised islands. Also, different beads, with each bead having the same sized encapsulated abrasive particles, but where the encapsulated particles are different sizes in the different beads, can be bonded together on the raised islands. Abrasive articles that can be coated with these equal-sized abrasive agglomerates include disks, disks having annular bands of abrasive, articles that have abrasive coated raised island structures, abrasive strips, endless belts and articles having patterns of abrasive coated areas.

Spherical Ceramic Abrasive Agglomerates

Problem: It is desired to form spherical shaped composite agglomerates of a mixture of abrasive particles and an erodible ceramic material where each of the spheres has the same nominal size. Applying a single or mono layer of theses equal sized spheres to a coated abrasive article results in effective utilization of each spherical bead as workpiece abrading contact is made with each bead. The smaller beads coated with the larger beads in the coating of commercially available abrasive articles presently on the market are not utilized until the larger beads are ground down. A desired size of beads is from 10 to 300 microns in diameter.

Figure 66:
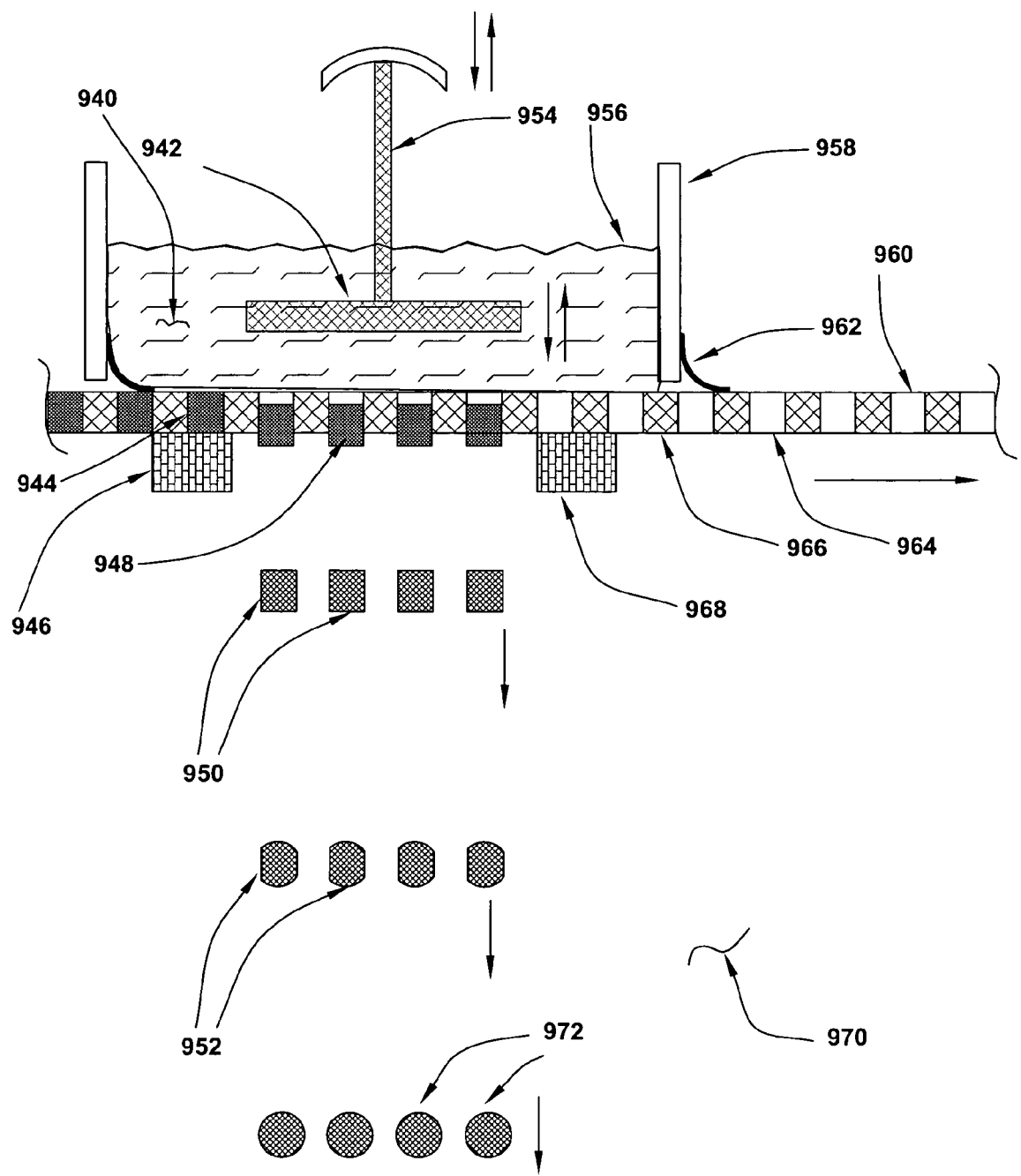
FIG. 66 is a cross section view of spherical beads formed from slurry lumps ejected from perforated sheet cells by a plunger.

Solution: Various methods to manufacture like-sized beads and also specific diameter or volume, beads include the use of porous screens, perforated hole font belts, constricted slurry flow pipes with vibration enhancement and flow pipes with mechanical blade or air-jet periodic fluid droplet shearing action. Each of these systems can generate sphere volumes of a like size. The cross-hatch woven screen device has a consistent cross-sectional square area and the depth of the square cavity is defined by the diameter of the wire used and the type of wire weave used to fabricate the woven wire screen. The volume of a liquid abrasive particle-and-ceramic material sphere is equal to the volume contained within one cell formed by the square opening in the screen mesh. Another method to create a pattern of controlled volumetric holes in a carrier belt is to form a pattern of through-holes in a continuous belt, or in a font sheet, where the belt has a defined thickness. The sphere volume is then equal to the perforated hole volume. A ceramic abrasive sphere is then produced by filling the open holes or squares in either the screen or belt with a slurry mixture of abrasive particles and water or solvent wetted ceramic material. A simple way to level-fill the screen or belt openings is to route the belt through a slurry bank captured between two nip rolls. The slurry volume contained in each slurry cavity is then ejected from the cavity by use of a air jet orifice or mechanical vibration or mechanical shock forces. Each ejected slurry volume will form a spherical droplet due to surface tension forces acting on the droplet as the drop which is free-falling as it travels through a trajectory path in a heated atmosphere which dries the droplet as it is traveling to form a skin on the bead. The beads can be collected and fired in an oven or furnace to develop the full strength of the ceramic binder. The abrasive particles can constitute from 5 to 90% of the bead by volume. Abrasive bead sizes can range from 10 to 300 microns. The same bead manufacturing techniques described here can be used to create non-abrasive ceramic beads and non-abrasive non-ceramic beads having uniform sizes.

FIG. 62 is a cross-sectional view of a mesh screen abrasive agglomerate manufacturing system using a open mesh screen that is level-filled with an abrasive slurry mixture with nipped rolls. A open mesh screen or a perforated metal sheet 850 moves in a downward direction between two rotating nipped rolls 870 that force a abrasive slurry mixture 868 into the open screen cells 864 that are adjacent to screen cell walls 866. The cell walls 866 can be either a woven wire or other woven material or can be a perforated metal or other perforated material. The open cells 864 can have a circular shape or can be rectangular or can have a irregular or even discontinuous shape such as formed by a woven wire mesh. Each open cell shape will have a consistent average equivalent cross-sectional area that is shown, in part, by the cell opening dimension 878 as this drawing cross section view is two dimensional where the depth of the open cell 864 is not shown. The thickness of the screen 880 also is the thickness of the open cell 864. The open cell 864 contained volume is defined by the open cell 864 cross-section area which is comprised of the open cell 864 area (not shown) which is comprised of the cell length 878 and the cell depth (not shown) multiplied by the screen thickness 880. The small change in the overall cell 864 volume due to the non-perfect cell wall distortions created by the interleaving of the woven wires that form the cell wall 866 is not significant in determining the volumetric size of the ejected slurry volumes 856 that originate in the slurry filled cells 872 as the ejected volumes 856 would be consistent from cell-to-cell. Precision-sized perforation holes 864 that can be formed in sheet material typically would not have the same amount of hole wall 866 size or surface variation as would a woven wire screen mesh hole. The screen 850 can be in continuous motion which would present slurry filled cells 872 to a fluid nozzle 874 that projects a interrupted or pulsed or steady flow fluid stream 876 against the filled cells 872 that causes lumps of slurry 856 to be ejected from the screen 850 body, thereby leaving a screen section 882 having empty screen cell holes. The slurry lumps 856 travel in a free-fall motion into a dehydrating fluid 862 and surface tension forces acting on the liquid droplet lumps 856 form lumps having a more spherical shape 858 and the drop shape formation continues until spherical shaped 860 slurry droplets are formed before the slurry shape 860 sphere or slurry bead is solidified. The slurry bead forming and ejection process can take place when all or a portion of the apparatus is enveloped in a dehydrating fluid 862 including being submerged in a dehydrating liquid 862 or located within or adjacent to a hot air dehydrating fluid 862. FIG. 63 is a cross-sectional view of a mesh screen abrasive agglomerate manufacturing system using a open mesh screen that is level-filled with an abrasive slurry mixture with a doctor blade. A open mesh screen or a perforated metal sheet 884 moves in a downward direction between a doctor blade 902 and a support base 886 that force a abrasive slurry mixture 900 into the open screen cells 894 that are adjacent to screen cell walls 896. The cell walls 896 can be either a woven wire or other woven material or can be a perforated metal or other perforated material. The open cells 894 can have a circular shape or can be rectangular or can have a irregular or even discontinuous shape such as formed by a woven wire mesh. The screen 884 can be in continuous motion which would present slurry filled cells 904 to a fluid nozzle 906 that projects a interrupted or pulsed or steady flow fluid stream 908 against the filled cells 904 that causes lumps of slurry 888 to be ejected from the screen 884 body, thereby leaving a screen section 910 having empty screen cell holes. The slurry lumps 888 travel in a free-fall motion into a dehydrating fluid 912 and surface tension forces acting on the liquid droplet lumps 888 form lumps having a more spherical shape 890 and the drop shape formation continues until the spherical shaped 892 slurry droplets are formed before the slurry shape 892 spheres or slurry beads are solidified. The slurry bead forming and ejection process can take place when all or a portion of the apparatus is enveloped in a dehydrating fluid 912 including being submerged in a dehydrating liquid 912 or located within or adjacent to a hot air dehydrating fluid. FIG. 64 is a top view of an open mesh screen that has a rectangular array of rectangular open cells 916 that have cross-sectional areas 914 where the areas 914 are equal to the open cell 916 length 920 multiplied by the open cell 916 depth 918. FIG. 65 is a cross-sectional view of an open mesh screen that is level-filled with an abrasive slurry mixture. A open mesh screen or a perforated metal sheet 922 moves in a downward direction where the screen sheet 922 has abrasive slurry mixture filled cells 932 that are adjacent to screen cell walls 930. The screen 922 can be in continuous motion which would present slurry filled cells 932 to a fluid nozzle 934 that projects a fluid stream 936 against the filled cells 932 that causes lumps of slurry 924 to be ejected from the screen 922 body, thereby leaving a screen section 938 having empty screen cell holes. The slurry lumps 924 travel in a free-fall motion where surface tension forces acting on the liquid droplet lumps 924 form lumps having a more spherical shape 926 and the drop shape formation continues until spherical shaped 928 slurry droplets are formed before the slurry shape 928 sphere or slurry bead is solidified.

Abrasive Bead Screen Plunger

Problem: It is desired to create abrasive particle or other material spherical beads that have an equal size by applying a consistent controlled pressure fluid ejection on each liquid bead material cell resulting in uniform sized ejected beads.

Solution: A mesh screen having a screen thickness and open cells where the volume of an open cell thickness and cross-sectional area is approximately equal to the desired volume of a material sphere can be filled with a liquid mixture of abrasive particles and a binder material, including a ceramic sol gel or a resin binder. Nonabrasive material may be used to fill the screen cells also to produce nonabrasive beads. After the screen is surface level filled with the liquid bead material, the liquid in the cells can be ejected from the cells with the use of a plunger plate that traps a fluid between the plate and the screen surface as the plate is rapidly advanced towards the surface of the screen from an initial position some distance away from the screen. The fluid trapped between the plate and the screen can be air, another gas, or preferably a liquid including water, oil dehydrating liquid, dehydrating liquids including different alcohols, or a solvent, or mixtures thereof. The screen is rigidly supported at the outer periphery of the plate cross section area thereby leaving the central portion of the screen open in the screen area section corresponding to the plunger area that allows the individual screen cell material to be ejected from each of the individual cells at the side of the screen opposite of the plunger plate. The fluid material lumps are ejected into hot air or a dehydrating liquid. An enclosure wall positioned on the outer periphery of the plunger plate is held in contact with the screen surface and acts as a fluid seal for the plunger and results in a uniform fluid pressure being applied to the material in each cell whereby the ejection force is the same on each cell material. Air is compressible so the fluid ejecting pressure will build up as the plunger advances until the cell material is ejected. A liquid fluid is incompressible and has more mass than air so the speed that the cell material is ejected is controlled by the plunger plate advancing speed and a uniform fluid pressure would tend to exist even when a few cells become open in advance of other cells. The plunger plate can be circular or rectangular or have other shapes. Cell material may be ejected into either an air environment or ejected when the material is submerged in a liquid vat. In either case, surface tension on the ejected material lump produces a spherical material shape. FIG. 66 is a cross-section view of a screen slurry lump plunger mechanism ejector. A screen 960 moves along two screen support bars 968 where abrasive or non-abrasive slurry volume lumps 948 are ejected from the screen 960 by driving a plunger 954 having a plunger plate 942 from a controlled distance from the screen 960 toward the screen 960 until the plunger plate 942 is in close proximity to the screen surface. Slurry volume lumps 948 are shown partially ejected from the screen 960. The fluid 940 located between the plunger plate 942 and the screen 960 is vertically driven toward the screen 960 by the plunger plate 942 as some of this fluid 940 is trapped between the plunger plate and the screen 960 surface as the plate 942 descends. The fluid 940 has a fluid surface 956 and is contained by fluid walls 958 that have flexible wiper fluid seals 962 that contact the screen and prevent substantial loss of the fluid 940 from the wall 958 fluid container. The moving plunger 942 develops a dynamic fluid 940 pressure between the plunger plate 942 and the screen 960 and this fluid pressure drives the slurry lumps 948 from the screen 960 to form ejected slurry lumps 950 that free-fall travel downward in a dehydrating fluid 970 that includes hot air or a dehydrating liquid. As the lumps 950 travel, surface tension forces on the lumps 950 rounds them into semi-spherical lumps 952 that are further rounded into spherical lumps 972. The screen support bars 968 and 946 provide structural support to the section of flexible screen 960 that extends across the width of the plunger plate 942 and which screen section is subjected to the dynamic fluid 940 pressure exerted by the moving plunger plate 942. The bar 946 also tends to shield from plunger plate 942 induced fluid 940 pressure the other non-plunger screen area slurry lumps 944 that are in screen mesh cells that are located upstream within the moving screen 960 body from the support bar 946. Bar 946 shields the ejecting action of the moving plunger plate 942 and prevents these remote-location slurry lumps 946 from being partially or wholly ejected from the screen 960. The plunger plate 942 movement is limited and only enough of the fluid 940 is driven downward to eject the slurry lumps 948 from the screen 960. If the fluid 940 is a liquid only a limited amount of it will leak through a typical very fine 325 mesh screen used to produce the desired size of abrasive beads due to the fact that the mesh cell openings in the screen 960 are only 45 micrometers (0.002 inches). If the fluid 940 is air or another gas, the amount of gas that passes through the screen 960 is insignificant and will not disrupt the slurry dehydrating fluid system. Screens 960 having larger mesh openings can also be used to produce larger sized slurry beads and fluid 940 leakage can be minimized by the use of narrow plunger plates 942.

Screen Drum Spherical Bead Former

Problem: It is desirable to form spherical beads from various liquid materials with a continuous manufacturing process where all the beads are of equal size. Drops of liquid material are separated from each other after formation during which time surface tension forces form spherical drop beads prior to solidification of the beads by hot air or a dehydrating liquid bath.

Solution: A rotatable drum having one side partially open can have a drum circumference formed of silicone rubber coated mesh screen or a perforated metal strip. The drum can have a nonporous solid radial back plate to which plate is attached a bearing supported rotatable shaft. The drum front plate can be a solid nonporous solid material wall that has an annular shape that allows the continuous introduction of a stream of liquid material that can be formed into equal sized drops of liquid, the liquid material can include water based sol gels of oxides and abrasive particles may or may not be mixed with the sol gel. Drops of other materials including fertilizers, hollow sphere forming mixtures, chemicals, medicinal material and glass beads may be formed with the same process. After liquid material is introduced into the open end of the screen drum, the drum is rotated and a set of internal and external flexible wipers force the liquid into the open cells of the mesh screen circular drum band. The cell hole openings in the mesh screen or perforated metal are small enough and the viscosity of the liquid material is high enough that the pool of liquid, which remains on the bottom area of the drum as the drum is rotated, does not freely pass through the screen mesh openings. Wiper filled mesh holes pass upward out of the liquid pool until they arrive at a cell blow-out head that spans the longitudinal width of the screen where an air, gas, or liquid is applied under pressure uniformly across the contacting surface area of the blow-out head that is hydraulically sealed against the drum inner surface of the drum screen. The drum may be rotationally advanced or continuously rotated to present liquid filled screen cells to the blow-out head that ejects drops of liquid material into an environment of heated air or into a vat of dehydrating fluid. Surface tension forces on the drop will form a drop spherical shape prior to drop solidification. The spherical bead drop formed from the material contained in a individual screen cell will have approximately the same volume as the volume of the liquid trapped in a screen cell. The shape of the ejected fluid material lump is changed from an irregular lump shape to a spherical shape by surface tension forces acting within the material lump after the lump is ejected but before the lump is solidified. Once the spherical shape is formed, the sphere or bead shape becomes solidified and the shape retains its spherical shape throughout further sphere processing events. Air or liquid fluid can be fed in pressure or volume pulses or fed at a continuous rate to the sealed blow-out head that can be held stationary through the drum opening.

Eject Frozen Slurry Beads from Screens

Problem: It is difficult to eject one-piece liquid abrasive slurry lumps from a wire mesh screen, or from a perforated sheet, when the ejecting fluid stream breaks the liquid mixture lump into multiple pieces. Also, the open cell slurry lumps formed in open cells in a woven wire screen typically have portions of the slurry lump contained in a independent cell that have mutual slurry portions that are common to the slurry lumps that are contained in adjacent cells. This mutual cell-to-cell slurry lump joining at the cell edges is due to the intertwining routing of the screen woven wire that forms the defined cell borders of each screen cell. Independent screen cells are seen as exact rectangles when the cells are viewed from a direction perpendicular to the screens surface. However, the sidewalls of each apparent open cell has cell-to-cell open areas that are joined with adjacent cells because of the routing of the woven wires that form the cells. Breaking of individual cell lumps into undesirable smaller pieces can occur when a slurry filled cell is subjected to a high pressure air or other fluid impinging jet.

Solution: The abrasive slurry is typically made up of a metal oxide particles that is suspended as a colloidal mixture in a water base that in turn is mixed with abrasive particles and other materials. This abrasive slurry mixture can be applied to an open mesh screen or a perforated sheet where the slurry material is leveled to the top planar surface of the screen or perforated metal sheet to form defined slurry volumes in each cell hole. A rubber squeegee or other doctor blade device can be used to completely fill the cell cavity holes level to the surface of the screen, or perforated metal or polymer sheet, by controlling the contact angle, the speed and contact pressure of the device and, if desired, applying vibration to the device during the cell filling process. As an aid in removing the slurry lump from the screen cell cavity as a single entity, the temperature of the screen and slurry can be reduced to where the slurry is partially or wholly frozen as a continuous lump entities in the screen cells. A fluid jet of air or liquid, or a combination of both can be directed to the surface area of each frozen cell. The slurry contained in each screen cell will tend to fracture, due to the pressure of the impingement jet, at the cell lump border edges. The primary lump contained in each cell will be broken away from slurry material contained in adjacent cells and also broken away from the irregular surfaces of the woven wire cell walls. The edge-fractured slurry lump will remain intact as a single lump body and will be ejected from the screen cell by the high pressure impinging fluid jet acting on the whole cross section area of the lump contained in the screen cell. The primary lump will tend to be ejected as a single lump entity in both cases when the slurry is frozen as a solid lump or if the slurry has the form of a slush form of ice-like slurry material. If the screen and slurry are frozen, the screen can be flexed sufficiently to weaken or break the structural bond of the frozen slurry contained in each cell with the slurry lumps contained in adjacent cells even though the slurry lumps will remain in position in the screen cells after flexing the screen. Also, the screen can be flexed sufficiently to weaken or break the structural bond of the frozen slurry contained in each cell with the screen wire or electrodeposited metal cell walls with the result that the slurry lumps can remain contained in the cells after flexing the screen or cell sheet. Then, the lumps can be ejected by a fluid jet, or by other means, including the use of a vacuum device. Also, the screen may be heated preferentially by applying energy from energy sources that include, but are not limited to, resistive heating or inductive heating or microwave energy where the metal wires would be heated prior to melting the frozen slurry lumps. Here, portions of the frozen slurry cell cavity lump that is immediately adjacent to the woven screen cell wires would tend to melt prior to the main body of the cell contained lump melting. This edge melting of the lump will weaken the bond between the lump and the wire cell walls but the ejecting force applied by the impinging fluid jet will act on the lump body surface to eject the lump from the screen. Flexing of the screen can be done before, during or after the application of energy to the screen. Flexing can also be done to woven wire mesh screens that have been reduced in thickness by hammering or other means to provide a more unified screen cavity cell wall structure as these screens will remain flexible. Applied energy sources can also be selected to heat up the slurry lump material and energy sources or combinations of energy sources can be selected to optimize the heating of both the slurry and screen materials. Another technique to break individual cavity sheet slurry into separate lump entities is to apply acoustic energy to the cavity sheet surface to flex the sheet and break the lumps apart from each other, and also, to loosen the lumps in the cavity sheet cells. Acoustic energy can also be directed at a perforated or electrode-posited cavity sheet to loosen the lumps from the cavity cells. The descriptions here are given primarily for using a mesh screen for forming abrasive beads as an example but the same techniques can be applied to perforated metal sheet materials or electrodeposited metal sheet or polymer sheet materials that have formed cell cavity holes. After ejection, the frozen or slush slurry lump will be directed into a heated environment, or an environment that has energy source applied to it whereby the frozen or slurry lump changes to a liquid lump that surface tension forces act upon to form the lump into a spherical shape. Further application of heat or other forms of energy will then dehydrate the lumps and the lumps will then become solidified after which they will be subjected to high temperature firing which will convert the spheres into porous ceramic abrasive agglomerate beads. One method to freeze the slurry filled screen is to route the screen through a bath of alcohol, or other liquids, that have a bath temperature lower than the freezing temperature of the slurry mixture. In addition, solvent or other organic chemicals can be mixed with abrasive and metal oxide solution to improve the freeze characteristics of the slurry mixture. The techniques described here for the formation of spherical abrasive beads can also be applied, without limitation, to the formation of non-abrasive spherical material shapes that have equal sized diameters.

Surface Conditioning of Annular Coated Abrasive Articles

Problem: It is desired that ceramic spherical or non-spherical shaped agglomerates that are coated in a single or monolayer on a abrasive article backing sheet or on the top island surfaces of an raised island abrasive article all have the same height relative to the mounting side of a backing sheet. It is also desirable that stray double-layered abrasive particles, spherical abrasive agglomerates and non-spherical shaped abrasive agglomerates that are inadvertently coated on raised islands be removed. Further, it is desirable that oversized abrasive particles or oversized abrasive agglomerates that are inadvertently coated on raised islands be removed or abrasively adjusted in height-size so their top surfaces all have the same height relative to the mounting side of a backing sheet. In addition, it is desired that the outer non-abrasive material exterior surfaces of individual abrasive particle agglomerate beads be initially abraded away to expose the abrasive particles which are contained within the bead sphere surfaces prior to abrading use of an abrading article.

Figure 53:
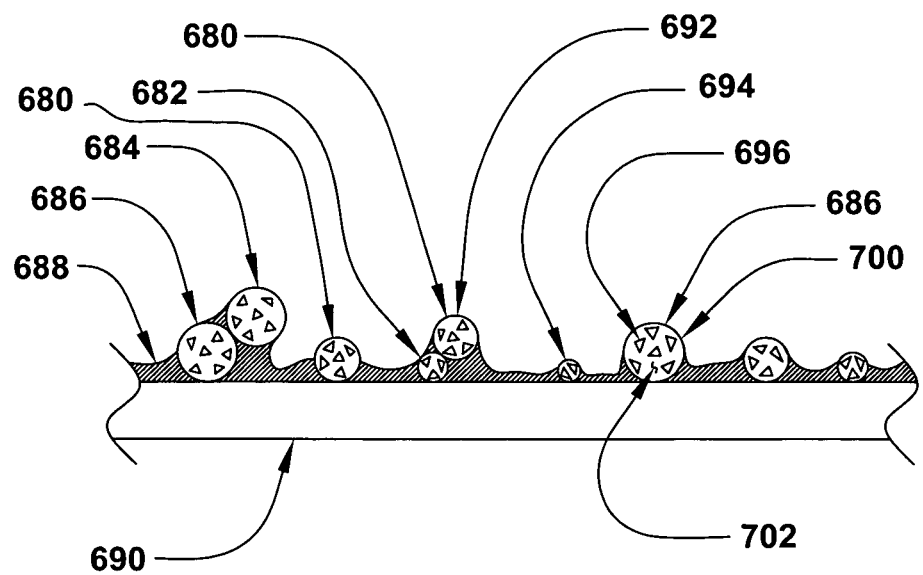
FIG. 53 is a cross-section view of different sizes of spherical stacked abrasive agglomerates.
Figure 54:
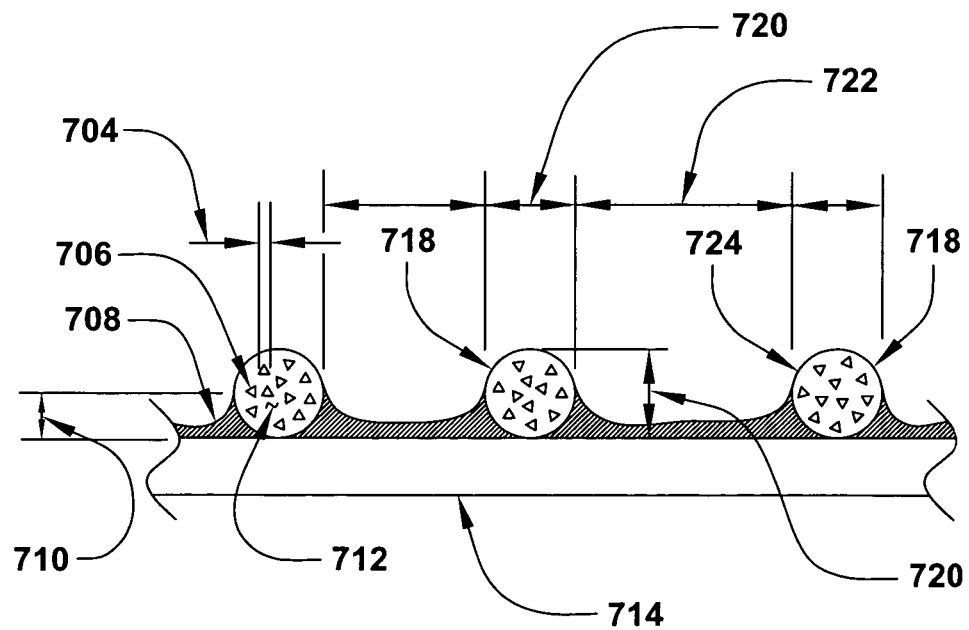
FIG. 54 is a cross-section view of mono or single layer equal-sized spherical agglomerates.
Figure 55:
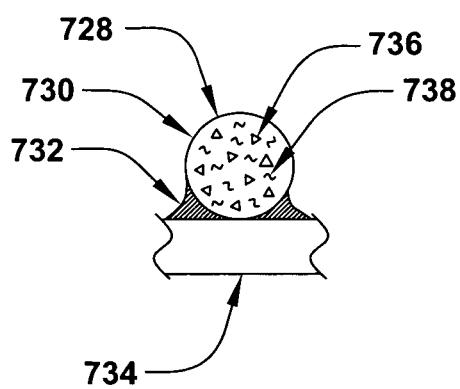
FIG. 55 is a cross-section views of un-worn spherical abrasive agglomerate.
Figure 56:
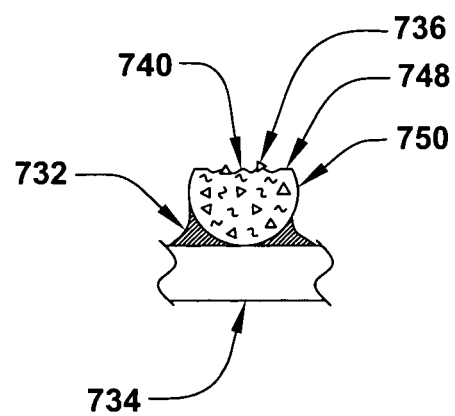
FIG. 56 is a cross-section view of a partial worn spherical abrasive bead agglomerate.
Figure 57:
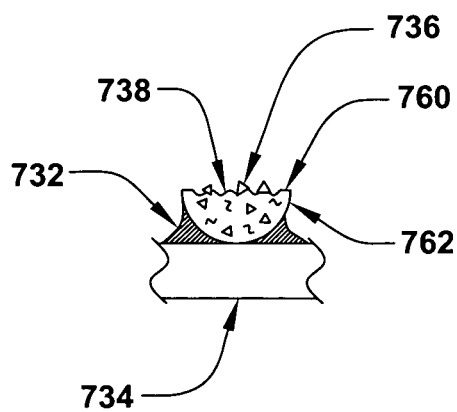
FIG. 57 is a cross-section view of a half worn spherical abrasive bead agglomerate.
Figure 58:
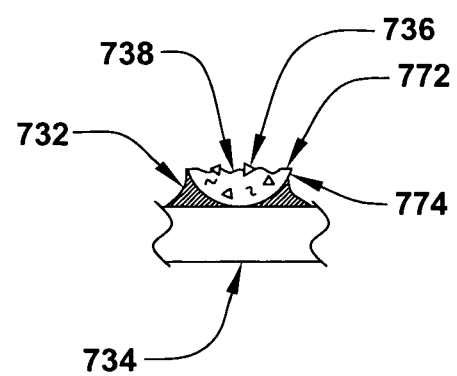
FIG. 58 is a cross-section view of a well worn spherical abrasive bead agglomerate.
Figure 59:
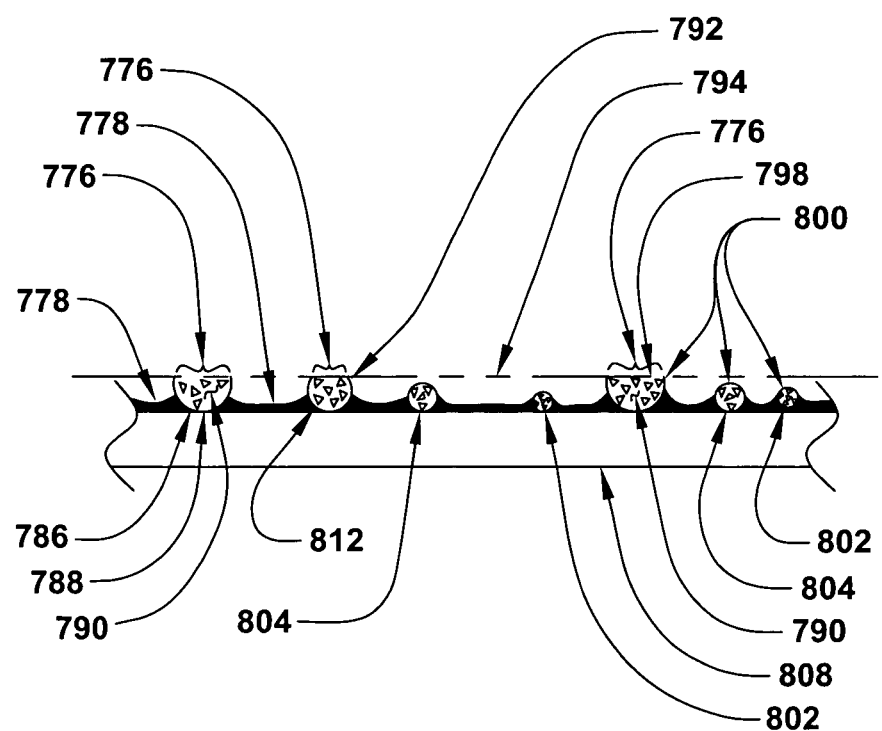
FIG. 59 is a cross-section view of a partial worn spherical abrasive bead agglomerate.
Figure 60:
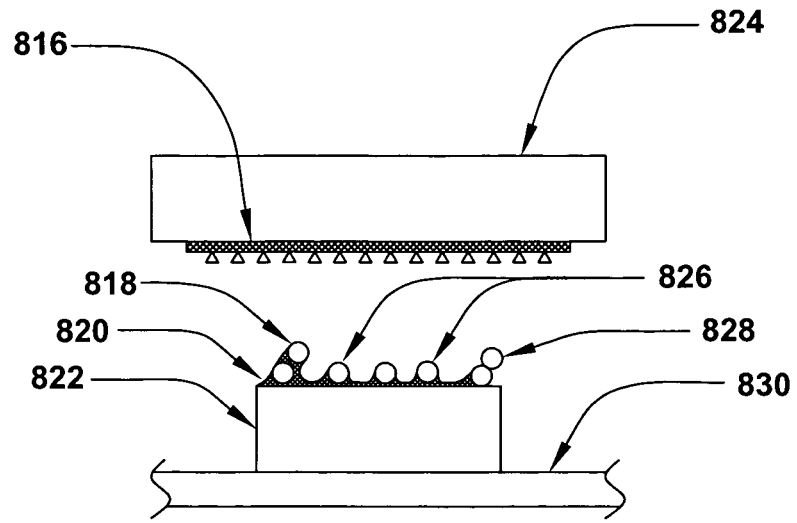
FIG. 60 is a cross-section view of a plate used to grind off elevated abrasive beads.
Figure 61:
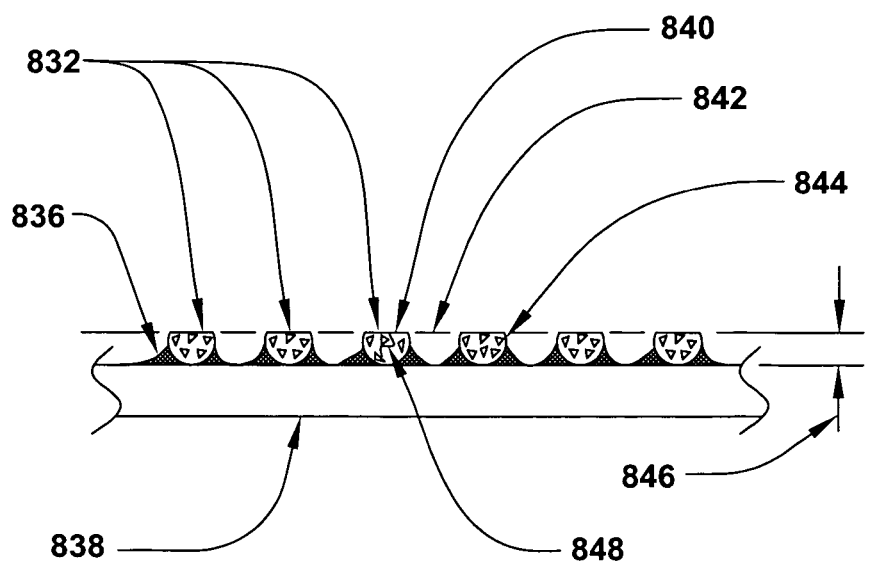
FIG. 61 is a cross-section view of equal sized beads worn-down to the same level.
Figure 62:
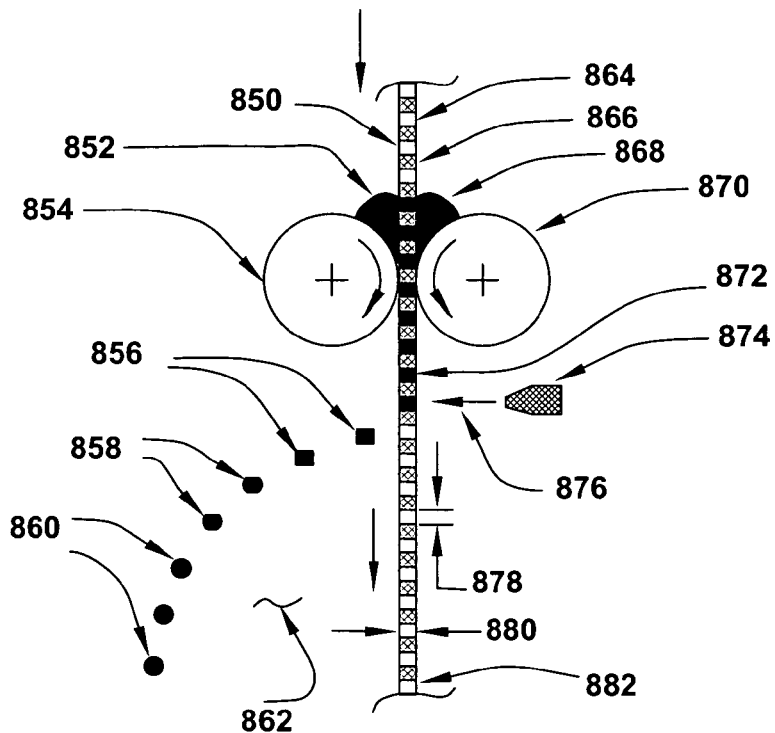
FIG. 62 is a cross-section view of equal sized slurry bead lumps ejected from a roll system screen.
Figure 63:
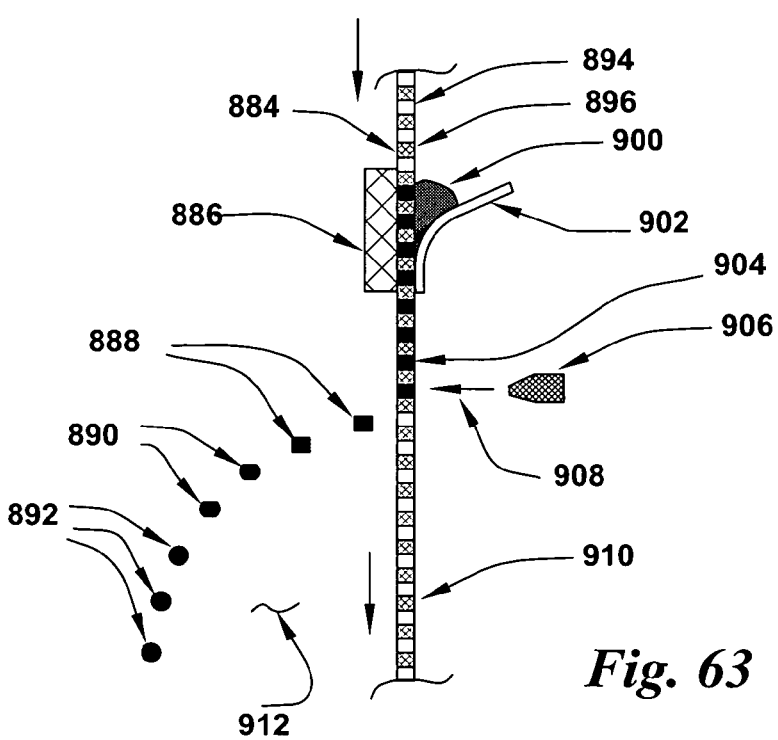
FIG. 63 is a cross-section view of equal sized slurry bead lumps ejected from a doctor blade system screen.
Figure 64:
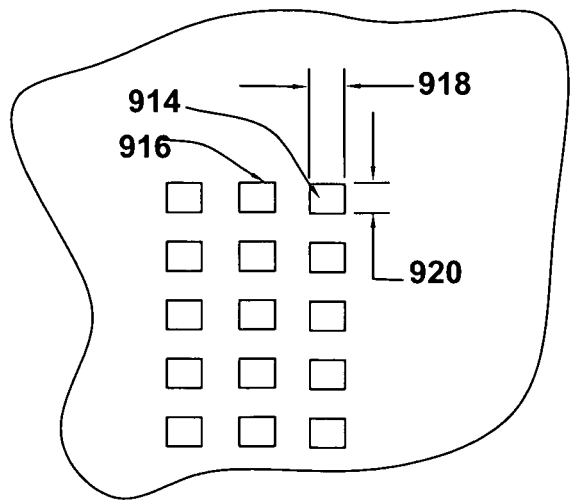
FIG. 64 is a top view of an open mesh screen with a rectangular array of rectangular open cells.
Figure 65:
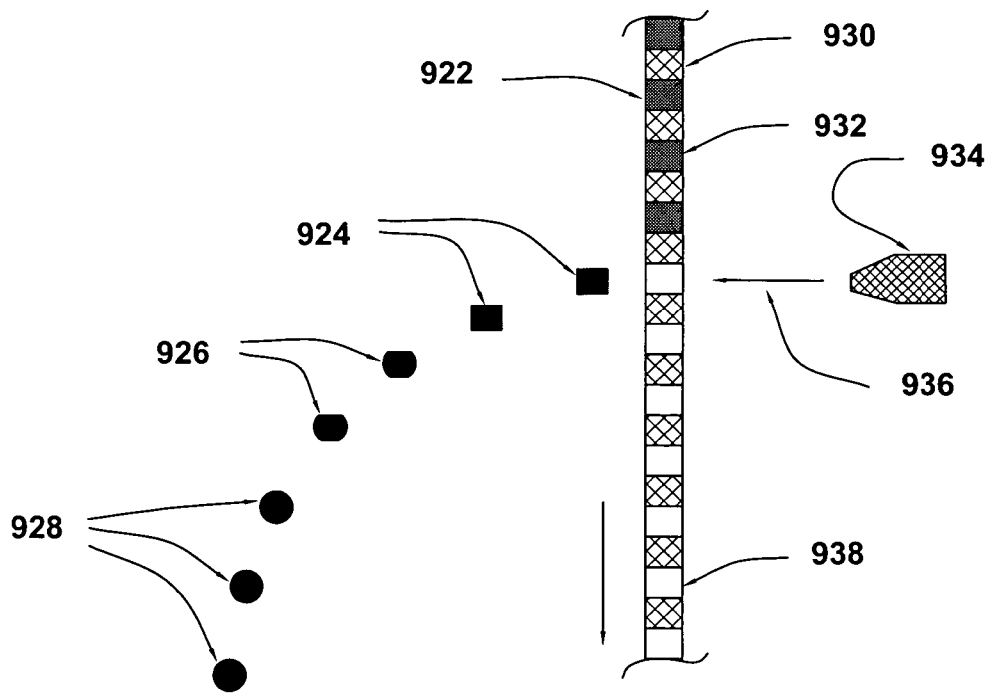
FIG. 65 is a cross section view of spherical beads formed from slurry lumps ejected from cells.

Solution: After an abrasive article having an annular band of coated abrasive agglomerates or single abrasive particles or an abrasive article having agglomerate coated raised islands is manufactured, the article can be surface conditioned to remove stray double-level agglomerates. The article can also be surface conditioned to remove the upper portion of the agglomerate enclosure exterior surfaces. The surface conditioning process comprises pre-grinding or conditioning the abrasive article by contacting the moving or stationary surface of a newly manufactured abrasive article with a moving or stationary abrading device including a rigid block or a abrasive surface prior to using the newly manufactured abrasive article to abrade a workpiece surface. The abrasive article would be mounted on a rotatable platen and another abrading surface would be brought into abrading contact with the surface of the annular band abrasive article that is to be preconditioned. Either the contacting abrading surface can be moved relative to the annular article or the annular article can be moved relative to the contacting abrading surface while contact pressure is maintained during the abrading contact. Only enough abrading action is provided to knock off, or partially wear down, the unwanted second-level particles or agglomerates or oversized particles or agglomerates, thereby developing a single depth particle surface on the abrasive article abrasive surface. Some additional grinding is further applied to grind away only the upper portion of the agglomerate encapsulating exterior surface to expose the very top-surface particles enclosed in the spherical composite agglomerates. Abrasive particle agglomerates may be spherical agglomerates or composite agglomerates having shapes other than spherical shapes and the agglomerates may include ceramic matrix material or other erodible abrasive particle support matrix material. FIG. 53 is a cross-section view of different sizes of spherical stacked abrasive particle agglomerates, or abrasive beads, on a backing sheet. Spherical abrasive particle composite agglomerates including large agglomerates 686, medium sized agglomerates 680, medium-small agglomerates 682 and small sized agglomerates 694 are bonded with a polymer resin 688 to a backing sheet 690. Each of the spherical agglomerates 682, 686, 680 and 694 have an agglomerate exterior surface 700, shown for agglomerate 686 that encloses small abrasive particles 696 surrounded and fixed in position by an erodible porous ceramic matrix 702. Raised second-level abrasive agglomerates 684, 692 are shown attached with resin 688 to the upper surfaces of agglomerates 682 and 686 respectively, that are bonded directly to the backing surface 690. It is desirable to remove the stacked agglomerates 684 and 692 from their elevated second-level positions where they are resin 688 bonded to the single-layer agglomerates 682 and 686. The stacked agglomerates 692 can be broken off their resin 688 moorings on top of agglomerates 682 and 686, or, the agglomerates 684, 692 can be worn down to expose the top apex surface of agglomerates 682 and 686 agglomerates. FIG. 54 is a cross-section view of mono or single layer equal-sized spherical composite agglomerates having gap spaces between agglomerates that are resin bonded to a backing sheet. Agglomerates 718 having a agglomerate exterior surface 724 enclosing individual abrasive particles 706 held in an erodible porous ceramic matrix 712 are resin 708 bonded to a backing sheet 714 with a defined space 722 between agglomerates 718 having a agglomerate diameter 720. Individual composite agglomerates 718 having approximate 3-micron size 704 individual abrasive particles enclosed in the agglomerates 718 that have an approximate 30-micron diameter size 720. The agglomerates 718 are sparsely positioned on the backing 714 with a particle space gap size 722 having a range from 60 to 1000 microns, or more, and where the gap size 722 distance is measured parallel to the surface of the backing 714 between each adjacent agglomerate 718. Grinding debris and swarf generated by the abrading action on a workpiece (not shown) surface travels in the gap space 722 between the agglomerates 718. The resin 708 is shown as having a resin 708 height or thickness 710 that is approximately 33% of the agglomerate 718 diameter 720 where the resin 708 provides structural support to the agglomerate 718 but does not impede the removal of the debris or grinding swarf (not shown) generated by abrading a workpiece (not shown). When a solvent filled slurry coating, comprising a mixture of spherical abrasive agglomerates 718 or other block shaped abrasive particles and a resin 708 having a solvent component, is coated on a backing sheet 714, the slurry resin height 710 can equal or exceed the agglomerate 718 diameter 720 when the resin coating 708 is first applied to the backing 714. After the solvent is removed by evaporation from the resin 708 by partial or full drying of the slurry resin 708 coated backing 714, the volume of the slurry coating resin 708 is reduced from its original coated volume that fully exposes the upper surface of agglomerates 718. The resin 708 remaining after solvent evaporation tends to form a meniscus-shaped resin 708 structural support of the agglomerates 718. Another technique used to obtain the meniscus-shaped resin 708 support of agglomerates 718 is to level-coat a backing 714 with a resin 708 and drop or propel agglomerates 718 into the thickness depth of the coated resin 708 thereby forming a meniscus-shape resin 708 support of the agglomerates 718. An additional resin size coat can be applied to increase the structural support of the agglomerates 718. FIGS. 55, 56, 57 and 58 are cross-section views of full sized abrasive particles composite agglomerates attached to a backing sheet at different stages of wear-down. FIG. 55 is a cross-section view of a spherical agglomerate un-ground and non-worn agglomerate abrasive bead 730 having an exterior surface 728 that surrounds a porous ceramic matrix 738 holding individual abrasive particles 736. The abrasive bead 730 is attached to a backing 734 by a polymeric adhesive resin 732. FIG. 56 is a cross-section view of a partially worn-down abrasive bead 748 having an exterior surface 750 that surrounds a porous ceramic matrix 740 holding individual abrasive particles 736. The abrasive bead 748 is attached to a backing 734 by a polymeric adhesive resin 732. FIG. 57 is a cross-section view of a half worn-down abrasive bead 760 having an exterior surface 762 that surrounds a porous ceramic matrix 738 holding individual abrasive particles 736. The abrasive bead 760 is attached to a backing 734 by a polymeric adhesive resin 732. FIG. 58 is a cross-section view of a fully worn-down abrasive bead 772 having an exterior surface 774 that surrounds a porous ceramic matrix 738 holding individual abrasive particles 736. The abrasive bead 772 is attached to a backing 734 by a polymeric adhesive resin 732. The wear experienced by the agglomerates 730, 748, 760 and 772 occurs progressively from the start of the abrading life of an flexible backing abrasive article to the end of the useful life of the article. The resin 732 must bond the agglomerates, having different wear-down geometric configurations as represented by the agglomerates 730, 748, 760 and 772, to the backing with sufficient strength to resist abrading forces resulting from abrading contact with a workpiece from the initiation of abrading to the final use of the abrasive article. FIG. 59 is a cross-section view of a monolayer or a single layer of partially worn spherical composite abrasive agglomerates having different agglomerate sizes. Large agglomerates 788, medium agglomerates 812, small agglomerates 804 and very small agglomerates 802 are resin 778 bonded to a backing sheet 808. Agglomerates 786, 798 and 812 are partially worn-down where a portion of the agglomerate exterior surface 792 is removed, thereby exposing an area 776 of individual abrasive particles 800 and a erodible ceramic matrix 790. The wear-down line 794 defines the common elevation location of the partial removal of the upper portions of the agglomerates 786 and 812 caused by the abrading contact with a workpiece (not shown). Agglomerates 802 and 804 lie below the wear-down line 794 indicating they have escaped contact with the workpiece and thus have not been useful in the workpiece abrading process. FIG. 60 is a cross-section view of a surface conditioning plate having a abrasive sheet article used to grind off elevated second-level abrasive agglomerate beads attached with a resin to raised island structures attached to a backing sheet. A grinding plate 824 having an attached abrasive covered abrasive sheet article 816 is brought into abrading contact with the elevated second-level abrasive beads 818, 828 that are resin 820 bonded to the upper surfaces of first-level abrasive beads 826 that are resin 820 bonded to a raised island 822 that is attached to a flexible backing sheet 830. Abrading action continues until the elevated second-level beads 818, 828 are removed. This conditioning plate 824 can be used on non-monolayer beads that are attached to raised islands, or, the conditioning plate 824 can be used on annular bands of abrasive particles or agglomerate beads or non-bead abrasive agglomerates that are coated directly on the backing surface of a non-raised island abrasive article. A flat wear-plate or other hard abrading surface articles can be used in place of the abrasive sheet article attached to the conditioning plate 824 to perform the function of removing second-level agglomerates or can be used for abrading away the upper portion of agglomerate exterior surfaces to expose enclosed abrasive particles. Spherical agglomerate beads are shown in FIGS. 53, 54, 55, 56, 57, 58, 59, 60 and 61 illustrate issues related to agglomerate bead coatings and wear-down including the removal of second level abrasive beads but all of the factors of the existence of these issues and the corrective techniques for them are described. These issues and their corrective techniques can also be applied to abrasive articles having individual abrasive particles rather than composite spherical or block shaped agglomerates. Stray oversized individual abrasive particles can also be removed or worn-down to the level of the average sized particles by use of a conditioning plate 824. Stray oversized individual non-spherical abrasive agglomerates can also be removed or worn-down to the level of the average sized agglomerates by use of a conditioning plate 824. The conditioning plate 824 can be moving or stationary. FIG. 61 is a cross-section view of equal sized abrasive agglomerates worn-down to the same level. Equal-sized abrasive agglomerates 832 resin 836 bonded to a backing sheet 838 have an outer exterior surface 844 enclosing small abrasive particles 848 held in a porous ceramic matrix 840. All of the equal-sized worn agglomerates 832 having substantially the same size original non-worn diameters are positioned in a single layer or monolayer in direct proximity on the top surface of a backing sheet 838 and are resin 836 bonded to the backing sheet 838. The wear of each abrasive agglomerate 832 contacting a workpiece (not shown) is substantially equal at the position indicated by the wear line 842. The wear line 842 also indicates the equal wear down of agglomerates 832 to a height 846 above the backing 838 as workpiece abrading wear occurs. The top portion of an agglomerate outer exterior surface located at the wear line 842 is shown partially removed to expose new sharp abrasive particles 848 and the porous ceramic matrix 840 as the ceramic matrix 840 is eroded away and ejected from the agglomerate 832 exterior surface 844 enclosure.

Mesh Screen, Raised Island, Font Sheet

Problem: It is desired to form raised island resin structures on the surface of a backing sheet or continuous web where the islands have equal heights using a hole font sheet. It is important that the font sheet can be separated from the formed islands after the island resin has partially solidified without disturbing the adhesion of the islands to the backing sheet.

Solution: An open cell perforated metal sheet or a woven or welded mesh screen font sheet can be cut into desirable shapes including circular or rectangular or into long rectangular strips that are joined together at the ends to form a continuous belt. The font sheet can be taper hole reamed, ground or machined to have an equal thickness across the full surface. Also, one or both surfaces of the font sheet can be abrasively bead blasted to round off the edges of the font sheet through-holes to provide a tapered base at the support of the raised islands formed with the sheet. The rounded holes also tend to improve separation of the sheet from partially solidified formed resin islands. The perforated sheets and mesh screens may have circular, square, diamond-shape or other shapes and the sheets or screens can be fabricated from metal, polymer material and braided polymer filaments. A paraffin wax, beeswax, polyethylene, Teflon®, silicone rubber, silicone oil, petroleum jelly in a solvent, silicone grease, fluropolymer or other coatings can be applied to the surface of the font sheet. These coatings can also fill in void areas of the font screens to prevent trapping or resin-lock sites for the resin. Perforated metal or polymer sheets, or formed belts, can be immersed in a vat of molten coating material one or more times to build up a coating thickness on the font sheet or the excess coating material may be blown off preferentially from one side of the font sheet or blown off both surfaces of the font sheet by directing the flow air jet at right angles to the font sheet or at an angle to the font sheet. An array of raised islands of resin can be bonded to an individual backing sheet or to a continuous web backing sheet material where the backing material is flexible using the hole font by placing the font sheet in flat contact with the flexible backing, filling the font hole cells level to the surface of the font with liquid resin and then separating the font sheet from the back either before or after partial solidification of the resin thereby leaving liquid or partially solidified resin island sites adhesively bonded to the backing sheet. The backing sheet having the attached liquid resin island sites can then be pressed, sandwich fashion, between two gap spaced parallel island mold plates to create an array of islands, all having the same height measured from the backside of the backing. A precision thickness release liner sheet may be placed between the top of the liquid island tops and the upper mold plate and the mold plate and the release liner separated from the islands after the resin is partially solidified where the resin is of a rheological elastic character and having a reduced visco-elastic character. The partially solidified resin results in geometrically stabilized island shapes that retain the equal island heights and flat-topped island surfaces after either, or both, the upper mold plate and the release liner are separated from the array of resin islands. Likewise, a continuous belt can be constructed from mesh screen or perforated metal and the belt may be coated with a wax or other release agent. The belt may be routed over two rolls and the open belt cells continuously filled with liquid resin to allow the resin to be deposited on a continuous web that is routed into surface contact with the belt where the resin contained in the belt cells adhesively contacts the web backing surface. The belt-cell resin material that is in wet contact with the web backing is drawn from the individual belt cells as the web is separated from the belt and these cell material lumps become deposited on the web surface to form an array of liquid resin islands on the backing material. The open cell belt can be separated from the backing before or after partial solidification of the resin. The resin may be solidified by various chemical or energy means or with electron beam radiation or other heat or energy sources. After separation of the open cell font belt, a calendar roll can be positioned a gap-spaced distance from a rotating backing roll where the surface of the calendar roll contacts the resin islands directly or contacts a precision thickness release liner web that is routed between the calendar roll surface and the resin island top surfaces. One or more of these calendar rolls may form all the islands to an equal height measured from the backside of the island backing. Island array patterns can be formed into the island hole font belts and font sheets to form abrasive articles of many different configurations on backing sheets or on continuous web materials including circular disks having arrays of islands positioned across the full continuous surface of the disk. Islands may be formed as an annular band of islands or sheet articles may have rectangular island arrays on rectangular sheets or on long web strips or on strips that are joined together at both ends to form an endless belt.

The island shapes include circular, rectangular bar, serpentine, curved crescent shapes and other shapes that are arranged in rectangular or annular array patterns to form circular disks or rectangular sheets or rectangular strips or endless belts. The flexible or rigid hole font can be made of materials including but not limited to polymer, wax, silicone rubber, fluoropolymer, metal or other materials such as woven or braided fiber or polymer threads. The hole font may be coated or saturated with adhesion release materials including wax, silicone rubber, silicone or flupopolymer oils, silicone grease, other greases and oils or other release agents commonly used in the plastic injection mold industry. Successful transfer of the liquid resin from the font cell holes to the backing sheet depends on a number of factors. It is desired to have good adhesion of the resin to the backing sheet and have poor adhesion of the resin to the font to allow the backing sheet to be separated from the font sheet wherein the liquid resin contained in the font hole cells is drawn out of the font cells by the gradual separation motion of the backing sheet away from the font sheet. A gradual separation is preferred due to the liquid shear forces being applied to the individual cell volumes of resin by the relative movement of the backing sheet as it is moved away from the font sheet. A fast separation motion can shear the resin thereby leaving a portion of it adhering to the font rather than transferring the whole resin lump contained in a font cell hole to the backing as a single entity shape. A paraffin wax coating on the font cells prevents adhesion of the liquid resin when a shallow separation angle of less than 30 degrees is used to separate the font from the web or sheet backing. Also, it is preferred to maintain the same forward velocity of both the font and the backing to prevent skewing of the island shapes which may occur when there is a relative lineal velocity between the backing web or backing sheet and the font. Further, it is desirable that the font and backing become separated at a slow speed to prevent separation of resin cell volumes due to fluid inertia effects. When part of a cell volume becomes separated from the cell volume bulk lump this may result in a distorted or reduced size island shape being deposited on the backing sheet surface. The rheological characteristics of the resin are important to make a transfer of island shapes to the backing. Resin having a high viscosity is more stable geometrically than low viscosity resin but high viscosity resin is more difficult to extract from a cell. Resin having a thixotropic character where the shape is only distorted by fluid shear action may be helpful to transfer a resin island volume as an intact lump shape.

Stiction of Abrasive Articles

Problem: It is desired to construct a abrasive article that minimizes the "stiction" between the surface of a abrasive sheet article and a flat workpiece when water is used as a coolant during the abrading process.

Solution: Water is often used as a coolant to remove heat that is generated in localized areas where the abrasive surface contacts a workpiece surface. The highest elevation abrasive article surface areas first contact a workpiece surface area, particularly when the abrasive is a in the form of a thin sheet that is mounted on a rigid flat platen or other abrasive sheet supporting surface. Also, high spots on the surface of a workpiece are in contact with an abrasive surface before the low spots, or low areas, of a workpiece contact an abrasive surface. In either case, the contact force applied between the abrasive and the workpiece is concentrated in a small contact-area and this concentrated force tends to create localized heating of small portions of the workpiece surface. Often this localized heating can induce large thermal stress in the workpiece, which can cause localized cracking, or micro-cracks, in the workpiece due to the large temperature gradients that are generated by the localized heating. Temperatures can become high enough in localized areas, such as at the tip of a single abrasive particle that the particle tip can become carburized and dulled even though the average temperature of a somewhat larger area doesn't even reach a water boiling temperature. Air can be used as a coolant to reduce these large temperatures but air is a poor heat transfer medium as it has low convection heat transfer coefficients and also has low thermal mass heat absorption capabilities. Water is a preferred coolant as water boils when heated past its boiling point of 212 degrees F., which is a low enough temperature to protect a workpiece from thermal stresses. Water has a very large coefficient of convective heat transfer, when boiling, which helps remove localized generated heat from the workpiece. This heat is transferred to the water, which is moved away from the hot spot on the workpiece. Also, water absorbs a large quantity of heat when it boils in localized areas due to the large heat of fusion of water, which further helps remove the generated heat as the heat is carried away in the form of steam.

The use of coolant water can create problems which become apparent when a smooth surfaced abrasive lapping sheet having a thin smooth coat of small abrasive particles, or abrasive beads, is used to grind flat and lap smooth a workpiece surface. As the workpiece becomes more flat and smooth the water film between the workpiece and the abrasive becomes thinner. When the workpiece is moved away from the abrasive in a direction perpendicular to the abrasive surface, the water film acts as a bonding agent between the workpiece and abrasive surfaces. This bonding action takes place as the water is basically non-elastic (incompressible and non-stretchable until the vapor pressure of the water is reached) and the volumetric change in the water film volume required as the two surfaces are separated can not easily take place. Upon workpiece separation, an extra volume of replacement water is required at the interior of the workpiece water film area to allow the workpiece to separate from the abrasive surface. This extra water has to flow the long distance across the full radius, or full half-width, of a workpiece surface inward to the center of the workpiece from the outer periphery of the workpiece perimeter. In addition, the new added volume of water has to travel toward the workpiece surface center through the very small gap that exists between the workpiece and abrasive sheet mutual surface areas. Water is much too viscous to flow through this very thin gap easily so the workpiece appears to be "attached" or "adhesively bonded" to the abrasive sheet when the workpiece is withdrawn from the abrasive surface. This attachment can also be referred to as "stiction". Further, when a workpiece that has been ground flat to the surface of a very smooth lapping film abrasive sheet is also moved laterally along the surface of the abrasive, the force required to make this lateral movement also increases as the workpiece is lapped into a more flat and smooth surface condition. Here, the very thin layer of coolant water that exists in the gap between the two surfaces is sheared by the lateral motion of the workpiece. The force required to move the workpiece against this water film lateral shearing force increases as the velocity of the motion is increased. The lateral shearing force also increases with a size increase of the workpiece as the sheared area of the coolant water film increases for larger sized workpieces. This lateral force can also be referred to as "stiction". These effects of stiction can be seen by observing the stiction action of a water-wetted suction cup that is squeezed tightly against a mirror surface to create a very thin layer of water between the surface of the suction cup and the mirror. The suction cup device has significant holding power in both a perpendicular and lateral direction. In another example, forcing two pieces of water-wetted flat glass together can demonstrate both the perpendicular and lateral stiction forces due to the viscosity of the water that lies between the two flat surfaces. In addition to these coolant water film viscous shear effects, when abrasive surface particles attached to an abrasive sheet article interlock with very small imperfections located on the surface of a workpiece, additional stiction forces can be present when a force is applied to separate the two surfaces. Abrasive articles having abrasive coated raised island structures can be used to reduce the effects of stiction as the coolant water is given a free flow path in the recessed passageways that exist between the raised island structures. Water that has to travel to the center of the contact areas of each individual island structure to provide workpiece separation only has to travel a small fraction of the distance required by that of a non-island abrasive article. This shorter water travel distance occurs because the individual contact area size dimensions of the many abrasive raised island areas is much smaller than the contact area dimensions of the full sized workpiece.

Boundary Layer of Coolant Water

Problem: It is desired to construct an abrasive article that minimizes the formation of thick boundary layers of slow moving water films that can exist directly on the surface of a workpiece that is moving at high relative surface speeds in contact with a smooth abrasive article. These thick boundary layers can prevent portions of a workpiece surface from laying flat against the surface of a abrasive article, which can result in the workpiece being ground non-flat as only some of the moving abrasive contacts the workpiece. In some cases the water fluid boundary layer can become so thick that the individual abrasive particles can not reach through the thickness of the boundary layer to contact a workpiece surface. Here also, the water boundary layer can actually cause hydroplaning of the workpiece where portions of, or all of, the workpiece is held away from contact with the abrasive particles. Boundary layers can be formed on the surface of a workpiece both when the workpiece is stationary and the abrasive is moved, or they can be formed when the workpiece is moved and the abrasive is stationary.

Solution: An abrasive article having abrasive coated raised island structures can be used to reduce the effect of hydroplaning of a water-cooled workpiece during abrading, as compared to a flat surfaced abrasive article. Water is typically applied at the entry of the interface between the workpiece and the abrasive article as the abrasive is moving relative to the workpiece. This water is carried into the small gap that exists between the abrasive surface and the workpiece surface. The abrasive side of the water film can have a small, or little, velocity relative to the abrasive surface, depending in part on the thickness of the water film. The action of the moving abrasive article carrying the layer of water into the gap space between the abrasive and the workpiece develops a water film thickness on the surface of the stationary workpiece. The portions of the water film that are in direct contact with the surface of the stationary workpiece have little, if any, velocity relative to the workpiece surface. Portions of the water film does have an progressively increased velocity relative to the workpiece surface as the distance in the water film, in a direction perpendicular to the workpiece surface, is increased. At a certain distance away from the abrasive surface, the velocity of a portion of the water in a thick water film has nearly the same velocity as the abrasive surface, which defines the top location of the boundary layer thickness. The water boundary layer thickness extends from the surface of the workpiece to the region where the water has a velocity nearly equal to the free stream velocity of the abrasive carried water. The boundary layer thickness is generally developed in a moving stream of water that is thick enough that a portion of the water film closest to the moving abrasive surface has a uniform velocity that equals the moving abrasive velocity. This condition of the presence of an extra-thick layer of water in the gap between the abrasive surface and a workpiece surface may or may not exist in high speed lapping operations depending on many variables including the type and condition of the workpiece, the abrasive type, the abrading speeds and contact pressures. The thickness of a boundary layer increases from zero thickness at the leading edge of the workpiece to a larger thickness that is a function of the distance away from the leading edge as measured along the flat surface of the workpiece. This water film thickness increases in the direction of the abrading relative surface speed velocity vector. The longer the distance from the leading edge of the workpiece, the thicker the boundary layer can be. If a workpiece has a long surface dimension, as measured in the direction of the abrading velocity vector, the boundary layer can become quite thick. However, when the trailing edge of the workpiece loses contact with the abrasive, the boundary stops building in depth as there is no gap water that is being laterally sheared by the mutual relative motion between the workpiece and the abrasive surface. Here, the formation of the water boundary layer is broken at the workpiece trailing edge. Water drawn into the gap area between the workpiece and the abrasive can separate the workpiece from physical contact with the abrasive due to the thickness of the formed water boundary layer. Separation by the boundary layer can prevent individual abrasive particles that are coated on the surface of a workpiece from having abrading contact with a workpiece. Full-sized unworn abrasive particles or abrasive beads that are coated on the surface of a abrasive lapping sheet article typically have sizes or diameters that are only 0.002 inches (50 micrometers). These particles are usually imbedded into a polymer resin binder coating to where only two thirds of the non-worn down individual full-sized abrasive particles are exposed above the surface of the supporting binder layer. When the abrasive particles or abrasive beads are half worn they project much less than 0.001 inch (25 micrometers) from the abrasive binder surface but the thickness of the boundary layer remains the same. It becomes more difficult for these worn abrasive beads to maintain abrading contact with the surface of the workpiece as the abrasive wear continues. Boundary layer thicknesses of water, which are a function of a number of variables, including the abrading velocity and the distance from the workpiece leading edge, can easily exceed the distance that the individual abrasive particles extend out from the surface of the abrasive sheet article. Reduction of the boundary layer thickness is desirable. The workpiece surface contact dimensions can not be changed but the corresponding contact dimensions of the abrasive article can be shortened by significant amounts. When an abrasive article is used that has raised flat surfaced abrasive coated island structures, instead of an abrasive article that has a continuous flat planar abrasive surface, the contact distance between the workpiece and the abrasive surface leading edge can be substantially reduced. The water boundary layer thickness is now formed from the leading edge of the island structure and extends to the opposite side of the island surface area that is located in a downstream direction aligned with the abrading velocity speed vector. The boundary layer thickness build-up stops at the trailing edge of the raised island surface. Each raised island can have a very short surface area dimension as measured in the direction of the abrading speed vector direction. The same raised islands can have surface area dimensions that are quite long in directions that are perpendicular to the abrading speed vector as the boundary layer thickness is not a function of this specific perpendicular area dimension. Thus, the individual raised islands can have large sized surface areas but it is desired that they have short dimensions in the critical abrading vector direction. Raised island abrasive articles can be orientated relative to a workpiece and lapping or grinding equipment to optimize the reduction of the thickness of water boundary layers, particularly during high speed lapping operations. The use of narrow radial-positioned raised island abrasive coated bars on an abrasive disk article that is rotated at high speeds on a platen is an example of this optimization. Raised island shapes and island array patterns can also be optimized on rectangular abrasive articles that are used to abrade and polish workpiece articles even when the abrasive article is stationary and the workpiece is moved relative to the abrasive with different circulatory, or other, patterns of workpiece motion.

In high speed lapping operations coolant water is typically applied to the surface of a moving abrasive surface as a liquid spray or a water mist where it is carried under a workpiece surface to temporarily reside in the gap that exists between the workpiece surface and the abrasive surface. Water that already exists in the gap between the workpiece and abrasive is also carried out of the gap by the moving abrasive. The relative abrading speed can be high, medium or low and the speed may be intentionally varied during an abrading process. Further, the workpiece can be stationary, can have a surface speed that is opposed to the abrasive surface speed or the workpiece can have a speed that is in the same direction as the abrasive surface speed. Also, the abrasive can be stationary and the workpiece moved. The abrasive or workpiece can have a rotational motion or a linear motion or it can have a motion geometrical or random pattern. The amount of water that is carried into or out from the gap between the workpiece and the abrasive is also a function of the type of, and size and wear condition of, the abrasive particles, agglomerates or beads. A workpiece having a long dimension in the vector direction of the abrading speed affects the amount of water or water film thickness that is present in the gap. Likewise, the downstream length of the raised island structures, the leading edge shape of the islands and the width of the leading edges of the islands that are attached to a raised island abrasive article will affect the depth of the water gap film. For high speed lapping or grinding, the amount of water that is applied to the surface of an abrasive sheet can affect the water gap film thickness, as does the relative abrading speed. The leading edge geometry of the workpiece surface periphery can have a large influence on the water film thickness. If the workpiece has a knife-edge that is held in close proximity to the abrasive surface, the water that is being carried at high speeds by the abrasive then is deflected off to the side of the workpiece as this carried water film impacts the leading edge side of the workpiece. The water that impacts the side of the workpiece is instantly decelerated from the nominal speed of the abrasive to a standstill velocity, which develops a large dynamic water pressure at the leading edge area of the workpiece. If this high pressure reaches into the gap between the workpiece and the abrasive surface, this high pressure will be applied against some of the leading edge portion of the workpiece flat surface area and will tend to lift the front leading edge area of the workpiece away from the abrasive. When the front workpiece edge is raised, even a very small amount, an angled wedge gap is formed between the workpiece and the abrasive. Then more water is driven into this wedge gap and the workpiece is lifted further from the abrasive. Shallow wedge angles in the gaps between sliding surface components in the presence of a liquid allows the liquid to be driven into the gap which is the fluid flow mechanism for the lubrication of moving components. Once a liquid moving at high speeds enters the gap area, it is drawn into the deeper regions of the gap and will form a high pressure boundary layer of liquid in the whole gap area between the two components. The fluid that exists in the component gaps can produce very high component separation pressures even when a fluid such as air, that has little viscosity, is used. If a workpiece leading edge is rounded or angled, even the slightest amount, coolant water can be driven into this angled area and tend to separate the both the leading edge and the whole surface area of the workpiece from the abrasive surface. Furthermore, when a workpiece has a non-flat defective area at a portion of a leading edge, water can be easily driven into this localized defective area and raise this portion of the workpiece away from the abrasive surface. This is often the case when a workpiece is being flat-ground into a planar shape prior to the whole newly flatten surface receiving polishing action to produce both a flat and smooth surface. There are other issues that are raised in the formation of uniform thickness water boundary layers between a workpiece and an abrading surface when the central portion of the workpiece surface is either raised or recessed from the nominal plane of the workpiece surface. Recessed areas produce thicker localized boundary layers and raised areas produce thinner localized boundary layers. There are large potential advantages to use raised abrasive coated island articles in place of continuous flat surfaced abrasive articles as they can reduce the amount of water that is driven into the gap between a workpiece surface and the abrading surface of the abrasive article.

Individual raised island abrasive articles can be cut out from web backings without disturbing the structural integrity of either the raised island structures or the abrasive coatings on the structures by cutting out the article with a cutting pattern that avoids cutting through the thickness of the raised island structure, but instead, by cutting through the thickness of the backing sheet adjacent to the raised islands.

The preferred method of manufacturing an abrasive article having abrasive particle coated raised island structures that are attached to a flexible continuous-web backing sheet material is to first produce a web having non-coated raised island structures that have island top surfaces that are precisely located in a plane that is parallel to the flat mounting side of the backing sheet. Then, it is preferred that an abrasive coating be applied to the flat surfaces of the raised islands. The same preference exists for manufacturing raised island abrasive articles from individual sheets of non-continuous-web backing material. Precisely flat abrasive island structures that are attached to a backing sheet are first manufactured and then these island structures are coated with abrasive particles or abrasive agglomerates. If uncoated island structures can be produced sufficiently flat in a common plane that is precisely parallel to the back mounting surface of a backing sheet the structures can be coated with a monolayer of abrasive particles or abrasive agglomerates where the coated abrasive article will also have a precision thickness as measured from the top surface of the abrasive to the backside of the backing if each equal sized abrasive particle is attached directly to the planar surface of the island structures with no resin gap space between the particle and the island surface. The required flatness of the uncoated island structures is related to the size of the abrasive particles or agglomerates that are coated in a monolayer onto the structure surfaces. A very large particle diameter size allows the possibility of having less accurate island structure height or thickness control as most of a particle would be consumed by abrading action before a workpiece contacted the uncoated portion of the surface of a raised elevation out-of-plane island structure. The thickness tolerance of the allowable variation of island structure thickness can be defined as a percentage of the diameter or equivalent diameter of the abrasive particles or abrasive agglomerates that are coated on the island structures. The goal is to coat a structure with a monolayer of abrasive particles or abrasive agglomerates and then to utilize most of the volume quantity of hard abrasive material that is contained in each abrasive particle. Spherical shaped abrasive particles or abrasive agglomerates offer an advantage over square block or truncated pyramid shaped particles in that the sphere shape presents the volume bulk of abrasive material to a workpiece at a distance equal to the sphere radius at a elevation removed from the top surface of the island structure. These spheres all tend to consistently contact the structure surface at a sphere contact point that provides a uniform height location of each sphere above the structure surface. Most of the sphere abrasive material volume is located at the center of the sphere that is positioned above the sphere island structure contact point by a distance equal to the sphere radius. It is preferred that the standard deviation in the uncoated island structure thickness which is measured from the top of the uncoated raised island surface to the back mounting side of the backing sheet be less than 80% of the equivalent diameter of the abrasive particles or agglomerates that are to be coated on the structures. It is more preferred that the standard deviation be less than 50% and even more preferred that the deviation be less than 30%. If a thin resin coat is first applied to island structure surfaces and abrasive particles are drop coated or electrostatic propelled into the resin coat it is important that the particles have a consistent penetration into the resin coat material to maintain the uniform flatness and described thickness of the abrasive article coating. Drop coating abrasive particles into thick resin coatings or into non uniform thickness resin coatings can create abrasive article thickness control problems as some particles may penetrate deeply into the resin and some other particles may reside on the top surface of the thick resin coating which can result in non precise abrasive article thickness at portions of the article abrasive surface. If a slurry mixture of a polymer resin and abrasive particles or abrasive agglomerates is coated on the island structures, it is important that the coating is applied with techniques that provide a uniform precision thickness of the finished abrasive coated article. It is difficult to adjust the precision thickness of the abrasive coatings to compensate for non-flat surfaces of the island structures. There are many different methods and combinations of methods that can be used to manufacture flexible sheet abrasive articles having raised island structures that can have many article forms including but not limited to continuous abrasive surfaced disks, annular abrasive surfaced disks, rectangular sheets, long strips or bands, and continuous belts that have precision thickness abrasive coated islands which allow them to be used in precision low or high speed grinding and lapping operations. Some methods and combinations of methods of manufacturing are described here in detail but many other combinations that are not described can also be used create these precision thickness raised island abrasive articles.

Further described is a flexible, continuous abrasive sheet web comprising a flexible polymeric or metal backing web sheet having an full web width array of raised abrasive structures, the abrasive structures comprising islands of a first structural material having a raised flat top surface, the top surface having at least a monolayer of abrasive particles or abrasive agglomerates supported in a polymeric resin, wherein the total web thickness of all islands measured from the flat top surface of the abrasive coated islands to the bottom support surface of the backing sheet has a standard deviation in abrasive particle coated islands thickness of less than 0.03 mm. That web may have a full web width array of islands made up of circular island shapes. In addition, that web may have island structures that are top coated with a monolayer of diamonds or other hard abrasive particles or abrasive agglomerates at least 7 up to 400 micrometers in average particle diameter. Also, that web may have island structures that are top coated with a slurry mixture comprising abrasive particles or abrasive agglomerates and a polymer resin. Further, the raised island structure material of that web may comprises a particle filled polymer resin or a non-particle filled polymer resin. The island structures of that web may have the island material flat top surfaces formed by mold plates or the surfaces may be formed by mold rolls or the surface may be machined or the surface may be abrasively ground to a precise raised island structure total web thickness wherein the web thickness is measured from the flat top surface of the non-abrasive coated island material structure to the bottom support surface of the web backing sheet. Described is a process of resin coating that web where the top exposed surfaces of the island foundation structures are precision thickness polymeric resin coated by a web sheet transfer coating process where a liquid-state resin coated transfer web sheet is pressed into conformation in uniform contact with the nominally flat top surfaces of the full web width array of raised islands until the resin wets the full top surface area of each island, after which wetting the coated transfer web sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin. In addition, a process is described of abrasive slurry coating that abrasive web where the top exposed surfaces of the island foundation structures are precision thickness abrasive slurry resin mixture coated by a web sheet transfer coating process where a liquid-state abrasive resin slurry mixture coated transfer web sheet, the slurry mixture comprising abrasive particles or abrasive agglomerates and a polymer resin, is pressed into conformation in uniform contact with the nominally flat top surfaces of the full web width array of raised islands until the slurry mixture wets the full top surface area of each island, after which wetting the coated transfer web sheet is removed, leaving at least 5% of the abrasive slurry mixture within the island areas of contact attached as a uniform layer on the island top surfaces.

A abrasive web is described where the flexible, continuous abrasive sheet web comprising a flexible polymeric or metal backing web sheet having an full web width array of raised abrasive structures, the abrasive structures comprising islands of a first structural material having a raised flat top surface, the top surface having at least a monolayer of abrasive particles or abrasive agglomerates supported in a polymeric resin, where the total thickness of all islands measured from the flat top surface of the abrasive coated islands to the bottom support surface of the backing sheet has a standard deviation in abrasive particle coated islands thickness of less than 80% of the average diameter of the abrasive particles or abrasive agglomerates. That web may have a full web width array of islands that are made up of circular island shapes. Also, the island structures of that web may be top coated with a monolayer of diamonds or other hard abrasive particles or abrasive agglomerates at least 7 up to 400 micrometers in average particle diameter. Further, that flexible abrasive web may have island structures that are top coated with a slurry mixture comprising abrasive particles or abrasive agglomerates and a polymer resin. The raised island structure material of that web may comprise a particle filled polymer resin or a non-particle filled polymer resin and the island structure material flat top surface may be formed by mold plates or the surface may be formed by mold rolls or the surface may be machined or the surface may be abrasively ground to a precise raised island structure total web thickness wherein the web thickness is measured from the flat top surface of the non-abrasive coated island material structure to the bottom support surface of the web backing sheet. Also, a process of resin coating that abrasive web is described where the top exposed surfaces of the island foundation structures are precision thickness polymeric resin coated by a web sheet transfer coating process where a liquid-state resin coated transfer web sheet is pressed into conformation in uniform contact with the nominally flat top surfaces of the full web width array of raised islands until the resin wets the full top surface area of each island, after which wetting the coated transfer web sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin. Another process of abrasive slurry coating that abrasive web is described where the top exposed surfaces of the island foundation structures are precision thickness abrasive slurry resin mixture coated by a web sheet transfer coating process where a liquid-state abrasive resin slurry mixture coated transfer web sheet, the slurry mixture comprising abrasive particles or abrasive agglomerates and a polymer resin, is pressed into conformation in uniform contact with the nominally flat top surfaces of the full web width array of raised islands until the slurry mixture wets the full top surface area of each island, after which wetting the coated transfer web sheet is removed, leaving at least 5% of the abrasive slurry mixture within the island areas of contact attached as a uniform layer on the island top surfaces. Further, that continuous web sheet may be shape-cut to form circular abrasive disks and that web sheet may be shape-cut to form rectangular abrasive sheets.

A flexible, continuous abrasive rectangular shaped sheet article is described where the article comprising a flexible polymeric or metal backing sheet having an full article sheet surface area array of raised abrasive structures, the abrasive structures comprising islands of a first structural material having a raised flat top surface, the top surface having at least a monolayer of abrasive particles or abrasive agglomerates supported in a polymeric resin, wherein the total thickness of all rectangular sheet islands measured from the flat top surface of the abrasive coated islands to the bottom support surface of the rectangular backing sheet has a standard deviation in abrasive particle coated islands thickness of less than 0.03 mm. That rectangular article may have a full article area array of islands is made up of circular island shapes. A process is described where that rectangular abrasive sheet article is attached to a flat platen surface by the use of vacuum wherein the vacuum reduced atmospheric pressure is provided on the back support side of the disk sheet thereby attaching the disk flat surface in flat contact to the platen flat surface. Also, that abrasive sheet article may be used where the coated abrasive sheet is a lapping film used to abrasively flat lap a workpiece surface. In addition, that flexible abrasive sheet article may have island structures that are top coated with a monolayer of diamonds or other hard abrasive particles or abrasive agglomerates at least 7 and up to 400 micrometers in average particle diameter. Further that sheet may have island structures that are top coated with a slurry mixture comprising abrasive particles or abrasive agglomerates and a polymer resin. Also, that rectangular flexible abrasive sheet may have raised island structure material that comprises a particle filled polymer resin or a non-particle filled polymer resin and these island structure material may have flat top surfaces that are formed by mold plates or the surface may be formed by mold rolls or the surface may be machined or the surface may be abrasively ground to a precise raised island structure total sheet thickness wherein the rectangular sheet thickness is measured from the flat top surface of the non-abrasive coated island material structure to the bottom support surface of the rectangular backing sheet. A process of resin coating that abrasive rectangular sheet is where the top exposed surfaces of the island foundation structures are precision thickness polymeric resin coated by a sheet transfer coating process where a liquid-state resin coated transfer sheet is pressed into conformation in uniform contact with the nominally flat top surfaces of the article full array of raised islands until the resin wets the full top surface area of each island, after which wetting the coated transfer sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin. In addition, a process of abrasive slurry coating that abrasive rectangular sheet where the top exposed surfaces of the island foundation structures are precision thickness abrasive slurry resin mixture coated by a sheet transfer coating process where a liquid-state abrasive resin slurry mixture coated transfer sheet, the slurry mixture comprising abrasive particles or abrasive agglomerates and a polymer resin, is pressed into conformation in uniform contact with the nominally flat top surfaces of the article full array of raised islands until the slurry mixture wets the full top surface area of each island, after which wetting the coated transfer sheet is removed, leaving at least 5% of the abrasive slurry mixture within the island areas of contact attached as a uniform layer on the island top surfaces.

Also, a flexible, continuous abrasive sheet rectangular shaped article may be used, the article comprising a flexible polymeric or metal backing web sheet having an full article sheet surface area array of raised abrasive structures, the abrasive structures comprising islands of a first structural material having a raised flat top surface, the top surface having at least a monolayer of abrasive particles or abrasive agglomerates supported in a polymeric resin, wherein the total thickness of all islands measured from the flat top surface of the abrasive coated islands to the bottom support surface of the backing sheet has a standard deviation in abrasive particle coated islands thickness of less than 80% of the average diameter of the abrasive particles or abrasive agglomerates. That sheet may have a full article area array of islands made up of circular island shapes. Further, a process may be used where that abrasive sheet article may be attached to a flat platen surface by the use of vacuum wherein the vacuum reduced atmospheric pressure is provided on the back support side of the disk sheet thereby attaching the disk flat surface in flat contact to the platen flat surface. Also, that abrasive sheet article may be used where the coated abrasive disk is a lapping film used to abrasively flat lap a workpiece surface. That flexible abrasive sheet may have island structures that are top coated with a monolayer of diamonds or other hard abrasive particles or abrasive agglomerates at least 7 up to 400 micrometers in average particle diameter. In addition, that flexible abrasive sheet island structures may be top coated with a slurry mixture comprising abrasive particles or abrasive agglomerates and a polymer resin and the raised island structure material may comprise a particle filled polymer resin or a non-particle filled polymer resin. Further, the island structures may have island material flat top surfaces that are formed by mold plates or the surface may be formed by mold rolls or the surface may be machined or the surface may be abrasively ground to a precise raised island structure total sheet thickness wherein the rectangular sheet thickness is measured from the flat top surface of the non-abrasive coated island material structure to the bottom support surface of the rectangular backing sheet. A process of resin coating a abrasive rectangular sheet exists where the top exposed surfaces of the island foundation structures are precision thickness polymeric resin coated by a sheet transfer coating process where a liquid-state resin coated transfer sheet is pressed into conformation in uniform contact with the nominally flat top surfaces of the article full array of raised islands until the resin wets the full top surface area of each island, after which wetting the coated transfer sheet is removed, leaving at least 5% of the resin within the island areas of contact attached as a uniform layer on the island top surfaces, after which abrasive particles or abrasive agglomerates are deposited onto the wet resin coated islands wherein the particles or agglomerates are supported in the polymeric resin. In addition, a process of abrasive slurry coating that abrasive rectangular may be used where the top exposed surfaces of the island foundation structures are precision thickness abrasive slurry resin mixture coated by a sheet transfer coating process where a liquid-state abrasive resin slurry mixture coated transfer sheet, the slurry mixture comprising abrasive particles or abrasive agglomerates and a polymer resin, is pressed into conformation in uniform contact with the nominally flat top surfaces of the article full array of raised islands until the slurry mixture wets the full top surface area of each island, after which wetting the coated transfer sheet is removed, leaving at least 5% of the abrasive slurry mixture within the island areas of contact attached as a uniform layer on the island top surfaces.

A flexible abrasive sheet article has an array of abrasive coated raised island structures that are attached to a backing sheet wherein the backing sheet has a sheet periphery edge, the abrasive article comprising: islands of a first structural material, the islands having raised island flat top surfaces; the flat top island surfaces having a monolayer of spherical abrasive agglomerate beads supported in a polymeric resin; structures have structure wall sides; structures have a structure base, the structure base having a structure base area; there are recessed areas between adjacent structures; the individual structures that are located at the sheet periphery edge have structure base areas wherein the structure base area sizes of these peripheral edge structures are at least 80% of the average size of the structure base areas of all of the structures that are attached to the article backing sheet; and the individual structures that are located at the periphery edge of the backing sheet are positioned on the backing sheet whereby at least a portion of the island structure base of each of these periphery edge location raised structures is adjacent to the periphery edge of the backing sheet wherein there is an absence of defined recessed areas that exist between the structure bases and the periphery edge of the backing sheet. Also, that article where the abrasive article backing sheet periphery has a circular shape and where the abrasive article backing sheet periphery has a rectangular shape, and further where the abrasive article backing sheet has a serpentine or compound curved sheet periphery edge line whereby at least a portion of the island structure base of each of the periphery edge location raised structures is adjacent to the serpentine or compound curved periphery edge of the backing sheet wherein there is an absence of defined recessed areas that exist between the structure bases and the serpentine or compound curved periphery edge of the backing sheet.

A flexible abrasive sheet article has an array of abrasive coated raised island structures that are attached to a backing sheet, the abrasive article comprising: islands of a first structural material, the islands having raised island flat top surfaces; the flat top island surfaces having a monolayer of spherical abrasive agglomerate beads supported in a polymeric resin; structures have structure wall sides; structures have a structure base, the structure base having a structure base area; there are recessed areas between adjacent structures; the total thickness of all islands measured from the flat top surface of the abrasive coated islands to the bottom support surface of the backing sheet has a standard deviation in abrasive particle coated islands thickness of less than 80% of the average diameter of the abrasive beads. That article where the standard deviation in thickness is less than 50% and where the abrasive article backing sheet periphery has a circular shape and further, where the abrasive article backing sheet periphery has a rectangular shape, in addition to, where the abrasive article backing sheet periphery has a serpentine or compound curved edge. The same article where the individual structures that are located at the periphery edge of the backing sheet have structure base areas wherein the structure base area sizes of these peripheral edge structures are at least 80% of the average size of the structure base areas of all of the structures that are attached to the article backing sheet and where the individual structures that are located at the periphery edge of the backing sheet are positioned on the backing sheet wherein these peripheral structures have recessed areas that extend between the structures and the backing sheet peripheral edge and the article where the individual structures that are located at the periphery edge of the backing sheet have structure base areas wherein the structure base area sizes of these peripheral edge structures are at least 80% of the average size of the structure base areas of all of the structures that are attached to the article backing sheet and where the individual structures that are located at the periphery edge of the backing sheet are positioned on the backing sheet whereby at least a portion of the island structure base of each of these periphery edge location raised structures is adjacent to the periphery edge of the backing sheet wherein there is an absence of defined recessed areas that exist between the structure bases and the periphery edge of the backing sheet. Also, the same article, where the abrasive agglomerate bead is a spherical shaped abrasive bead comprised of diamond abrasive particles that are supported by a porous metal oxide matrix and where the average bead diameter ranges from 20 to 100 micrometers and where the article average bead diameter ranges from 40 to 60 micrometers and where the spherical abrasive beads are supported in a polymeric resin have a average gap spacing between adjacent beads where the gap spacing distance is less than 10 times the average diameter of the beads. Further, the same article where the spherical abrasive beads are supported in a polymeric resin have a average gap spacing between adjacent beads where the gap spacing distance is less than 4 times the average diameter of the beads and where the spherical abrasive beads are supported in a polymeric resin have a average gap spacing between adjacent beads where the gap spacing distance is less than 2 times the average diameter of the beads and in addition, the article where the spherical abrasive beads are supported in a polymeric resin have a average gap spacing between adjacent beads where the gap spacing distance is less than the average diameter of the beads.

A flexible abrasive sheet article has an array of abrasive coated raised island structures that are attached to a backing sheet, the abrasive article comprising: islands of a first structural material, the islands having raised island flat top surfaces; the flat top island surfaces having a monolayer of spherical abrasive agglomerate beads supported in a polymeric resin; structures have structure wall sides; structures have a structure base, the structure base having a structure base area; there are recessed areas between adjacent structures; the total thickness of all islands measured from the flat top surface of the abrasive coated islands to the bottom support surface of the backing sheet has a standard deviation in abrasive particle coated islands thickness of less than 10 micrometers. That article where the standard deviation is less than 5 micrometers and where the abrasive article backing sheet periphery has a circular shape, also where the abrasive article backing sheet periphery has a rectangular shape, further where the average bead diameter ranges from 20 to 100 micrometers and where the average bead diameter ranges from 40 to 60 micrometers.

A flexible abrasive sheet article has an array of abrasive coated raised island structures that are attached to a backing sheet, the abrasive article comprising: islands of a first structural material, the islands having raised island flat top surfaces; the flat top island surfaces having a monolayer of spherical abrasive agglomerate beads supported in a polymeric resin; structures have structure wall sides; structures have a structure base, the structure base having a structure base area; there are recessed areas between adjacent structures; wherein at least 90% of the individual abrasive agglomerate beads that are located at the periphery edge of each island structure flat top surfaces are positioned on the island flat surface where no portion of the individual abrasive beads extends beyond the vertical alignment with the periphery edge of the island surface periphery edge when the backing sheet is positioned in a horizontal plane. That article wherein at least 95% of the individual abrasive agglomerate beads that are located at the periphery edge of each island structure flat top surfaces are positioned on the island flat surface where no portion of the individual abrasive beads extends beyond the vertical alignment with the periphery edge of the island surface periphery edge when the backing sheet is positioned in a horizontal plane and wherein at least 99% of the individual abrasive agglomerate beads that are located at the periphery edge of each island structure flat top surfaces are positioned on the island flat surface where no portion of the individual abrasive beads extends beyond the vertical alignment with the periphery edge of the island surface periphery edge when the backing sheet is positioned in a horizontal plane.

A flexible abrasive sheet article has an array of abrasive coated raised island structures that are attached to a backing sheet, the abrasive article comprising: islands of a first structural material, the islands having raised island flat top surfaces; the flat top island surfaces having a monolayer of spherical abrasive agglomerate beads supported in a polymeric resin; structures have structure wall sides; structures have a structure base, the structure base having a structure base area; there are recessed areas between adjacent structures; wherein there is an abrasive island top surface border gap space between the abrasive beads located on the island surface that are positioned near the periphery edge of each island structure flat top surface and the periphery edge of the island surface periphery edge. That article wherein the abrasive island top surface border gap space between the abrasive beads located on the island surface that are positioned near the periphery edge of each island structure flat top surface and the periphery edge of the island surface periphery edge have a border gap space that is equal to at least the average diameter of the abrasive beads.

A flexible abrasive sheet article has an array of abrasive coated raised island structures that are attached to a backing sheet, the abrasive article comprising: islands of a first structural material, the islands having raised island flat top surfaces; the flat top island surfaces having a monolayer of spherical abrasive agglomerate beads supported in a polymeric resin; structures have structure wall sides; structures have a structure base, the structure base having a structure base area; there are recessed areas between adjacent structures; the beads are contacted on the bead top surface with a flat plate or roll which drives all of the beads into the resin whereby the top surface of all of the individual beads is positioned in a common plane that is parallel to the bottom support surface of the backing sheet. That article wherein the beads are contacted on the bead top surface with a flat plate or roll which drives all of the beads into the resin whereby the top surface of all of the individual beads is positioned within 20% of the average diameter of the abrasive beads of a common plane that is parallel to the bottom support surface of the backing sheet.

A flexible abrasive sheet article has a coating of spherical abrasive particles or abrasive agglomerates that are attached to a backing sheet comprising: one planar surface of the backing sheet having a monolayer of spherical abrasive particles or agglomerate beads that are supported in a polymeric resin; the abrasive particles or agglomerate agglomerates are uniformly coated on the full surface area of the backing sheet; the abrasive coated backing sheet is cut into a backing sheet area shape having a backing sheet periphery edge; wherein some of the individual abrasive particles or abrasive agglomerates that are located at the cut-sheet periphery edge of the backing sheet become loosened or have a weakened resin structural bond to the backing sheet due to the sheet periphery cutting action; the loosened or weakened abrasive particles or abrasive agglomerates located at the cut-sheet periphery edge of the backing sheet are removed from the abrasive sheet article prior to use of the abrasive article to abrade a workpiece. That article wherein the abrasive agglomerates have a spherical shape and wherein the abrasive sheet article has a circular surface area shape. Also, that article wherein the abrasive sheet article has a rectangular surface area shape and that article having a process of removing loose edge particles and agglomerates of the article wherein a jet of particle filled or non-particle filled air, or a liquid, or a combination of both air and liquid, is directed at the cut edge of the abrasive article sheet to dislodge and separate loosened or bond-weakened abrasive particles or abrasive agglomerates from the backing sheet peripheral edge, and further, that article having a process of removing loose edge particles and agglomerates wherein the cut edge of the abrasive coated abrasive article sheet is subjected to a mechanical scrubbing action to dislodge and separate loosened or bond-weakened abrasive particles or abrasive agglomerates from the backing sheet peripheral edge.

A process of making spherical abrasive agglomerates may comprise using a cell sheet wherein the cell sheet has a array of cell sheet through holes; the cell sheet through holes each have a cross sectional area; the cell sheet having a nominal thickness; the cell sheet holes form cell sheet volumes wherein a cell sheet volume is equal to the cell sheet through hole cross sectional area multiplied by the cell sheet thickness; mixing materials into a solution, the mixture solution comprising abrasive particles, an oxide, or a combination of oxides, and water or solvents or a combination thereof; filling the cell sheet holes with the mixture solution to form mixture volumes wherein the volume of mixture solution contained in each mixture volume is equal to the cell sheet volume; freezing the mixture solution contained in each cell hole to form a partial or wholly solidified mixture volume in each cell sheet hole; ejecting the frozen mixture volumes from the cell sheet by subjecting the mixture solution contained in each cell to an impinging jet of fluid wherein the impact of the impinging jet of fluid dislocates the mixture volumes from the cell sheet thereby forming independent mixture solution lump entities; wherein the ejected independent mixture solution lump entities are shaped into independent spherical entities by mixture solution surface tension forces or other forces acting on the lump entities; the independent spherical entities are introduced into and subjected to a solidification environment wherein the independent spherical entities become solidified to form loose green beads; firing the green beads at high temperatures to produce abrasive beads. That process wherein prior to ejecting the frozen mixture volumes from the cell sheet, the cell sheet is flexed sufficiently to partially or fully break the structural bond of the frozen solidified mixture volumes with the cell sheet and that process wherein prior to ejecting the frozen mixture volumes from the cell sheet, the cell sheet is heated sufficiently to weaken the structural bond of the frozen solidified mixture volumes with the cell sheet. In addition, that process wherein the cell sheet is a woven wire mesh screen and also wherein the cell sheet is a electrodeposited metal sheet having cell sheet through holes.

A process of making spherical beads may comprise: using a cell sheet wherein the cell sheet has a array of cell sheet through holes; the cell sheet through holes each have a cross sectional area; the cell sheet having a nominal thickness; the cell sheet holes form cell sheet volumes wherein a cell sheet volume is equal to the cell sheet through hole cross sectional area multiplied by the cell sheet thickness; mixing materials into a solution, the mixture solution comprising an oxide, or a combination of oxides, and water or solvents or a combination thereof; filling the cell sheet holes with the mixture solution to form mixture volumes wherein the volume of mixture solution contained in each mixture volume is equal to the cell sheet volume; freezing the mixture solution contained in each cell hole to form a partial or wholly solidified mixture volume in each cell sheet hole; ejecting the frozen mixture volumes from the cell sheet by subjecting the mixture solution contained in each cell to an impinging jet of fluid wherein the impact of the impinging jet of fluid dislocates the mixture volumes from the cell sheet thereby forming independent mixture solution lump entities; wherein the ejected independent mixture solution lump entities are shaped into independent spherical entities by mixture solution surface tension forces or other forces acting on the lump entities; the independent spherical entities are introduced into and subjected to a solidification environment wherein the independent spherical entities become solidified to form loose green beads; firing the green beads at high temperatures to produce beads. That process wherein prior to ejecting the frozen mixture volumes from the cell sheet, the cell sheet is flexed sufficiently to partially or fully break the structural bond of the frozen solidified mixture volumes with the cell sheet and that process wherein prior to ejecting the frozen mixture volumes from the cell sheet, the cell sheet is heated sufficiently to weaken the structural bond of the frozen solidified mixture volumes with the cell sheet.

One embodiment is described as a flexible abrasive sheet article having an array of abrasive coated, raised island structures attached to a backing sheet with the sheet article having an edge defining a periphery. The islands of the raised island structures comprise a structural material, and the islands have raised, flat top surfaces. The flat top surfaces of the islands comprise or consist essentially of a monolayer of spherical abrasive agglomerate beads supported in a polymeric resin. The raised island structures have structural wall sides. The raised island structures have a structural base, the structural base having a structural base area. Recessed areas are present between bases of adjacent raised island structures. Individual raised island structures that are located at the sheet article edge have structural base areas wherein the structural base area sizes of these peripheral edge structures are at least 80% of the average size of the structure base areas of all of the structures that are attached to the article backing sheet. This means that the islands around the edges are not significantly smaller than the average island, including the base area. The individual raised island structures that are located at the periphery of the backing sheet are positioned on the backing sheet whereby at least a portion of the island structure base of each of the islands located at the periphery extends completely to the edge of the backing sheet. This means that there is no 'shoulder' or empty surface space between the edge and the base of the islands.

What is claimed:

1. A method of forming a flexible abrasive sheet article having an array of abrasive coated raised island structures attached to a backing sheet, the method comprising:
   pressing spherical abrasive beads while they are in contact with a flat plate or roll to position all of the beads into a non-solidified polymeric resin on raised island flat top surfaces to level top surfaces of individual abrasive beads into a monolayer of the spherical abrasive beads into a position within a common plane that is parallel to a bottom support surface of a backing sheet;
   wherein the formed flexible abrasive sheet article has features of:
   a) raised islands comprising a first structural material, the raised islands having the raised island flat top surfaces;
   b) the raised island flat top surfaces supporting the monolayer of spherical abrasive beads supported in a polymeric resin;
   c) the raised island structures having structural wall sides free of adhered spherical abrasive;
   d) the raised island structures having a structural base, the structural base having a structure base area; and
   e) recessed areas between structural bases of adjacent raised island structures are free of adhered, spherical abrasive beads.

2. The method of claim 1 wherein the pressing positions spherical abrasive beads having an average diameter into the resin whereby a top surface of each of the individual beads is positioned within a deviation that is 20% of the average diameter of the abrasive beads from a common plane that is parallel to the bottom support surface of the backing sheet and intersects the median height of all spherical agglomerate abrasive beads.

3. The method of claim 2 wherein individual abrasive particles are used as a substitute for the spherical agglomerate abrasive beads, the abrasive particles having top particle surfaces that are exposed from the resin and wherein the abrasive article forming method comprises contacting the top exposed surfaces of the article exposed abrasive particles with a flat plate or roll, pressing the contacted abrasive particles while they are in contact with the flat plate or roll to position all of the contacted exposed particles in the non-solidified polymeric resin on the article raised island flat top surfaces to level the top surfaces of the contacted individual abrasive particles into position within a common plane that is parallel to a bottom mounting surface of the backing sheet and the resin is partially or wholly solidified whereby the top surfaces of the contacted abrasive particles are positioned in the common plane and the all of the abrasive particles are supported by the resin.

4. The method of claim 2 wherein the shape of the abrasive article is a rectangular sheet.

5. The method of claim 2 wherein the abrasive article is a circular disk having an annular band of abrasive coated raised islands.

6. The method of claim 2 wherein the abrasive article is an abrasive lapping article.

7. The method of claim 2 wherein the resin is not solidified during the abrasive bead pressing action.

8. The method of claim 2 wherein individual raised island structures that are located at the edge of the flat sheet article have structural base areas wherein the structural base area sizes of peripheral edge structures of the individual raised island structures are at least 80% of the average size of the structure base areas of all of the structures that are attached to the article backing sheet and the individual raised island structures that are located at the periphery of the backing sheet are positioned on the backing sheet whereby at least a portion of the island structure base of each of the islands located at the periphery extends completely to the edge of the backing sheet.

9. The method of claim 8 where the abrasive article backing sheet periphery has a circular shape.

10. The method of claim 8 where the abrasive article backing sheet has a serpentine or compound curved sheet edge line whereby at least a portion of the island structural base of each of the raised island structures adjacent the edge is adjacent to the serpentine or compound curved edge line of the backing sheet.

11. The method of forming the flexible abrasive sheet article of claim 1 wherein in feature b) the flat top island surfaces comprises a monolayer of spherical abrasive agglomerate beads of abrasive particles encapsulated in a porous oxide matrix where the beads are supported in a liquid non-solidified polymeric resin wherein the beads have top bead surfaces that are exposed from the resin; the backing sheet having a top raised island side and a sheet bottom article flat mounting surface side and the method further comprises mounting the sheet article on a flat platen surface with the sheet article mounting side contacting the platen flat surface, contacting the top exposed surfaces of the article exposed beads with the flat plate or roll, pressing the contacted spherical beads with the flat plate or the roll while they are in contact with the flat plate or the roll to position all of the contacted exposed beads in the non-solidified polymeric resin on the article raised island flat top surfaces to level the top surfaces of the contacted individual abrasive beads into position within a common plane that is parallel to the bottom support surface of the backing sheet; and the non-solidified resin is thereafter partially or wholly solidified whereby the top surfaces of the contacted abrasive beads are positioned in the common plane and all of the abrasive beads are supported by the resin.

12. The method of claim 11 wherein the pressing positions spherical abrasive beads having an average diameter into the resin whereby a top surface of each of the individual beads is positioned within a deviation that is 20% of the average diameter of the abrasive beads from a common plane that is parallel to the bottom support surface of the backing sheet.

13. The method of claim 11 wherein individual abrasive particles are used as a substitute for the spherical agglomerate abrasive beads, the abrasive particles having top particle surfaces that are exposed from the resin and wherein the abrasive article forming method comprises contacting the top exposed surfaces of the article exposed abrasive particles with the flat plate or roll, pressing the contacted abrasive particles while they are in contact with the flat plate or roll to position all of the contacted exposed particles in the non-solidified polymeric resin on the article raised island flat top surfaces to level the top surfaces of the contacted individual abrasive particles into position within a common plane that is parallel to the bottom support surface of the backing sheet and the resin is partially or wholly solidified whereby the top surfaces of the contacted abrasive particles are positioned in the common plane and the all of the abrasive particles are supported by the resin.

14. The method of claim 11 wherein the abrasive article is a a circular disk having an annular band of abrasive coated raised islands.

15. The method of claim 11 wherein the abrasive article is an abrasive lapping article.

16. The method of claim 11 wherein the resin is not solidified during the abrasive bead pressing action.

17. The method of claim 11 wherein individual raised island structures that are located at the edge of the sheet article have structural base areas wherein the structural base area sizes of peripheral edge structures of the individual raised island structures are at least 80% of the average size of the structure base areas of all of the structures that are attached to the article backing sheet and the individual raised island structures that are located at the periphery of the backing sheet are positioned on the backing sheet whereby at least a portion of the island structure base of each of the islands located at the periphery extends completely to the edge of the backing sheet.

18. The method of claim 17 where the abrasive article backing sheet periphery has a circular shape.

19. The method claim 17 where the abrasive article backing sheet has a serpentine or compound curved sheet edge line whereby at least a portion of the island structural base of each of the raised island structures adjacent the edge is adjacent to the serpentine or compound curved edge line of the backing sheet.

20. A method of forming a flexible abrasive sheet article having an array of abrasive coated raised island structures attached to a rectangular backing sheet comprising:

a) pressing spherical beads while they are in contact with a flat plate or roll to position all of the beads into a polymeric resin on raised island flat top surfaces to level top surfaces of individual abrasive beads into position within a common plane that is parallel to a bottom surface of the rectangular backing sheet to form a monolayer of the individual abrasive beads, wherein the flat top island surfaces comprise a monolayer of spherical abrasive agglomerate beads of abrasive particles encapsulated in a porous oxide matrix where the beads are supported in a liquid non-solidified polymeric resin wherein the beads have top bead surfaces that are exposed from the resin; the rectangular backing sheet having a top raised island side and a sheet bottom article flat mounting surface side; and wherein the method further comprises b) in a) mounting the rectangular backing sheet with raised island structures thereon on a flat platen surface with the sheet article bottom mounting side contacting the platen flat surface, contacting the top exposed surfaces of the article exposed beads with the flat plate or roll, pressing the contacted spherical beads with the flat plate or the roll while they are in contact with the flat plate or the roll to position all of the contacted exposed beads in the non-solidified polymeric resin on the article raised island flat top surfaces to level the top surfaces of the contacted individual abrasive beads into position within a common plane that is parallel to the bottom mounting surface side of the article backing sheet; and c) then the non-solidified polymeric resin is partially or wholly solidified whereby the top surfaces of the contacted abrasive beads are positioned in the common plane and all of the abrasive beads are supported by the resin, and wherein the shape of the abrasive article is a rectangular sheet.

21. A method of forming a flexible abrasive sheet article having an array of abrasive coated raised island structures attached to a backing sheet, comprising steps:

a) pressing spherical beads while they are in contact with a flat plate or roll to position all of the beads into a polymeric resin on raised island flat top surfaces to level top surfaces of individual abrasive beads into position within a common plane that is parallel to a bottom surface of the backing sheet to form a monolayer of the individual abrasive beads, wherein the flat top island surfaces comprise a monolayer of spherical abrasive agglomerate beads of abrasive particles encapsulated in a porous oxide matrix where the spherical abrasive agglomerate beads are supported in the liquid non-solidified polymeric resin wherein the beads have top bead surfaces that are exposed from the resin; the backing sheet having a top raised island side and a sheet bottom article flat mounting surface side; and wherein the method further comprises b) in a) mounting the backing sheet with raised island structures thereon on a flat platen surface with the sheet article mounting surface side contacting the platen flat surface, contacting the top exposed surfaces of the article exposed beads with a flat plate or roll, pressing the contacted spherical beads with the flat plate or the roll while they are in contact with the flat plate or the roll to position all of the contacted exposed beads in the non-solidified polymeric resin on the article raised island flat top surfaces to level the top surfaces of the contacted individual abrasive beads into position within a common plane that is parallel to the bottom mounting surface side of the article backing sheet; and c) then the resin is partially or wholly solidified whereby the top surfaces of the contacted abrasive beads are positioned in the common plane and all of the abrasive beads are supported by the resin, and wherein the shape of the abrasive article is a circular abrasive disk.

22. A method of forming a flexible abrasive sheet article having an array of abrasive coated raised island structures attached to a backing sheet, the method comprising:

a) pressing spherical abrasive agglomerate beads while they are in contact with a flat plate or roll to position all spherical abrasive agglomerate beads into a liquid non-solidified polymeric resin on raised island flat top surfaces to level top surfaces of the individual abrasive beads into position within a common plane that is parallel to a bottom surface of the backing sheet, forming a monolayer of the spherical beads, thereby forming the flexible abrasive sheet article having features of:

islands comprising a first structural material, the islands having raised island flat top surfaces;

the flat top island surfaces comprising a monolayer of spherical abrasive beads supported in the liquid non-solidified polymeric resin;

the raised island structures having structural wall sides;

the raised island structures having a structural base, the structural base having a structure base area; and recessed areas between structural bases of adjacent raised island structures; wherein the spherical abrasive agglomerate beads comprise abrasive particles encapsulated in a porous oxide matrix in which the beads are supported in the liquid non-solidified polymeric resin such that the beads have top bead surfaces that are exposed from the resin; the backing sheet having a top raised island side and a sheet bottom article flat mounting surface side; and wherein the method further comprises b) mounting the backing sheet having raised island structures with flat top surfaces on a flat platen surface with the sheet article mounting side contacting the platen flat surface, contacting the top exposed surfaces of the article exposed beads with the flat plate or roll, pressing the contacted spherical beads with the flat plate or the roll while they are in contact with the flat plate or the roll to position all of the contacted exposed beads in the non-solidified polymeric resin on the article raised island flat top surfaces to level the top surfaces of the contacted individual abrasive beads into position within a common plane that is parallel to the bottom mounting surface of the article backing sheet; and c) the resin is partially or wholly solidified whereby the top surfaces of the contacted abrasive beads are positioned in the common plane and all of the abrasive beads are supported by the resin, and wherein the resin is partially solidified during the abrasive bead pressing.

23. The method of claim 22 where the abrasive article backing sheet periphery has a rectangular shape.

24. The method of claim 22 wherein the shape of the abrasive article is a circular abrasive disk.

25. The method of claim 22 wherein the resin is partially solidified during the abrasive bead pressing action.

26. The method of claim 22 wherein individual raised island structures that are located at the edge of the sheet article have structural base areas wherein the structural base area sizes of peripheral edge structures of the individual raised island structures are at least 80% of the average size of the structure base areas' of all of the structures that are attached to the article backing sheet and the individual raised island structures that are located at the periphery of the backing sheet are positioned on the backing sheet whereby at least a portion of the island structure base of each of the islands located at the periphery extends completely to the edge of the backing sheet and where the abrasive article backing sheet periphery has a rectangular shape.

* * * * *